(12) United States Patent
Blagg et al.

(10) Patent No.: US 12,552,758 B2
(45) Date of Patent: Feb. 17, 2026

(54) INHIBITORS OF MLH1 AND/OR PMS2 FOR CANCER TREATMENT

(71) Applicant: NeoPhore Limited, Cheshire (GB)

(72) Inventors: Julian Blagg, London (GB); Jon Roffey, London (GB); Martin Drysdale, London (GB); Paul Winship, Saffron Walden (GB); David Clark, Saffron Walden (GB)

(73) Assignee: NeoPhore Limited, Altrincham (GB)

( * ) Notice: Subject to any disclaimer, the term of this patent is extended or adjusted under 35 U.S.C. 154(b) by 554 days.

(21) Appl. No.: 17/925,493

(22) PCT Filed: Jun. 1, 2021

(86) PCT No.: PCT/GB2021/051349
§ 371 (c)(1),
(2) Date: Nov. 15, 2022

(87) PCT Pub. No.: WO2021/245405
PCT Pub. Date: Dec. 9, 2021

(65) Prior Publication Data
US 2023/0183197 A1 Jun. 15, 2023

(30) Foreign Application Priority Data
Jun. 1, 2020 (GB) .................... 2008201

(51) Int. Cl.
| C07D 295/16 | (2006.01) |
| A61K 45/06 | (2006.01) |
| C07D 207/12 | (2006.01) |
| C07D 209/08 | (2006.01) |
| C07D 209/44 | (2006.01) |
| C07D 211/42 | (2006.01) |
| C07D 213/16 | (2006.01) |
| C07D 215/08 | (2006.01) |
| C07D 217/04 | (2006.01) |
| C07D 217/16 | (2006.01) |
| C07D 231/12 | (2006.01) |
| C07D 239/26 | (2006.01) |

(Continued)

(52) U.S. Cl.
CPC ............ *C07D 295/16* (2013.01); *A61K 45/06* (2013.01); *C07D 207/12* (2013.01); *C07D 209/08* (2013.01); *C07D 209/44* (2013.01); *C07D 211/42* (2013.01); *C07D 213/16* (2013.01); *C07D 215/08* (2013.01); *C07D 217/04* (2013.01); *C07D 217/16* (2013.01); *C07D 231/12* (2013.01); *C07D 239/26* (2013.01); *C07D 249/04* (2013.01); *C07D 265/36* (2013.01); *C07D 401/04* (2013.01); *C07D 401/12* (2013.01); *C07D 403/04* (2013.01); *C07D 403/12* (2013.01); *C07D 405/12* (2013.01); *C07D 471/04* (2013.01)

(58) Field of Classification Search
CPC .. C07D 295/16; C07D 207/12; C07D 209/08; C07D 209/44; C07D 211/42; C07D 213/16; C07D 215/08; C07D 217/04; C07D 217/16; C07D 231/12; C07D 239/26; C07D 249/04; C07D 265/36; C07D 401/04; C07D 401/12; C07D 403/04; C07D 403/12; C07D 405/12; C07D 471/04; A61K 45/06
See application file for complete search history.

(56) References Cited

U.S. PATENT DOCUMENTS

| 2005/0245741 A1* | 11/2005 | Hossain ................. A61P 11/00 546/17 |
| 2011/0098290 A1 | 4/2011 | Williams et al. |

(Continued)

FOREIGN PATENT DOCUMENTS

| WO | WO-2006/117669 A1 | 11/2006 |
| WO | WO-2008/044027 A2 | 4/2008 |

(Continued)

OTHER PUBLICATIONS

Thornber. Isosterism and Molecular Modification in Drug Design. Chem. Soc. Rev., 1979, 8, 563-580 (Year: 1979).*

(Continued)

*Primary Examiner* — Andrew D Kosar
(74) *Attorney, Agent, or Firm* — Foley Hoag LLP; David P. Halstead; Alexander J. Chatterley

(57) ABSTRACT

The present invention relates to compounds of Formula (I) that target the MLH1 and/or PMS2 proteins that are components of the DNA Mismatch Repair (MMR) process:

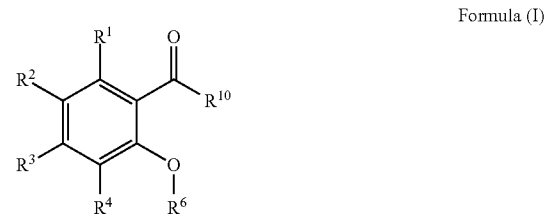

Formula (I)

wherein $R^1$, $R^2$, $R^3$, $R^4$, $R^6$ and $R^{10}$ are each as defined herein. The present invention also relates to processes for the preparation of these compounds, to pharmaceutical compositions comprising them, and to their use in the treatment of proliferative disorders, such as cancer, as well as other diseases or conditions in which MLH1 and/or PMS2 activity is implicated.

19 Claims, 16 Drawing Sheets

(51) Int. Cl.
*C07D 249/04* (2006.01)
*C07D 265/36* (2006.01)
*C07D 401/04* (2006.01)
*C07D 401/12* (2006.01)
*C07D 403/04* (2006.01)
*C07D 403/12* (2006.01)
*C07D 405/12* (2006.01)
*C07D 471/04* (2006.01)

(56) References Cited

U.S. PATENT DOCUMENTS

| | | |
|---|---|---|
| 2013/0210820 A1 | 8/2013 | Williams et al. |
| 2018/0016274 A1 | 1/2018 | Stockley et al. |
| 2019/0375732 A1 | 12/2019 | Hung et al. |
| 2023/0061002 A1 | 3/2023 | Blagg et al. |

FOREIGN PATENT DOCUMENTS

| | | |
|---|---|---|
| WO | WO-2008/044034 A1 | 4/2008 |
| WO | WO-2008/044054 A2 | 4/2008 |
| WO | WO-2009/060835 A1 | 5/2009 |
| WO | WO-2009/125230 A1 | 10/2009 |
| WO | WO-2013/106643 A2 | 7/2013 |
| WO | WO-2015/038649 A1 | 3/2015 |
| WO | WO-2017/182783 A2 | 10/2017 |
| WO | WO-2018/013840 A1 | 1/2018 |
| WO | WO-2018/132769 A1 | 7/2018 |
| WO | WO-2019/014600 A1 | 1/2019 |
| WO | WO-2019/118830 A1 | 6/2019 |
| WO | WO-2020/014409 A1 | 1/2020 |
| WO | WO-2020/104820 A1 | 5/2020 |
| WO | WO-2021/148786 A1 | 7/2021 |
| WO | WO-2021/245405 A1 | 12/2021 |
| WO | WO-2023/002165 A1 | 1/2023 |
| WO | WO-2024/153947 A1 | 7/2024 |

OTHER PUBLICATIONS

Database CA [Online], Chemical Abstracts Service, Columbus, Ohio, US; Kimura, Shinya et al.: ""Preparation of 2H-chromen-2-one, I,2-dihydroquinolin-2-one, and 3H-isoquinolin-3-one derivatives having ubiquitin-binding activity"", XP002803853, retrieved from STN Database accession No. 2009:580918 abstract & WO 2009/060835 AI (Univ Kyoto [JP]; Riken [JP] et al.) May 14, 2009 (May 14, 2009).
Database Chemcats [Online], Chemical Abstracts Service, Columbus, Ohio, US; Feb. 27, 2020 (Feb. 27, 2020), Aurora Screening Compounds 3: XP002803852, Database accession No. 1915233285, 1857559366, 1506809590, 1300807168, AN: 1113588225, AN: 0652247019, AN: 0580432166, AN: 0373840129 corresponding to RN: 2472069-33-1, RN: 2402034-10-8, RN: 2403532-27-2, RN: 2405990-30-7, RN: 2373605-21-9, RN: 2471417-65-7.
International Search Report and Written Opinion for International Application No. PCT/GB2021/051349, mailed Aug. 20, 2021.
Leenders et al., "Cancer prevention by aspirin in children with Constitutional Mismatch Repair Deficiency (CMMRD)," European Journal of Human Genetics, 26: pp. 1417-1423 (2018).
CAS Registry, RN 1205503-07-6, Entered STN: Feb. 10, 2010.
CAS Registry, RN 1205503-88-3, Entered STN: Feb. 10, 2010.
CAS Registry, RN 1205651-62-2, Entered STN: Feb. 10, 2010.
CAS Registry, RN 1205956-70-2, Entered STN: Feb. 11, 2010.
CAS Registry, RN 1787791-23-4, Entered STN: Jun. 24, 2015.
CAS Registry, RN 1787938-12-8, Entered STN: Jun. 24, 2015.
CAS Registry, RN 1789367-78-7, Entered STN: Jun. 26, 2015.
CAS Registry, RN 1789647-37-5, Entered STN: Jun. 26, 2015.
CAS Registry, RN 2175533-83-0, Entered STN: Feb. 18, 2018.
CAS Registry, RN 2176339-35-6, Entered STN: Feb. 19, 2018.
CAS Registry, RN 2178341-19-8, Entered STN: Feb. 22, 2018.
CAS Registry, RN 2178690-92-9, Entered STN: Feb. 22, 2018.
CAS Registry, RN 2308309-15-9, Entered STN: May 15, 2019.
CAS Registry, RN 2308341-72-0, Entered STN: May 15, 2019.
CAS Registry, RN 2309215-16-3, Entered STN: May 16, 2019.
CAS Registry, RN 2309421-83-6, Entered STN: May 16, 2019.
CAS Registry, RN 2309595-03-5, Entered STN: May 17, 2019.
CAS Registry, RN 2309697-85-4, Entered STN: May 17, 2019.
CAS Registry, RN 2309799-38-8, Entered STN: May 17, 2019.
CAS Registry, RN 2309872-58-8, Entered STN: May 17, 2019.
CAS Registry, RN 2319690-79-2, Entered STN: May 28, 2019.
CAS Registry, RN 2319779-92-3, Entered STN: May 29, 2019.
CAS Registry, RN 2319894-26-1, Entered STN: May 29, 2019.
CAS Registry, RN 2319910-48-8, Entered STN: May 29, 2019.
CAS Registry, RN 2320038-07-9, Entered STN: May 29, 2019.
CAS Registry, RN 2320127-11-3, Entered STN: May 29, 2019.
CAS Registry, RN 2320200-21-1, Entered STN: May 29, 2019.
CAS Registry, RN 2320354-64-9, Entered STN: May 29, 2019.
CAS Registry, RN 2320366-84-3, Entered STN: May 29, 2019.
CAS Registry, RN 2320527-80-6, Entered STN: May 29, 2019.
CAS Registry, RN 2320687-14-5, Entered STN: May 30, 2019.
CAS Registry, RN 2320826-51-3, Entered STN: May 30, 2019.
CAS Registry, RN 2323186-97-4, Entered STN: Jun. 3, 2019.
CAS Registry, RN 2323202-04-4, Entered STN: Jun. 3, 2019.
CAS Registry, RN 2323321-41-9, Entered STN: Jun. 3, 2019.
CAS Registry, RN 2323832-22-8, Entered STN: Jun. 4, 2019.
CAS Registry, RN 2323865-95-6, Entered STN: Jun. 4, 2019.
CAS Registry, RN 2323926-99-2, Entered STN: Jun. 4, 2019.
CAS Registry, RN 2324489-57-6, Entered STN: Jun. 5, 2019.
CAS Registry, RN 2370266-61-6, Entered STN: Aug. 30, 2019.
CAS Registry, RN 2370706-42-4, Entered STN: Aug. 30, 2019.
CAS Registry, RN 2371690-58-1, Entered STN: Sep. 1, 2019.
CAS Registry, RN 2372664-35-0, Entered STN: Sep. 3, 2019.
CAS Registry, RN 2372772-96-6, Entered STN: Sep. 3, 2019.
CAS Registry, RN 2373061-79-9, Entered STN: Sep. 3, 2019.
CAS Registry, RN 2373874-32-7, Entered STN: Sep. 4, 2019.
CAS Registry, RN 2389560-46-5, Entered STN: Dec. 12, 2019.
CAS Registry, RN 2390800-65-2, Entered STN: Dec. 15, 2019.
CAS Registry, RN 2401412-76-6, Entered STN: Jan. 7, 2020.
CAS Registry, RN 2405499-84-3, Entered STN: Jan. 13, 2020.
CAS Registry, RN 2406731-67-5, Entered STN: Jan. 14, 2020.
Geng et al., "Design, synthesis and pharmacological evaluation of ALK and Hsp90 dual inhibitors bearing resorcinol and 2,4-diaminopyrimidine motifs," European Journal of Medicial Chemistry, 152: 76-86 (2018).
Howes et al., "A fluorescence polarization assay for inhibitor of HSP90," Analytical Biochemistry, 350(2): 202-213 (2006).
International Preliminary Report on Patentability for International Application No. PCT/GB21/50122 dated Jul. 26, 2022.
International Search Report and Written Opinion for International Application No. PCT/GB21/50122 dated Mar. 26, 2021.
International Search Report and Written Opinion for International Application No. PCT/GB24/50147 dated Apr. 2, 2024.
United Kingdom Search Report for GB Application No. 2000789.4 dated Jul. 28, 2020.
United Kingdom Search Report for GB Application No. 2003559.8 dated Aug. 24, 2020.
United Kingdom Search Report for GB Application No. 2300881.6 dated Jul. 14, 2023.

* cited by examiner

INHIBITORS OF MLH1 AND/OR PMS2 FOR CANCER TREATMENT

RELATED APPLICATIONS

This application is a U.S. National Stage filing under 35 U.S.C. § 371 of PCT Application No. PCT/GB2021/051349, filed Jun. 1, 2021, which claims priority from United Kingdom Patent Application No. 2008201.2, filed on Jun. 1, 2020, in the United Kingdom. The contents of International Patent Application PCT/GB2021/051349 are incorporated herein by reference in their entirety.

INTRODUCTION

The present invention relates to certain compounds that function as inhibitors of MLH1 and/or PMS2 protein activity. The compounds of the present invention may be used to treat disease or conditions mediated, at least in part, by inappropriate MLH1 and PMS2 activity, for example, cancer. The invention furthermore relates to the use of the compounds as pharmaceuticals, processes for making them and pharmaceutical compositions comprising them.

BACKGROUND OF THE INVENTION

Cancer is caused by altered cellular proliferation. Precisely what causes a cell to become malignant and proliferate in an uncontrolled and unregulated manner has been the focus of intense research over recent decades. This research has led to the identification of molecular targets associated with key pathways that enable such malignancies.

Mismatch repair (MMR) is a highly conserved DNA repair pathway that plays a major role during DNA replication, repair and recombination, as well as during meiosis in eukaryotes and immunoglobulin maturation/diversification in mammals. MMR promotes genome stability in all organisms by correcting DNA base mismatches and insertion/deletion (indel) loops that can occasionally arise during normal DNA replication process. Base pair mismatches occur when incorrect nucleotides are inserted into the newly synthesized DNA strand and escape the proofreading function of DNA polymerases. Indel loops commonly arise in the context of microsatellites—highly polymorphic short repetitive DNA sequences distributed throughout both prokaryotic and eukaryotic genomes. Typically, at microsatellites, the template and primer strands are prone to slippage (dissociation and reannealing) during replication, which can generate loop structures and a discordant number of repeat units between the template and newly synthesized strand.

DNA mismatch repair is a bidirectional excision and re-synthesis system that initiates at a defined strand scission 3'- or 5'- to a mismatch; the excision tract extends just past the mismatch. MMR can be divided into four steps: 1) mismatch recognition by MSH proteins; 2) recruitment of MLH proteins that connect the mismatch recognition signal to where the distant DNA strand scission begins; 3) excision of the errant DNA strand, and 4) re-synthesis of the excision gap using the remaining DNA strand as a template [1]. MMR is a highly conserved biological pathway. In humans, mismatch recognition by hMutSα (MSH2-MSH6) or hMutSβ (MSH2-MSH3) initiates the MMR pathway. Binding of hMutSα or hMutSβ to the mismatch site results in the recruitment of MutLα (MLH1-PMS2) to form a ternary complex whose protein-protein and protein-DNA interactions are modulated by ATP/ADP cofactors. Proliferating cell nuclear antigen (PCNA) may play a role in the recruitment of MMR proteins to the vicinity of the replication fork [1]. PCNA may also activate a latent endonuclease activity in eukaryotic MutLα proteins. After DNA incision, exonuclease 1 (EXO1) is recruited which excises the newly synthesized DNA strand and the DNA excision gap is re-synthesized by DNA polymerase δ (Polδ). When DNA re-synthesis is complete, the remaining nick is ligated by DNA ligase to restore the integrity of the duplex [2]. Consistent with this function, MMR is an important tumor suppressor pathway that is lost in up to 40% of sporadic cancers. Moreover, individuals with germline mutations in MMR genes develop cancer predisposition conditions.

Lynch Syndrome (LS, formerly designated as hereditary non-polyposis colorectal cancer) is the most common cause of hereditary colorectal cancer (CRC), accounting for 2-5% of all cases. LS is also characterized by an increased risk of malignancies at certain extracolonic sites such as the endometrium, ovary, stomach and small bowel, among others [3]. LS has an autosomal dominant inheritance pattern and is caused by germline mutations in MMR genes MLH1, MSH2, MSH6 or PMS2. Gene expression from the one wild-type allele is sufficient for adequate MMR activity until a second hit inactivates the wild-type allele leading to MMR deficiency.

Constitutional mismatch repair deficiency (CMMRD) syndrome is a distinct childhood cancer predisposition syndrome that results from biallelic germline mutations in one of the four MMR genes, MLH1, MSH2, MSH6 or PMS2. Patients may have either homozygous biallelic alterations or heterozygous alterations of MMR genes.

MMR-deficient cancers are commonly and typically characterized by the accumulation of DNA mutations at higher rates than normal cells and other tumours; for example, CMMRD tumours commonly have an ultra-hypermutated phenotype (>250 substitution mutations/Mb) [4]. MMR deficiency also results in gains or losses in the repeat length of microsatellites, referred to as microsatellite instability (MSI). Cancers that possess more than 40% microsatellite variations (positive for two or more of five microsatellite markers routinely tested) are described as high frequency MSI (MSI-H). Tumours that have no MSI are microsatellite stable (MSS) and those that possess less than 40% microsatellite variations (one out of the five markers showing microsatellite instability) are low frequency MSI (MSI-L) [5]. MSI analysis is a widely used diagnostic biomarker of MMR-deficient tumours and MSI status is linked with a high prevalence of frameshift (FS) mutations that can occur because of insertion/deletion within coding microsatellites. In addition to altering downstream functions of the protein, the FS creates a new amino acid sequence that serves as a substrate for antigen processing and presentation [6], stimulating the activation of CD8+ T cells (class I) and the "helper" function of CD4+ T cells (class II).

Cancers with a greater number of neoantigens are more prone to immune surveillance and have an increased likelihood of responding to immunotherapy [7]; higher neoantigen load is associated with overall lymphocytic infiltration, TILs, memory T cells, and survival in colorectal cancer [8, 9]. This feature supports a rationale for immunotherapy-based treatment strategies [6]. Consistent with this notion, immune checkpoint inhibitors now offer a significant therapeutic advance in the treatment of MMR-deficient cancers. Inhibitors of PD-1; for example, pembrolizumab (Keytruda) and nivolumab (Opdivo), have been approved by the Food and Drug Administration (FDA) for patients with MMR-D or MSI-H metastatic CRC based upon the significant survival benefit they provide. The CTLA-4 inhibitor ipilimumab (Yervoy), has been approved for use in combination with nivolumab for the treatment of MMR-D or MSI-H CRC patients who were previously treated with chemotherapy. Importantly, the FDA has approved the use of pembrolizumab in MMR-D/MSI-H cancers regardless of histological tumour type [10].

It is now accepted that clinical responses to immune checkpoint inhibitors require the existence of tumour neoantigens and infiltration of T cells that recognize such neoantigens. Higher neoantigen load is associated with response to CTLA-4 and PD-1 blockade in patients with melanoma and non-small-cell lung cancer [11, 12, 13]. The number of neoantigens is linked to TMB, and several large studies have confirmed that high TMB correlates with enhanced checkpoint inhibitor responses and improved overall survival in certain tumour types, such as urothelial carcinoma [14], non-small cell lung cancer [15-18] and small cell lung cancer [19].

Germano et al. recently proposed that MMR inactivation through silencing of MLH1 increases TMB and leads to "dynamic mutational profiles", resulting in persistent renewal of neoantigens both in vitro and in vivo. This triggers immune surveillance and leads to the control of tumour growth, particularly in combination with immune checkpoint inhibition, in mouse models [20]. Similar results are observed upon silencing of MSH2 [21].

Guan et al. and Lu et al. report that MLH1 deficiency leads to cytosolic DNA release, activation of the cGAS-STING pathway and IFN-3 production. Guan et al. demonstrate that MLH1 loss leads to DNA hyperexcision, RPA exhaustion, chromosomal instability and accumulation of cytosolic DNA. Lu et al. report that the sensing of cytosolic DNA by the cGAS STING pathway contributes to the clinical benefit of immunotherapy in patients harboring MMR deficient tumours. Together these reports suggest that abrogation of MMR activity may elicit beneficial immune activation through activation of the cGAS-STING pathway.

There is therefore a robust biological and clinical rationale highlighting the need for inhibitors that target the MLH1 and/or PMS2 proteins, key components of DNA MMR to reawaken an anti-tumour immune response.

Thus, the present invention provides methods for the treatment of cancer by binding to and modulating the function of the DNA MMR components MLH1 and/or PMS2 using small molecules as single agents and in combination with immunotherapy agents, other DNA damage response pathway modulators and/or standard-of-care chemotherapeutic agents.

Outside of the cancer field, triplet repeat disorders comprise over 30 human neurodegenerative and neuromuscular inherited diseases such as Huntington's disease (HD), myotonic dystrophy type 1 (DM1), fragile X syndrome type A (FRAXA), Friedreich's ataxia (FRDA), and spinocerebellar ataxias (SCAs). Such disorders are characterized by the expansion of simple repeats in genomic DNA. These unstable repeats are commonly found at different regions of several genes and their expansion can cause disease by a variety of both loss- and gain-of-function pathways, for instance through interfering with the expression or properties of the gene products, or by affecting splicing or antisense regulation. Several mechanisms including errors during DNA replication, meiotic recombination, transcription, DNA repair, and chromatin remodeling have been proposed to contribute to repeat instability, which can occur at various stages of the cell cycle. There is evidence that a functional MMR pathway is required for maintaining the stability of microsatellite sequences: for example, Msh2−/− transgenic mice bearing a copy of the human HD exon 1 (containing the CAG repeats) showed reduced expansion of the introduced (CAG)n repeats when compared with Msh2+/+HD exon 1 mice counterparts [22].

Thus, there is a further need for compounds that target MLH1 and/or PMS2 components of the DNA MMR process for treating triplet repeat disorders. The present invention was devised with the foregoing in mind.

REFERENCES

1. Martin-Lopez, J. V. and R. Fishel, *The mechanism of mismatch repair and the functional analysis of mismatch repair defects in Lynch syndrome.* Fam Cancer, 2013. 12(2): p. 159-68.
2. Liu, D., G. Keijzers, and L. J. Rasmussen, *DNA mismatch repair and its many roles in eukaryotic cells.* Mutat Res, 2017. 773: p. 174-187.
3. Lynch, H. T., et al., *Review of the Lynch syndrome: history, molecular genetics, screening, differential diagnosis, and medicolegal ramifications.* Clin Genet, 2009. 76(1): p. 1-18.
4. Shlien, A., et al., Combined hereditary and somatic mutations of replication error repair genes result in rapid onset of ultra-hypermutated cancers. Nat Genet, 2015. 47(3): p. 257-62
5. Sehgal, R., et al., *Lynch syndrome: an updated review.* Genes (Basel), 2014. 5(3): p. 497-507
6. Willis, J. A., et al., *Immune Activation in Mismatch Repair-Deficient Carcinogenesis: More Than Just Mutational Rate.* Clin Cancer Res, 2019.
7. Gubin, M. M. and R. D. Schreiber, *CANCER. The odds of immunotherapy success.* Science, 2015. 350(6257): p. 158-9.
8. Kloor, M. and M. von Knebel Doeberitz, *The Immune Biology of Microsatellite-Unstable Cancer.* Trends Cancer, 2016. 2(3): p. 121-133.
9. Giannakis, M., et al., *Genomic Correlates of Immune-Cell Infiltrates in Colorectal Carcinoma.* Cell Rep, 2016. 17(4): p. 1206.
10. Lemery, S., P. Keegan, and R. Pazdur, *First FDA Approval Agnostic of Cancer Site—When a Biomarker Defines the Indication.* N Engl J Med, 2017. 377(15): p. 1409-1412.
11. Le, D. T., et al., *PD-1 Blockade in Tumors with Mismatch-Repair Deficiency.* N Engl J Med, 2015. 372(26): p. 2509-20.
12. Rizvi, N. A., et al., *Cancer immunology. Mutational landscape determines sensitivity to PD-1 blockade in non-small cell lung cancer.* Science, 2015. 348(6230): p. 124-8.
13. Van Allen, E. M., et al., *Genomic correlates of response to CTLA-4 blockade in metastatic melanoma.* Science, 2015. 350(6257): p. 207-211.
14. Rosenberg, J E., et al., *Atezolizumab in patients with locally advanced and metastatic urothelial carcinoma who have progressed following treatment with platinum-based chemotherapy: a single-arm, multicentre, phase 2 trial.* Lancet, 2016. 387(10031): p. 1909-20.
15. Hellmann, M. D., et al., *Genomic Features of Response to Combination Immunotherapy in Patients with Advanced Non-Small-Cell Lung Cancer.* Cancer Cell, 2018. 33(5): p. 843-852 e4.
16. Rizvi, H., et al., *Molecular Determinants of Response to Anti-Programmed Cell Death (PD)-1 and Anti-Programmed Death-Ligand 1 (PD-L1) Blockade in Patients*

With Non-Small-Cell Lung Cancer Profiled With Targeted Next-Generation Sequencing. J Clin Oncol, 2018. 36(7): p. 633-641.
17. Carbone, D. P., et al., *First-Line Nivolumab in Stage IV or Recurrent Non-Small-Cell Lung Cancer.* N Engl J Med, 2017. 376(25): p. 2415-2426.
18. Hellmann, M. D., et al., *Nivolumab plus Ipilimumab in Lung Cancer with a High Tumor Mutational Burden.* N Engl J Med, 2018. 378(22): p. 2093-2104.
19. Hellmann, M. D., et al., *Tumor Mutational Burden and Efficacy of Nivolumab Monotherapy and in Combination with Ipilimumab in Small-Cell Lung Cancer.* Cancer Cell, 2018. 33(5): p. 853-861 e4.
20. Germano, G., et al., *Inactivation of DNA repair triggers neoantigen generation and impairs tumour growth.* Nature, 2017. 552(7683): p. 116-120.
21. Mandal, R., et al., *Genetic diversity of tumors with mismatch repair deficiency influences anti-PD-1 immunotherapy response.* Science, 2019. 364(6439): p. 485-491.
22. Lu, C., et al. *DNA sensing in mismatch repair-deficient tumor cells is essential for anti-tumor immunity.* Cancer Cell. 2021, 39 (1), 96-108.
23. Guan J., et al., *MLH1 deficiency-triggered DNA hyperexcision by exonuclease 1 activates the cGAS-STING pathway.* Cancer Cell. 2021, 39 (1), 109-121,
24. Manley, K., et al., *Msh2 deficiency prevents in vivo somatic instability of the CAG repeat in Huntington disease transgenic mice.* Nat Genet, 1999. 23(4): p. 471-3.

SUMMARY OF THE INVENTION

According to a first aspect of the present invention there is provided a compound, or a pharmaceutically acceptable salt, hydrate or solvate thereof, as defined herein.

According to a further aspect of the present invention, there is provided a pharmaceutical composition comprising a compound as defined herein, or a pharmaceutically acceptable salt, hydrate or solvate thereof, in admixture with a pharmaceutically acceptable diluent or carrier.

According to a further aspect of the present invention, there is provided a method of inhibiting MLH1 and/or PMS2 activity (e.g. MLH1 activity or PMS2 activity or MLH1 and PMS2 activity), in vitro or in vivo, said method comprising contacting a cell with an effective amount of a compound or a pharmaceutically acceptable salt, hydrate or solvate thereof as defined herein.

According to a further aspect of the present invention, there is provided a method of treating a disease or disorder in which MLH1 and/or PMS2 activity (e.g. MLH1 activity or PMS2 activity or MLH1 and PMS2 activity) is implicated in a patient in need of such treatment, said method comprising administering to said patient a therapeutically effective amount of a compound or a pharmaceutically acceptable salt, hydrate or solvate thereof as defined herein, or a pharmaceutical composition as defined herein.

According to a further aspect of the present invention, there is provided a method of treating a proliferative disorder in a patient in need of such treatment, said method comprising administering to said patient a therapeutically effective amount of a compound or a pharmaceutically acceptable salt, hydrate or solvate thereof as defined herein, or a pharmaceutical composition as defined herein.

According to a further aspect of the present invention, there is provided a method of treating cancer in a patient in need of such treatment, said method comprising administering to said patient a therapeutically effective amount of a compound or a pharmaceutically acceptable salt, hydrate or solvate thereof as defined herein, or a pharmaceutical composition as defined herein.

According to a further aspect of the present invention, there is provided a method of treating a triplet disorder (e.g. Huntington's disease (HD), myotonic dystrophy type 1 (DM1), fragile X syndrome type A (FRAXA), Friedreich's ataxia (FRDA), and spinocerebellar ataxias (SCAs)) in a patient in need of such treatment, said method comprising administering to said patient a therapeutically effective amount of a compound or a pharmaceutically acceptable salt, hydrate or solvate thereof as defined herein, or a pharmaceutical composition as defined herein.

According to a further aspect of the present invention, there is provided a compound, or a pharmaceutically acceptable salt, hydrate or solvate thereof, or a pharmaceutical composition as defined herein for use in therapy.

According to a further aspect of the present invention, there is provided a compound, or a pharmaceutically acceptable salt, hydrate or solvate thereof, or a pharmaceutical composition as defined herein for use as a medicament.

According to a further aspect of the present invention, there is provided a compound or a pharmaceutically acceptable salt, hydrate or solvate thereof as defined herein, or a pharmaceutical composition as defined herein, for use in the treatment of a proliferative disorder.

According to a further aspect of the present invention, there is provided a compound, or a pharmaceutically acceptable salt, hydrate or solvate thereof, or a pharmaceutical composition as defined herein for use in the treatment of cancer. In a particular embodiment, the cancer is human cancer.

According to a further aspect of the present invention, there is provided a compound, or a pharmaceutically acceptable salt, hydrate or solvate thereof, or a pharmaceutical composition as defined herein for use in the treatment of a triplet disorder. In a particular embodiment, the triplet disorder is selected from the group consisting of Huntington's disease (HD), myotonic dystrophy type 1 (DM1), fragile X syndrome type A (FRAXA), Friedreich's ataxia (FRDA), and spinocerebellar ataxias (SCAs).

According to a further aspect of the present invention, there is provided a compound, or a pharmaceutically acceptable salt, hydrate or solvate thereof, as defined herein for use in the inhibition of MLH1 and/or PMS2 activity (e.g. MLH1 activity or PMS2 activity or MLH1 and PMS2 activity).

According to a further aspect of the present invention, there is provided a compound, or a pharmaceutically acceptable salt, hydrate or solvate thereof, as defined herein for use in the treatment of a disease or disorder in which MLH1 and/or PMS2 activity (e.g. MLH1 activity or PMS2 activity or MLH1 and PMS2 activity) is implicated.

According to a further aspect of the present invention, there is provided the use of a compound, or a pharmaceutically acceptable salt, hydrate or solvate thereof, as defined herein in the manufacture of a medicament for the treatment of a proliferative disorder.

According to a further aspect of the present invention, there is provided the use of a compound, or a pharmaceutically acceptable salt, hydrate or solvate thereof, as defined herein in the manufacture of a medicament for the treatment of cancer.

According to a further aspect of the present invention, there is provided the use of a compound, or a pharmaceutically acceptable salt, hydrate or solvate thereof, as defined herein in the manufacture of a medicament for the treatment of a triplet disorder. In a particular embodiment, the triplet disorder is selected from the group consisting of Huntington's disease (HD), myotonic dystrophy type 1 (DM1), fragile X syndrome type A (FRAXA), Friedreich's ataxia (FRDA), and spinocerebellar ataxias (SCAs).

According to a further aspect of the present invention, there is provided a use of a compound, or a pharmaceutically acceptable salt, hydrate or solvate thereof, as defined herein in the manufacture of a medicament for the inhibition of MLH1 and/or PMS2 activity (e.g. MLH1 activity or PMS2 activity or MLH1 and PMS2 activity).

According to a further aspect of the present invention, there is provided a use of a compound, or a pharmaceutically acceptable salt, hydrate or solvate thereof, as defined herein in the manufacture of a medicament for the treatment of a disease or disorder in which MLH1 and/or PMS2 activity (e.g. MLH1 activity or PMS2 activity or MLH1 and PMS2 activity) is implicated.

According to a further aspect of the present invention, there is provided a process for preparing a compound, or a pharmaceutically acceptable salt, hydrate or solvate thereof, as defined herein.

According to a further aspect of the present invention, there is provided a compound, or a pharmaceutically acceptable salt, hydrate or solvate thereof, obtainable by, or obtained by, or directly obtained by a process of preparing a compound as defined herein.

According to a further aspect of the present invention, there are provided novel intermediates as defined herein which are suitable for use in any one of the synthetic methods set out herein.

In the above-outlined aspects of the invention, the proliferative disorder is suitably cancer, and the cancer is suitably a human cancer. In particular, the compounds of the present invention will be useful for the treatment of any cancer in which mis-match repair inhibition and/or cGAS/STING pathway activation is beneficial. Any suitable cancer may be targeted (e.g. adenoid cystic carcinoma, adrenal gland tumor, amyloidosis, anal cancer, appendix cancer, astrocytoma, ataxia-telangiectasia, Beckwith-Wiedemann Syndrome, bile duct cancer (cholangiocarcinoma), Birt-Hogg-Dubé Syndrome, bladder cancer, bone cancer, brain stem glioma, brain tumor, breast cancer, Carney Complex, central nervous system tumors, cervical cancer, colorectal cancer, Cowden Syndrome, craniopharyngioma, desmoplastic infantile ganglioglioma, ependymoma, esophageal cancer, Ewing sarcoma, eye cancer, eyelid cancer, familial adenomatous polyposis, familial GIST, familial malignant melanoma, familial non-VHL clear cell renal cell carcinoma, familial pancreatic cancer, gallbladder cancer, gastrointestinal stromal tumor—GIST, germ cell tumor, gestational trophoblastic disease, head and neck cancer, hereditary breast and ovarian cancer, hereditary diffuse gastric cancer, hereditary leiomyomatosis and renal cell cancer, hereditary mixed polyposis syndrome, hereditary pancreatitis, hereditary papillary renal carcinoma, juvenile polyposis syndrome, kidney cancer, lacrimal gland tumor, laryngeal and hypopharyngeal cancer, leukemia (acute lymphoblastic leukamia (ALL), acute myeloid leukemia (AML), B-cell prolymphocytic leukemia, hairy cell leukemia, chronic lymphocytic leukemia (CLL), chronic myeloid leukemia (CML), chronic T-cell lymphocytic leukemia, eosinophilic leukemia), Li-Fraumeni Syndrome, liver cancer, lung cancer (non-small cell lung cancer, small cell lung cancer), Lymphoma (Hodgkin, non-Hodgkin), Lynch Syndrome, mastocytosis, medulloblastoma, melanoma, meningioma, mesothelioma, multiple endocrine neoplasia Type 1 & 2, multiple myeloma, MUTYH (or MYH)-associated polyposis, myelodysplastic syndromes (MDS), nasal cavity and paranasal sinus Cancer, nasopharyngeal Cancer, neuroblastoma, neuroendocrine tumors (e.g. of the gastrointestinal tract, lung or pancreas), neurofibromatosis Type 1 & 2, nevoid basal cell carcinoma syndrome, oral and oropharyngeal cancer, osteosarcoma, ovarian/fallopian tube/peritoneal cancer, pancreatic cancer, parathyroid cancer, penile cancer, Peutz-Jeghers Syndrome, pheochromocytoma, paraganglioma, pituitary gland tumor, pleuropulmonary blastoma, prostate cancer, retinoblastoma, rhabdomyosarcoma, salivary gland cancer, sarcoma (e.g. Kaposi or soft tissue), skin cancer, small bowel cancer, stomach cancer, testicular cancer, thymoma and thymic carcinoma, thyroid cancer, tuberous sclerosis complex, uterine cancer, vaginal cancer, Von Hippel-Lindau syndrome, vulvar cancer, Waldenstrom's macroglobulinemia, Werner syndrome, Wilms Tumor and xeroderma pigmentosum). Particular cancers of interest include haematological cancers such as lymphomas (including diffuse large B-cell lymphoma (DLBCL), follicular lymphoma (FL), Burkitt lymphoma (BL) and angioimmunoblastic T-cell lymphoma (AITL)), leukaemias (including acute lymphoblastic leukaemia (ALL) and chronic myeloid leukaemia (CML)), multiple myeloma, breast cancer, non-small cell lung cancer (NSCLC), colorectal cancer, endometrial cancer, gastro-oesophageal cancer, neuroendocrine cancers, osteosarcomas, prostate cancer, pancreatic cancer, small intestine cancer, bladder cancer, rectal cancer, cholangiocarcinoma, CNS cancer, thyroid cancer, head and neck cancer, oesophageal cancer, and ovarian cancer.

Features, including optional, suitable, and preferred features in relation to one aspect of the invention may also be features, including optional, suitable and preferred features in relation to any other aspect of the invention.

DETAILED DESCRIPTION OF THE INVENTION

Definitions

Unless otherwise stated, the following terms used in the specification and claims have the following meanings set out below.

It is to be appreciated that references to "treating" or "treatment" include prophylaxis as well as the alleviation of established symptoms of a condition. "Treating" or "treatment" of a state, disorder or condition therefore includes: (1) preventing or delaying the appearance of clinical symptoms of the state, disorder or condition developing in a human that may be afflicted with or predisposed to the state, disorder or condition but does not yet experience or display clinical or subclinical symptoms of the state, disorder or condition, (2) inhibiting the state, disorder or condition, i.e., arresting, reducing or delaying the development of the disease or a relapse thereof (in case of maintenance treatment) or at least one clinical or subclinical symptom thereof, or (3) relieving or attenuating the disease, i.e., causing regression of the state, disorder or condition or at least one of its clinical or subclinical symptoms.

A "therapeutically effective amount" means the amount of a compound that, when administered to a mammal for treating a disease, is sufficient to effect such treatment for the disease. The "therapeutically effective amount" will vary depending on the compound, the disease and its severity and the age, weight, etc., of the mammal to be treated. It should be understood that in, for example, a human or other mammal, a therapeutically effective amount can be determined experimentally in a laboratory or clinical setting, or a therapeutically effective amount may be the amount required by the guidelines of the United States Food and Drug Administration (FDA) or equivalent foreign regulatory body, for the particular disease and subject being treated. It should be appreciated that determination of proper dosage forms, dosage amounts, and routes of administration is within the level of ordinary skill in the pharmaceutical and medical arts.

As used herein by themselves or in conjunction with another term or terms, "subject(s)" and "patient(s)", refer to animals (e.g. mammals), particularly humans. Suitably, the "subject(s)" and "patient(s)" may be a non-human animal (e.g. livestock and domestic pets) or a human.

As used herein by itself or in conjunction with another term or terms, "pharmaceutically acceptable" refers to materials that are generally chemically and/or physically compatible with other ingredients (such as, for example, with reference to a formulation), and/or is generally physiologically compatible with the recipient (such as, for example, a subject) thereof.

In this specification the term "alkyl" includes both straight and branched chain alkyl groups. References to individual alkyl groups such as "propyl" are specific for the straight chain version only and references to individual branched chain alkyl groups such as "isopropyl" are specific for the branched chain version only. For example, "(1-6C)alkyl" includes (1-4C)alkyl, (1-3C)alkyl, propyl, isopropyl and t-butyl.

The term "(m-nC)" or "(m-nC) group" used alone or as a prefix, refers to any group having m to n carbon atoms.

An "alkylene" group is an alkyl group that is positioned between and serves to connect two other chemical groups. Thus, "(1-6C)alkylene" means a linear saturated divalent hydrocarbon radical of one to six carbon atoms or a branched saturated divalent hydrocarbon radical of three to six carbon atoms, for example, methylene (—CH$_2$—), the ethylene isomers (—CH(CH$_3$)— and —CH$_2$CH$_2$—), the propylene isomers (—CH(CH$_3$)CH$_2$—, —CH(CH$_2$CH$_3$)—, —C(CH$_3$)$_2$—, and —CH$_2$CH$_2$CH$_2$—), pentylene (—CH$_2$CH$_2$CH$_2$CH$_2$CH$_2$—), and the like.

The term "alkyenyl" refers to straight and branched chain alkyl groups comprising 2 or more carbon atoms, wherein at least one carbon-carbon double bond is present within the group. Examples of alkenyl groups include ethenyl, propenyl and but-2,3-enyl and includes all possible geometric (E/Z) isomers.

The term "alkynyl" refers to straight and branched chain alkyl groups comprising 2 or more carbon atoms, wherein at least one carbon-carbon triple bond is present within the group. Examples of alkynyl groups include acetylenyl and propynyl.

"(m-nC)cycloalkyl" means a saturated hydrocarbon ring system containing from m to n number of carbon atoms. Exemplary cycloalkyl groups include, for example, cyclopropyl, cyclobutyl, cyclopentyl, cyclohexyl, cycloheptyl and bicyclo[2.2.1]heptyl.

The term "alkoxy" refers to O-linked straight and branched chain alkyl groups. Examples of alkoxy groups include methoxy, ethoxy and t-butoxy.

The term "haloalkyl" is used herein to refer to an alkyl group in which one or more hydrogen atoms have been replaced by halogen (e.g. fluorine) atoms. Examples of haloalkyl groups include —CH$_2$F, —CHF$_2$ and —CF$_3$.

The term "halo" or "halogeno" refers to fluoro, chloro, bromo and iodo, suitably fluoro, chloro and bromo, more suitably, fluoro and chloro.

The term "carbocyclyl", "carbocyclic" or "carbocycle" means a non-aromatic saturated or partially saturated monocyclic, fused, bridged, or spiro bicyclic carbon-containing ring system(s). Monocyclic carbocyclic rings contain from about 3 to 12 (suitably from 3 to 7) ring atoms. Bicyclic carbocycles contain from 6 to 17 member atoms, suitably 7 to 12 member atoms, in the ring. Bicyclic carbocyclic(s) rings may be fused, spiro, or bridged ring systems. Examples of carbocyclic groups include cyclopropyl, cyclobutyl, cyclohexyl, cyclohexenyl and spiro[3.3]heptanyl.

The term "heterocyclyl", "heterocyclic" or "heterocycle" means a non-aromatic saturated or partially saturated monocyclic, fused, bridged, or spiro bicyclic heterocyclic ring system(s). Monocyclic heterocyclic rings contain from about 3 to 12 (suitably from 3 to 7) ring atoms, with from 1 to 5 (suitably 1, 2 or 3) heteroatoms selected from nitrogen, oxygen or sulfur in the ring. Bicyclic heterocycles contain from 7 to 17 member atoms, suitably 7 to 12 member atoms, in the ring. Bicyclic heterocyclic(s) rings may be fused, spiro, or bridged ring systems. Examples of heterocyclic groups include cyclic ethers such as oxiranyl, oxetanyl, tetrahydrofuranyl, dioxanyl, and substituted cyclic ethers. Heterocycles containing nitrogen include, for example, azetidinyl, pyrrolidinyl, piperidinyl, piperazinyl, tetrahydrotriazinyl, tetrahydropyrazolyl, and the like. Typical sulfur containing heterocycles include tetrahydrothienyl, dihydro-1,3-dithiol, tetrahydro-2H-thiopyran, and hexahydrothiepine. Other heterocycles include dihydro-oxathiolyl, tetrahydro-oxazolyl, tetrahydro-oxadiazolyl, tetrahydrodioxazolyl, tetrahydro-oxathiazolyl, hexahydrotriazinyl, tetrahydro-oxazinyl, morpholinyl, thiomorpholinyl, tetrahydropyrimidinyl, dioxolinyl, octahydrobenzofuranyl, octahydrobenzimidazolyl, and octahydrobenzothiazolyl. For heterocycles containing sulfur, the oxidized sulfur heterocycles containing SO or SO$_2$ groups are also included. Examples include the sulfoxide and sulfone forms of tetrahydrothienyl and thiomorpholinyl such as tetrahydrothiene 1,1-dioxide and thiomorpholinyl 1,1-dioxide. Heterocycles may comprise 1 or 2 oxo (═O) or thioxo (═S) substituents. A suitable value for a heterocyclyl group which bears 1 or 2 oxo (═O) or thioxo (═S) substituents is, for example, 2-oxopyrrolidinyl, 2-thioxopyrrolidinyl, 2-oxoimidazolidinyl, 2-thioxoimidazolidinyl, 2-oxopiperidinyl, 2,5-dioxopyrrolidinyl, 2,5-dioxoimidazolidinyl or 2,6-dioxopiperidinyl. Particular heterocyclyl groups are saturated monocyclic 3 to 7 membered heterocyclyls containing 1, 2 or 3 heteroatoms selected from nitrogen, oxygen or sulfur, for example azetidinyl, tetrahydrofuranyl, tetrahydropyranyl, pyrrolidinyl, morpholinyl, tetrahydrothienyl, tetrahydrothienyl 1,1-dioxide, thiomorpholinyl, thiomorpholinyl 1,1-dioxide, piperidinyl, homopiperidinyl, piperazinyl or homopiperazinyl. As the skilled person would appreciate, any heterocycle may be linked to another group via any suitable atom, such as via a carbon or nitrogen atom. However, reference herein to piperidino or morpholino refers to a piperidin-1-yl or morpholin-4-yl ring that is linked via the ring nitrogen.

By "bridged ring systems" is meant ring systems in which two rings share more than two atoms, see for example *Advanced Organic Chemistry*, by Jerry March, 4$^{th}$ Edition, Wiley Interscience, pages 131-133, 1992. Examples of bridged heterocyclyl ring systems include, aza-bicyclo[2.2.1]heptane, 2-oxa-5-azabicyclo[2.2.1]heptane, aza-bicyclo[2.2.2]octane, aza-bicyclo[3.2.1]octane and quinuclidine.

By "spiro bi-cyclic ring systems" we mean that the two ring systems share one common spiro carbon atom, i.e. the heterocyclic ring is linked to a further carbocyclic or heterocyclic ring through a single common spiro carbon atom.

Examples of spiro ring systems include 6-azaspiro[3.4]octane, 2-oxa-6-azaspiro[3.4]octane, 2-azaspiro[3.3]heptanes, 2-oxa-6-azaspiro[3.3]heptanes, 7-oxa-2-azaspiro[3.5]nonane, 6-oxa-2-azaspiro[3.4]octane, 2-oxa-7-azaspiro[3.5]nonane and 2-oxa-6-azaspiro[3.5]nonane.

As used herein by itself or in conjunction with another term or terms, "aromatic" refers to monocyclic and polycyclic ring systems containing 4n+2 pi electrons, where n is an integer. Aromatic should be understood as referring to and including ring systems that contain only carbon atoms (i.e. "aryl") as well as ring systems that contain at least one heteroatom selected from N, O or S (i.e. "heteroaromatic" or "heteroaryl"). An aromatic ring system can be substituted or unsubstituted.

As used herein by itself or in conjunction with another term or terms, "non-aromatic" refers to a monocyclic or polycyclic ring system having at least one double bond that is not part of an extended conjugated pi system. As used herein, non-aromatic refers to and includes ring systems that contain only carbon atoms as well as ring systems that contain at least one heteroatom selected from N, O or S. A non-aromatic ring system can be substituted or unsubstituted.

The term "heteroaryl" or "heteroaromatic" means an aromatic mono-, bi-, or polycyclic ring incorporating one or more (for example 1-4, particularly 1, 2 or 3) heteroatoms selected from nitrogen, oxygen or sulfur. The term heteroaryl includes both monovalent species and divalent species. Examples of heteroaryl groups are monocyclic and bicyclic groups containing from five to twelve ring members, and more usually from five to ten ring members. The heteroaryl group can be, for example, a 5- or 6-membered monocyclic ring or a 9- or 10-membered bicyclic ring, for example a bicyclic structure formed from fused five and six membered rings or two fused six membered rings. Each ring may contain up to about four heteroatoms typically selected from nitrogen, sulfur and oxygen. Typically the heteroaryl ring will contain up to 3 heteroatoms, more usually up to 2, for example a single heteroatom. In one embodiment, the heteroaryl ring contains at least one ring nitrogen atom. The nitrogen atoms in the heteroaryl rings can be basic, as in the case of an imidazole or pyridine, or essentially non-basic as in the case of an indole or pyrrole nitrogen. In general the number of basic nitrogen atoms present in the heteroaryl group, including any amino group substituents of the ring, will be less than five.

Examples of heteroaryl include furyl, pyrrolyl, thienyl, oxazolyl, isoxazolyl, imidazolyl, pyrazolyl, thiazolyl, isothiazolyl, oxadiazolyl, thiadiazolyl, triazolyl, tetrazolyl, pyridyl, pyridazinyl, pyrimidinyl, pyrazinyl, 1,3,5-triazenyl, benzofuranyl, indolyl, isoindolyl, benzothienyl, benzoxazolyl, benzimidazolyl, benzothiazolyl, benzothiazolyl, indazolyl, purinyl, benzofurazanyl, quinolyl, isoquinolyl, quinazolinyl, quinoxalinyl, cinnolinyl, pteridinyl, naphthyridinyl, carbazolyl, phenazinyl, benzisoquinolinyl, pyridopyrazinyl, thieno[2,3-b]furanyl, 2H-furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl. "Heteroaryl" also covers partially aromatic bi- or polycyclic ring systems wherein at least one ring is an aromatic ring and one or more of the other ring(s) is a non-aromatic, saturated or partially saturated ring, provided at least one ring contains one or more heteroatoms selected from nitrogen, oxygen or sulfur. Examples of partially aromatic heteroaryl groups include for example, tetrahydroisoquinolinyl, tetrahydroquinolinyl, 2-oxo-1,2,3,4-tetrahydroquinolinyl, dihydrobenzthienyl, dihydrobenzfuranyl, 2,3-dihydro-benzo[1,4]dioxinyl, benzo[1,3]dioxolyl, 2,2-dioxo-1,3-dihydro-2-benzothienyl, 4,5,6,7-tetrahydrobenzofuranyl, indolinyl, 1,2,3,4-tetrahydro-1,8-naphthyridinyl, 1,2,3,4-tetrahydropyrido[2,3-b]pyrazinyl and 3,4-dihydro-2H-pyrido[3,2-b][1,4]oxazinyl.

Examples of five membered heteroaryl groups include but are not limited to pyrrolyl, furanyl, thienyl, imidazolyl, furazanyl, oxazolyl, oxadiazolyl, oxatriazolyl, isoxazolyl, thiazolyl, isothiazolyl, pyrazolyl, triazolyl and tetrazolyl groups.

Examples of six membered heteroaryl groups include but are not limited to pyridyl, pyrazinyl, pyridazinyl, pyrimidinyl and triazinyl.

A bicyclic heteroaryl group may be, for example, a group selected from:
 a benzene ring fused to a 5- or 6-membered ring containing 1, 2 or 3 ring heteroatoms;
 a pyridine ring fused to a 5- or 6-membered ring containing 1, 2 or 3 ring heteroatoms;
 a pyrimidine ring fused to a 5- or 6-membered ring containing 1 or 2 ring heteroatoms;
 a pyrrole ring fused to a 5- or 6-membered ring containing 1, 2 or 3 ring heteroatoms;
 a pyrazole ring fused to a 5- or 6-membered ring containing 1 or 2 ring heteroatoms;
 a pyrazine ring fused to a 5- or 6-membered ring containing 1 or 2 ring heteroatoms;
 an imidazole ring fused to a 5- or 6-membered ring containing 1 or 2 ring heteroatoms;
 an oxazole ring fused to a 5- or 6-membered ring containing 1 or 2 ring heteroatoms;
 an isoxazole ring fused to a 5- or 6-membered ring containing 1 or 2 ring heteroatoms;
 a thiazole ring fused to a 5- or 6-membered ring containing 1 or 2 ring heteroatoms;
 an isothiazole ring fused to a 5- or 6-membered ring containing 1 or 2 ring heteroatoms;
 a thiophene ring fused to a 5- or 6-membered ring containing 1, 2 or 3 ring heteroatoms;
 a furan ring fused to a 5- or 6-membered ring containing 1, 2 or 3 ring heteroatoms;
 a cyclohexyl ring fused to a 5- or 6-membered heteroaromatic ring containing 1, 2 or 3 ring heteroatoms; and
 a cyclopentyl ring fused to a 5- or 6-membered heteroaromatic ring containing 1, 2 or 3 ring heteroatoms.

Particular examples of bicyclic heteroaryl groups containing a six membered ring fused to a five membered ring include but are not limited to benzfuranyl, benzthiophenyl, benzimidazolyl, benzoxazolyl, benzisoxazolyl, benzthiazolyl, benzisothiazolyl, isobenzofuranyl, indolyl, isoindolyl, indolizinyl, indolinyl, isoindolinyl, purinyl (e.g., adeninyl, guaninyl), indazolyl, benzodioxolyl and pyrazolopyridinyl groups.

Particular examples of bicyclic heteroaryl groups containing two fused six membered rings include but are not limited to quinolinyl, isoquinolinyl, chromanyl, thiochromanyl, chromenyl, isochromenyl, chromanyl, isochromanyl, benzodioxanyl, quinolizinyl, benzoxazinyl, benzodiazinyl, pyridopyridinyl, quinoxalinyl, quinazolinyl, cinnolinyl, phthalazinyl, naphthyridinyl and pteridinyl groups.

The term "aryl" means a cyclic or polycyclic aromatic ring having from 5 to 12 carbon atoms. The term aryl includes both monovalent species and divalent species. Examples of aryl groups include, but are not limited to, phenyl, biphenyl, naphthyl and the like. In a particular embodiment, an aryl is phenyl.

This specification also makes use of several composite terms to describe groups comprising more than one functionality. Such terms will be understood by a person skilled in the art. For example (3-6C)cycloalkyl(m-nC)alkyl comprises (m-nC)alkyl substituted by (3-6C)cycloalkyl.

The term "optionally substituted" refers to either groups, structures, or molecules that are substituted and those that are not substituted. The term "wherein a/any CH, $CH_2$, $CH_3$ group or heteroatom (i.e. NH) within a $R^1$ group is optionally substituted" suitably means that (any) one of the hydrogen radicals of the $R^1$ group is substituted by a relevant stipulated group.

Where optional substituents are chosen from "one or more" groups it is to be understood that this definition includes all substituents being chosen from one of the specified groups or the substituents being chosen from two or more of the specified groups. In some embodiments, one or more refers to one, two or three. In another embodiment, one or more refers to one or two. In a particular embodiment, one or more refers to one.

The phrase "compound of the invention" means those compounds which are disclosed herein, both generically and specifically.

"About" when used herein in conjunction with a measurable value such as, for example, an amount or a period of time and the like, is meant to encompass reasonable variations of the value, for instance, to allow for experimental error in the measurement of said value.

Compounds

In one aspect, the present invention relates to compounds, or pharmaceutically acceptable salts, hydrates or solvates thereof, having the structural Formula (I), shown below:

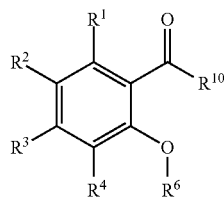

Formula (I)

wherein
- $R^1$ and $R^3$ are independently selected from the group consisting of hydrogen, hydroxy, halogen and (1-4C) alkoxy, with the proviso that at least one of $R^1$ and $R^3$ is hydroxy;
- $R^2$ is hydrogen or fluoro;
- $R^4$ is selected from the group consisting of hydrogen, halogen, (1-6C)alkyl, (3-6C)cycloalkyl and (3-6C) cycloalkyl(1-2C)alkyl, wherein the said (1-6C)alkyl is optionally substituted by one or more $R^{5a}$ and the said (3-6C)cycloalkyl and (3-6C)cycloalkyl(1-2C) alkyl groups are optionally substituted with one or more $R^{5b}$; where each $R^{5a}$ is independently selected from halogen or (1-4C)alkoxy and each $R^{5b}$ is independently selected from the group consisting of halogen, (1-4C)alkyl and (1-4C)alkoxy;
- $R^6$ is (1-6C)alkyl, (3-8C)cycloalkyl, (3-8C)cycloalkyl (1-2C)alkyl or a 4- to 7-membered heterocyclyl ring comprising one heteroatom selected from N, O or S, or a group having a structure according to formula (A) shown below:

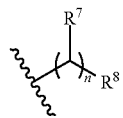

(A)

wherein
- $R^7$ is hydrogen or (1-3C)alkyl;
- n is 1 or 2;
- $R^8$ is aryl or heteroaryl, wherein the said aryl or heteroaryl is optionally substituted with one or more $R^9$; where each $R^9$ is independently selected from the group consisting of hydroxy, cyano, halogen, (1-3C)alkyl, (1-3C)alkoxy, (2-3C)alkenyl, or (2-3C)alkynyl;
- $R^{10}$ is —$NR^{11}R^{12}$, wherein $R^{11}$ and $R^{12}$ are linked, such that, together with the nitrogen atom to which they are attached, they form a 5-7 membered monocyclic heterocyclic ring that is fused to either a 5-6 membered monocyclic heteroaromatic ring or a benzene ring, thereby forming a 8-11 membered bicyclic heteroaryl ring;
- wherein any one or more of the rings present in $R^{10}$ is independently optionally substituted with one or more $R^{13}$;
- each $R^{13}$ is independently selected from the group consisting of halogen, cyano, oxo, epoxy and a group

-$L^1$-$X^1$-$Q^1$ wherein:
- $L^1$ is absent or (1-3C)alkylene;
- $X^1$ is absent or is selected from the group consisting of —O—, —C(O)—, —C(O)—O—, —O—C (O)—, —S(O)$_{0-2}$—, —C(O)—N($R^{14}$)—, —N($R^{14}$)—C(O)—, —$NR^{14}$—, —N($R^{14}$)—C (O)—$NR^{14}$—, —$SO_2$N($R^1$)—, or —N($R^{14}$) $SO_2$—, where $R^{14}$ is, at each occurrence, independently selected from the group consisting of hydrogen, hydroxy, cyano, (1-4C)alkyl, (2-4C) alkenyl and (2-4C)alkynyl, where any (1-4C)alkyl, (2-4C)alkenyl or (2-4C)alkynyl in $R^{14}$ is independently optionally substituted with one or more groups selected from the group consisting of halogen and hydroxy;
- $Q^1$ is selected from the group consisting of hydrogen, (1-6C)alkyl, (2-6C)alkenyl, (2-6C)alkynyl, (3-8C) cycloalkyl, (3-8C)cycloalkyl(1-3C)alkyl, aryl, aryl(1-3C)alkyl, heterocyclyl, heterocyclyl(1-3C) alkyl, heteroaryl and heteroaryl(1-3C)alkyl, wherein any (1-6C)alkyl, (2-6C)alkenyl, (2-6C) alkynyl, (3-8C)cycloalkyl, (3-8C)cycloalkyl(1-3C)alkyl, aryl, aryl(1-3C)alkyl, heterocyclyl, heterocyclyl(1-3C)alkyl, heteroaryl or heteroaryl(1-3C)alkyl in $Q^1$ is optionally substituted with one or more groups $R^{15}$; and
- each $R^{15}$ is independently selected from the group consisting of hydroxy, cyano, oxo, halogen, (1-3C) alkyl, (1-3C)alkoxy, —$NR^{15a}R^{15b}$, —C(O)—$R^{15a}$, —C(O)—$OR^{15a}$, —O—C(O)—$R^{15a}$, —C(O)— $NR^{15a}R^{15b}$, —N($R^{15b}$)C(O)—$R^{15a}$, —S(O)$_{0-2}$$R^{15a}$, —S(O)$_2$$NR^{15a}R^{15b}$, and —N($R^{15b}$)—S(O)$_2$$R^{15a}$, wherein $R^{15a}$ and $R^{15b}$ are each independently hydrogen or (1-3C)alkyl, and wherein any (1-3C) alkyl moiety present in a $R^{15a}$ or $R^{15b}$ group is optionally further substituted by one or more substituents independently selected from hydroxy, cyano, halogen, —OR$^{15c}$, —NR$^{15c}$R$^{15d}$ and —C(O)—R$^{15c}$, wherein R$^{15c}$ and R$^{15d}$ are both independently selected from hydrogen and (1-2C)alkyl.

In another aspect, the present invention relates to compounds, or pharmaceutically acceptable salts, hydrates or solvates thereof, having the structural Formula (I), shown below:

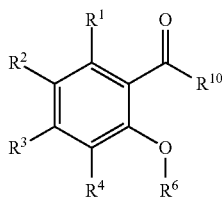

Formula (I)

wherein
- R$^1$ and R$^3$ are independently selected from the group consisting of hydrogen, hydroxy, halogen and (1-4C)alkoxy, with the proviso that at least one of R$^1$ and R$^3$ is hydroxy;
- R$^2$ is hydrogen or fluoro;
- R$^4$ is selected from the group consisting of hydrogen, halogen, (1-6C)alkyl, (3-6C)cycloalkyl and (3-6C)cycloalkyl(1-2C)alkyl, wherein the said (1-6C)alkyl is optionally substituted by one or more R$^{5a}$ and the said (3-6C)cycloalkyl and (3-6C)cycloalkyl(1-2C)alkyl groups are optionally substituted with one or more R$^{5b}$; where each R$^{5a}$ is independently selected from halogen or (1-4C)alkoxy and each R$^{5b}$ is independently selected from the group consisting of halogen, (1-4C)alkyl and (1-4C)alkoxy;
- R$^6$ is (3-8C)cycloalkyl, (3-8C)cycloalkyl(1-2C)alkyl or a 4- to 7-membered heterocyclyl ring comprising one heteroatom selected from N, O or S, or a group having a structure according to formula (A) shown below:

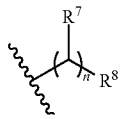

(A)

wherein
- R$^7$ is hydrogen or (1-3C)alkyl;
- n is 1 or 2;
- R$^8$ is aryl or heteroaryl, wherein the said aryl or heteroaryl is optionally substituted with one or more R$^9$; where each R$^9$ is independently selected from the group consisting of hydroxy, cyano, halogen, (1-3C)alkyl, (1-3C)alkoxy, (2-3C)alkenyl, or (2-3C)alkynyl;
- R$^{10}$ is —NR$^{11}$R$^{12}$, wherein R$^{11}$ and R$^{12}$ are linked, such that, together with the nitrogen atom to which they are attached, they form a 5-7 membered monocyclic heterocyclic ring that is fused to either a 5-6 membered monocyclic heteroaromatic ring or a benzene ring, thereby forming a 8-11 membered bicyclic heteroaryl ring;

wherein any one or more of the rings present in R$^{10}$ is independently optionally substituted with one or more R$^{13}$;

each R$^{13}$ is independently selected from the group consisting of halogen, cyano, oxo, epoxy and a group

-L$^1$-X$^1$-Q$^1$ wherein:
- L$^1$ is absent or (1-3C)alkylene;
- X$^1$ is absent or is selected from the group consisting of —O—, —C(O)—, —C(O)—O—, —O—C(O)—, —S(O)$_{0-2}$—, —C(O)—N(R$^{14}$)—, —N(R$^{14}$)—C(O)—, —NR$^{14}$—, —N(R$^{14}$)—C(O)—NR$^{14}$—, —SO$_2$N(R$^1$)—, or —N(R$^{14}$)SO$_2$—, where R$^{14}$ is, at each occurrence, independently selected from the group consisting of hydrogen, hydroxy, cyano, (1-4C)alkyl, (2-4C)alkenyl and (2-4C)alkynyl, where any (1-4C)alkyl, (2-4C)alkenyl or (2-4C)alkynyl in R$^{14}$ is independently optionally substituted with one or more groups selected from the group consisting of halogen and hydroxy;
- Q$^1$ is selected from the group consisting of hydrogen, (1-6C)alkyl, (2-6C)alkenyl, (2-6C)alkynyl, (3-8C)cycloalkyl, aryl, heterocyclyl and heteroaryl, wherein any (1-6C)alkyl, (2-6C)alkenyl, (2-6C)alkynyl, (3-8C)cycloalkyl, aryl, heterocyclyl, or heteroaryl in Q$^1$ is optionally substituted with one or more groups R$^{15}$; and each R$^{15}$ is independently selected from the group consisting of hydroxy, cyano, oxo, halogen, (1-3C)alkyl, (1-3C)alkoxy, —NR$^{15a}$R$^{15b}$, —C(O)—R$^{15a}$, —C(O)—OR$^{15a}$, —O—C(O)—R$^{15a}$, —C(O)—NR$^{15a}$R$^{15b}$, —N(R$^{15b}$)C(O)—R$^{15a}$, —S(O)$_{0-2}$R$^{15a}$, —S(O)$_2$NR$^{15a}$R$^{15b}$, and —N(R$^{15b}$)—S(O)$_2$R$^{15a}$, wherein R$^{15a}$ and R$^{15b}$ are each independently hydrogen or (1-3C)alkyl, and wherein any (1-3C)alkyl moiety present in a R$^{15a}$ or R$^{15b}$ group is optionally further substituted by one or more substituents independently selected from hydroxy, cyano, halogen, —OR$^{15c}$, —NR$^{15c}$R$^{15d}$ and —C(O)—R$^{15c}$, wherein R$^{15c}$ and R$^{15d}$ are both independently selected from hydrogen and (1-2C)alkyl.

Particular compounds of the invention include, for example, compounds of the Formula (I), or pharmaceutically acceptable salts, hydrates and/or solvates thereof, wherein, unless otherwise stated, each of R$^1$, R$^2$, R$^3$, R$^4$, R$^6$ and R$^{10}$ (including R$^{11}$ and R$^{12}$) and any associated substituent groups has any of the meanings defined hereinbefore or in any of paragraphs (1) to (135) hereinafter:

(1) R$^1$ and R$^3$ are independently selected from the group consisting of hydrogen, hydroxy, halo and (1-2C)alkoxy, with the proviso that at least one of R$^1$ and R$^3$ is hydroxy.

(2) R$^1$ and R$^3$ are independently selected from the group consisting of hydrogen, hydroxy, fluoro and (1-2C)alkoxy, with the proviso that at least one of R$^1$ and R$^3$ is hydroxy.

(3) R$^1$ and R$^3$ are independently selected from the group consisting of hydrogen, hydroxy, fluoro and methoxy, with the proviso that at least one of R$^1$ and R$^3$ is hydroxy.

(4) R$^1$ and R$^3$ are both hydroxy.

(5) R$^2$ is fluoro.

(6) R$^2$ is hydrogen.

(7) R$^4$ is selected from the group consisting of hydrogen, halogen, (1-4C)alkyl, (3-6C)cycloalkyl and (3-6C)cycloalkyl(1-2C)alkyl, wherein the said (1-4C)alkyl is optionally substituted by one or more $R^{5a}$ and the said (3-6C)cycloalkyl and (3-6C)cycloalkyl(1-2C)alkyl groups are optionally substituted with one or more $R^{5b}$.

(8) $R^4$ is selected from the group consisting of hydrogen, halogen, (1-4C)alkyl, (3-5C)cycloalkyl and (3-5C)cycloalkyl(1-2C)alkyl, wherein the said (1-4C)alkyl is optionally substituted by one, two or three $R^{5a}$ and the said (3-5C)cycloalkyl and (3-5C)cycloalkyl(1-2C)alkyl groups are optionally substituted with one, two or three $R^{5b}$.

(9) $R^4$ is selected from the group consisting of hydrogen, halogen, (1-4C)alkyl, (3-5C)cycloalkyl and (3-5C)cycloalkyl(1C)alkyl, wherein the said (1-4C)alkyl is optionally substituted by one, two or three $R^{5a}$ and the said (3-5C)cycloalkyl and (3-5C)cycloalkyl(1C)alkyl groups are optionally substituted with one, two or three $R^{5b}$.

(10) $R^4$ is selected from the group consisting of hydrogen, halogen, (1-4C)alkyl and (3-5C)cycloalkyl, wherein the said (1-4C)alkyl is optionally substituted by one or two $R^{5a}$ and the said (3-5C)cycloalkyl group is optionally substituted with one or two $R^{5b}$.

(11) $R^4$ is selected from the group consisting of hydrogen, fluoro, chloro (1-4C)alkyl, cyclopropyl and cyclobutyl, wherein the said (1-4C)alkyl is optionally substituted by one $R^{5a}$ and the said cyclopropyl and cyclobutyl groups are optionally substituted with one $R^{5b}$.

(12) $R^4$ is selected from the group consisting of hydrogen, fluoro, chloro, methyl, ethyl iso-propyl, cyclopropyl and cyclobutyl.

(13) $R^4$ is selected from the group consisting of hydrogen, methyl, ethyl, iso-propyl, cyclopropyl and cyclobutyl.

(14) $R^4$ is selected from the group consisting of hydrogen, methyl and ethyl.

(15) $R^4$ is selected from the group consisting of hydrogen and methyl.

(16) $R^4$ is hydrogen.

(17) $R^4$ is methyl.

(18) Each $R^{5a}$ is independently selected from halogen, hydroxy or (1-3C)alkoxy.

(19) Each $R^{5a}$ is independently selected from fluoro, chloro, hydroxy or (1-2C)alkoxy.

(20) Each $R^{5a}$ is independently selected from fluoro, hydroxy or methoxy.

(21) Each $R^{5b}$ is independently selected from the group consisting of halogen, hydroxy, (1-3C)alkyl and (1-3C)alkoxy.

(22) Each $R^{5b}$ is independently selected from the group consisting of halogen, hydroxy, (1-2C)alkyl and (1-2C)alkoxy.

(23) Each $R^{5b}$ is independently selected from the group consisting of fluoro, chloro, hydroxy, (1-2C)alkyl and (1-2C)alkoxy.

(24) Each $R^{5b}$ is independently selected from the group consisting of fluoro, chloro, hydroxy, methyl and methoxy.

(25) $R^7$ is hydrogen or (1-2C)alkyl.

(26) $R^7$ is (1-3C)alkyl.

(27) $R^7$ is hydrogen or methyl.

(28) $R^7$ is hydrogen.

(29) $R^7$ is methyl.

(30) n is 1.

(31) n is 2.

(32) $R^8$ is phenyl or 5-6 membered heteroaryl, wherein the said phenyl or 5-6 membered heteroaryl is optionally substituted with one or more $R^9$.

(33) $R^8$ is phenyl or 5-6 membered heteroaryl containing 1, 2 or 3 ring heteroatoms independently selected from N and O, wherein the said phenyl or 5-6 membered heteroaryl is optionally substituted with one, two or three $R^9$.

(34) $R^8$ is phenyl or 5-6 membered heteroaryl containing 1, 2 or 3 ring N atoms, wherein the said phenyl or 5-6 membered heteroaryl is optionally substituted with one, two or three $R^9$.

(35) $R^8$ has any one of the following structures:

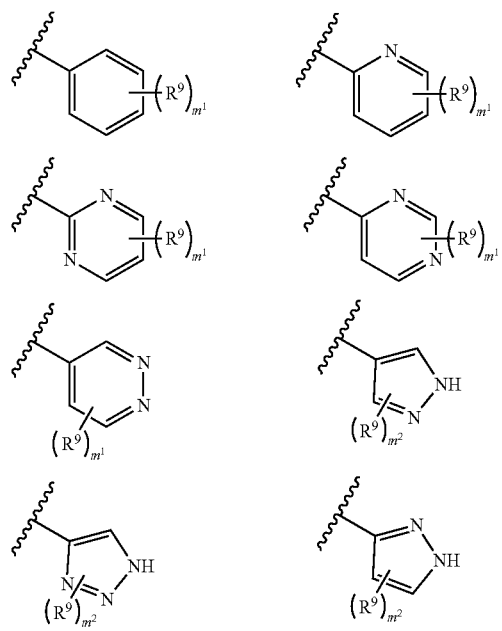

wherein $R^9$ is as defined herein (or as in any one of paragraphs (44) to (50) below), each $m^1$ is independently 0, 1, 2 or 3; and each $m^2$ is independently 0, 1 or 2.

(36) $R^8$ has the following structure:

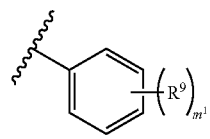

wherein $m^1$ is 0, 1, 2 or 3 and $R^9$ is as defined herein (or as in any one of paragraphs (44) to (50) below).

(37) $R^8$ has any one of the following structures:

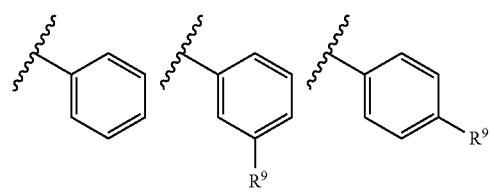

-continued

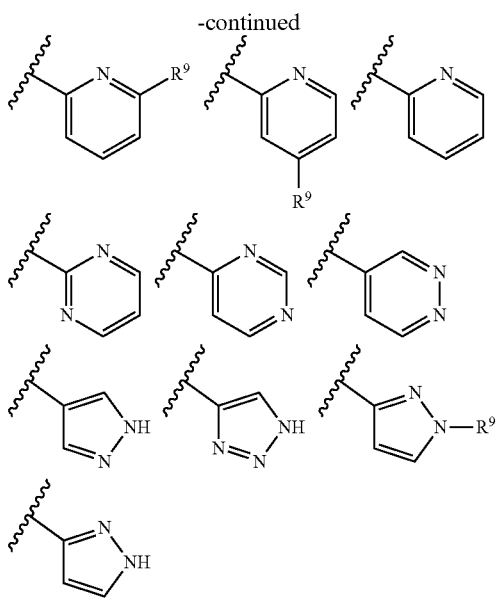

wherein R⁹ is as defined herein (or as in any one of paragraphs (44) to (50) below).

(38) R⁸ has any one of the following structures:

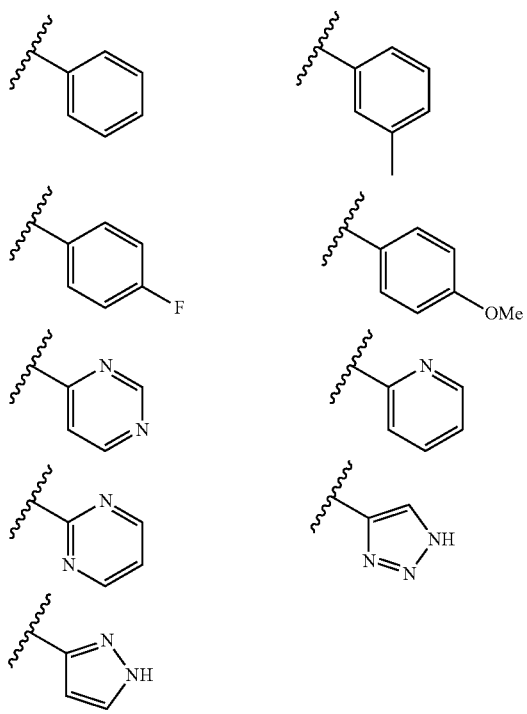

(39) R³ has the following structure:

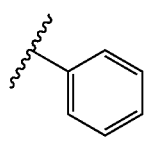 [SMILES: *c1ccccc1]

(40) Each $m^1$ is independently 0, 1 or 2;

(41) Each $m^1$ is independently 0 or 1;

(42) Each $m^1$ is 0.

(43) Each $m^2$ is independently 0 or 1;

(44) Each $R^9$ is independently selected from the group consisting of cyano, halogen, (1-3C)alkyl, (1-3C)alkoxy, (2-3C)alkenyl or (2-3C)alkynyl.

(45) Each $R^9$ is independently selected from the group consisting of halogen, (1-3C)alkyl, (1-3C)alkoxy, (2-3C)alkenyl or (2-3C)alkynyl.

(46) Each $R^9$ is independently selected from the group consisting of halogen, (1-3C)alkyl, (1-3C)alkoxy, (2C)alkenyl or (2C)alkynyl.

(47) Each $R^9$ is independently selected from the group consisting of halogen, (1-2C)alkyl, (1-2C)alkoxy, (2C)alkenyl and (2C)alkynyl.

(48) Each $R^9$ is independently selected from the group consisting of fluoro, chloro, (1-3C)alkyl and (1-3C)alkoxy.

(49) Each $R^9$ is independently selected from the group consisting of fluoro, (1-2C)alkyl and (1-2C)alkoxy.

(50) Each $R^9$ is independently selected from the group consisting of fluoro, methyl and methoxy.

(51) $R^{11}$ and $R^{12}$ are linked, such that, together with the nitrogen atom to which they are attached, they form a 5-7 membered monocyclic heterocyclic ring that is fused to either a 5-6 membered monocyclic heteroaromatic ring or a benzene ring, thereby forming a 8-11 membered bicyclic heteroaryl ring; wherein any of which rings is optionally substituted with one or more $R^{13}$.

(52) $R^{11}$ and $R^{12}$ are linked, such that, together with the nitrogen atom to which they are attached, they form a 5-6 membered monocyclic heterocyclic ring that is fused to either a 5-6 membered monocyclic heteroaromatic ring or a benzene ring, thereby forming a 8-10 membered bicyclic heteroaryl ring; wherein any of which rings is optionally substituted with up to two $R^{13}$.

(53) $R^{11}$ and $R^{12}$ are linked, such that, together with the nitrogen atom to which they are attached, they form any one of the following ring systems:

wherein
$v^2$ and $v^3$ are each independently 1 or 2;
$W^1$ is CH, N or O;
each ring A is a benzene ring or a 5-6 membered heteroaromatic ring; and any ring is optionally substituted with one or two $R^{13}$.

(54) $R^{11}$ and $R^{12}$ are linked, such that, together with the nitrogen atom to which they are attached, they form any one of the following ring systems:

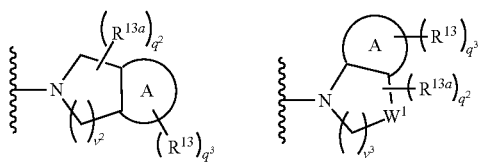

wherein
  $v^2$ and $v^3$ are each independently 1 or 2;
  $W^1$ is CH, N or O;
  each ring A is a benzene ring or a 5-6 membered heteroaromatic ring containing 1, 2 or 3 heteroatoms independently selected from N and O;
  each $R^{13a}$ is independently selected from the group consisting of oxo, hydroxy, halo, (1-3C)alkyl and (1-3C)alkoxy, wherein any (1-3C)alkyl and (1-3C)alkoxy in $R^{13a}$ is optionally substituted with one or more groups independently selected from the group consisting of hydroxy and halo;
  each $q^2$ is independently 0, 1 or 2; and
  each $q^3$ is independently 0 or 1.

(55) $R^{11}$ and $R^{12}$ are linked, such that, together with the nitrogen atom to which they are attached, they form any one of the following ring systems:

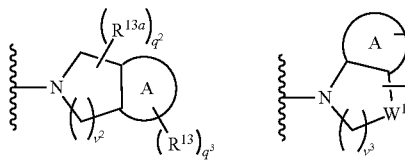

wherein
  $v^1$ is 1, 2 or 3;
  $v^2$ and $v^3$ are each independently 1 or 2;
  $W^1$ is CH, N or O;
  each ring A is a benzene ring or a 5-6 membered heteroaromatic ring containing 1, 2 or 3 N atoms;
  each $R^{13a}$ is independently selected from the group consisting of oxo, hydroxy, halo, (1-3C)alkyl and (1-3C)alkoxy, wherein any (1-3C)alkyl and (1-3C)alkoxy in $R^{13a}$ is optionally substituted with one or more groups independently selected from the group consisting of hydroxy and halo;
  each $q^2$ is independently 0, 1 or 2; and
  each $q^3$ is independently 0 or 1.

(56) $R^{11}$ and $R^{12}$ are linked, such that, together with the nitrogen atom to which they are attached, they form any one of the following ring systems:

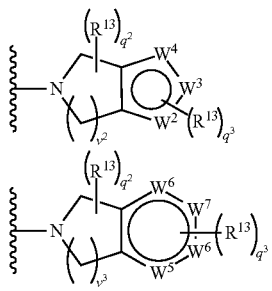

-continued

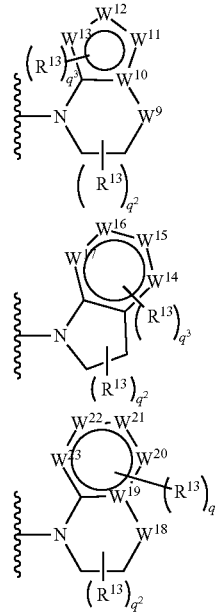

wherein
  each $q^2$ is independently 0 or 1;
  each $q^3$ is independently 0, 1 or 2;
  $v^2$ and $v^3$ are each independently 1 or 2;
  $W^2$, $W^3$ and $W^4$ are each independently CH, N or O, providing that only zero, one or two of $W^2$, $W^3$ and $W^4$ are N or O;
  $W^5$, $W^6$, $W^7$ and $W^8$ are each independently CH, N or O, providing that only zero, one or two of $W^5$, $W^6$, $W^7$ and $W^8$ are N or O;
  $W^9$ is N, O or $CH_2$
  $W^{10}$ is C or N;
  $W^{11}$, $W^{12}$ and $W^{13}$ are each independently CH, N or O, providing that only zero, one or two of $W^{11}$, $W^{12}$ and $W^{13}$ are N or O;
  $W^{14}$, $W^{15}$, $W^{16}$ and $W^{17}$ are each independently CH, N or O, providing that only zero, one or two of $W^{14}$, $W^{15}$, $W^{16}$ and $W^{17}$ are N or O;
  $W^{18}$ is N, O or $CH_2$
  $W^{19}$ is C or N; and
  $W^{20}$, $W^{21}$, $W^{22}$ and $W^{23}$ are each independently CH, N or O, providing that only zero, one or two of $W^{20}$, $W^{21}$, $W^{22}$ and $W^{23}$ are N or O.

(57) $R^{11}$ and $R^{12}$ are linked, such that, together with the nitrogen atom to which they are attached, they form any one of the following ring systems:

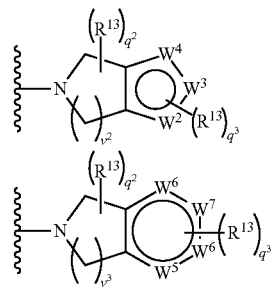

-continued

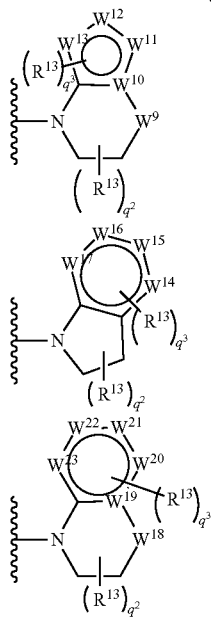

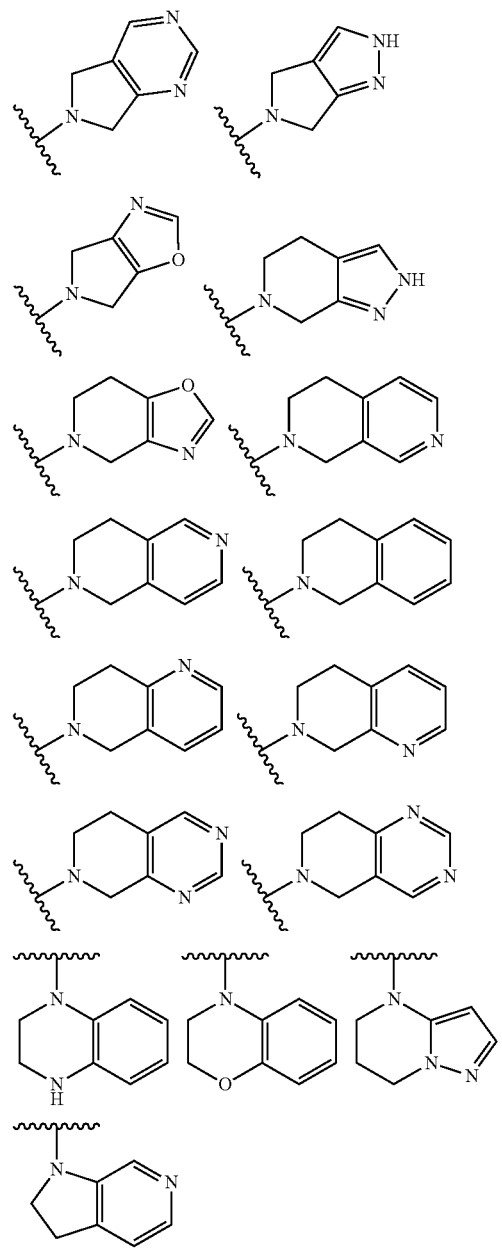

wherein
each $q^2$ is independently 0 or 1;
each $q^3$ is independently 0, 1 or 2;
$v^2$ and $v^3$ are each independently 1 or 2;
$W^2$, $W^3$ and $W^4$ are each independently CH or N, providing that only zero, one or two of $W^2$, $W^3$ and $W^4$ are N;
$W^5$, $W^6$, $W^7$ and $W^8$ are each independently CH or N, providing that only zero, one or two of $W^5$, $W^6$, $W^7$ and $W^8$ are N;
$W^9$ is N, O or $CH_2$
$W^{10}$ is C or N;
$W^{11}$, $W^{12}$ and $W^{13}$ are each independently CH or N, providing that only zero, one or two of $W^{11}$, $W^{12}$ and $W^{13}$ are N;
$W^{14}$, $W^{15}$, $W^{16}$ and $W^{17}$ are each independently CH or N, providing that only zero, one or two of $W^{14}$, $W^{15}$, $W^{16}$ and $W^{17}$ are N;
$W^{18}$ is N, O or $CH_2$
$W^{19}$ is C or N;
$W^{20}$, $W^{21}$, $W^{22}$ and $W^{23}$ are each independently CH or N, providing that only zero, one or two of $W^{20}$, $W^{21}$, $W^{22}$ and $W^{23}$ are N; and
each $R^{13a}$ is independently selected from the group consisting of oxo, hydroxy, halo, (1-3C)alkyl and (1-3C)alkoxy, wherein any (1-3C)alkyl and (1-3C) alkoxy in $R^{13a}$ is optionally substituted with one or more groups independently selected from the group consisting of hydroxy and halo.
(58) $R^{11}$ and $R^{12}$ are linked, such that, together with the nitrogen atom to which they are attached, they form any one of the following ring systems:

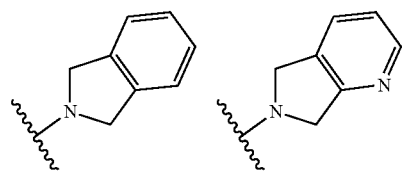

wherein any of the above rings is optionally substituted with 1, 2 or 3 $R^{13}$.
(59) $R^{11}$ and $R^{12}$ are linked, such that, together with the nitrogen atom to which they are attached, they form any one of the following ring systems:

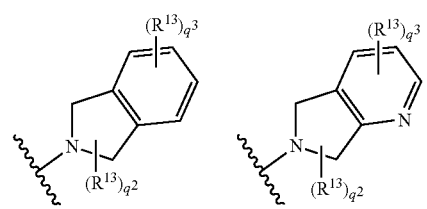

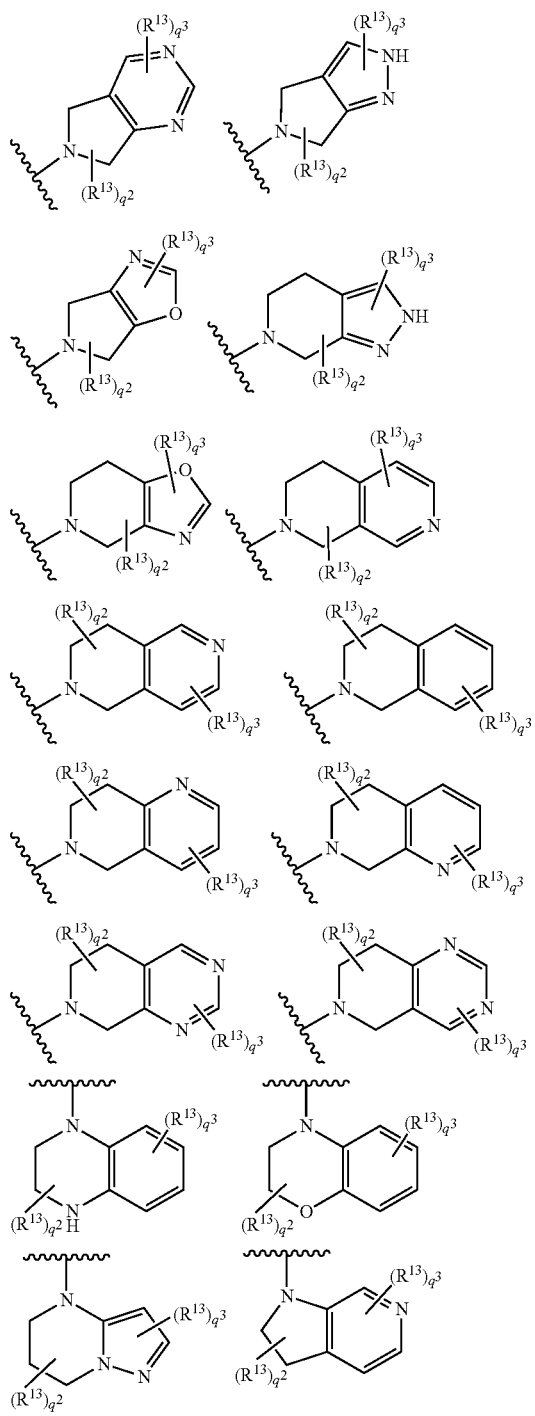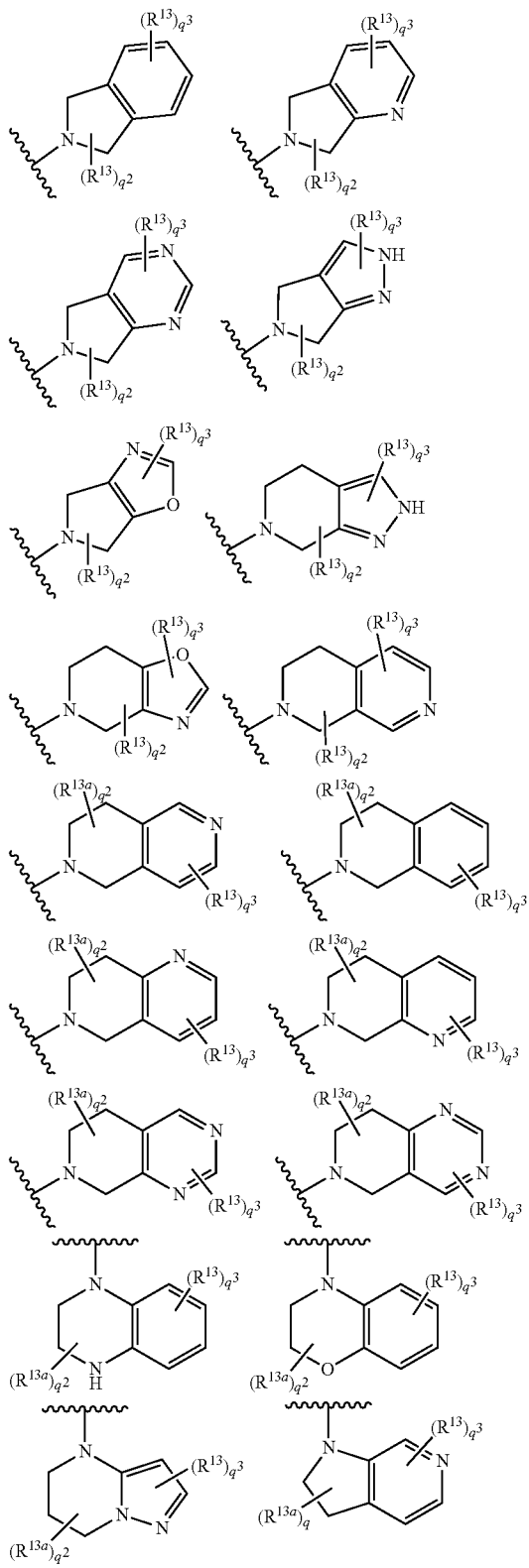

wherein each $q^2$ is independently 0 or 1 and each $q^3$ is independently 0, 1 or 2.

(60) $R^{11}$ and $R^{12}$ are linked, such that, together with the nitrogen atom to which they are attached, they form any one of the following ring systems:

wherein
each $q^2$ is independently 0 or 1 and each $q^3$ is independently 0, 1 or 2; and
each $R^{13a}$ is independently selected from the group consisting of oxo, hydroxy, halo, (1-3C)alkyl and (1-3C)alkoxy, wherein any (1-3C)alkyl and (1-3C) alkoxy in $R^{13a}$ is optionally substituted with one or more groups independently selected from the group consisting of hydroxy and halo.

(61) $R^{11}$ and $R^{12}$ are linked, such that, together with the nitrogen atom to which they are attached, they form the following ring system:

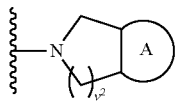

wherein
$v^2$ is 1 or 2;
ring A is a benzene ring or a 5-6 membered heteroaromatic ring; and
any ring is optionally substituted with one or two $R^{13}$.

(62) $R^{11}$ and $R^{12}$ are linked, such that, together with the nitrogen atom to which they are attached, they form the following ring system:

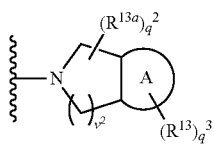

wherein
$v^2$ is 1 or 2;
ring A is a benzene ring or a 5-6 membered heteroaromatic ring containing 1, 2 or 3 heteroatoms independently selected from N and O;
each $R^{13a}$ is independently selected from the group consisting of oxo, hydroxy, halo, (1-3C)alkyl and (1-3C)alkoxy, wherein any (1-3C)alkyl and (1-3C) alkoxy in $R^{13a}$ is optionally substituted with one or more groups independently selected from the group consisting of hydroxy and halo;
each $q^2$ is independently 0, 1 or 2; and
each $q^3$ is independently 0 or 1.

(63) $R^{11}$ and $R^{12}$ are linked, such that, together with the nitrogen atom to which they are attached, they form the following ring system:

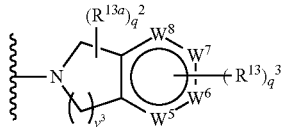

wherein
each $q^2$ is independently 0 or 1;
each $q^3$ is independently 0, 1 or 2;
$v^3$ is independently 1 or 2;
$W^5$, $W^6$, $W^7$ and $W^8$ are each independently CH or N, providing that only zero, one or two of $W^4$, $W^5$, $W^6$ and $W^7$ are N; and
each $R^{13a}$ is independently selected from the group consisting of oxo, hydroxy, halo, (1-3C)alkyl and (1-3C)alkoxy, wherein any (1-3C)alkyl and (1-3C) alkoxy in $R^{13a}$ is optionally substituted with one or more groups independently selected from the group consisting of hydroxy and halo.

(64) $R^{11}$ and $R^{12}$ are linked, such that, together with the nitrogen atom to which they are attached, they form any one of the following ring systems:

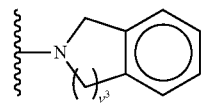

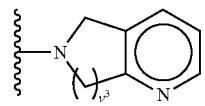

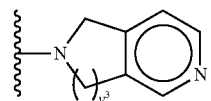

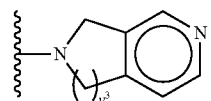

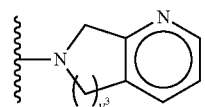

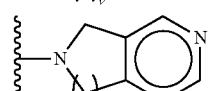

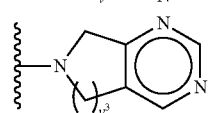

wherein $v^3$ is independently 1 or 2; and
any ring is optionally substituted with one or two $R^{13}$.

(65) $R^{11}$ and $R^{12}$ are linked, such that, together with the nitrogen atom to which they are attached, they form any one of the following ring systems:

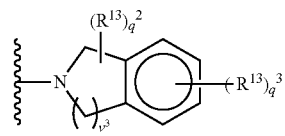

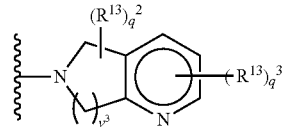

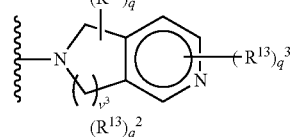

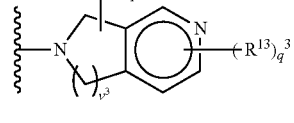

-continued

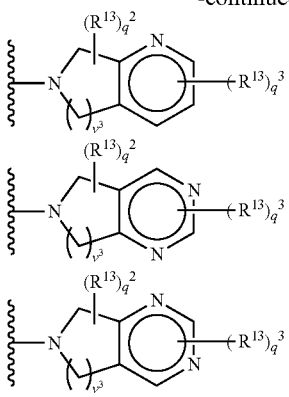

wherein
each q³ is independently 0 or 1;
each q³ is independently 0, 1 or 2; and
v³ is independently 1 or 2.

(66) $R^{11}$ and $R^{12}$ are linked, such that, together with the nitrogen atom to which they are attached, they form any one of the following ring systems:

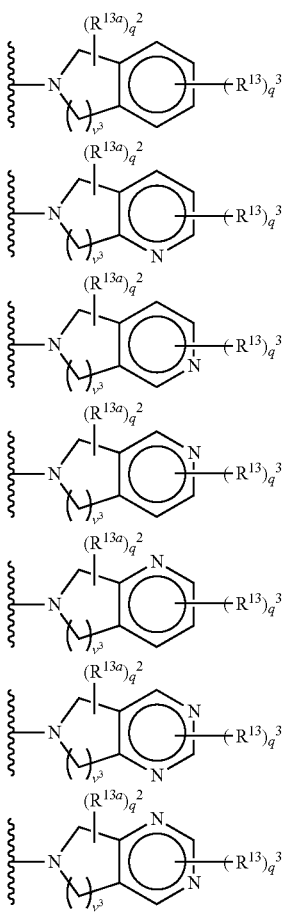

wherein
each q³ is independently 0 or 1;
each q³ is independently 0, 1 or 2;

v³ is independently 1 or 2; and
each $R^{13a}$ is independently selected from the group consisting of oxo, hydroxy, halo, (1-3C)alkyl and (1-3C)alkoxy, wherein any (1-3C)alkyl and (1-3C) alkoxy in $R^{13a}$ is optionally substituted with one or more groups independently selected from the group consisting of hydroxy and halo.

(67) $R^{11}$ and $R^{12}$ are linked, such that, together with the nitrogen atom to which they are attached, they form the following ring system:

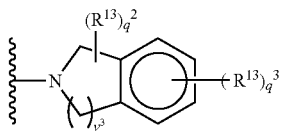

wherein
each q³ is independently 0 or 1;
each q³ is independently 0, 1 or 2; and
v³ is independently 1 or 2.

(68) $R^{11}$ and $R^{12}$ are linked, such that, together with the nitrogen atom to which they are attached, they form the following ring system:

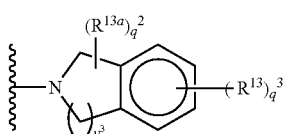

wherein
each q³ is independently 0 or 1;
each q³ is independently 0, 1 or 2;
v³ is independently 1 or 2; and
each $R^{13a}$ is independently selected from the group consisting of oxo, hydroxy, halo, (1-3C)alkyl and (1-3C)alkoxy, wherein any (1-3C)alkyl and (1-3C) alkoxy in $R^{13a}$ is optionally substituted with one or more groups independently selected from the group consisting of hydroxy and halo.

(69) $R^{11}$ and $R^{12}$ are linked, such that, together with the nitrogen atom to which they are attached, they form any one of the following ring systems:

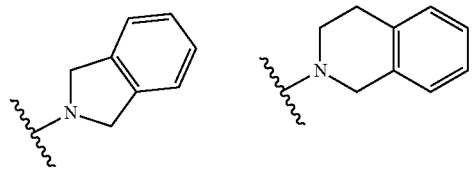 [SMILES: *N1Cc2ccccc2C1 ; *N1CCc2ccccc2C1]

wherein any of the above rings is optionally substituted with 1, 2 or 3 $R^{13}$.

(70) $R^{11}$ and $R^{12}$ are linked, such that, together with the nitrogen atom to which they are attached, they form any one of the following ring systems:

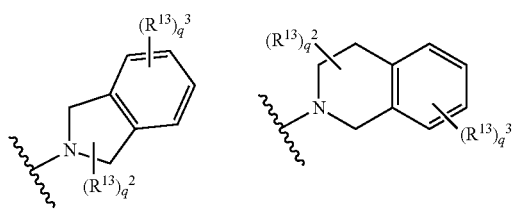

wherein
each q² is independently 0 or 1 and each q³ is independently 0, 1 or 2.

(71) $R^{11}$ and $R^{12}$ are linked, such that, together with the nitrogen atom to which they are attached, they form any one of the following ring systems:

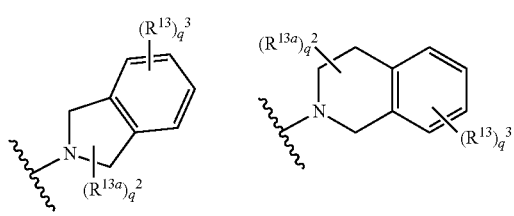

wherein
each q² is independently 0 or 1 and each q³ is independently 0, 1 or 2; and
each $R^{13a}$ is independently selected from the group consisting of oxo, hydroxy, halo, (1-3C)alkyl and (1-3C)alkoxy, wherein any (1-3C)alkyl and (1-3C)alkoxy in $R^{13a}$ is optionally substituted with one or more groups independently selected from the group consisting of hydroxy and halo.

(72) Each $R^{13}$ is independently selected from the group consisting of halogen, oxo, epoxy and a group -L¹-X¹-Q¹ (as defined hereinbefore or in any one of paragraphs (80) to (101) or (126) to (135) below).

(73) Each $R^{13}$ is independently selected from the group consisting of halogen, epoxy and a group -L¹-X¹-Q¹ (as defined hereinbefore or in any one of paragraphs (97) to (101) or (133) to (135) below).

(74) Each $R^{13}$ is independently selected from the group consisting of fluoro, bromo, epoxy and a group -L¹-X¹-Q¹ (as defined hereinbefore or in any one of paragraphs (99) to (101) or (134) to (135) below).

(75) Each $R^{13}$ is independently selected from the group consisting of fluoro and a group -L¹-X¹-Q¹ (as defined hereinbefore or in any one of paragraphs (100) or (101) or (134) to (135) below).

(76) Each $R^{13a}$ is independently selected from the group consisting of oxo, hydroxy, halo, (1-2C)alkyl and (1-2C)alkoxy, wherein any (1-2C)alkyl and (1-2C)alkoxy in $R^{13a}$ is optionally substituted with one or more groups independently selected from the group consisting of hydroxy and halo.

(77) Each $R^{13a}$ is independently selected from the group consisting of oxo, hydroxy, halo, (1-2C)alkyl and methoxy, wherein any (1-2C)alkyl in $R^{13a}$ is optionally substituted with one or more groups independently selected from the group consisting of hydroxy and halo.

(78) Each $R^{13a}$ is independently selected from the group consisting of oxo, hydroxy, (1-2C)alkyl, —CH₂OH, —CH₂F, —CHF₂, —CF₃ and methoxy.

(79) Each $R^{13a}$ is independently selected from the group consisting of oxo, hydroxy, (1-2C)alkyl and —CH₂OH,

(80) $L^1$ is absent or (1-2C)alkylene.

(81) $L^1$ is absent or methylene.

(82) $L^1$ is absent.

(83) $L^1$ is methylene.

(84) $X^1$ is absent or is selected from the group consisting of —O—, —C(O)—, —C(O)—O—, —O—C(O)—, —S(O)₀₋₂—, —C(O)—N(R¹⁴)—, —N(R¹⁴)—C(O)—, or —NR¹⁴—, where $R^{14}$ is, at each occurrence, independently selected from the group consisting of hydrogen, hydroxy, cyano, (1-4C)alkyl and (2-4C)alkenyl, where any (1-4C)alkyl or (2-4C)alkenyl in $R^{14}$ is independently optionally substituted with one or more groups selected from the group consisting of halogen and hydroxy.

(85) $X^1$ is absent or is selected from the group consisting of —O—, —C(O)—, —C(O)—O—, —N(R¹⁴)—C(O)—, or —NR¹⁴—, where $R^{14}$ is, at each occurrence, independently selected from the group consisting of hydrogen, cyano, (1-4C)alkyl and (2-4C)alkenyl, where any (1-4C)alkyl or (2-4C)alkenyl in $R^{14}$ is independently optionally substituted with one or more groups selected from the group consisting of halogen and hydroxy.

(86) $X^1$ is absent or is selected from the group consisting of —O—, —C(O)—, —C(O)—O—, —N(R¹⁴)—C(O)—, or —NR¹⁴—, where $R^{14}$ is, at each occurrence, independently selected from the group consisting of hydrogen, cyano, (1-4C)alkyl and (2-4C)alkenyl, where any (1-4C)alkyl or (2-4C)alkenyl in $R^{14}$ is independently optionally substituted with one, two or three groups selected from the group consisting of fluoro, chloro and hydroxy.

(87) $X^1$ is absent or is selected from the group consisting of —O—, —C(O)—, —C(O)—O—, —N(R¹⁴)—C(O)—, or —NR¹⁴—, where $R^{14}$ is, at each occurrence, independently selected from the group consisting of hydrogen, cyano, (1-4C)alkyl and (2-4C)alkenyl.

(88) $X^1$ is absent or is selected from the group consisting of —O—, —C(O)—, —C(O)—O—, —N(R¹⁴)—C(O)—, or —NR¹⁴—, where $R^{14}$ is, at each occurrence, independently selected from the group consisting of hydrogen, cyano and (1-2C)alkyl.

(89) $X^1$ is absent or is selected from the group consisting of —O—, —C(O)—O— and —NR¹⁴—, where $R^{14}$ is, at each occurrence, independently selected from the group consisting of hydrogen and (1-2C)alkyl.

(90) $Q^1$ is selected from the group consisting of hydrogen, (1-6C)alkyl, (2-6C)alkenyl, aryl, heterocyclyl and heteroaryl, wherein any (1-6C)alkyl, (2-6C)alkenyl, aryl, heterocyclyl or heteroaryl in $Q^1$ is optionally substituted with one or more groups $R^{15}$.

(91) $Q^1$ is selected from the group consisting of hydrogen, (1-4C)alkyl, (2-4C)alkenyl, phenyl, 5-6 membered heterocyclyl and 5-6 membered heteroaryl, wherein any (1-4C)alkyl, (2-4C)alkenyl, phenyl, 5-6 membered heterocyclyl or 5-6 membered heteroaryl in $Q^1$ is optionally substituted with one or more groups $R^{15}$.

(92) $Q^1$ is selected from the group consisting of hydrogen, (1-4C)alkyl, (2-4C)alkenyl, phenyl, 5-6 membered heterocyclyl and 5-6 membered heteroaryl, wherein any (1-4C)alkyl, (2-4C)alkenyl, phenyl, 5-6 membered heterocyclyl or 5-6 membered heteroaryl in $Q^1$ is optionally substituted with one, two or three groups $R^{15}$.

(93) $Q^1$ is selected from the group consisting of hydrogen, (1-4C)alkyl, (2-4C)alkenyl, phenyl, 5-6 membered heterocyclyl containing 1 or 2 heteroatoms independently selected from N and O, and 5-6 membered heteroaryl containing 1 or 2 heteroatoms independently selected from N and O, wherein any (1-4C)alkyl, (2-4C)alkenyl, phenyl, 5-6 membered heterocyclyl or 5-6 membered heteroaryl in $Q^1$ is optionally substituted with one, two or three groups $R^{15}$.

(94) $Q^1$ is selected from the group consisting of hydrogen, (1-4C)alkyl and 5-6 membered heterocyclyl containing 1 or 2 heteroatoms independently selected from N and O, wherein any (1-4C)alkyl or 5-6 membered heterocyclyl in $Q^1$ is optionally substituted with one or more groups $R^{15}$.

(95) $Q^1$ is selected from the group consisting of hydrogen, (1-2C)alkyl and piperazinyl wherein any (1-2C)alkyl or piperazinyl in $Q^1$ is optionally substituted with one or more groups $R^{15}$.

(96) $Q^1$ is selected from the group consisting of hydrogen, (1-2C)alkyl and piperazinyl wherein any (1-2C)alkyl or piperazinyl in $Q^1$ is optionally substituted with one or two groups $R^{15}$.

(97) $L^1$ is absent or (1-2C)alkylene;
$X^1$ is absent or is selected from the group consisting of —O—, —C(O)—, —C(O)—O—, —O—C(O)—, —S(O)$_{0-2}$—, —C(O)—N($R^{14}$)—, —N($R^{14}$)—C(O)—, or —N$R^{14}$—, where $R^{14}$ is, at each occurrence, independently selected from the group consisting of hydrogen, hydroxy, cyano, (1-4C)alkyl and (2-4C)alkenyl, where any (1-4C)alkyl or (2-4C)alkenyl in $R^{14}$ is independently optionally substituted with one or more groups selected from the group consisting of halogen and hydroxy; and
$Q^1$ is selected from the group consisting of hydrogen, (1-6C)alkyl, (2-6C)alkenyl, aryl, heterocyclyl and heteroaryl, wherein any (1-6C)alkyl, (2-6C)alkenyl, aryl, heterocyclyl or heteroaryl in $Q^1$ is optionally substituted with one or more groups $R^{15}$.

(98) $L^1$ is absent or (1-2C)alkylene;
$X^1$ is absent or is selected from the group consisting of —O—, —C(O)—, —C(O)—O—, —N($R^{14}$)—C(O)—, or —N$R^{14}$—, where $R^{14}$ is, at each occurrence, independently selected from the group consisting of hydrogen, cyano, (1-4C)alkyl and (2-4C)alkenyl, where any (1-4C)alkyl or (2-4C)alkenyl in $R^{14}$ is independently optionally substituted with one, two or three groups selected from the group consisting of fluoro, chloro and hydroxy; and
$Q^1$ is selected from the group consisting of hydrogen, (1-4C)alkyl, (2-4C)alkenyl, phenyl, 5-6 membered heterocyclyl and 5-6 membered heteroaryl, wherein any (1-4C)alkyl, (2-4C)alkenyl, phenyl, 5-6 membered heterocyclyl or 5-6 membered heteroaryl in $Q^1$ is optionally substituted with one, two or three groups $R^{15}$.

(99) $L^1$ is absent or (1-2C)alkylene;
$X^1$ is absent or is selected from the group consisting of —O—, —C(O)—, —C(O)—O—, —N($R^{14}$)—C(O)—, or —N$R^{14}$—, where $R^{14}$ is, at each occurrence, independently selected from the group consisting of hydrogen, cyano, (1-4C)alkyl and (2-4C)alkenyl; and
$Q^1$ is selected from the group consisting of hydrogen, (1-4C)alkyl, (2-4C)alkenyl, phenyl, 5-6 membered heterocyclyl containing 1 or 2 heteroatoms independently selected from N and O, and 5-6 membered heteroaryl containing 1 or 2 heteroatoms independently selected from N and O, wherein any (1-4C)alkyl, (2-4C)alkenyl, phenyl, 5-6 membered heterocyclyl or 5-6 membered heteroaryl in $Q^1$ is optionally substituted with one, two or three groups $R^{15}$.

(100) $L^1$ is absent or (1-2C)alkylene;
$X^1$ is absent or is selected from the group consisting of —O—, —C(O)—, —C(O)—O—, —N($R^{14}$)—C(O)—, or —N$R^{14}$—, where $R^{14}$ is, at each occurrence, independently selected from the group consisting of hydrogen, cyano and (1-2C)alkyl; and
$Q^1$ is selected from the group consisting of hydrogen, (1-2C)alkyl and piperazinyl wherein any (1-2C)alkyl or piperazinyl in $Q^1$ is optionally substituted with one or more groups $R^{15}$.

(101) $L^1$ is absent or (1-2C)alkylene;
$X^1$ is absent or is selected from the group consisting of —O—, —C(O)—O— and —N$R^{14}$—, where $R^{14}$ is, at each occurrence, independently selected from the group consisting of hydrogen and (1-2C)alkyl; and
$Q^1$ is selected from the group consisting of hydrogen, (1-2C)alkyl and piperazinyl wherein any (1-2C)alkyl or piperazinyl in $Q^1$ is optionally substituted with one or two groups $R^{15}$.

(102) Each $R^{15}$ is independently selected from the group consisting of hydroxy, cyano, oxo, halogen, (1-3C)alkyl, (1-3C)alkoxy, —N$R^{15a}R^{15b}$, —C(O)—$R^{15a}$, —C(O)—O$R^{15a}$, —O—C(O)—$R^{15a}$, —C(O)—N$R^{15a}R^{15b}$ and —N($R^{15b}$)C(O)—$R^{15a}$, wherein $R^{15a}$ and $R^{15b}$ are each independently hydrogen or (1-3C)alkyl, and wherein any (1-3C)alkyl moiety present in a $R^{15a}$ or $R^{15b}$ group is optionally further substituted by one or more substituents independently selected from hydroxy, cyano, halogen, —N$R^{15c}R^{15d}$, —C(O)—N$R^{15c}R^{15d}$ and —N($R^{15c}$)C(O)—$R^{15d}$ wherein $R^{15c}$, and $R^{15d}$ are both independently selected from hydrogen and (1-2C)alkyl.

(103) Each $R^{15}$ is independently selected from the group consisting of hydroxy, cyano, oxo, halogen, (1-3C)alkyl, (1-3C)alkoxy, —N$R^{15a}R^{15b}$, —C(O)—N$R^{15a}R^{15b}$ and —N($R^{15b}$)C(O)—$R^{15a}$, wherein $R^{15a}$ and $R^{15b}$ are each independently hydrogen or (1-3C)alkyl, and wherein any (1-3C)alkyl moiety present in a $R^{15a}$ or $R^{15b}$ group is optionally further substituted by one or more substituents independently selected from hydroxy, halogen and —N$R^{15c}R^{15d}$ wherein $R^{15c}$ and $R^{15d}$ are both independently selected from hydrogen and (1-2C)alkyl.

(104) Each $R^{15}$ is independently selected from the group consisting of hydroxy, cyano, halogen, (1-3C)alkyl, (1-3C)alkoxy, —N$R^{15a}R^{15b}$ and —C(O)—N$R^{15a}R^{15b}$, wherein $R^{15a}$ and $R^{15b}$ are each independently hydrogen or (1-3C)alkyl.

(105) Each $R^{15}$ is independently selected from the group consisting of hydroxy, cyano, halogen, (1-3C)alkyl and —C(O)—N$R^{15a}R^{15b}$, wherein $R^{15a}$ and $R^{15b}$ are each independently hydrogen or methyl.

(106) Each $R^{15}$ is independently selected from the group consisting of hydroxy, halogen, (1-3C)alkyl and —C(O)—N$R^{15a}R^{15b}$, wherein $R^{15a}$ and $R^{15b}$ are each independently hydrogen or methyl.

(107) Each $R^{15}$ is independently selected from the group consisting of hydroxy, (1-3C)alkyl and —C(O)—N$R^{15a}R^{15b}$, wherein $R^{15a}$ and $R^{15b}$ are each independently hydrogen or methyl.

(108) Each $R^{15}$ is independently selected from the group consisting of hydroxy, halogen and (1-3C)alkyl.

(109) $R^6$ is (3-8C)cycloalkyl, (3-8C)cycloalkyl(1-2C)alkyl or a 4- to 7-membered heterocyclyl ring comprising one heteroatom selected from N, O or S, or a group having a structure according to formula (A) shown below:

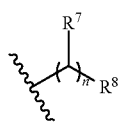
(A)

wherein n, $R^7$ and $R^8$ are each as defined herein.

(110) $R^6$ is (3-6C)cycloalkyl, (3-6C)cycloalkyl(1-2C)alkyl or a 4- to 7-membered heterocyclyl ring comprising one heteroatom selected from N, O or S, or a group having a structure according to formula (A) shown below:

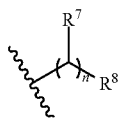
(A)

wherein n, $R^7$ and $R^8$ are each as defined herein.

(111) $R^6$ is (3-6C)cycloalkyl, (3-6C)cycloalkyl(1-2C)alkyl or a 5- or 6-membered heterocyclyl ring comprising one heteroatom selected from O or S, or a group having a structure according to formula (A) shown below:

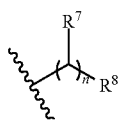
(A)

wherein n, $R^7$ and $R^8$ are each as defined herein.

(112) $R^6$ is (3-6C)cycloalkyl, (3-6C)cycloalkyl(1-2C)alkyl or tetrahydropyran, or a group having a structure according to formula (A) shown below:

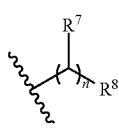
(A)

wherein n, $R^7$ and $R^8$ are each as defined herein.

(113) $R^6$ is (3-6C)cycloalkyl or (3-6C)cycloalkyl(1-2C)alkyl, or a group having a structure according to formula (A) shown below:

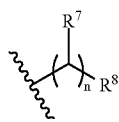
(A)

wherein n, $R^7$ and $R^8$ are each as defined herein.

(114) $R^6$ is a group having a structure according to formula (A) shown below:

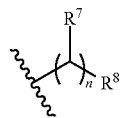
(A)

wherein n, $R^7$ and $R^8$ are each as defined herein.

(115) $R^6$ is (1-6C)alkyl, (3-8C)cycloalkyl, (3-8C)cycloalkyl(1-2C)alkyl or a 4- to 7-membered heterocyclyl ring comprising one heteroatom selected from N, O or S, or a group having a structure according to formula (A) shown below:

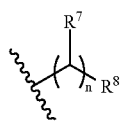
(A)

wherein n, $R^7$ and $R^8$ are each as defined herein.

(116) $R^6$ is (1-6C)alkyl, (3-6C)cycloalkyl, (3-6C)cycloalkyl(1-2C)alkyl or a 4- to 7-membered heterocyclyl ring comprising one heteroatom selected from N, O or S, or a group having a structure according to formula (A) shown below:

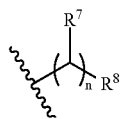
(A)

wherein n, $R^7$ and $R^8$ are each as defined herein.

(117) $R^6$ is (1-4C)alkyl, (3-6C)cycloalkyl, (3-6C)cycloalkyl(1-2C)alkyl or a 5- or 6-membered heterocyclyl ring comprising one heteroatom selected from O or S, or a group having a structure according to formula (A) shown below:

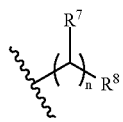
(A)

wherein n, $R^7$ and $R^8$ are each as defined herein.

(118) $R^6$ is (1-3C)alkyl, (3-6C)cycloalkyl, (3-6C)cycloalkyl(1-2C)alkyl or tetrahydropyran, or a group having a structure according to formula (A) shown below:

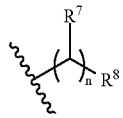
(A)

wherein n, $R^7$ and $R^8$ are each as defined herein.
(119) $R^6$ is (1-2C)alkyl, (3-6C)cycloalkyl or (3-6C)cycloalkyl(1-2C)alkyl, or a group having a structure according to formula (A) shown below:

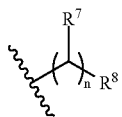

(A)

wherein n, $R^7$ and $R^8$ are each as defined herein.
(120) $R^6$ is methyl.
(121) $R^6$ is ethyl.
(122) $R^{11}$ and $R^{12}$ are linked, such that, together with the nitrogen atom to which they are attached, they form any one of the following ring systems:

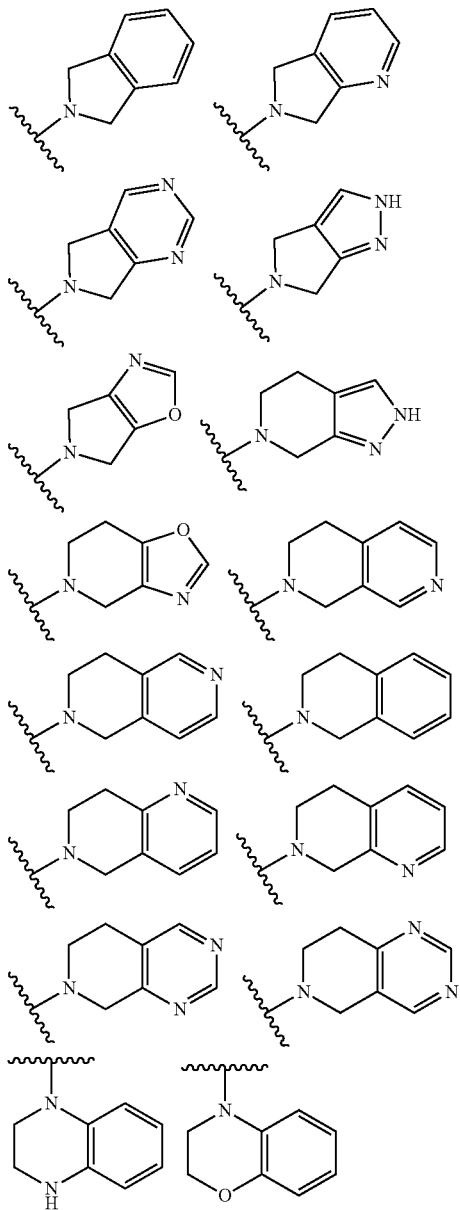

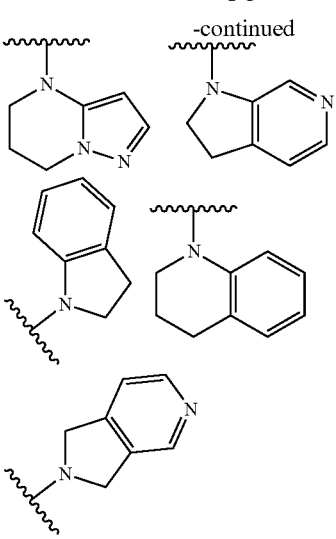

wherein any of the above rings is optionally substituted with 1, 2 or 3 $R^{13}$.
(123) Each $R^{13}$ is independently selected from the group consisting of halogen, cyano, oxo, epoxy and a group $-L^1-X^1-Q^1$ (as defined anywhere herein).
(124) Each $R^{13}$ is independently selected from the group consisting of halogen, cyano, epoxy and a group $-L^1-X^1-Q^1$ (as defined anywhere herein or in any one of paragraphs (97) to (101) or (133) to (135)).
(125) Each $R^{13}$ is independently selected from the group consisting of fluoro, bromo, cyano, epoxy and a group $-L^1-X^1-Q^1$ (as defined anywhere herein or in any one of paragraphs (99) to (101) or (133) to (135)).
(126) $X^1$ is absent or is selected from the group consisting of —O—, —C(O)—, —C(O)—O—, —O—C(O)—, —S(O)$_{0-2}$—, —C(O)—N($R^{14}$)—, —N($R^{14}$)—C(O)—, or —N$R^{14}$—, where $R^{14}$ is, at each occurrence, independently selected from the group consisting of hydrogen, hydroxy, cyano, (1-4C)alkyl and (2-4C)alkenyl, where any (1-4C)alkyl or (2-4C)alkenyl in $R^{14}$ is independently optionally substituted with one or more groups selected from the group consisting of halogen and hydroxy.
(127) $X^1$ is absent or is selected from the group consisting of —O—, —C(O)—, —C(O)—O—, —C(O)—N($R^{14}$)—, —N($R^{14}$)—C(O)—, or —N$R^{14}$—, where $R^{14}$ is, at each occurrence, independently selected from the group consisting of hydrogen, cyano and (1-2C)alkyl.
(128) $X^1$ is absent or is selected from the group consisting of —O—, —C(O)—O—, —C(O)—N($R^{14}$)— and —N($R^{14}$)—C(O)—, —N$R^{14}$—, where $R^{14}$ is, at each occurrence, independently selected from the group consisting of hydrogen and (1-2C)alkyl.
(129) $Q^1$ is selected from the group consisting of hydrogen, (1-6C)alkyl, (2-6C)alkenyl, aryl, aryl(1-3C)alkyl, heterocyclyl, heterocyclyl(1-3C)alkyl, heteroaryl and heteroaryl(1-3C)alkyl, wherein any (1-6C)alkyl, (2-6C)alkenyl, aryl, aryl(1-3C)alkyl, heterocyclyl, heterocyclyl(1-3C)alkyl, heteroaryl or heteroaryl(1-3C)alkyl in $Q^1$ is optionally substituted with one or more groups $R^{15}$.
(130) $Q^1$ is selected from the group consisting of hydrogen, (1-4C)alkyl, (2-4C)alkenyl, aryl, aryl(1-2C)alkyl, heterocyclyl, heterocyclyl(1-2C)alkyl, heteroaryl and heteroaryl(1-2C)alkyl, wherein any (1-4C)alkyl, (2-4C)alkenyl, aryl, aryl(1-2C)alkyl, heterocyclyl, heterocyclyl(1-2C)alkyl, heteroaryl or heteroaryl(1-2C)alkyl in $Q^1$ is optionally substituted with one or more groups $R^{15}$.
(131) $Q^1$ is selected from the group consisting of hydrogen, (1-4C)alkyl, (2-4C)alkenyl, phenyl, phenyl(1-2C)alkyl, 4-6 membered heterocyclyl, 4-6 membered heterocyclyl(1-2C)alkyl, 4-6 membered heteroaryl and 4-6 membered heteroaryl(1-2C)alkyl, wherein any (1-4C)alkyl, (2-4C)alkenyl, phenyl, phenyl(1-2C)alkyl, 4-6 membered heterocyclyl, 4-6 membered heterocyclyl(1-2C)alkyl, 4-6 membered heteroaryl or 4-6 membered heteroaryl(1-2C)alkyl in $Q^1$ is optionally substituted with one or more groups $R^{15}$.
(132) $Q^1$ is selected from the group consisting of hydrogen, (1-4C)alkyl, (2-4C)alkenyl, phenyl, phenyl(1C)alkyl, 4-6 membered heterocyclyl, 4-6 membered heterocyclyl(1C)alkyl, 4-6 membered heteroaryl and 4-6 membered heteroaryl(1C)alkyl, wherein any (1-4C)alkyl, (2-4C)alkenyl, phenyl, phenyl(1C)alkyl, 4-6 membered heterocyclyl, 4-6 membered heterocyclyl(1C)alkyl, 4-6 membered heteroaryl or 4-6 membered heteroaryl(1C)alkyl in $Q^1$ is optionally substituted with one or more groups $R^{15}$.
(133) $L^1$ is absent or (1-2C)alkylene;
$X^1$ is absent or is selected from the group consisting of —O—, —C(O)—, —C(O)—O—, —O—C(O)—, —S(O)$_{0-2}$—, —C(O)—N($R^{14}$)—, —N($R^{14}$)—C(O)—, or —N$R^{14}$—, where $R^{14}$ is, at each occurrence, independently selected from the group consisting of hydrogen, hydroxy, cyano, (1-4C)alkyl and (2-4C)alkenyl, where any (1-4C)alkyl or (2-4C)alkenyl in $R^{14}$ is independently optionally substituted with one or more groups selected from the group consisting of halogen and hydroxy; and
$Q^1$ is selected from the group consisting of hydrogen, (1-6C)alkyl, (2-6C)alkenyl, aryl, aryl(1-3C)alkyl, heterocyclyl, heterocyclyl(1-3C)alkyl, heteroaryl and heteroaryl(1-3C)alkyl, wherein any (1-6C)alkyl, (2-6C)alkenyl, aryl, aryl(1-3C)alkyl, heterocyclyl, heterocyclyl(1-3C)alkyl, heteroaryl or heteroaryl(1-3C)alkyl in $Q^1$ is optionally substituted with one or more groups $R^{15}$.
(134) $L^1$ is absent or (1-2C)alkylene;
$X^1$ is absent or is selected from the group consisting of —O—, —C(O)—, —C(O)—O—, —C(O)—N($R^{14}$)—, —N($R^1$)—C(O)—, or —N$R^{14}$—, where $R^{14}$ is, at each occurrence, independently selected from the group consisting of hydrogen, cyano and (1-2C)alkyl; and
$Q^1$ is selected from the group consisting of hydrogen, (1-4C)alkyl, (2-4C)alkenyl, aryl, aryl(1-2C)alkyl, heterocyclyl, heterocyclyl(1-2C)alkyl, heteroaryl and heteroaryl(1-2C)alkyl, wherein any (1-4C)alkyl, (2-4C)alkenyl, aryl, aryl(1-2C)alkyl, heterocyclyl, heterocyclyl(1-2C)alkyl, heteroaryl or heteroaryl(1-2C)alkyl in $Q^1$ is optionally substituted with one or more groups $R^{15}$.
(135) $L^1$ is absent or (1-2C)alkylene;
$X^1$ is absent or is selected from the group consisting of —O—, —C(O)—O—, —C(O)—N($R^{14}$)— and —N($R^{14}$)—C(O)—, —N$R^{14}$—, where $R^{14}$ is, at each occurrence, independently selected from the group consisting of hydrogen and (1-2C)alkyl; and
$Q^1$ is selected from the group consisting of hydrogen, (1-4C)alkyl, (2-4C)alkenyl, phenyl, phenyl(1C)alkyl, 4-6 membered heterocyclyl, 4-6 membered heterocyclyl(1C)alkyl, 4-6 membered heteroaryl and 4-6 membered heteroaryl(1C)alkyl, wherein any (1-4C)alkyl, (2-4C)alkenyl, phenyl, phenyl(1C)alkyl, 4-6 membered heterocyclyl, 4-6 membered heterocyclyl(1C)alkyl, 4-6 membered heteroaryl or 4-6 membered heteroaryl(1C)alkyl in $Q^1$ is optionally substituted with one or more groups $R^{15}$.

Suitably, $R^1$ and $R^3$ are as defined in any one of numbered paragraphs (3) to (4). Most suitably, $R^1$ and $R^3$ are as defined in numbered paragraph (4).

Suitably, $R^2$ is as defined in numbered paragraph (6).

Suitably, $R^4$ is as defined in any one of numbered paragraphs (10) to (17). More suitably, $R^4$ is as defined in any one of numbered paragraphs (13) to (17). Most suitably, $R^4$ is as defined in any one of numbered paragraphs (15) to (17).

Suitably, $R^{5a}$ is as defined in any one of numbered paragraphs (19) to (20). Most suitably, $R^{5a}$ is as defined in numbered paragraph (20).

Suitably, $R^{5b}$ is as defined in any one of numbered paragraphs (23) to (24). Most suitably, $R^{5a}$ is as defined in numbered paragraph (24).

Suitably, $R^7$ is as defined in any one of numbered paragraphs (27) to (29). Most suitably, $R^7$ is as defined in numbered paragraph (28).

Suitably, n is as defined in numbered paragraph (30).

Suitably, $R^8$ is as defined in any one of numbered paragraphs (34) to (39). More suitably, $R^8$ is as defined in any one of numbered paragraphs (36) to (39). Most suitably, $R^8$ is as defined in numbered paragraph (39).

Suitably, $m^1$ is as defined in numbered paragraph (41) or (42). Most suitably, $m^1$ is as defined in numbered paragraph (42).

Suitably, $R^9$ is as defined in any one of numbered paragraphs (46) to (50). More suitably, $R^9$ is as defined in any one of numbered paragraphs (48) to (50). Most suitably, $R^9$ is as defined in numbered paragraph (50).

Suitably, $R^{11}$ and $R^{12}$ are as defined in any one of numbered paragraphs (53) to (71). More suitably, $R^{11}$ and $R^{12}$ are as defined in any one of numbered paragraphs (57) to (71). Even more suitably, $R^{11}$ and $R^{12}$ are as defined in any one of numbered paragraphs (61) to (71). Yet even more suitably, $R^{11}$ and $R^{12}$ are as defined in any one of numbered paragraphs (64) to (71). Still more suitably, $R^{11}$ and $R^{12}$ are as defined in any one of numbered paragraphs (67) to (71). Most suitably, $R^{11}$ and $R^{12}$ are as defined in any one of numbered paragraphs (70) to (71).

Suitably, $R^{11}$ and $R^{12}$ are as defined in numbered paragraph (122).

Suitably, $R^{13}$ is as defined in numbered paragraph (74) or (75).

Suitably, $R^{13a}$ is as defined in any one of numbered paragraphs (78) to (79).

Suitably, $L^1$ is as defined in any one of numbered paragraphs (81) to (83).

Suitably, $X^1$ is as defined in any one of numbered paragraphs (86) to (89). More suitably, $X^1$ is as defined in any one of numbered paragraphs (88) to (89).

Suitably, $X^1$ is as defined in any one of numbered paragraphs (126) to (128). More suitably, $X^1$ is as defined in numbered paragraph (128).

Suitably, $Q^1$ is as defined in any one of numbered paragraphs (93) to (96). More suitably, $Q^1$ is as defined in any one of numbered paragraphs (95) to (96).

Suitably, $Q^1$ is as defined in any one of numbered paragraphs (129) to (132). More suitably, $Q^1$ is as defined in any one of numbered paragraphs (130) to (132). Most suitably, $Q^1$ is as defined in numbered paragraphs (131) or (132).

Suitably, $L^1$, $X^1$ and $Q^1$ are as defined in any one of numbered paragraphs (99) to (101).

Suitably, $L^1$, $X^1$ and $Q^1$ are as defined in any one of numbered paragraphs (133) to (135). Most suitably, $L^1$, $X^1$ and $Q^1$ are as defined in numbered paragraphs (134) or (135).

Suitably, $R^{15}$ is as defined in any one of numbered paragraphs (105) to (108). More suitably, $R^{15}$ is as defined in any one of numbered paragraphs (107) to (108).

Suitably, $R^6$ is as defined in any one of numbered paragraphs (109) to (114). More suitably, $R^6$ is as defined in any one of numbered paragraphs (111), (112), (113) or (114).

Suitably, $R^6$ is as defined in any one of numbered paragraphs (115) to (121). More suitably, $R^6$ is as defined in any one of numbered paragraphs (118), (119), (120) or (121).

In a particular group of compounds of the invention, compounds have a structure according to formula I-I (which is a sub-definition of formula I), or a pharmaceutically acceptable salt, hydrate and/or solvate thereof:

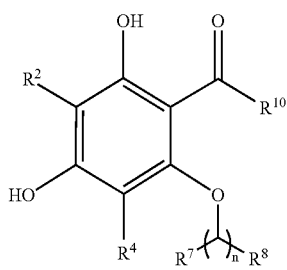

(I-I)

wherein n, $R^2$, $R^4$, $R^7$, $R^8$, $R^{10}$, and any associated subgroups, are as defined in any of the numbered paragraphs appearing hereinbefore.

In an embodiment of the compounds of formula I-I, or a pharmaceutically acceptable salt, hydrate and/or solvate thereof:
$R^2$ is as defined in numbered paragraph (5) or (6);
$R^4$ is as defined in any one of numbered paragraphs (10) to (17);
$R^7$ is as defined in any one of numbered paragraphs (27) to (29);
n is as defined in numbered paragraph (30);
$R^8$ is as defined in any one of numbered paragraphs (31) to (39);
$R^{11}$ and $R^{12}$ are as defined in any one of numbered paragraphs (53) to (71); and
all other groups are as defined in any of the numbered paragraphs appearing hereinbefore.

In an embodiment of the compounds of formula I-I, or a pharmaceutically acceptable salt, hydrate and/or solvate thereof:
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^8$ is as defined in any one of numbered paragraphs (34) to (39);
$R^9$ is as defined in any one of numbered paragraphs (46) to (50);
$R^{11}$ and $R^{12}$ are as defined in any one of numbered paragraphs (53) to (71);
$R^{13}$ is as defined in numbered paragraph (74) or (75);
$L^1$ is as defined in any one of numbered paragraphs (81) to (83);
$X^1$ is as defined in any one of numbered paragraphs (86) to (89);
$Q^1$ is as defined in any one of numbered paragraphs (93) to (96); and
all other groups are as defined in any of the numbered paragraphs appearing hereinbefore.

In an embodiment of the compounds of formula 1-1, or a pharmaceutically acceptable salt, hydrate and/or solvate thereof:
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);
$R^{11}$ and $R^{12}$ are as defined in any one of numbered paragraphs (57) to (71);
$R^{13}$ is as defined in numbered paragraph (74) or (75);
$R^{13a}$ is as defined in any one of numbered paragraphs (78) to (79);
$L^1$ is as defined in any one of numbered paragraphs (81) to (83);
$X^1$ is as defined in any one of numbered paragraphs (86) to (89);
$Q^1$ is as defined in any one of numbered paragraphs (93) to (96); and
all other groups are as defined in any of the numbered paragraphs appearing hereinbefore.

In an embodiment of the compounds of formula 1-1, or a pharmaceutically acceptable salt, hydrate and/or solvate thereof:
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);
$R^{11}$ and $R^{12}$ are as defined in any one of numbered paragraphs (61) to (71);
$R^{13}$ is as defined in numbered paragraph (74) or (75);
$R^{13a}$ is as defined in any one of numbered paragraphs (78) to (79);
$L^1$ is as defined in any one of numbered paragraphs (81) to (93);
$X^1$ is as defined in any one of numbered paragraphs (86) to (89);
$Q^1$ is as defined in any one of numbered paragraphs (93) to (96);
$R^{15}$ is as defined in any one of numbered paragraphs (105) to (108); and
all other groups are as defined in any of the numbered paragraphs appearing hereinbefore.

In an embodiment of the compounds of formula 1-1, or a pharmaceutically acceptable salt, hydrate and/or solvate thereof:

$R^2$ is as defined in numbered paragraph (5) or (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);
$R^{11}$ and $R^{12}$ are as defined in any one of numbered paragraphs (64) to (71);
$R^{13}$ is as defined in numbered paragraph (74) or (75);
$R^{13a}$ is as defined in any one of numbered paragraphs (78) to (79);
$L^1$ is as defined in any one of numbered paragraphs (81) to (83);
$X^1$ is as defined in any one of numbered paragraphs (88) to (89);
$Q^1$ is as defined in any one of numbered paragraphs (95) to (96);
$R^{15}$ is as defined in any one of numbered paragraphs (105) to (108); and
all other groups are as defined in any of the numbered paragraphs appearing hereinbefore.

In an embodiment of the compounds of formula 1-1, or a pharmaceutically acceptable salt, hydrate and/or solvate thereof:
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);
$R^{11}$ and $R^{12}$ are as defined in any one of numbered paragraphs (64) to (71);
$R^{13}$ is as defined in numbered paragraph (74) or (75);
$R^{13a}$ is as defined in any one of numbered paragraphs (78) to (79);
$L^1$ is as defined in any one of numbered paragraphs (81) to (83);
$X^1$ is as defined in any one of numbered paragraphs (88) to (89);
$Q^1$ is as defined in any one of numbered paragraphs (95) to (96);
$R^{15}$ is as defined in any one of numbered paragraphs (105) to (108); and
all other groups are as defined in any of the numbered paragraphs appearing hereinbefore.

In an embodiment of the compounds of formula 1-1, or a pharmaceutically acceptable salt, hydrate and/or solvate thereof:
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);

$R^{11}$ and $R^{12}$ are as defined in any one of numbered paragraphs (67) to (71);
$R^{13}$ is as defined in numbered paragraph (74) or (75);
$R^{13a}$ is as defined in any one of numbered paragraphs (78) to (79);
$L^1$, $X^1$ and $Q^1$ are as defined in any one of numbered paragraphs (99) to (101);
$R^{15}$ is as defined in any one of numbered paragraphs (105) to (108); and
all other groups are as defined in any of the numbered paragraphs appearing hereinbefore.

In an embodiment of the compounds of formula 1-1, or a pharmaceutically acceptable salt, hydrate and/or solvate thereof:
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in numbered paragraph (39);
$R^{11}$ and $R^{12}$ are as defined in any one of numbered paragraphs (67) to (71);
$R^{13}$ is as defined in numbered paragraph (74) or (75);
$R^{13a}$ is as defined in any one of numbered paragraphs (78) to (79);
$L^1$, $X^1$ and $Q^1$ are as defined in any one of numbered paragraphs (99) to (101);
$R^{15}$ is as defined in any one of numbered paragraphs (107) to (108); and
all other groups are as defined in any of the numbered paragraphs appearing hereinbefore.

In an embodiment of the compounds of formula 1-1, or a pharmaceutically acceptable salt, hydrate and/or solvate thereof:
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in numbered paragraph (39);
$R^{11}$ and $R^{12}$ are as defined in any one of numbered paragraphs (70) to (71);
$R^{13}$ is as defined in numbered paragraph (74) or (75);
$R^{13a}$ is as defined in any one of numbered paragraphs (78) to (79);
$L^1$, $X^1$ and $Q^1$ are as defined in any one of numbered paragraphs (99) to (101);
$R^{15}$ is as defined in any one of numbered paragraphs (107) to (108); and
all other groups are as defined in any of the numbered paragraphs appearing hereinbefore.

In an embodiment of the compounds of formula 1-1, or a pharmaceutically acceptable salt, hydrate and/or solvate thereof:
$R^2$ is as defined in numbered paragraph (6);
$R^4$ is as defined in numbered paragraph (15);
$R^7$ is as defined in numbered paragraph (27);
n is as defined in numbered paragraph (30);
$R^8$ is as defined in numbered paragraph (39);
$R^{11}$ and $R^{12}$ are as defined in numbered paragraph (70);
$R^{13}$ is as defined in numbered paragraph (74);
$R^{13a}$ is as defined in numbered paragraph (78);
$L^1$, $X^1$ and $Q^1$ are as defined in numbered paragraph (99);
$R^{15}$ is as defined in numbered paragraph (107); and all other groups are as defined in any of the numbered paragraphs appearing hereinbefore.

In an embodiment of the compounds of formula 1-1, or a pharmaceutically acceptable salt, hydrate and/or solvate thereof:
- $R^2$ is as defined in numbered paragraph (6);
- $R^4$ is as defined in any one of numbered paragraphs (15) to (17);
- $R^7$ is as defined in any one of numbered paragraphs (27) to (29);
- n is as defined in numbered paragraph (30);
- $R^8$ is as defined in numbered paragraph (39);
- $R^{11}$ and $R^{12}$ are as defined in any one of numbered paragraphs (67) to (71) or (122);
- $R^{13}$ is as defined in numbered paragraph (74), (75) or (123) to (125);
- $R^{13a}$ is as defined in any one of numbered paragraphs (78) to (79);
- $L^1$, $X^1$ and $Q^1$ are as defined in any one of numbered paragraphs (99) to (101) or (133) to (135);
- $R^{15}$ is as defined in any one of numbered paragraphs (107) to (108); and
- all other groups are as defined in any of the numbered paragraphs appearing hereinbefore.

In an embodiment of the compounds of formula 1-1, or a pharmaceutically acceptable salt, hydrate and/or solvate thereof:
- $R^2$ is as defined in numbered paragraph (6);
- $R^4$ is as defined in any one of numbered paragraphs (15) to (17);
- $R^7$ is as defined in any one of numbered paragraphs (27) to (29);
- n is as defined in numbered paragraph (30);
- $R^8$ is as defined in numbered paragraph (39);
- $R^{11}$ and $R^{12}$ are as defined in any one of numbered paragraphs (70) to (71) or (122);
- $R^{13}$ is as defined in numbered paragraph (74), (75) or (124) to (125);
- $R^{13a}$ is as defined in any one of numbered paragraphs (78) to (79);
- $L^1$, $X^1$ and $Q^1$ are as defined in any one of numbered paragraphs (99) to (101) or (134) to (135);
- $R^{15}$ is as defined in any one of numbered paragraphs (107) to (108); and
- all other groups are as defined in any of the numbered paragraphs appearing hereinbefore.

In an embodiment of the compounds of formula 1-1, or a pharmaceutically acceptable salt, hydrate and/or solvate thereof:
- $R^2$ is as defined in numbered paragraph (6);
- $R^4$ is as defined in numbered paragraph (15);
- $R^7$ is as defined in numbered paragraph (27);
- n is as defined in numbered paragraph (30);
- $R^8$ is as defined in numbered paragraph (39);
- $R^{11}$ and $R^{12}$ are as defined in numbered paragraph (122);
- $R^{13}$ is as defined in numbered paragraph (74) or (124);
- $R^{13a}$ is as defined in numbered paragraph (78);
- $L^1$, $X^1$ and $Q^1$ are as defined in numbered paragraph (134) or (135);
- $R^{15}$ is as defined in numbered paragraph (107); and
- all other groups are as defined in any of the numbered paragraphs appearing hereinbefore. In a particular group of compounds of the invention, compounds have a structure according to formula I-II (which is a sub-definition of formula I), or a pharmaceutically acceptable salt, hydrate and/or solvate thereof:

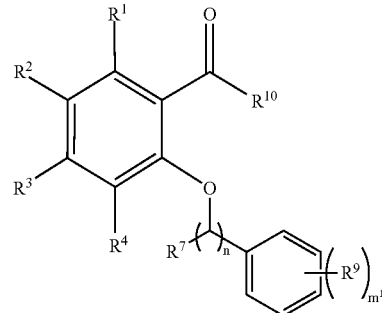

(I-II)

wherein n, $m^1$, $R^1$, $R^2$, $R^3$, $R^4$, $R^7$, $R^9$, $R^{10}$ and any associated subgroups are as defined in any of the numbered paragraphs appearing hereinbefore.

In an embodiment of the compounds of formula I-II, or a pharmaceutically acceptable salt, hydrate and/or solvate thereof:
- $m^1$ is as defined in numbered paragraph (41) or (42);
- $R^2$ is as defined in numbered paragraph (5) or (6);
- $R^4$ is as defined in any one of numbered paragraphs (10) to (17);
- $R^7$ is as defined in any one of numbered paragraphs (27) to (29);
- n is as defined in numbered paragraph (30);
- $R^{11}$ and $R^{12}$ are as defined in any one of numbered paragraphs (53) to (71); and
- all other groups are as defined in any of the numbered paragraphs appearing hereinbefore.

In an embodiment of the compounds of formula I-II, or a pharmaceutically acceptable salt, hydrate and/or solvate thereof:
- $R^1$ and $R^3$ are as defined in any one of numbered paragraphs (3) to (4);
- $m^1$ is as defined in numbered paragraph (41) or (42);
- $R^2$ is as defined in numbered paragraph (5) or (6);
- $R^4$ is as defined in any one of numbered paragraphs (13) to (17);
- $R^7$ is as defined in any one of numbered paragraphs (27) to (29);
- n is as defined in numbered paragraph (30);
- $R^9$ is as defined in any one of numbered paragraphs (46) to (50);
- $R^{11}$ and $R^{12}$ are as defined in any one of numbered paragraphs (53) to (71);
- $R^{13}$ is as defined in numbered paragraph (74) or (75);
- $L^1$ is as defined in any one of numbered paragraphs (81) to (83);
- $X^1$ is as defined in any one of numbered paragraphs (86) to (89);
- $Q^1$ is as defined in any one of numbered paragraphs (93) to (96); and
- all other groups are as defined in any of the numbered paragraphs appearing hereinbefore.

In an embodiment of the compounds of formula I-II, or a pharmaceutically acceptable salt, hydrate and/or solvate thereof:
- $R^1$ and $R^3$ are as defined in any one of numbered paragraphs (3) to (4);
- $m^1$ is as defined in numbered paragraph (41) or (42);
- $R^2$ is as defined in numbered paragraph (5) or (6);
- $R^4$ is as defined in any one of numbered paragraphs (13) to (17);

$R^7$ is as defined in any one of numbered paragraphs (27) to (29);

n is as defined in numbered paragraph (30);

$R^9$ is as defined in any one of numbered paragraphs (48) to (50);

$R^{11}$ and $R^{12}$ are as defined in any one of numbered paragraphs (57) to (71);

$R^{13}$ is as defined in numbered paragraph (74) or (75);

$R^{13a}$ is as defined in any one of numbered paragraphs (78) to (79);

$L^1$ is as defined in any one of numbered paragraphs (81) to (83);

$X^1$ is as defined in any one of numbered paragraphs (86) to (89);

$Q^1$ is as defined in any one of numbered paragraphs (93) to (96); and all other groups are as defined in any of the numbered paragraphs appearing hereinbefore.

In an embodiment of the compounds of formula I-II, or a pharmaceutically acceptable salt, hydrate and/or solvate thereof:

$R^1$ and $R^3$ are as defined in any one of numbered paragraphs (3) to (4);

$m^1$ is as defined in numbered paragraph (41) or (42);

$R^2$ is as defined in numbered paragraph (5) or (6);

$R^4$ is as defined in any one of numbered paragraphs (13) to (17);

$R^7$ is as defined in any one of numbered paragraphs (27) to (29);

n is as defined in numbered paragraph (30);

$R^9$ is as defined in any one of numbered paragraphs (48) to (50);

$R^{11}$ and $R^{12}$ are as defined in any one of numbered paragraphs (61) to (71);

$R^{13}$ is as defined in numbered paragraph (74) or (75);

$R^{13a}$ is as defined in any one of numbered paragraphs (78) to (79);

$L^1$ is as defined in any one of numbered paragraphs (81) to (93);

$X^1$ is as defined in any one of numbered paragraphs (86) to (89);

$Q^1$ is as defined in any one of numbered paragraphs (93) to (96);

$R^{15}$ is as defined in any one of numbered paragraphs (105) to (108); and all other groups are as defined in any of the numbered paragraphs appearing hereinbefore.

In an embodiment of the compounds of formula I-II, or a pharmaceutically acceptable salt, hydrate and/or solvate thereof:

$R^1$ and $R^3$ are as defined in any one of numbered paragraphs (3) to (4);

$m^1$ is as defined in numbered paragraph (41) or (42);

$R^2$ is as defined in numbered paragraph (5) or (6);

$R^4$ is as defined in any one of numbered paragraphs (15) to (17);

$R^7$ is as defined in any one of numbered paragraphs (27) to (29);

n is as defined in numbered paragraph (30);

$R^9$ is as defined in any one of numbered paragraphs (48) to (50);

$R^{11}$ and $R^{12}$ are as defined in any one of numbered paragraphs (64) to (71);

$R^{13}$ is as defined in numbered paragraph (74) or (75);

$R^{13a}$ is as defined in any one of numbered paragraphs (78) to (79);

$L^1$ is as defined in any one of numbered paragraphs (81) to (83);

$X^1$ is as defined in any one of numbered paragraphs (88) to (89);

$Q^1$ is as defined in any one of numbered paragraphs (95) to (96);

$R^{15}$ is as defined in any one of numbered paragraphs (105) to (108); and all other groups are as defined in any of the numbered paragraphs appearing hereinbefore.

In an embodiment of the compounds of formula I-II, or a pharmaceutically acceptable salt, hydrate and/or solvate thereof:

$R^1$ and $R^3$ are as defined in any one of numbered paragraphs (3) to (4);

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^9$ is as defined in any one of numbered paragraphs (48) to (50);

$R^{11}$ and $R^{12}$ are as defined in any one of numbered paragraphs (64) to (71);

$R^{13}$ is as defined in numbered paragraph (74) or (75);

$R^{13a}$ is as defined in any one of numbered paragraphs (78) to (79);

$L^1$ is as defined in any one of numbered paragraphs (81) to (83);

$X^1$ is as defined in any one of numbered paragraphs (88) to (89);

$Q^1$ is as defined in any one of numbered paragraphs (95) to (96);

$R^{15}$ is as defined in any one of numbered paragraphs (105) to (108); and all other groups are as defined in any of the numbered paragraphs appearing hereinbefore.

In an embodiment of the compounds of formula I-II, or a pharmaceutically acceptable salt, hydrate and/or solvate thereof:

$R^1$ and $R^3$ are as defined in any one of numbered paragraphs (3) to (4);

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^9$ is as defined in any one of numbered paragraphs (48) to (50);

$R^{11}$ and $R^{12}$ are as defined in any one of numbered paragraphs (67) to (71);

$R^{13}$ is as defined in numbered paragraph (74) or (75);

$R^{13a}$ is as defined in any one of numbered paragraphs (78) to (79);

$L^1$, $X^1$ and $Q^1$ are as defined in any one of numbered paragraphs (99) to (101);

$R^{15}$ is as defined in any one of numbered paragraphs (105) to (108); and all other groups are as defined in any of the numbered paragraphs appearing hereinbefore.

In an embodiment of the compounds of formula I-II, or a pharmaceutically acceptable salt, hydrate and/or solvate thereof:

$R^1$ and $R^3$ are as defined in any one of numbered paragraphs (3) to (4);
$m^1$ is as defined in numbered paragraph (41) or (42);
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^9$ is as defined in any one of numbered paragraphs (48) to (50);
$R^{11}$ and $R^{12}$ are as defined in any one of numbered paragraphs (67) to (71);
$R^{13}$ is as defined in numbered paragraph (74) or (75);
$R^{13a}$ is as defined in any one of numbered paragraphs (78) to (79);
$L^1$, $X^1$ and $Q^1$ are as defined in any one of numbered paragraphs (99) to (101);
$R^{15}$ is as defined in any one of numbered paragraphs (107) to (108); and
all other groups are as defined in any of the numbered paragraphs appearing hereinbefore.

In an embodiment of the compounds of formula I-II, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^9$ is as defined in any one of numbered paragraphs (48) to (50);
$R^{11}$ and $R^{12}$ are as defined in any one of numbered paragraphs (70) to (71);
$R^{13}$ is as defined in numbered paragraph (74) or (75);
$R^{13a}$ is as defined in any one of numbered paragraphs (78) to (79);
$L^1$, $X^1$ and $Q^1$ are as defined in any one of numbered paragraphs (99) to (101);
$R^{15}$ is as defined in any one of numbered paragraphs (107) to (108); and
all other groups are as defined in any of the numbered paragraphs appearing hereinbefore.

In an embodiment of the compounds of formula I-II, or a pharmaceutically acceptable salt, hydrate and/or solvate thereof:
$R^1$ and $R^3$ are as defined in numbered paragraphs (3);
$m^1$ is as defined in numbered paragraph (41);
$R^2$ is as defined in numbered paragraph (6);
$R^4$ is as defined in numbered paragraph (15);
$R^7$ is as defined in numbered paragraph (27);
n is as defined in numbered paragraph (30);
$R^9$ is as defined in numbered paragraph (48);
$R^{11}$ and $R^{12}$ are as defined in numbered paragraph (70);
$R^{13}$ is as defined in numbered paragraph (74);
$R^{13a}$ is as defined in numbered paragraph (78);
$L^1$, $X^1$ and $Q^1$ are as defined in numbered paragraph (99);
$R^{15}$ is as defined in numbered paragraph (107); and
all other groups are as defined in any of the numbered paragraphs appearing hereinbefore.

In an embodiment of the compounds of formula I-II, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^9$ is as defined in any one of numbered paragraphs (48) to (50);
$R^{11}$ and $R^{12}$ are as defined in any one of numbered paragraphs (67) to (71) or (122);
$R^{13}$ is as defined in any one of numbered paragraphs (74), (75) or (123) to (125);
$R^{13a}$ is as defined in any one of numbered paragraphs (78) to (79);
$L^1$, $X^1$ and $Q^1$ are as defined in any one of numbered paragraphs (99) to (101) or (133) to (135);
$R^{15}$ is as defined in any one of numbered paragraphs (107) to (108); and
all other groups are as defined in any of the numbered paragraphs appearing hereinbefore.

In an embodiment of the compounds of formula I-II, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^9$ is as defined in any one of numbered paragraphs (48) to (50);
$R^{11}$ and $R^{12}$ are as defined in any one of numbered paragraphs (70) to (71) or (122);
$R^{13}$ is as defined in any one of numbered paragraphs (74), (75) or (124) to (125);
$R^{13a}$ is as defined in any one of numbered paragraphs (78) to (79);
$L^1$, $X^1$ and $Q^1$ are as defined in any one of numbered paragraphs (99) to (101) or (134) to (135);
$R^{15}$ is as defined in any one of numbered paragraphs (107) to (108); and
all other groups are as defined in any of the numbered paragraphs appearing hereinbefore.

In an embodiment of the compounds of formula I-II, or a pharmaceutically acceptable salt, hydrate and/or solvate thereof:
$R^1$ and $R^3$ are as defined in numbered paragraph (3);
$m^1$ is as defined in numbered paragraph (41);
$R^2$ is as defined in numbered paragraph (6);
$R^4$ is as defined in numbered paragraph (15);
$R^7$ is as defined in numbered paragraph (27);
n is as defined in numbered paragraph (30);
$R^9$ is as defined in numbered paragraphs (48);
$R^{11}$ and $R^{12}$ are as defined in numbered paragraph (122);
$R^{13}$ is as defined in numbered paragraph (74) or (123);
$R^{13a}$ is as defined in numbered paragraph (78);
$L^1$, $X^1$ and $Q^1$ are as defined in numbered paragraph (134) or (135);
$R^{15}$ is as defined in numbered paragraph (107); and
all other groups are as defined in any of the numbered paragraphs appearing hereinbefore.

In a particular group of compounds of the invention, compounds have a structure according to formula I-III (which is a sub-definition of formula I), or a pharmaceutically acceptable salt, hydrate and/or solvate thereof:

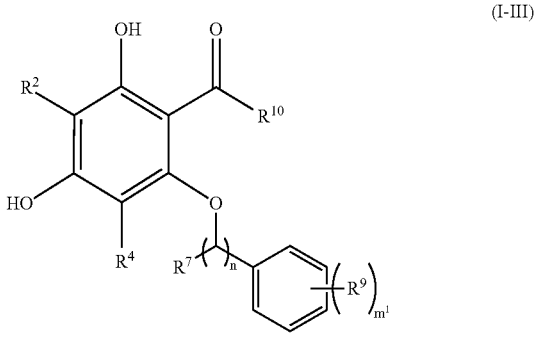

(I-III)

wherein n, $m^1$, $R^2$, $R^4$, $R^7$, $R^9$, $R^{10}$ and any associated subgroups are as defined in any of the numbered paragraphs appearing hereinbefore.

In an embodiment of the compounds of formula I-III, or a pharmaceutically acceptable salt, hydrate and/or solvate thereof:
- $m^1$ is as defined in numbered paragraph (41) or (42);
- $R^2$ is as defined in numbered paragraph (5) or (6);
- $R^4$ is as defined in any one of numbered paragraphs (10) to (17);
- $R^7$ is as defined in any one of numbered paragraphs (27) to (29);
- n is as defined in numbered paragraph (30);
- $R^{11}$ and $R^{12}$ are as defined in any one of numbered paragraphs (53) to (71); and
- all other groups are as defined in any of the numbered paragraphs appearing hereinbefore.

In an embodiment of the compounds of formula I-III, or a pharmaceutically acceptable salt, hydrate and/or solvate thereof:
- $m^1$ is as defined in numbered paragraph (41) or (42);
- $R^2$ is as defined in numbered paragraph (5) or (6);
- $R^4$ is as defined in any one of numbered paragraphs (13) to (17);
- $R^7$ is as defined in any one of numbered paragraphs (27) to (29);
- n is as defined in numbered paragraph (30);
- $R^9$ is as defined in any one of numbered paragraphs (46) to (50);
- $R^{11}$ and $R^{12}$ are as defined in any one of numbered paragraphs (53) to (71);
- $R^{13}$ is as defined in numbered paragraph (74) or (75);
- $L^1$ is as defined in any one of numbered paragraphs (81) to (83);
- $X^1$ is as defined in any one of numbered paragraphs (86) to (89);
- $Q^1$ is as defined in any one of numbered paragraphs (93) to (96); and
- all other groups are as defined in any of the numbered paragraphs appearing hereinbefore.

In an embodiment of the compounds of formula I-III, or a pharmaceutically acceptable salt, hydrate and/or solvate thereof:
- $m^1$ is as defined in numbered paragraph (41) or (42);
- $R^2$ is as defined in numbered paragraph (5) or (6);
- $R^4$ is as defined in any one of numbered paragraphs (13) to (17);
- $R^7$ is as defined in any one of numbered paragraphs (27) to (29);
- n is as defined in numbered paragraph (30);
- $R^9$ is as defined in any one of numbered paragraphs (48) to (50);
- $R^{11}$ and $R^{12}$ are as defined in any one of numbered paragraphs (57) to (71);
- $R^{13}$ is as defined in numbered paragraph (74) or (75);
- $R^{13a}$ is as defined in any one of numbered paragraphs (78) to (79);
- $L^1$ is as defined in any one of numbered paragraphs (81) to (83);
- $X^1$ is as defined in any one of numbered paragraphs (86) to (89);
- $Q^1$ is as defined in any one of numbered paragraphs (93) to (96); and
- all other groups are as defined in any of the numbered paragraphs appearing hereinbefore.

In an embodiment of the compounds of formula I-III, or a pharmaceutically acceptable salt, hydrate and/or solvate thereof:
- $m^1$ is as defined in numbered paragraph (41) or (42);
- $R^2$ is as defined in numbered paragraph (5) or (6);
- $R^4$ is as defined in any one of numbered paragraphs (13) to (17);
- $R^7$ is as defined in any one of numbered paragraphs (27) to (29);
- n is as defined in numbered paragraph (30);
- $R^9$ is as defined in any one of numbered paragraphs (48) to (50);
- $R^{11}$ and $R^{12}$ are as defined in any one of numbered paragraphs (61) to (71);
- $R^{13}$ is as defined in numbered paragraph (74) or (75);
- $R^{13a}$ is as defined in any one of numbered paragraphs (78) to (79);
- $L^1$ is as defined in any one of numbered paragraphs (81) to (93);
- $X^1$ is as defined in any one of numbered paragraphs (86) to (89);
- $Q^1$ is as defined in any one of numbered paragraphs (93) to (96);
- $R^{15}$ is as defined in any one of numbered paragraphs (105) to (108); and
- all other groups are as defined in any of the numbered paragraphs appearing hereinbefore.

In an embodiment of the compounds of formula I-III, or a pharmaceutically acceptable salt, hydrate and/or solvate thereof:
- $m^1$ is as defined in numbered paragraph (41) or (42);
- $R^2$ is as defined in numbered paragraph (5) or (6);
- $R^4$ is as defined in any one of numbered paragraphs (15) to (17);
- $R^7$ is as defined in any one of numbered paragraphs (27) to (29);
- n is as defined in numbered paragraph (30);
- $R^9$ is as defined in any one of numbered paragraphs (48) to (50);
- $R^{11}$ and $R^{12}$ are as defined in any one of numbered paragraphs (64) to (71);
- $R^{13}$ is as defined in numbered paragraph (74) or (75);
- $R^{13a}$ is as defined in any one of numbered paragraphs (78) to (79);
- $L^1$ is as defined in any one of numbered paragraphs (81) to (83);

X¹ is as defined in any one of numbered paragraphs (88) to (89);
Q¹ is as defined in any one of numbered paragraphs (95) to (96);
R¹⁵ is as defined in any one of numbered paragraphs (105) to (108); and
all other groups are as defined in any of the numbered paragraphs appearing hereinbefore.

In an embodiment of the compounds of formula I-III, or a pharmaceutically acceptable salt, hydrate and/or solvate thereof:
m¹ is as defined in numbered paragraph (41) or (42);
R² is as defined in numbered paragraph (6);
R⁴ is as defined in any one of numbered paragraphs (15) to (17);
R⁷ is as defined in any one of numbered paragraphs (27) to (29);
n is as defined in numbered paragraph (30);
R⁹ is as defined in any one of numbered paragraphs (48) to (50);
R¹¹ and R¹² are as defined in any one of numbered paragraphs (64) to (71);
R¹³ is as defined in numbered paragraph (74) or (75);
R¹³ᵃ is as defined in any one of numbered paragraphs (78) to (79);
L¹ is as defined in any one of numbered paragraphs (81) to (83);
X¹ is as defined in any one of numbered paragraphs (88) to (89);
Q¹ is as defined in any one of numbered paragraphs (95) to (96);
R¹⁵ is as defined in any one of numbered paragraphs (105) to (108); and
all other groups are as defined in any of the numbered paragraphs appearing hereinbefore.

In an embodiment of the compounds of formula I-III, or a pharmaceutically acceptable salt, hydrate and/or solvate thereof:
m¹ is as defined in numbered paragraph (41) or (42);
R² is as defined in numbered paragraph (6);
R⁴ is as defined in any one of numbered paragraphs (15) to (17);
R⁷ is as defined in any one of numbered paragraphs (27) to (29);
n is as defined in numbered paragraph (30);
R⁹ is as defined in any one of numbered paragraphs (48) to (50);
R¹¹ and R¹² are as defined in any one of numbered paragraphs (67) to (71);
R¹³ is as defined in numbered paragraph (74) or (75);
R¹³ᵃ is as defined in any one of numbered paragraphs (78) to (79);
L¹, X¹ and Q¹ are as defined in any one of numbered paragraphs (99) to (101);
R¹⁵ is as defined in any one of numbered paragraphs (105) to (108); and
all other groups are as defined in any of the numbered paragraphs appearing hereinbefore.

In an embodiment of the compounds of formula I-III, or a pharmaceutically acceptable salt, hydrate and/or solvate thereof:
m¹ is as defined in numbered paragraph (41) or (42);
R² is as defined in numbered paragraph (6);
R⁴ is as defined in any one of numbered paragraphs (15) to (17);
R⁷ is as defined in any one of numbered paragraphs (27) to (29);

n is as defined in numbered paragraph (30);
R⁹ is as defined in any one of numbered paragraphs (48) to (50);
R¹¹ and R¹² are as defined in any one of numbered paragraphs (67) to (71);
R¹³ is as defined in numbered paragraph (74) or (75);
R¹³ᵃ is as defined in any one of numbered paragraphs (78) to (79);
L¹, X¹ and Q¹ are as defined in any one of numbered paragraphs (99) to (101);
R¹⁵ is as defined in any one of numbered paragraphs (107) to (108); and
all other groups are as defined in any of the numbered paragraphs appearing hereinbefore.

In an embodiment of the compounds of formula I-III, or a pharmaceutically acceptable salt, hydrate and/or solvate thereof:
m¹ is as defined in numbered paragraph (41) or (42);
R² is as defined in numbered paragraph (6);
R⁴ is as defined in any one of numbered paragraphs (15) to (17);
R⁷ is as defined in any one of numbered paragraphs (27) to (29);
n is as defined in numbered paragraph (30);
R⁹ is as defined in any one of numbered paragraphs (48) to (50);
R¹¹ and R¹² are as defined in any one of numbered paragraphs (70) to (71);
R¹³ is as defined in numbered paragraph (74) or (75);
R¹³ᵃ is as defined in any one of numbered paragraphs (78) to (79);
L¹, X¹ and Q¹ are as defined in any one of numbered paragraphs (99) to (101);
R¹⁵ is as defined in any one of numbered paragraphs (107) to (108); and
all other groups are as defined in any of the numbered paragraphs appearing hereinbefore.

In an embodiment of the compounds of formula I-III, or a pharmaceutically acceptable salt, hydrate and/or solvate thereof:
m¹ is as defined in numbered paragraph (41);
R² is as defined in numbered paragraph (6);
R⁴ is as defined in numbered paragraph (15);
R⁷ is as defined in numbered paragraph (27);
n is as defined in numbered paragraph (30);
R⁹ is as defined in numbered paragraph (48);
R¹¹ and R¹² are as defined in numbered paragraph (70);
R¹³ is as defined in numbered paragraph (74);
R¹³ᵃ is as defined in numbered paragraph (78);
L¹, X¹ and Q¹ are as defined in numbered paragraph (99);
R¹⁵ is as defined in numbered paragraph (107); and
all other groups are as defined in any of the numbered paragraphs appearing hereinbefore.

In an embodiment of the compounds of formula I-III, or a pharmaceutically acceptable salt, hydrate and/or solvate thereof:
m¹ is as defined in numbered paragraph (41) or (42);
R² is as defined in numbered paragraph (6);
R⁴ is as defined in any one of numbered paragraphs (15) to (17);
R⁷ is as defined in any one of numbered paragraphs (27) to (29);
n is as defined in numbered paragraph (30);
R⁹ is as defined in any one of numbered paragraphs (48) to (50);
R¹¹ and R¹² are as defined in any one of numbered paragraphs (67) to (71) or (122);

$R^{13}$ is as defined in numbered paragraph (74), (75) or (123) to (125);
$R^{13a}$ is as defined in any one of numbered paragraphs (78) to (79);
$L^1$, $X^1$ and $Q^1$ are as defined in any one of numbered paragraphs (99) to (101) or (133) to (135);
$R^{15}$ is as defined in any one of numbered paragraphs (107) to (108); and
all other groups are as defined in any of the numbered paragraphs appearing hereinbefore.

In an embodiment of the compounds of formula I-III, or a pharmaceutically acceptable salt, hydrate and/or solvate thereof:
$m^1$ is as defined in numbered paragraph (41) or (42);
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^9$ is as defined in any one of numbered paragraphs (48) to (50);
$R^{11}$ and $R^{12}$ are as defined in any one of numbered paragraphs (70) to (71) or (122);
$R^{13}$ is as defined in numbered paragraph (74), (75) or (124) to (125);
$R^{13a}$ is as defined in any one of numbered paragraphs (78) to (79);
$L^1$, $X^1$ and $Q^1$ are as defined in any one of numbered paragraphs (99) to (101) or (134) to (135);
$R^{15}$ is as defined in any one of numbered paragraphs (107) to (108); and
all other groups are as defined in any of the numbered paragraphs appearing hereinbefore.

In an embodiment of the compounds of formula I-III, or a pharmaceutically acceptable salt, hydrate and/or solvate thereof:
$m^1$ is as defined in numbered paragraph (41);
$R^2$ is as defined in numbered paragraph (6);
$R^4$ is as defined in numbered paragraph (15);
$R^7$ is as defined in numbered paragraph (27);
n is as defined in numbered paragraph (30);
$R^9$ is as defined in numbered paragraph (48);
$R^{11}$ and $R^{12}$ are as defined in numbered paragraph (122);
$R^{13}$ is as defined in numbered paragraph (74) or (123);
$R^{13a}$ is as defined in numbered paragraph (78);
$L^1$, $X^1$ and $Q^1$ are as defined in numbered paragraph (134) or (135);
$R^{15}$ is as defined in numbered paragraph (107); and
all other groups are as defined in any of the numbered paragraphs appearing hereinbefore.

In a particular group of compounds of the invention, compounds have a structure according to formula I-IV (which is a sub-definition of formula I), or a pharmaceutically acceptable salt, hydrate and/or solvate thereof:

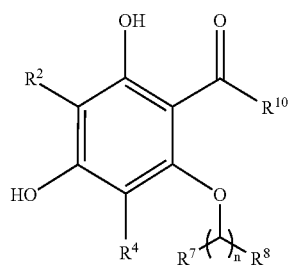

(I-IV)

wherein
$R^{10}$ is $-NR^{11}R^{12}$ and $R^{11}$ and $R^{12}$ are as defined in numbered paragraph (53); and
n, $R^2$, $R^4$, $R^7$ and $R^8$, and any associated subgroups, are as defined in any of the numbered paragraphs appearing hereinbefore.

In a particular group of compounds of the invention, compounds have a structure according to formula I-V (which is a sub-definition of formula I), or a pharmaceutically acceptable salt, hydrate and/or solvate thereof:

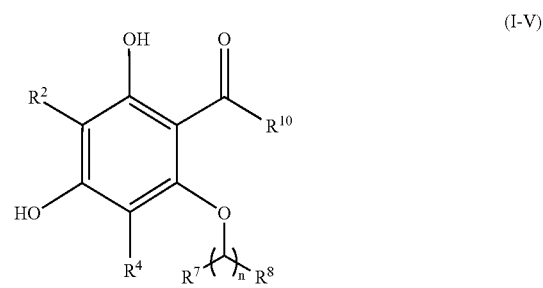

(I-V)

wherein
$R^{10}$ is $-NR^{11}R^{12}$ and $R^{11}$ and $R^{12}$ are as defined in numbered paragraph (56); and
n, $R^2$, $R^4$, $R^7$ and $R^8$, and any associated subgroups, are as defined in any of the numbered paragraphs appearing hereinbefore.

In a particular group of compounds of the invention, compounds have a structure according to formula I-VI (which is a sub-definition of formula I), or a pharmaceutically acceptable salt, hydrate and/or solvate thereof:

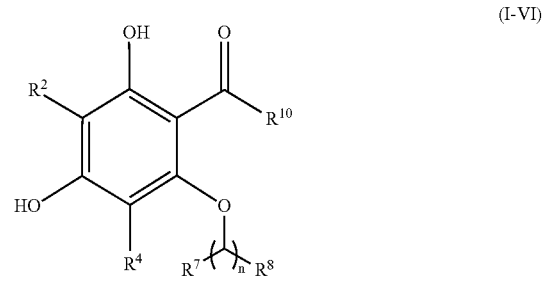

(I-VI)

wherein
$R^{10}$ is $-NR^{11}R^{12}$ and $R^{11}$ and $R^{12}$ are as defined in numbered paragraph (65) or (66); and
n, $R^2$, $R^4$, $R^7$ and $R^8$, and any associated subgroups, are as defined in any of the numbered paragraphs appearing hereinbefore.

In a particular group of compounds of the invention, compounds have a structure according to formula I-VII (which is a sub-definition of formula I), or a pharmaceutically acceptable salt, hydrate and/or solvate thereof:

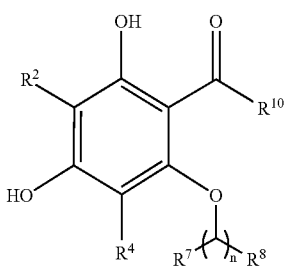

(I-VII)

wherein
$R^{10}$ is —$NR^{11}R^{12}$ and $R^{11}$ and $R^{12}$ are as defined in numbered paragraph (68); and n, $R^2$, $R^4$, $R^7$ and $R^8$, and any associated subgroups, are as defined in any of the numbered paragraphs appearing hereinbefore.

In a particular group of compounds of the invention, compounds have a structure according to formula I-VIII (which is a sub-definition of formula I), or a pharmaceutically acceptable salt, hydrate and/or solvate thereof:

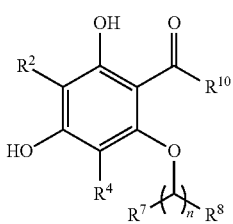

(I-VIII)

wherein
$R^{10}$ is —$NR^{11}R^{12}$ and $R^{11}$ and $R^{12}$ are as defined in numbered paragraph (70) or (71); and
n, $R^2$, $R^4$, $R^7$ and $R^8$, and any associated subgroups, are as defined in any of the numbered paragraphs appearing hereinbefore.

In a particular group of compounds of the invention, compounds have a structure according to formula I-VIIIa (which is a sub-definition of formula I), or a pharmaceutically acceptable salt, hydrate and/or solvate thereof:

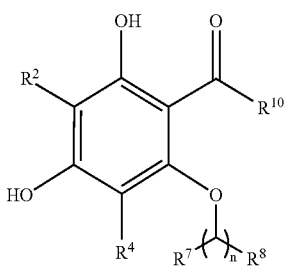

(I-VIIIa)

wherein
$R^{10}$ is —$NR^{11}R^{12}$ and $R^{11}$ and $R^{12}$ are as defined in numbered paragraph (122); and
n, $R^2$, $R^4$, $R^7$ and $R^8$, and any associated subgroups, are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (5) or (6);
$R^4$ is as defined in any one of numbered paragraphs (10) to (17);
$R^7$ is as defined in any one of numbered paragraphs (27) to (29);
n is as defined in numbered paragraph (30);
$R^8$ is as defined in any one of numbered paragraphs (31) to (39); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^8$ is as defined in any one of numbered paragraphs (34) to (39);
$R^9$ is as defined in any one of numbered paragraphs (46) to (50);
$R^{13}$ is as defined in numbered paragraph (74) or (75);
$L^1$ is as defined in any one of numbered paragraphs (81) to (83);
$X^1$ is as defined in any one of numbered paragraphs (86) to (89);
$Q^1$ is as defined in any one of numbered paragraphs (93) to (96); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);
$R^{13}$ is as defined in numbered paragraph (74) or (75);
$L^1$ is as defined in any one of numbered paragraphs (81) to (83);
$X^1$ is as defined in any one of numbered paragraphs (86) to (89);
$Q^1$ is as defined in any one of numbered paragraphs (93) to (96); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);

$R^{13}$ is as defined in numbered paragraph (74) or (75);
$L^1$ is as defined in any one of numbered paragraphs (81) to (93);
$X^1$ is as defined in any one of numbered paragraphs (86) to (89);
$Q^1$ is as defined in any one of numbered paragraphs (93) to (96);
$R^{15}$ is as defined in any one of numbered paragraphs (105) to (108); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (5) or (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);
$R^{13}$ is as defined in numbered paragraph (74) or (75);
$L^1$ is as defined in any one of numbered paragraphs (81) to (83);
$X^1$ is as defined in any one of numbered paragraphs (88) to (89);
$Q^1$ is as defined in any one of numbered paragraphs (95) to (96);
$R^{15}$ is as defined in any one of numbered paragraphs (105) to (108); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);
$R^{13}$ is as defined in numbered paragraph (74) or (75);
$L^1$ is as defined in any one of numbered paragraphs (81) to (83);
$X^1$ is as defined in any one of numbered paragraphs (88) to (89);
$Q^1$ is as defined in any one of numbered paragraphs (95) to (96);
$R^{15}$ is as defined in any one of numbered paragraphs (105) to (108); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in any one of numbered paragraphs (36) to (39);
$R^9$ is as defined in any one of numbered paragraphs (48) to (50);
$R^{13}$ is as defined in numbered paragraph (74) or (75);
$L^1$, $X^1$ and $Q^1$ are as defined in any one of numbered paragraphs (99) to (101);
$R^{15}$ is as defined in any one of numbered paragraphs (105) to (108); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in numbered paragraph (39);
$R^{13}$ is as defined in numbered paragraph (74) or (75);
$L^1$, $X^1$ and $Q^1$ are as defined in any one of numbered paragraphs (99) to (101);
$R^{15}$ is as defined in any one of numbered paragraphs (107) to (108); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^8$ is as defined in numbered paragraph (39);
$R^{13}$ is as defined in numbered paragraph (74) or (75);
$L^1$, $X^1$ and $Q^1$ are as defined in any one of numbered paragraphs (99) to (101);
$R^{15}$ is as defined in any one of numbered paragraphs (107) to (108); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (6);
$R^4$ is as defined in numbered paragraph (15);
$R^7$ is as defined in numbered paragraph (27);
n is as defined in numbered paragraph (30);
$R^8$ is as defined in numbered paragraph (39);
$R^{13}$ is as defined in numbered paragraph (74);
$L^1$, $X^1$ and $Q^1$ are as defined in numbered paragraph (100);
$R^{15}$ is as defined in any one of numbered paragraphs (107); and
all other groups are as defined in any of the numbered paragraphs appearing hereinbefore.

In an embodiment of the compounds of formula I-IV, I-V, I-VI, I-VII or I-VIII, or a pharmaceutically acceptable salt, hydrate and/or solvate thereof:
$R^2$ is as defined in numbered paragraph (6);
$R^4$ is as defined in numbered paragraph (17);
$R^7$ is as defined in numbered paragraph (29);

n is as defined in numbered paragraph (30);
R$^8$ is as defined in numbered paragraph (39);
R$^{13}$ is as defined in numbered paragraph (75);
L$^1$, X$^1$ and Q$^1$ are as defined in numbered paragraph (101);
R$^{15}$ is as defined in any one of numbered paragraphs (108); and
all other groups are as defined in any of the numbered paragraphs appearing hereinbefore.

In an embodiment of the compounds of formula I-IV, I-V, I-VI, I-VII, I-VIII or I-VIIIa, or a pharmaceutically acceptable salt, hydrate and/or solvate thereof:
R$^2$ is as defined in numbered paragraph (6);
R$^4$ is as defined in any one of numbered paragraphs (15) to (17);
R$^7$ is as defined in any one of numbered paragraphs (27) to (29);
n is as defined in numbered paragraph (30);
R$^8$ is as defined in numbered paragraph (39);
R$^{13}$ is as defined in numbered paragraph (74), (75) or (123) to (125);
L$^1$, X$^1$ and Q$^1$ are as defined in any one of numbered paragraphs (99) to (101) or (133) to (135);
R$^{15}$ is as defined in any one of numbered paragraphs (107) to (108); and
all other groups are as defined in any of the numbered paragraphs appearing hereinbefore.

In an embodiment of the compounds of formula I-IV, I-V, I-VI, I-VII, I-VIII or I-VIIIa, or a pharmaceutically acceptable salt, hydrate and/or solvate thereof:
R$^2$ is as defined in numbered paragraph (6);
R$^4$ is as defined in numbered paragraph (15);
R$^7$ is as defined in numbered paragraph (27);
n is as defined in numbered paragraph (30);
R$^8$ is as defined in numbered paragraph (39);
R$^{13}$ is as defined in numbered paragraph (74) or (123);
L$^1$, X$^1$ and Q$^1$ are as defined in numbered paragraph (100) or (134);
R$^{15}$ is as defined in any one of numbered paragraphs (107); and
all other groups are as defined in any of the numbered paragraphs appearing hereinbefore.

In an embodiment of the compounds of formula I-IV, I-V, I-VI, I-VII, I-VIII or I-VIIIa, or a pharmaceutically acceptable salt, hydrate and/or solvate thereof:
R$^2$ is as defined in numbered paragraph (6);
R$^4$ is as defined in numbered paragraph (17);
R$^7$ is as defined in numbered paragraph (29);
n is as defined in numbered paragraph (30);
R$^8$ is as defined in numbered paragraph (39);
R$^{13}$ is as defined in numbered paragraph (75) or (125);
L$^1$, X$^1$ and Q$^1$ are as defined in numbered paragraph (134) or (135);
R$^{15}$ is as defined in any one of numbered paragraphs (108); and
all other groups are as defined in any of the numbered paragraphs appearing hereinbefore.

In a particular group of compounds of the invention, compounds have a structure according to formula I-IX (which is a sub-definition of formula I), or a pharmaceutically acceptable salt, hydrate and/or solvate thereof:

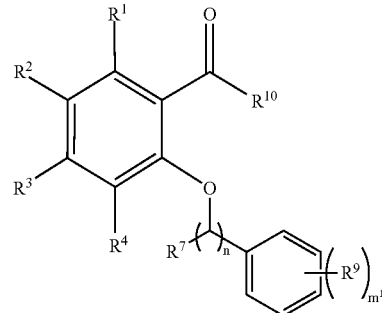

(I-IX)

wherein
R$^{10}$ is —NR$^{11}$R$^{12}$ and R$^{11}$ and R$^{12}$ are as defined in numbered paragraph (56); and
n, m$^1$, R$^1$, R$^2$, R$^3$, R$^4$, R$^7$ and R$^9$, and any associated subgroups, are as defined in any of the numbered paragraphs appearing hereinbefore.

In a particular group of compounds of the invention, compounds have a structure according to formula I-X (which is a sub-definition of formula I), or a pharmaceutically acceptable salt, hydrate and/or solvate thereof:

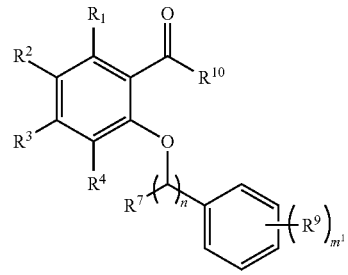

(I-X)

wherein
R$^{10}$ is —NR$^{11}$R$^{12}$ and R$^{11}$ and R$^{12}$ are as defined in numbered paragraph (68); and
n, m$^1$, R$^1$, R$^2$, R$^3$, R$^4$, R$^7$ and R$^9$, and any associated subgroups, are as defined in any of the numbered paragraphs appearing hereinbefore.

In a particular group of compounds of the invention, compounds have a structure according to formula I-Xa (which is a sub-definition of formula I), or a pharmaceutically acceptable salt, hydrate and/or solvate thereof:

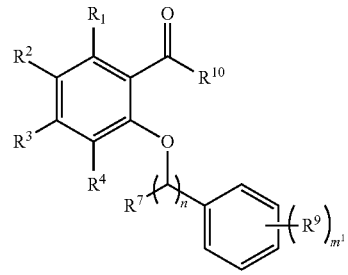

(I-Xa)

wherein
R$^{10}$ is —NR$^{11}$R$^{12}$ and R$^{11}$ and R$^{12}$ are as defined in numbered paragraph (122); and n, $m^1$, $R^1$, $R^2$, $R^3$, $R^4$, $R^7$ and $R^9$, and any associated subgroups, are as defined in any of the numbered paragraphs appearing hereinbefore.

In an embodiment of the compounds of formula I-IX or I-X, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (5) or (6);
$R^4$ is as defined in any one of numbered paragraphs (10) to (17);
$R^7$ is as defined in any one of numbered paragraphs (27) to (29);
n is as defined in numbered paragraph (30); and
all other groups are as defined in any of the numbered paragraphs appearing hereinbefore.

In an embodiment of the compounds of formula I-IX or I-X, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^9$ is as defined in any one of numbered paragraphs (46) to (50);
$R^{13}$ is as defined in numbered paragraph (74) or (75);
$L^1$ is as defined in any one of numbered paragraphs (81) to (83);
$X^1$ is as defined in any one of numbered paragraphs (86) to (89);
$Q^1$ is as defined in any one of numbered paragraphs (93) to (96); and
all other groups are as defined in any of the numbered paragraphs appearing hereinbefore.

In an embodiment of the compounds of formula I-IX or I-X, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^9$ is as defined in any one of numbered paragraphs (48) to (50);
$R^{13}$ is as defined in numbered paragraph (74) or (75);
$L^1$ is as defined in any one of numbered paragraphs (81) to (83);
$X^1$ is as defined in any one of numbered paragraphs (86) to (89);
$Q^1$ is as defined in any one of numbered paragraphs (93) to (96); and
all other groups are as defined in any of the numbered paragraphs appearing hereinbefore.

In an embodiment of the compounds of formula I-IX or I-X, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^9$ is as defined in any one of numbered paragraphs (48) to (50);
$R^{13}$ is as defined in numbered paragraph (74) or (75);
$L^1$ is as defined in any one of numbered paragraphs (81) to (93);
$X^1$ is as defined in any one of numbered paragraphs (86) to (89);
$Q^1$ is as defined in any one of numbered paragraphs (93) to (96);
$R^{15}$ is as defined in any one of numbered paragraphs (105) to (108); and
all other groups are as defined in any of the numbered paragraphs appearing hereinbefore.

In an embodiment of the compounds of formula I-IX or I-X, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (5) or (6);
$R^4$ is as defined in any one of numbered paragraphs (15) to (17);
$R^7$ is as defined in any one of numbered paragraphs (27) to (29);
n is as defined in numbered paragraph (30);
$R^9$ is as defined in any one of numbered paragraphs (48) to (50);
$R^{13}$ is as defined in numbered paragraph (74) or (75);
$L^1$ is as defined in any one of numbered paragraphs (81) to (83);
$X^1$ is as defined in any one of numbered paragraphs (88) to (89);
$Q^1$ is as defined in any one of numbered paragraphs (95) to (96);
$R^{15}$ is as defined in any one of numbered paragraphs (105) to (108); and
all other groups are as defined in any of the numbered paragraphs appearing hereinbefore.

In an embodiment of the compounds of formula I-IX or I-X, or a pharmaceutically acceptable salt, hydrate and/or solvate thereof:
$R^1$ and $R^3$ are as defined in any one of numbered paragraphs (3) to (4);
$m^1$ is as defined in numbered paragraph (41) or (42);
$R^2$ is as defined in numbered paragraph (6);
$R^4$ is as defined in any one of numbered paragraphs (15) to (17);
$R^7$ is as defined in any one of numbered paragraphs (27) to (29);
n is as defined in numbered paragraph (30);
$R^9$ is as defined in any one of numbered paragraphs (48) to (50);
$R^{13}$ is as defined in numbered paragraph (74) or (75);
$L^1$ is as defined in any one of numbered paragraphs (81) to (83);
$X^1$ is as defined in any one of numbered paragraphs (88) to (89);

$Q^1$ is as defined in any one of numbered paragraphs (95) to (96);

$R^{15}$ is as defined in any one of numbered paragraphs (105) to (108); and all other groups are as defined in any of the numbered paragraphs appearing hereinbefore.

In an embodiment of the compounds of formula I-IX or I-X, or a pharmaceutically acceptable salt, hydrate and/or solvate thereof:

$R^1$ and $R^3$ are as defined in any one of numbered paragraphs (3) to (4);

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^9$ is as defined in any one of numbered paragraphs (48) to (50);

$R^{13}$ is as defined in numbered paragraph (74) or (75);

$L^1$, $X^1$ and $Q^1$ are as defined in any one of numbered paragraphs (99) to (101);

$R^{15}$ is as defined in any one of numbered paragraphs (105) to (108); and all other groups are as defined in any of the numbered paragraphs appearing hereinbefore.

In an embodiment of the compounds of formula I-IX or I-X, or a pharmaceutically acceptable salt, hydrate and/or solvate thereof:

$R^1$ and $R^3$ are as defined in any one of numbered paragraphs (3) to (4);

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^{13}$ is as defined in numbered paragraph (74) or (75);

$L^1$, $X^1$ and $Q^1$ are as defined in any one of numbered paragraphs (99) to (101);

$R^{15}$ is as defined in any one of numbered paragraphs (107) to (108); and all other groups are as defined in any of the numbered paragraphs appearing hereinbefore.

In an embodiment of the compounds of formula I-IX or I-X, or a pharmaceutically acceptable salt, hydrate and/or solvate thereof:

$R^1$ and $R^3$ are as defined in any one of numbered paragraphs (3) to (4);

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^{13}$ is as defined in numbered paragraph (74) or (75);

$L^1$, $X^1$ and $Q^1$ are as defined in any one of numbered paragraphs (99) to (101);

$R^{15}$ is as defined in any one of numbered paragraphs (107) to (108); and all other groups are as defined in any of the numbered paragraphs appearing hereinbefore.

In an embodiment of the compounds of formula I-IX or I-X, or a pharmaceutically acceptable salt, hydrate and/or solvate thereof:

$R^1$ and $R^3$ are as defined in paragraph (3);

$m^1$ is as defined in numbered paragraph (41);

$R^2$ is as defined in numbered paragraph (6);

$R^4$ is as defined in numbered paragraph (15);

$R^7$ is as defined in numbered paragraph (27);

n is as defined in numbered paragraph (30);

$R^{13}$ is as defined in numbered paragraph (74);

$L^1$, $X^1$ and $Q^1$ are as defined in numbered paragraph (100);

$R^{15}$ is as defined in numbered paragraph (107); and all other groups are as defined in any of the numbered paragraphs appearing hereinbefore.

In an embodiment of the compounds of formula I-IX or I-X, or a pharmaceutically acceptable salt, hydrate and/or solvate thereof:

$R^1$ and $R^3$ are as defined in paragraph (4);

$m^1$ is as defined in numbered paragraph (42);

$R^2$ is as defined in numbered paragraph (6);

$R^4$ is as defined in numbered paragraph (17);

$R^7$ is as defined in numbered paragraph (29);

n is as defined in numbered paragraph (30);

$R^{13}$ is as defined in numbered paragraph (75);

$L^1$, $X^1$ and $Q^1$ are as defined in numbered paragraph (101);

$R^{15}$ is as defined in numbered paragraph (108); and all other groups are as defined in any of the numbered paragraphs appearing hereinbefore.

In an embodiment of the compounds of formula I-IX, I-X or I-Xa, or a pharmaceutically acceptable salt, hydrate and/or solvate thereof:

$R^1$ and $R^3$ are as defined in any one of numbered paragraphs (3) to (4);

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^{13}$ is as defined in numbered paragraph (74), (75) or (123) to (125);

$L^1$, $X^1$ and $Q^1$ are as defined in any one of numbered paragraphs (99) to (101) or (133) to (135);

$R^{15}$ is as defined in any one of numbered paragraphs (107) to (108); and all other groups are as defined in any of the numbered paragraphs appearing hereinbefore.

In an embodiment of the compounds of formula I-IX, I-X or I-Xa, or a pharmaceutically acceptable salt, hydrate and/or solvate thereof:

$R^1$ and $R^3$ are as defined in paragraph (3);

$m^1$ is as defined in numbered paragraph (41);

$R^2$ is as defined in numbered paragraph (6);

$R^4$ is as defined in numbered paragraph (15);

$R^7$ is as defined in numbered paragraph (27);

n is as defined in numbered paragraph (30);

$R^{13}$ is as defined in numbered paragraph (74) or (123);

$L^1$, $X^1$ and $Q^1$ are as defined in numbered paragraph (100) or (134);

$R^{15}$ is as defined in numbered paragraph (107); and all other groups are as defined in any of the numbered paragraphs appearing hereinbefore.

In an embodiment of the compounds of formula I-IX, I-X or I-Xa, or a pharmaceutically acceptable salt, hydrate and/or solvate thereof:
$R^1$ and $R^3$ are as defined in paragraph (4);
$m^1$ is as defined in numbered paragraph (42);
$R^2$ is as defined in numbered paragraph (6);
$R^4$ is as defined in numbered paragraph (17);
$R^7$ is as defined in numbered paragraph (29);
n is as defined in numbered paragraph (30);
$R^{13}$ is as defined in numbered paragraph (75) or (124);
$L^1$, $X^1$ and $Q^1$ are as defined in numbered paragraph (134) or (135);
$R^{15}$ is as defined in numbered paragraph (108); and
all other groups are as defined in any of the numbered paragraphs appearing hereinbefore.

In a particular group of compounds of the invention, compounds have a structure according to formula I-XI (which is a sub-definition of formula I), or a pharmaceutically acceptable salt, hydrate and/or solvate thereof:

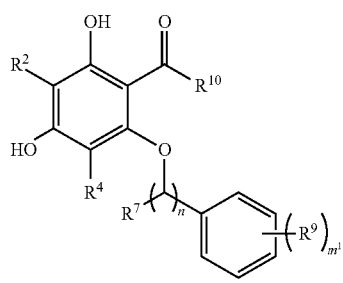

(I-XI)

wherein
$R^{10}$ is $-NR^{11}R^{12}$ and $R^{11}$ and $R^{12}$ are as defined in numbered paragraph (56); and
n, $m^1$, $R^2$, $R^4$, $R^7$ and $R^9$, and any associated subgroups, are as defined in any of the numbered paragraphs appearing hereinbefore.

In a particular group of compounds of the invention, compounds have a structure according to formula I-XII (which is a sub-definition of formula I), or a pharmaceutically acceptable salt, hydrate and/or solvate thereof:

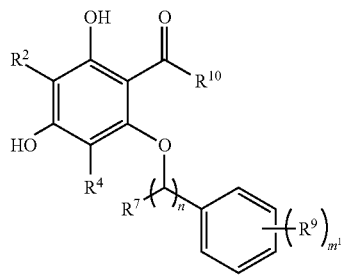

(I-XII)

wherein
$R^{10}$ is $-NR^{11}R^{12}$ and $R^{11}$ and $R^{12}$ are as defined in numbered paragraph (68); and
n, $m^1$, $R^2$, $R^4$, $R^7$ and $R^9$, and any associated subgroups, are as defined in any of the numbered paragraphs appearing hereinbefore.

In an embodiment of the compounds of formula I-XI or I-XII, or a pharmaceutically acceptable salt, hydrate and/or solvate thereof:
$m^1$ is as defined in numbered paragraph (41) or (42);
$R^2$ is as defined in numbered paragraph (5) or (6);
$R^4$ is as defined in any one of numbered paragraphs (10) to (17);
$R^7$ is as defined in any one of numbered paragraphs (27) to (29);
n is as defined in numbered paragraph (30); and
all other groups are as defined in any of the numbered paragraphs appearing hereinbefore.

In an embodiment of the compounds of formula I-XI or I-XII, or a pharmaceutically acceptable salt, hydrate and/or solvate thereof:
$m^1$ is as defined in numbered paragraph (41) or (42);
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^9$ is as defined in any one of numbered paragraphs (46) to (50);
$R^{13}$ is as defined in numbered paragraph (74) or (75);
$L^1$ is as defined in any one of numbered paragraphs (81) to (83);
$X^1$ is as defined in any one of numbered paragraphs (86) to (89);
$Q^1$ is as defined in any one of numbered paragraphs (93) to (96); and
all other groups are as defined in any of the numbered paragraphs appearing hereinbefore.

In an embodiment of the compounds of formula I-XI or I-XII, or a pharmaceutically acceptable salt, hydrate and/or solvate thereof:
$m^1$ is as defined in numbered paragraph (41) or (42);
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^9$ is as defined in any one of numbered paragraphs (48) to (50);
$R^{13}$ is as defined in numbered paragraph (74) or (75);
$R^{13a}$ is as defined in any one of numbered paragraphs (78) to (79);
$L^1$ is as defined in any one of numbered paragraphs (81) to (83);
$X^1$ is as defined in any one of numbered paragraphs (86) to (89);
$Q^1$ is as defined in any one of numbered paragraphs (93) to (96); and
all other groups are as defined in any of the numbered paragraphs appearing hereinbefore.

In an embodiment of the compounds of formula I-XI or I-XII, or a pharmaceutically acceptable salt, hydrate and/or solvate thereof:
$m^1$ is as defined in numbered paragraph (41) or (42);
$R^2$ is as defined in numbered paragraph (5) or (6);
$R^4$ is as defined in any one of numbered paragraphs (13) to (17);
$R^7$ is as defined in any one of numbered paragraphs (27) to (29);
n is as defined in numbered paragraph (30);
$R^9$ is as defined in any one of numbered paragraphs (48) to (50);
$R^{13}$ is as defined in numbered paragraph (74) or (75);

$R^{13a}$ is as defined in any one of numbered paragraphs (78) to (79);

$L^1$ is as defined in any one of numbered paragraphs (81) to (93);

$X^1$ is as defined in any one of numbered paragraphs (86) to (89);

$Q^1$ is as defined in any one of numbered paragraphs (93) to (96);

$R^{15}$ is as defined in any one of numbered paragraphs (105) to (108); and all other groups are as defined in any of the numbered paragraphs appearing hereinbefore.

In an embodiment of the compounds of formula I-XI or I-XII, or a pharmaceutically acceptable salt, hydrate and/or solvate thereof:

$m^1$ is as defined in numbered paragraph (41) or (42);

$R^2$ is as defined in numbered paragraph (5) or (6);

$R^4$ is as defined in any one of numbered paragraphs (15) to (17);

$R^7$ is as defined in any one of numbered paragraphs (27) to (29);

n is as defined in numbered paragraph (30);

$R^9$ is as defined in any one of numbered paragraphs (48) to (50);

$R^{13}$ is as defined in numbered paragraph (74) or (75);

$R^{13a}$ is as defined in any one of numbered paragraphs (78) to (79);

$L^1$ is as defined in any one of numbered paragraphs (81) to (83);

$X^1$ is as defined in any one of numbered paragraphs (88) to (89);

$Q^1$ is as defined in any one of numbered paragraphs (95) to (96);

$R^{15}$ is as defined in any one of numbered paragraphs (105) to (108); and all other groups are as defined in any of the numbered paragraphs appearing hereinbefore.

In an embodiment of the compounds of formula I-XI or I-XII, or a pharmaceutically acceptable salt, hydrate and/or solvate thereof:

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^9$ is as defined in any one of numbered paragraphs (48) to (50);

$R^{13}$ is as defined in numbered paragraph (74) or (75);

$R^{13a}$ is as defined in any one of numbered paragraphs (78) to (79);

$L^1$ is as defined in any one of numbered paragraphs (81) to (83);

$X^1$ is as defined in any one of numbered paragraphs (88) to (89);

$Q^1$ is as defined in any one of numbered paragraphs (95) to (96);

$R^{15}$ is as defined in any one of numbered paragraphs (105) to (108); and all other groups are as defined in any of the numbered paragraphs appearing hereinbefore.

In an embodiment of the compounds of formula I-XI or I-XII, or a pharmaceutically acceptable salt, hydrate and/or solvate thereof:

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^9$ is as defined in any one of numbered paragraphs (48) to (50);

$R^{13}$ is as defined in numbered paragraph (74) or (75);

$R^{13a}$ is as defined in any one of numbered paragraphs (78) to (79);

$L^1$, $X^1$ and $Q^1$ are as defined in any one of numbered paragraphs (99) to (101);

$R^{15}$ is as defined in any one of numbered paragraphs (105) to (108); and all other groups are as defined in any of the numbered paragraphs appearing hereinbefore.

In an embodiment of the compounds of formula I-XI or I-XII, or a pharmaceutically acceptable salt, hydrate and/or solvate thereof:

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^{13}$ is as defined in numbered paragraph (74) or (75);

$R^{13a}$ is as defined in any one of numbered paragraphs (78) to (79);

$L^1$, $X^1$ and $Q^1$ are as defined in any one of numbered paragraphs (99) to (101);

$R^{15}$ is as defined in any one of numbered paragraphs (107) to (108); and all other groups are as defined in any of the numbered paragraphs appearing hereinbefore.

In an embodiment of the compounds of formula I-XI or I-XII, or a pharmaceutically acceptable salt, hydrate and/or solvate thereof:

$m^1$ is as defined in numbered paragraph (41) or (42);

$R^2$ is as defined in numbered paragraph (6);

$R^4$ is as defined in any one of numbered paragraphs (15) to (17);

$R^7$ is as defined in any one of numbered paragraphs (27) to (29);

n is as defined in numbered paragraph (30);

$R^{13}$ is as defined in numbered paragraph (74) or (75);

$R^{13a}$ is as defined in any one of numbered paragraphs (78) to (79);

$L^1$, $X^1$ and $Q^1$ are as defined in any one of numbered paragraphs (99) to (101);

$R^{15}$ is as defined in any one of numbered paragraphs (107) to (108); and all other groups are as defined in any of the numbered paragraphs appearing hereinbefore.

In an embodiment of the compounds of formula I-XI or I-XII, or a pharmaceutically acceptable salt, hydrate and/or solvate thereof:

$m^1$ is as defined in numbered paragraph (41);

$R^2$ is as defined in numbered paragraph (6);

$R^4$ is as defined in numbered paragraph (15);

$R^7$ is as defined in numbered paragraph (27);

n is as defined in numbered paragraph (30);

$R^{13}$ is as defined in numbered paragraph (74);

$R^{13a}$ is as defined in numbered paragraph (78);

$L^1$, $X^1$ and $Q^1$ are as defined in numbered paragraph (100);

$R^{15}$ is as defined in numbered paragraph (107); and
all other groups are as defined in any of the numbered paragraphs appearing hereinbefore.

In an embodiment of the compounds of formula I-XI or I-XII, or a pharmaceutically acceptable salt, hydrate and/or solvate thereof:
  $m^1$ is as defined in numbered paragraph (42);
  $R^2$ is as defined in numbered paragraph (6);
  $R^4$ is as defined in numbered paragraph (17);
  $R^7$ is as defined in numbered paragraph (29);
  n is as defined in numbered paragraph (30);
  $R^{13}$ is as defined in numbered paragraph (75);
  $R^{13a}$ is as defined in numbered paragraph (79);
  $L^1$, $X^1$ and $Q^1$ are as defined in numbered paragraph (101);
  $R^{15}$ is as defined in numbered paragraph (108); and
  all other groups are as defined in any of the numbered paragraphs appearing hereinbefore.

In a particular group of compounds of formula I, $R^6$ is as defined in paragraph (109) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (110) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (111) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (112) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (113) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (114) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (115) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (116) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (117) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (118) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (119) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (120) above, and $R^1$, $R^2$, $R^3$, $R^4$, n, $R^7$, $R^8$ and $R^{10}$ are as defined in any of the numbered paragraphs appearing hereinbefore.

In a particular group of compounds of formula I, $R^6$ is as defined in paragraph (121) above, and $R^1$, $R^2$, $R^3$, $R^4$, n, $R^7$, $R^8$ and $R^{10}$ are as defined in any of the numbered paragraphs appearing hereinbefore.

In a particular group of compounds of the invention, compounds have a structure according to formula I-XIII (which is a sub-definition of formula I), or a pharmaceutically acceptable salt, hydrate and/or solvate thereof:

(I-XIII)

wherein $R^2$, $R^4$, and $R^{10}$, and any associated subgroups, are as defined in any of the numbered paragraphs appearing hereinbefore and $R^6$ is as defined in any one of paragraphs (109) to (121) above.

In an embodiment of the compounds of formula I-XIII, or a pharmaceutically acceptable salt, hydrate and/or solvate thereof, $R^6$ is as defined in paragraph (109) above.

In an embodiment of the compounds of formula I-XIII, or a pharmaceutically acceptable salt, hydrate and/or solvate thereof, $R^6$ is as defined in paragraph (110) above.

In an embodiment of the compounds of formula I-XIII, or a pharmaceutically acceptable salt, hydrate and/or solvate thereof, $R^6$ is as defined in paragraph (111) above.

In an embodiment of the compounds of formula I-XIII, or a pharmaceutically acceptable salt, hydrate and/or solvate thereof, $R^6$ is as defined in paragraph (112) above.

In an embodiment of the compounds of formula I-XIII, or a pharmaceutically acceptable salt, hydrate and/or solvate thereof, $R^6$ is as defined in paragraph (113) above.

In an embodiment of the compounds of formula I-XIII, or a pharmaceutically acceptable salt, hydrate and/or solvate thereof, $R^6$ is as defined in paragraph (114) above.

In an embodiment of the compounds of formula I-XIII, or a pharmaceutically acceptable salt, hydrate and/or solvate thereof, $R^6$ is as defined in paragraph (115) above.

In an embodiment of the compounds of formula I-XIII, or a pharmaceutically acceptable salt, hydrate and/or solvate thereof, $R^6$ is as defined in paragraph (116) above.

In an embodiment of the compounds of formula I-XIII, or a pharmaceutically acceptable salt, hydrate and/or solvate thereof, $R^6$ is as defined in paragraph (117) above.

In an embodiment of the compounds of formula I-XIII, or a pharmaceutically acceptable salt, hydrate and/or solvate thereof, $R^6$ is as defined in paragraph (118) above.

In an embodiment of the compounds of formula I-XIII, or a pharmaceutically acceptable salt, hydrate and/or solvate thereof, $R^6$ is as defined in paragraph (119) above.

In an embodiment of the compounds of formula I-XIII, or a pharmaceutically acceptable salt, hydrate and/or solvate thereof, $R^6$ is as defined in paragraph (120) above.

In an embodiment of the compounds of formula I-XIII, or a pharmaceutically acceptable salt, hydrate and/or solvate thereof, $R^6$ is as defined in paragraph (121) above.

In an embodiment of the compounds of formula I-XIII, or a pharmaceutically acceptable salt, hydrate and/or solvate thereof:
  $R^2$ is as defined in numbered paragraph (5) or (6);

R⁴ is as defined in any one of numbered paragraphs (10) to (17);
R⁶ is as defined in any one of numbered paragraphs (109) to (114);
R⁷ is as defined in any one of numbered paragraphs (27) to (29);
n is as defined in numbered paragraph (30);
R⁸ is as defined in any one of numbered paragraphs (31) to (39);
R¹¹ and R¹² are as defined in any one of numbered paragraphs (53) to (71); and
all other groups are as defined in any of the numbered paragraphs appearing hereinbefore.

In an embodiment of the compounds of formula I-XIII, or a pharmaceutically acceptable salt, hydrate and/or solvate thereof:
R² is as defined in numbered paragraph (5) or (6);
R⁴ is as defined in any one of numbered paragraphs (13) to (17);
R⁶ is as defined in any one of numbered paragraphs (111) to (114);
R⁷ is as defined in any one of numbered paragraphs (27) to (29);
n is as defined in numbered paragraph (30);
R⁸ is as defined in any one of numbered paragraphs (34) to (39);
R⁹ is as defined in any one of numbered paragraphs (46) to (50);
R¹¹ and R¹² are as defined in any one of numbered paragraphs (53) to (71);
R¹³ is as defined in numbered paragraph (74) or (75);
L¹ is as defined in any one of numbered paragraphs (81) to (83);
X¹ is as defined in any one of numbered paragraphs (86) to (89);
Q¹ is as defined in any one of numbered paragraphs (93) to (96); and
all other groups are as defined in any of the numbered paragraphs appearing hereinbefore.

In an embodiment of the compounds of formula I-XIII, or a pharmaceutically acceptable salt, hydrate and/or solvate thereof:
R² is as defined in numbered paragraph (5) or (6);
R⁴ is as defined in any one of numbered paragraphs (13) to (17);
R⁶ is as defined in any one of numbered paragraphs (112) to (114);
R⁷ is as defined in any one of numbered paragraphs (27) to (29);
n is as defined in numbered paragraph (30);
R⁸ is as defined in any one of numbered paragraphs (36) to (39);
R⁹ is as defined in any one of numbered paragraphs (48) to (50);
R¹¹ and R¹² are as defined in any one of numbered paragraphs (57) to (71);
R¹³ is as defined in numbered paragraph (74) or (75);
R¹³ᵃ is as defined in any one of numbered paragraphs (78) to (79);
L¹ is as defined in any one of numbered paragraphs (81) to (83);
X¹ is as defined in any one of numbered paragraphs (86) to (89);
Q¹ is as defined in any one of numbered paragraphs (93) to (96); and
all other groups are as defined in any of the numbered paragraphs appearing hereinbefore.

In an embodiment of the compounds of formula I-XIII, or a pharmaceutically acceptable salt, hydrate and/or solvate thereof:
R² is as defined in numbered paragraph (5) or (6);
R⁴ is as defined in any one of numbered paragraphs (13) to (17);
R⁶ is as defined in any one of numbered paragraphs (112) to (114);
R⁷ is as defined in any one of numbered paragraphs (27) to (29);
n is as defined in numbered paragraph (30);
R⁸ is as defined in any one of numbered paragraphs (36) to (39);
R⁹ is as defined in any one of numbered paragraphs (48) to (50);
R¹¹ and R¹² are as defined in any one of numbered paragraphs (61) to (71);
R¹³ is as defined in numbered paragraph (74) or (75);
R¹³ᵃ is as defined in any one of numbered paragraphs (78) to (79);
L¹ is as defined in any one of numbered paragraphs (81) to (93);
X¹ is as defined in any one of numbered paragraphs (86) to (89);
Q¹ is as defined in any one of numbered paragraphs (93) to (96);
R¹⁵ is as defined in any one of numbered paragraphs (105) to (108); and
all other groups are as defined in any of the numbered paragraphs appearing hereinbefore.

In an embodiment of the compounds of formula I-XIII, or a pharmaceutically acceptable salt, hydrate and/or solvate thereof:
R² is as defined in numbered paragraph (5) or (6);
R⁴ is as defined in any one of numbered paragraphs (15) to (17);
R⁶ is as defined in any one of numbered paragraphs (112) to (114);
R⁷ is as defined in any one of numbered paragraphs (27) to (29);
n is as defined in numbered paragraph (30);
R⁸ is as defined in any one of numbered paragraphs (36) to (39);
R⁹ is as defined in any one of numbered paragraphs (48) to (50);
R¹¹ and R¹² are as defined in any one of numbered paragraphs (64) to (71);
R¹³ is as defined in numbered paragraph (74) or (75);
R¹³ᵃ is as defined in any one of numbered paragraphs (78) to (79);
L¹ is as defined in any one of numbered paragraphs (81) to (83);
X¹ is as defined in any one of numbered paragraphs (88) to (89);
Q¹ is as defined in any one of numbered paragraphs (95) to (96);
R¹⁵ is as defined in any one of numbered paragraphs (105) to (108); and
all other groups are as defined in any of the numbered paragraphs appearing hereinbefore.

In an embodiment of the compounds of formula I-XIII, or a pharmaceutically acceptable salt, hydrate and/or solvate thereof:
R² is as defined in numbered paragraph (6);
R⁴ is as defined in any one of numbered paragraphs (15) to (17);

$R^6$ is as defined in any one of numbered paragraphs (112) to (114);

$R^7$ is as defined in any one of numbered paragraphs (27) to (29);

n is as defined in numbered paragraph (30);

$R^8$ is as defined in any one of numbered paragraphs (36) to (39);

$R^9$ is as defined in any one of numbered paragraphs (48) to (50);

$R^{11}$ and $R^{12}$ are as defined in any one of numbered paragraphs (64) to (71);

$R^{13}$ is as defined in numbered paragraph (74) or (75);

$R^{13a}$ is as defined in any one of numbered paragraphs (78) to (79);

$L^1$ is as defined in any one of numbered paragraphs (81) to (83);

$X^1$ is as defined in any one of numbered paragraphs (88) to (89);

$Q^1$ is as defined in any one of numbered paragraphs (95) to (96);

$R^{15}$ is as defined in any one of numbered paragraphs (105) to (108); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (6);

$R^4$ is as defined in any one of numbered paragraphs (15) to (17);

$R^6$ is as defined in any one of numbered paragraphs (112) to (114);

$R^7$ is as defined in any one of numbered paragraphs (27) to (29);

n is as defined in numbered paragraph (30);

$R^8$ is as defined in any one of numbered paragraphs (36) to (39);

$R^9$ is as defined in any one of numbered paragraphs (48) to (50);

$R^{11}$ and $R^{12}$ are as defined in any one of numbered paragraphs (67) to (71);

$R^{13}$ is as defined in numbered paragraph (74) or (75);

$R^{13a}$ is as defined in any one of numbered paragraphs (78) to (79);

$L^1$, $X^1$ and $Q^1$ are as defined in any one of numbered paragraphs (99) to (101);

$R^{15}$ is as defined in any one of numbered paragraphs (105) to (108); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (6);

$R^4$ is as defined in any one of numbered paragraphs (15) to (17);

$R^6$ is as defined in any one of numbered paragraphs (113) to (114);

$R^7$ is as defined in any one of numbered paragraphs (27) to (29);

n is as defined in numbered paragraph (30);

$R^8$ is as defined in numbered paragraph (39);

$R^{11}$ and $R^{12}$ are as defined in any one of numbered paragraphs (67) to (71);

$R^{13}$ is as defined in numbered paragraph (74) or (75);

$R^{13a}$ is as defined in any one of numbered paragraphs (78) to (79);

$L^1$, $X^1$ and $Q^1$ are as defined in any one of numbered paragraphs (99) to (101);

$R^{15}$ is as defined in any one of numbered paragraphs (107) to (108); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (6);

$R^4$ is as defined in any one of numbered paragraphs (15) to (17);

$R^6$ is as defined in any one of numbered paragraphs (113) to (114);

$R^7$ is as defined in any one of numbered paragraphs (27) to (29);

n is as defined in numbered paragraph (30);

$R^8$ is as defined in numbered paragraph (39);

$R^{11}$ and $R^{12}$ are as defined in any one of numbered paragraphs (70) to (71);

$R^{13}$ is as defined in numbered paragraph (74) or (75);

$R^{13a}$ is as defined in any one of numbered paragraphs (78) to (79);

$L^1$, $X^1$ and $Q^1$ are as defined in any one of numbered paragraphs (99) to (101);

$R^{15}$ is as defined in any one of numbered paragraphs (107) to (108); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (6);

$R^4$ is as defined in numbered paragraph (15);

$R^6$ is as defined in numbered paragraph (113);

$R^7$ is as defined in numbered paragraph (27);

n is as defined in numbered paragraph (30);

$R^8$ is as defined in numbered paragraph (39);

$R^{11}$ and $R^{12}$ are as defined in numbered paragraph (70);

$R^{13}$ is as defined in numbered paragraph (74);

$R^{13a}$ is as defined in numbered paragraph (78);

$L^1$, $X^1$ and $Q^1$ are as defined in numbered paragraph (99);

$R^{15}$ is as defined in numbered paragraph (107); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (5) or (6);

$R^4$ is as defined in any one of numbered paragraphs (10) to (17);

$R^6$ is as defined in any one of numbered paragraphs (109) to (121);

$R^7$ is as defined in any one of numbered paragraphs (27) to (29);

n is as defined in numbered paragraph (30);

$R^8$ is as defined in any one of numbered paragraphs (31) to (39);

$R^{11}$ and $R^{12}$ are as defined in any one of numbered paragraphs (53) to (71) or (122); and all other groups are as defined in any of the numbered paragraphs appearing hereinbefore.

In an embodiment of the compounds of formula I-XIII, or a pharmaceutically acceptable salt, hydrate and/or solvate thereof:

R$^2$ is as defined in numbered paragraph (5) or (6);
R$^4$ is as defined in any one of numbered paragraphs (13) to (17);
R$^6$ is as defined in any one of numbered paragraphs (111) to (121);
R$^7$ is as defined in any one of numbered paragraphs (27) to (29);
n is as defined in numbered paragraph (30);
R$^8$ is as defined in any one of numbered paragraphs (34) to (39);
R$^9$ is as defined in any one of numbered paragraphs (46) to (50);
R$^{11}$ and R$^{12}$ are as defined in any one of numbered paragraphs (53) to (71) or (122);
R$^{13}$ is as defined in numbered paragraph (74), (75) or (123) to (125);
L$^1$ is as defined in any one of numbered paragraphs (81) to (83);
X$^1$ is as defined in any one of numbered paragraphs (86) to (89) or (126) to (128);
Q$^1$ is as defined in any one of numbered paragraphs (93) to (96) or (129) to (132); and
all other groups are as defined in any of the numbered paragraphs appearing hereinbefore.

In an embodiment of the compounds of formula I-XIII, or a pharmaceutically acceptable salt, hydrate and/or solvate thereof:
R$^2$ is as defined in numbered paragraph (5) or (6);
R$^4$ is as defined in any one of numbered paragraphs (13) to (17);
R$^6$ is as defined in any one of numbered paragraphs (112) to (121);
R$^7$ is as defined in any one of numbered paragraphs (27) to (29);
n is as defined in numbered paragraph (30);
R$^8$ is as defined in any one of numbered paragraphs (36) to (39);
R$^9$ is as defined in any one of numbered paragraphs (48) to (50);
R$^{11}$ and R$^{12}$ are as defined in any one of numbered paragraphs (57) to (71) or (122);
R$^{13}$ is as defined in numbered paragraph (74), (75), (124) or (125);
R$^{13a}$ is as defined in any one of numbered paragraphs (78) to (79);
L$^1$ is as defined in any one of numbered paragraphs (81) to (83);
X$^1$ is as defined in any one of numbered paragraphs (86) to (89) or (126) to (128);
Q$^1$ is as defined in any one of numbered paragraphs (93) to (96) or (130) to (132); and
all other groups are as defined in any of the numbered paragraphs appearing hereinbefore.

In an embodiment of the compounds of formula I-XIII, or a pharmaceutically acceptable salt, hydrate and/or solvate thereof:
R$^2$ is as defined in numbered paragraph (5) or (6);
R$^4$ is as defined in any one of numbered paragraphs (13) to (17);
R$^6$ is as defined in any one of numbered paragraphs (112) to (121);
R$^7$ is as defined in any one of numbered paragraphs (27) to (29);
n is as defined in numbered paragraph (30);
R$^8$ is as defined in any one of numbered paragraphs (36) to (39);
R$^9$ is as defined in any one of numbered paragraphs (48) to (50);
R$^{11}$ and R$^{12}$ are as defined in any one of numbered paragraphs (61) to (71) or (122);
R$^{13}$ is as defined in numbered paragraph (74), (75) or (123);
R$^{13a}$ is as defined in any one of numbered paragraphs (78) to (79);
L$^1$ is as defined in any one of numbered paragraphs (81) to (83);
X$^1$ is as defined in any one of numbered paragraphs (86) to (89) or (126) to (128);
Q$^1$ is as defined in any one of numbered paragraphs (93) to (96) or (131) to (132);
R$^{15}$ is as defined in any one of numbered paragraphs (105) to (108); and
all other groups are as defined in any of the numbered paragraphs appearing hereinbefore.

In an embodiment of the compounds of formula I-XIII, or a pharmaceutically acceptable salt, hydrate and/or solvate thereof:
R$^2$ is as defined in numbered paragraph (5) or (6);
R$^4$ is as defined in any one of numbered paragraphs (15) to (17);
R$^6$ is as defined in any one of numbered paragraphs (112) to (114) or (119) to (121);
R$^7$ is as defined in any one of numbered paragraphs (27) to (29);
n is as defined in numbered paragraph (30);
R$^8$ is as defined in any one of numbered paragraphs (36) to (39);
R$^9$ is as defined in any one of numbered paragraphs (48) to (50);
R$^{11}$ and R$^{12}$ are as defined in any one of numbered paragraphs (64) to (71) or (122);
R$^{13}$ is as defined in numbered paragraph (74), (75) or (123);
R$^{13a}$ is as defined in any one of numbered paragraphs (78) to (79);
L$^1$ is as defined in any one of numbered paragraphs (81) to (83);
X$^1$ is as defined in any one of numbered paragraphs (88) to (89) or (127) to (128);
Q$^1$ is as defined in any one of numbered paragraphs (95) to (96) or (131) to (132);
R$^{15}$ is as defined in any one of numbered paragraphs (105) to (108); and
all other groups are as defined in any of the numbered paragraphs appearing hereinbefore.

In an embodiment of the compounds of formula I-XIII, or a pharmaceutically acceptable salt, hydrate and/or solvate thereof:
R$^2$ is as defined in numbered paragraph (6);
R$^4$ is as defined in any one of numbered paragraphs (15) to (17);
R$^6$ is as defined in any one of numbered paragraphs (112) to (114) or (119) to (121);
R$^7$ is as defined in any one of numbered paragraphs (27) to (29);
n is as defined in numbered paragraph (30);
R$^8$ is as defined in any one of numbered paragraphs (36) to (39);
R$^9$ is as defined in any one of numbered paragraphs (48) to (50);
R$^{11}$ and R$^{12}$ are as defined in any one of numbered paragraphs (64) to (71) or (122);

$R^{13}$ is as defined in numbered paragraph (74), (75) or (123);

$R^{13a}$ is as defined in any one of numbered paragraphs (78) to (79);

$L^1$ is as defined in any one of numbered paragraphs (81) to (83);

$X^1$ is as defined in any one of numbered paragraphs (88) to (89) or (127) to (128);

$Q^1$ is as defined in any one of numbered paragraphs (95) to (96) or (131) to (132);

$R^{15}$ is as defined in any one of numbered paragraphs (105) to (108); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (6);

$R^4$ is as defined in any one of numbered paragraphs (15) to (17);

$R^6$ is as defined in any one of numbered paragraphs (112) to (114) or (119) to (121);

$R^7$ is as defined in any one of numbered paragraphs (27) to (29);

n is as defined in numbered paragraph (30);

$R^8$ is as defined in any one of numbered paragraphs (36) to (39);

$R^9$ is as defined in any one of numbered paragraphs (48) to (50);

$R^{11}$ and $R^{12}$ are as defined in any one of numbered paragraphs (67) to (71) or (122);

$R^{13}$ is as defined in numbered paragraph (74), (75) or (124);

$R^{13a}$ is as defined in any one of numbered paragraphs (78) to (79);

$L^1$, $X^1$ and $Q^1$ are as defined in any one of numbered paragraphs (99) to (101) or (133) to (135);

$R^{15}$ is as defined in any one of numbered paragraphs (105) to (108); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (6);

$R^4$ is as defined in any one of numbered paragraphs (15) to (17);

$R^6$ is as defined in any one of numbered paragraphs (113) to (114) or (120) to (121);

$R^7$ is as defined in any one of numbered paragraphs (27) to (29);

n is as defined in numbered paragraph (30);

$R^8$ is as defined in numbered paragraph (39);

$R^{11}$ and $R^{12}$ are as defined in any one of numbered paragraphs (67) to (71) or (122);

$R^{13}$ is as defined in numbered paragraph (74), (75) or (124);

$R^{13a}$ is as defined in any one of numbered paragraphs (78) to (79);

$L^1$, $X^1$ and $Q^1$ are as defined in any one of numbered paragraphs (99) to (101) or (133) to (135);

$R^{15}$ is as defined in any one of numbered paragraphs (107) to (108); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (6);

$R^4$ is as defined in any one of numbered paragraphs (15) to (17);

$R^6$ is as defined in any one of numbered paragraphs (113) to (114) or (120) to (121);

$R^7$ is as defined in any one of numbered paragraphs (27) to (29);

n is as defined in numbered paragraph (30);

$R^8$ is as defined in numbered paragraph (39);

$R^{11}$ and $R^{12}$ are as defined in any one of numbered paragraphs (70) to (71) or (122);

$R^{13}$ is as defined in numbered paragraph (74), (75) or (124);

$R^{13a}$ is as defined in any one of numbered paragraphs (78) to (79);

$L^1$, $X^1$ and $Q^1$ are as defined in any one of numbered paragraphs (99) to (101) or (133) to (135);

$R^{15}$ is as defined in any one of numbered paragraphs (107) to (108); and all other groups are as defined in any of the numbered paragraphs appearing hereinbefore.

In an embodiment of the compounds of formula I-XIII, or a pharmaceutically acceptable salt, hydrate and/or solvate thereof:

$R^2$ is as defined in numbered paragraph (6);

$R^4$ is as defined in numbered paragraph (15);

$R^6$ is as defined in numbered paragraph (113);

$R^7$ is as defined in numbered paragraph (27);

n is as defined in numbered paragraph (30);

$R^8$ is as defined in numbered paragraph (39);

$R^{11}$ and $R^{12}$ are as defined in numbered paragraph (122);

$R^{13}$ is as defined in numbered paragraph (74) or (125);

$R^{13a}$ is as defined in numbered paragraph (78);

$L^1$, $X^1$ and $Q^1$ are as defined in numbered paragraph (134) or (135);

$R^{15}$ is as defined in numbered paragraph (107); and all other groups are as defined in any of the numbered paragraphs appearing hereinbefore.

Particular compounds of the present invention include any of the compounds exemplified in the present application, or a pharmaceutically acceptable salt or solvate thereof, and, in particular, any of the following:

[2,4-dihydroxy-6-(pyrimidin-2-ylmethoxy)phenyl]-pyrrolidin-1-yl-methanone;

[2-(cyclopentoxy)-4,6-dihydroxy-phenyl]-pyrrolidin-1-yl-methanone;

(2-benzyloxy-4,6-dihydroxy-phenyl)-pyrrolidin-1-yl-methanone;

(2-benzyloxy-4,6-dihydroxy-phenyl)-isoindolin-2-yl-methanone;

(2-benzyloxy-4,6-dihydroxy-phenyl)-(1-piperidyl)methanone;

(2-benzyloxy-4,6-dihydroxy-phenyl)-[(3S)-3-hydroxypyrrolidin-1-yl]methanone;

(2-benzyloxy-4,6-dihydroxy-phenyl)-[(3R)-3-hydroxypyrrolidin-1-yl]methanone;

(2-benzyloxy-4,6-dihydroxy-phenyl)-[(3R)-3-hydroxy-1-piperidyl]methanone;

(2-benzyloxy-4,6-dihydroxy-phenyl)-[(3S)-3-hydroxy-1-piperidyl]methanone;

(2-benzyloxy-4,6-dihydroxy-3-methyl-phenyl)-pyrrolidin-1-yl-methanone;

(2-benzyloxy-3-ethyl-4,6-dihydroxy-phenyl)-pyrrolidin-1-yl-methanone;

[2,4-dihydroxy-6-(2-pyridylmethoxy)phenyl]-pyrrolidin-1-yl-methanone;
[2,4-dihydroxy-6-[(1R)-1-phenylethoxy]phenyl]-pyrrolidin-1-yl-methanone;
[2,4-dihydroxy-6-[(1R)-1-phenylethoxy]phenyl]-pyrrolidin-1-yl-methanone;
[2-[(4-fluorophenyl)methoxy]-4,6-dihydroxy-phenyl]-pyrrolidin-1-yl-methanone;
[2,4-dihydroxy-6-[(4-methoxyphenyl)methoxy]phenyl]-pyrrolidin-1-yl-methanone;
[2,4-dihydroxy-6-(m-tolylmethoxy)phenyl]-pyrrolidin-1-yl-methanone;
(2-benzyloxy-4,6-dihydroxy-phenyl)-(5,7-dihydropyrrolo[3,4-b]pyridin-6-yl)methanone;
(2-benzyloxy-4,6-dihydroxy-phenyl)-(4-methoxyisoindolin-2-yl)methanone;
[2,4-dihydroxy-6-(pyrimidin-4-ylmethoxy)phenyl]-pyrrolidin-1-yl-methanone;
2,4-dihydroxy-6-(1H-pyrazol-3-ylmethoxy)phenyl]-pyrrolidin-1-yl-methanone;
[2,4-dihydroxy-6-(1H-triazol-4-ylmethoxy)phenyl]-pyrrolidin-1-yl-methanone;
(2-benzyloxy-4,6-dihydroxy-phenyl)-(5-bromoisoindolin-2-yl)methanone;
methyl 2-(2-benzyloxy-4,6-dihydroxy-benzoyl)isoindoline-5-carboxylate;
(2-benzyloxy-4,6-dihydroxy-phenyl)-(5-methoxyisoindolin-2-yl)methanone;
(2-benzyloxy-4,6-dihydroxy-phenyl)-(5,6-dimethoxyisoindolin-2-yl)methanone;
[2,4-dihydroxy-6-(1-phenylethoxy)phenyl]-isoindolin-2-yl-methanone;
[2,4-dihydroxy-6-(1-phenylethoxy)phenyl]-(5-methoxyisoindolin-2-yl)methanone;
[2,4-dihydroxy-6-(1-phenylethoxy)phenyl]-(5,6-dimethoxyisoindolin-2-yl)methanone;
(2-benzyloxy-4,6-dihydroxy-3-methyl-phenyl)-(5,7-dihydropyrrolo[3,4-b]pyridin-6-yl)methanone;
5,7-dihydropyrrolo[3,4-b]pyridin-6-yl-[4,6-dihydroxy-3-methyl-2-(m-tolylmethoxy)phenyl]methanone;
5,7-dihydropyrrolo[3,4-b]pyridin-6-yl-[2,4-dihydroxy-6-(m-tolylmethoxy)phenyl]methanone;
5,7-dihydropyrrolo[3,4-b]pyridin-6-yl-[4,6-dihydroxy-3-methyl-2-(2-pyridylmethoxy)phenyl]methanone;
[4,6-dihydroxy-3-methyl-2-(2-pyridylmethoxy)phenyl]-isoindolin-2-yl-methanone;
5,7-dihydropyrrolo[3,4-b]pyridin-6-yl-[2,4-dihydroxy-6-(2-pyridylmethoxy)phenyl]methanone;
(2-benzyloxy-4,6-dihydroxy-3-methyl-phenyl)-(3,4-dihydro-1H-isoquinolin-2-yl)methanone;
[2,4-dihydroxy-6-(2-pyridylmethoxy)phenyl]-isoindolin-2-yl-methanone;
(2-benzyloxy-4,6-dihydroxy-3-methyl-phenyl)-(4-bromoisoindolin-2-yl)methanone;
(2-benzyloxy-4,6-dihydroxy-3-methyl-phenyl)-[4-(hydroxymethyl)isoindolin-2-yl]methanone;
(2-benzyloxy-4,6-dihydroxy-3-methyl-phenyl)-[5-[(4-methylpiperazin-1-yl)methyl]isoindolin-2-yl]methanone;
(2-benzyloxy-4,6-dihydroxy-3-methyl-phenyl)-(6-methoxy-3,4-dihydro-1H-isoquinolin-2-yl)methanone;
(2-benzyloxy-4,6-dihydroxy-3-methyl-phenyl)-(3,4-dihydro-1H-2,7-naphthyridin-2-yl)methanone;
(2-benzyloxy-4,6-dihydroxy-3-methyl-phenyl)-(3,4-dihydro-1H-2,6-naphthyridin-2-yl)methanone;
3,4-dihydro-1H-isoquinolin-2-yl-[4,6-dihydroxy-3-methyl-2-(m-tolylmethoxy)phenyl]methanone;
3,4-dihydro-1H-isoquinolin-2-yl-[4,6-dihydroxy-3-methyl-2-(2-pyridylmethoxy)phenyl]methanone;
[4,6-dihydroxy-3-methyl-2-(2-pyridylmethoxy)phenyl]-(7-methoxy-3,4-dihydro-1H-isoquinolin-2-yl)methanone;
[4,6-dihydroxy-3-methyl-2-(2-pyridylmethoxy)phenyl]-(6-methoxy-3,4-dihydro-1H-isoquinolin-2-yl)methanone;
3,4-dihydro-1H-isoquinolin-2-yl-[2-[(4-fluorophenyl)methoxy]-4,6-dihydroxy-3-methyl-phenyl]methanone;
(2-(benzyloxy)-4,6-dihydroxyphenyl)(5-((4-methylpiperazin-1-yl)methyl)isoindolin-2-yl)methanone;
(4-aminoisoindolin-2-yl)(2-(benzyloxy)-4,6-dihydroxy-3-methylphenyl)methanone;
(2-(benzyloxy)-4,6-dihydroxy-3-methylphenyl)(4-vinylisoindolin-2-yl)methanone;
(2-(benzyloxy)-4,6-dihydroxy-3-methylphenyl)(7-methoxy-3,4-dihydroisoquinolin-2(1H)-yl)methanone;
(2-(benzyloxy)-4,6-dihydroxy-3-methylphenyl)(5,8-dihydro-1,7-naphthyridin-7(6H)-yl)methanone;
(2-(benzyloxy)-4,6-dihydroxy-3-methylphenyl)(7,8-dihydro-1,6-naphthyridin-6(5H)-yl)methanone;
(2-(benzyloxy)-4,6-dihydroxy-3-methylphenyl)(7,8-dihydropyrido[4,3-d]pyrimidin-6(5H)-yl)methanone;
(2-(benzyloxy)-4,6-dihydroxy-3-methylphenyl)(5,8-dihydropyrido[3,4-d]pyrimidin-7(6H)-yl)methanone;
(3,4-dihydroisoquinolin-2(1H)-yl)(4,6-dihydroxy-3-methyl-2-((1-methyl-1H-pyrazol-3-yl)methoxy)phenyl)methanone;
(2-(benzyloxy)-4,6-dihydroxyphenyl)(3,4-dihydroisoquinolin-2(1H)-yl)methanone;
(2-(benzyloxy)-4,6-dihydroxy-3-methylphenyl)(isoindolin-2-yl)methanone;
(2-(benzyloxy)-4,6-dihydroxy-3-methylphenyl)(7-((dimethylamino)methyl)-3,4-dihydroisoquinolin-2(1H)-yl)methanone;
(2-(benzyloxy)-4,6-dihydroxy-3-methylphenyl)(6-((dimethylamino)methyl)-3,4-dihydroisoquinolin-2(1H)-yl)methanone;
(S)-(2-(Benzyloxy)-4,6-dihydroxy-3-methylphenyl)(3-(hydroxymethyl)-3,4-dihydroisoquinolin-2(1H)-yl)methanone;
(2-(benzyloxy)-4,6-dihydroxy-3-methylphenyl)(1-(hydroxymethyl)isoindolin-2-yl)methanone;
(R)-(2-(benzyloxy)-4,6-dihydroxy-3-methylphenyl)(3-(hydroxymethyl)-3,4-dihydroisoquinolin-2(1H)-yl)methanone;
(2-(Benzyloxy)-4,6-dihydroxy-3-methylphenyl)(1-(hydroxymethyl)-3,4-dihydroisoquinolin-2(1H)-yl)methanone;
(2-(Benzyloxy)-4,6-dihydroxy-3-methylphenyl)(4-(hydroxymethyl)-3,4-dihydroisoquinolin-2(1H)-yl)methanone;
(2-(Benzyloxy)-4,6-dihydroxy-3-methylphenyl)(2,3-dihydro-4H-benzo[b][1,4]oxazin-4-yl)methanone;
(2-(Benzyloxy)-4,6-dihydroxy-3-methylphenyl)(5-((dimethylamino)methyl)isoindolin-2-yl)methanone;
(2-(Benzyloxy)-4,6-dihydroxy-3-methylphenyl)(5-(morpholinomethyl)isoindolin-2-yl)methanone;
(2-(Benzyloxy)-4,6-dihydroxy-3-methylphenyl)(indolin-1-yl)methanone;
(2-(Benzyloxy)-4,6-dihydroxyphenyl)(indolin-1-yl)methanone;
(2-(Benzyloxy)-4,6-dihydroxy-3-methylphenyl)(3,4-dihydroquinolin-1(2H)-yl)methanone;
(2-(Benzyloxy)-4,6-dihydroxyphenyl)(3,4-dihydroquinolin-1(2H)-yl)methanone;
(2-(Benzyloxy)-4,6-dihydroxy-3-methylphenyl)(1,3-dihydro-2H-pyrrolo[3,4-c]pyridin-2-yl)methanone;

(2-(Benzyloxy)-4,6-dihydroxy-3-methylphenyl)(4-((4-methylpiperazin-1-yl)methyl)isoindolin-2-yl)methanone;
(2-(Benzyloxy)-4,6-dihydroxy-3-methylphenyl)(4-(morpholinomethyl)isoindolin-2-yl)methanone;
2-(2-(Benzyloxy)-4,6-dihydroxy-3-methylbenzoyl)-N,N-dimethyl-1,2,3,4-tetrahydroisoquinoline-7-carboxamide;
2-(2-(benzyloxy)-4,6-dihydroxy-3-methylbenzoyl)-N,N-dimethyl-1,2,3,4-tetrahydroisoquinoline-6-carboxamide;
(2-(Benzyloxy)-4,6-dihydroxy-3-methylphenyl)(4-((tetrahydrofuran-3-yl)amino)isoindolin-2-yl)methanone;
(2-(Benzyloxy)-4,6-dihydroxy-3-methylphenyl)(4-(oxetan-3-ylamino)isoindolin-2-yl)methanone;
(2-(Benzyloxy)-4,6-dihydroxy-3-methylphenyl)(4-(3-hydroxypiperidin-1-yl)isoindolin-2-yl)methanone;
2-(2-(benzyloxy)-4,6-dihydroxy-3-methylbenzoyl)isoindoline-4-carbonitrile;
2-(2-(Benzyloxy)-4,6-dihydroxy-3-methylbenzoyl)-N,N-dimethylisoindoline-5-carboxamide;
2-(2-(Benzyloxy)-4,6-dihydroxy-3-methylbenzoyl)-N,N-methylisoindoline-5-carboxamide;
2-(2-(Benzyloxy)-4,6-dihydroxy-3-methylbenzoyl)-N,N-dimethylisoindoline-4-carboxamide;
2-(2-(benzyloxy)-4,6-dihydroxy-3-methylbenzoyl)-N-methylisoindoline-4-carboxamide;
N-(2-(2-(benzyloxy)-4,6-dihydroxy-3-methylbenzoyl)isoindolin-4-yl)acetamide;
((2-(Benzyloxy)-4,6-dihydroxy-3-methylphenyl)(4-((tetrahydrofuran-3-yl)oxy)isoindolin-2-yl)methanone;
(4-(Azetidin-3-yl methoxy) isoindolin-2-yl) (2-(benzyloxy)-4,6-dihydroxy-3-methylphenyl) methanone;
(2-(Benzyloxy)-4,6-dihydroxy-3-methylphenyl)(4-(pyrimidin-5-ylmethoxy)isoindolin-2-yl)methanone;
1-(2-(2-(Benzyloxy)-4,6-dihydroxy-3-methylbenzoyl)isoindolin-4-yl)azetidine-3-carbonitrile;
(4,6-Dihydroxy-2-methoxy-3-methylphenyl)(5-((4-methylpiperazin-1-yl)methyl)isoindolin-2-yl)methanone;
(2-Ethoxy-4,6-dihydroxy-3-methylphenyl)(5-((4-methylpiperazin-1-yl)methyl)isoindolin-2-yl)methanone;
(2-(Cyclohexylmethoxy)-4,6-dihydroxy-3-methylphenyl) (5-((4-methylpiperazin-1-yl)methyl)isoindolin-2-yl) methanone;
(2-(Cyclopropylmethoxy)-4,6-dihydroxy-3-methylphenyl) (5-((4-methylpiperazin-1-yl)methyl)isoindolin-2-yl) methanone; and
(2-(Cyclohexylmethoxy)-4,6-dihydroxy-3-methylphenyl) (6-((dimethylamino)methyl)-3,4-dihydroisoquinolin-2 (1H)-yl)methanone.

The various functional groups and substituents making up the compounds of the Formula (I), or sub-formulae (I-I) to (I-XII), are typically chosen such that the molecular weight of the compound of the formula (I) does not exceed 1000. More usually, the molecular weight of the compound will be less than 900, for example less than 800, or less than 750, or less than 700, or less than 650. More preferably, the molecular weight is less than 600 and, for example, is 550 or less.

A suitable pharmaceutically acceptable salt of a compound of the invention is, for example, an acid-addition salt of a compound of the invention which is sufficiently basic, for example, an acid-addition salt with, for example, an inorganic or organic acid, for example hydrochloric, hydrobromic, sulfuric, phosphoric, trifluoroacetic, formic, citric methane sulfonate or maleic acid. In addition, a suitable pharmaceutically acceptable salt of a compound of the invention which is sufficiently acidic is an alkali metal salt, for example a sodium or potassium salt, an alkaline earth metal salt, for example a calcium or magnesium salt, an ammonium salt or a salt with an organic base which affords a pharmaceutically acceptable cation, for example a salt with methylamine, dimethylamine, trimethylamine, piperidine, morpholine or tris-(2-hydroxyethyl)amine.

Compounds that have the same molecular formula but differ in the nature or sequence of bonding of their atoms or the arrangement of their atoms in space are termed "isomers". Isomers that differ in the arrangement of their atoms in space are termed "stereoisomers". Stereoisomers that are not mirror images of one another are termed "diastereomers" and those that are non-superimposable mirror images of each other are termed "enantiomers". When a compound has an asymmetric center, for example, it is bonded to four different groups, a pair of enantiomers is possible. An enantiomer can be characterized by the absolute configuration of its asymmetric center and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture".

The compounds of this invention may possess one or more asymmetric centers; such compounds can therefore be produced as individual (R)- or (S)-stereoisomers or as mixtures thereof. Unless indicated otherwise, the description or naming of a particular compound in the specification and claims is intended to include both individual enantiomers and mixtures, racemic or otherwise, thereof. The methods for the determination of stereochemistry and the separation of stereoisomers are well-known in the art (see discussion in Chapter 4 of "Advanced Organic Chemistry", 4th edition J. March, John Wiley and Sons, New York, 2001), for example by synthesis from optically active starting materials or by resolution of a racemic form. Some of the compounds of the invention may have geometric isomeric centres (E- and Z-isomers).

It is to be understood that the present invention encompasses all optical, diastereoisomers and geometric isomers and mixtures thereof that possess activity.

The present invention also encompasses compounds of the invention as defined herein which comprise one or more isotopic substitutions. For example, H may be in any isotopic form, including 1H, 2H(D), and 3H (T); C may be in any isotopic form, including 12C, 13C, and 14C; and O may be in any isotopic form, including 16O and 18O; and the like.

It is also to be understood that certain compounds of the Formula (I), or sub-formulae (I-I) to (I-XII), may exist in solvated as well as unsolvated forms such as, for example, hydrated forms. It is to be understood that the invention encompasses all such solvated forms that possess activity.

It is also to be understood that certain compounds of the Formula (I), or sub-formulae (I-I) to (I-XII), may exhibit polymorphism, and that the invention encompasses all such forms that possess activity.

Compounds of the Formula (I), or sub-formulae (I-I) to (I-XII), may exist in a number of different tautomeric forms and references to compounds of the Formula (I), or sub-formulae (I-I) to (I-XII), include all such forms. For the avoidance of doubt, where a compound can exist in one of several tautomeric forms, and only one is specifically described or shown, all others are nevertheless embraced by Formula (I), or sub-formulae (I-I) to (I-XII). Examples of tautomeric forms include keto-, enol-, and enolate-forms, as in, for example, the following tautomeric pairs: keto/enol (illustrated below), imine/enamine, amide/imino alcohol, amidine/amidine, nitroso/oxime, thioketone/enethiol, and nitro/aci-nitro.

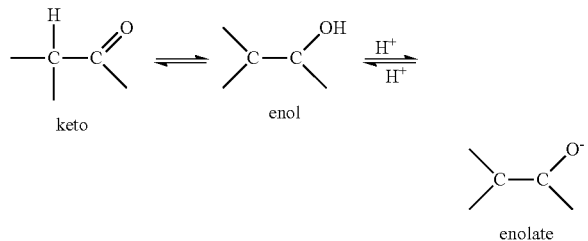

Compounds of the Formula (I), or sub-formulae (I-I) to (I-XII), containing an amine function may also form N-oxides. A reference herein to a compound of the Formula (I), or sub-formulae (I-I) to (I-XII), that contains an amine function also includes the N-oxide. Where a compound contains several amine functions, one or more than one nitrogen atom may be oxidised to form an N-oxide. Particular examples of N-oxides are the N-oxides of a tertiary amine or a nitrogen atom of a nitrogen-containing heterocycle. N-Oxides can be formed by treatment of the corresponding amine with an oxidizing agent such as hydrogen peroxide or a per-acid (e.g. a peroxycarboxylic acid), see for example Advanced Organic Chemistry, by Jerry March, 4th Edition, Wiley Interscience, pages. More particularly, N-oxides can be made by the procedure of L. W. Deady (Syn. Comm. 1977, 7, 509-514) in which the amine compound is reacted with m-chloroperoxybenzoic acid (mCPBA), for example, in an inert solvent such as dichloromethane.

The compounds of Formula (I), or sub-formulae (I-I) to (I-XII), may be administered in the form of a pro-drug which is broken down in the human or animal body to release a compound of the invention. A pro-drug may be used to alter the physical properties and/or the pharmacokinetic properties of a compound of the invention. A pro-drug can be formed when the compound of the invention contains a suitable group or substituent to which a property-modifying group can be attached. Examples of pro-drugs include in vivo cleavable ester derivatives that may be formed at a carboxy group or a hydroxy group in a compound of the Formula (I), or sub-formulae (I-I) to (I-XII), and in-vivo cleavable amide derivatives that may be formed at a carboxy group or an amino group in a compound of the Formula (I), or sub-formulae (I-I) to (I-XII).

Accordingly, the present invention includes those compounds of the Formula (I), or sub-formulae (I-I) to (I-XII), as defined hereinbefore, when made available by organic synthesis and when made available within the human or animal body by way of cleavage of a pro-drug thereof. Accordingly, the present invention includes those compounds of the Formula (I), or sub-formulae (I-I) to (I-XII), that are produced by organic synthetic means and also such compounds that are produced in the human or animal body by way of metabolism of a precursor compound, that is a compound of the Formula (I), or sub-formulae (I-I) to (I-XII), may be a synthetically-produced compound or a metabolically-produced compound.

A suitable pharmaceutically acceptable pro-drug of a compound of the Formula (I), or sub-formulae (I-I) to (I-XII), is one that is based on reasonable medical judgement as being suitable for administration to the human or animal body without undesirable pharmacological activities and without undue toxicity.

Various forms of pro-drug have been described, for example in the following documents:—
a) Methods in Enzymology, Vol. 42, p. 309-396, edited by K. Widder, et al. (Academic Press, 1985);
b) Design of Pro-drugs, edited by H. Bundgaard, (Elsevier, 1985);
c) A Textbook of Drug Design and Development, edited by Krogsgaard-Larsen and H. Bundgaard, Chapter 5 "Design and Application of Pro-drugs", by H. Bundgaard p. 113-191 (1991);
d) H. Bundgaard, Advanced Drug Delivery Reviews, 8, 1-38 (1992);
e) H. Bundgaard, et al., Journal of Pharmaceutical Sciences, 77, 285 (1988);
f) N. Kakeya, et al., Chem. Pharm. Bull., 32, 692 (1984);
g) T. Higuchi and V. Stella, "Pro-Drugs as Novel Delivery Systems", A.C.S. Symposium Series, Volume 14; and
h) E. Roche (editor), "Bioreversible Carriers in Drug Design", Pergamon Press, 1987.

A suitable pharmaceutically acceptable pro-drug of a compound of the Formula (I), or sub-formulae (I-I) to (I-XII), that possesses a carboxy group is, for example, an in vivo cleavable ester thereof. An in vivo cleavable ester of a compound of the Formula I, or sub-formulae (I-I) to (I-XII), containing a carboxy group is, for example, a pharmaceutically acceptable ester which is cleaved in the human or animal body to produce the parent acid or parent alcohol. Suitable pharmaceutically acceptable esters for carboxy include (1-6C)alkyl esters such as methyl, ethyl and tert-butyl, (1-6C)alkoxymethyl esters such as methoxymethyl esters, (1-6C)alkanoyloxymethyl esters such as pivaloyloxymethyl esters, 3-phthalidyl esters, (3-8C)cycloalkylcarbonyloxy-(1-6C)alkyl esters such as cyclopentylcarbonyloxymethyl and 1-cyclohexylcarbonyloxyethyl esters, 2-oxo-1,3-dioxolenylmethyl esters such as 5-methyl-2-oxo-1,3-dioxolen-4-ylmethyl esters and (1-6C)alkoxycarbonyloxy-(1-6C)alkyl esters such as methoxycarbonyloxymethyl and 1-methoxycarbonyloxyethyl esters.

A suitable pharmaceutically acceptable pro-drug of a compound of the Formula (I), or sub-formulae (I-I) to (I-XII), that possesses a hydroxy group is, for example, an in vivo cleavable ester or ether thereof. An in vivo cleavable ester or ether of a compound of the Formula (I), or sub-formulae (I-I) to (I-XII), containing a hydroxy group is, for example, a pharmaceutically acceptable ester or ether which is cleaved in the human or animal body to produce the parent hydroxy compound. Suitable pharmaceutically acceptable ester forming groups for a hydroxy group include inorganic esters such as phosphate esters (including phosphoramidic cyclic esters). Further suitable pharmaceutically acceptable ester forming groups for a hydroxy group include (1-10C) alkanoyl groups such as acetyl, benzoyl, phenylacetyl and substituted benzoyl and phenylacetyl groups, (1-10C) alkoxycarbonyl groups such as ethoxycarbonyl, N,N-(1-6C)₂carbamoyl, 2-dialkylaminoacetyl and 2-carboxyacetyl groups. Examples of ring substituents on the phenylacetyl and benzoyl groups include aminomethyl, N-alkylaminomethyl, N,N-dialkylaminomethyl, morpholinomethyl, piperazin-1-ylmethyl and 4-(1-4C)alkylpiperazin-1-ylmethyl. Suitable pharmaceutically acceptable ether forming groups for a hydroxy group include α-acyloxyalkyl groups such as acetoxymethyl and pivaloyloxymethyl groups.

A suitable pharmaceutically acceptable pro-drug of a compound of the Formula (I), or sub-formulae (I-I) to (I-XII), that possesses a carboxy group is, for example, an in vivo cleavable amide thereof, for example an amide formed with an amine such as ammonia, a (1-4C)alkylamine such as methylamine, a [(1-4C)alkyl]₂amine such as dimethylamine, N-ethyl-N-methylamine or diethylamine, a (1-4C)alkoxy-(2-4C)alkylamine such as 2-methoxyethylamine, a phenyl-(1-4C)alkylamine such as benzylamine and amino acids such as glycine or an ester thereof.

A suitable pharmaceutically acceptable pro-drug of a compound of the Formula (I), or sub-formulae (I-I) to (I-XII), that possesses an amino group is, for example, an in vivo cleavable amide derivative thereof. Suitable pharmaceutically acceptable amides from an amino group include, for example an amide formed with (1-10C)alkanoyl groups such as an acetyl, benzoyl, phenylacetyl and substituted benzoyl and phenylacetyl groups. Examples of ring substituents on the phenylacetyl and benzoyl groups include aminomethyl, N-alkylaminomethyl, N,N-dialkylaminomethyl, morpholinomethyl, piperazin-1-ylmethyl and 4-(1-4C)alkyl)piperazin-1-ylmethyl.

The in vivo effects of a compound of the Formula (I), or sub-formulae (I-I) to (I-XII), may be exerted in part by one or more metabolites that are formed within the human or animal body after administration of a compound of the Formula (I), or sub-formulae (I-I) to (I-XII). As stated hereinbefore, the in vivo effects of a compound of the Formula (I), or sub-formulae (I-I) to (I-XII), may also be exerted by way of metabolism of a precursor compound (a pro-drug).

Though the present invention may relate to any compound or particular group of compounds defined herein by way of optional, preferred or suitable features or otherwise in terms of particular embodiments, the present invention may also relate to any compound or particular group of compounds that specifically excludes said optional, preferred or suitable features or particular embodiments.

Suitably, the present invention excludes any individual compounds not possessing the biological activity defined herein.

Synthesis

The compounds of the present invention can be prepared by any suitable technique known in the art. Particular processes for the preparation of these compounds are described further in the accompanying examples.

In the description of the synthetic methods described herein and in any referenced synthetic methods that are used to prepare the starting materials, it is to be understood that all proposed reaction conditions, including choice of solvent, reaction atmosphere, reaction temperature, duration of the experiment and workup procedures, can be selected by a person skilled in the art.

It is understood by one skilled in the art of organic synthesis that the functionality present on various portions of the molecule must be compatible with the reagents and reaction conditions utilised.

It will be appreciated that during the synthesis of the compounds of the invention in the processes defined herein, or during the synthesis of certain starting materials, it may be desirable to protect certain substituent groups to prevent their undesired reaction. The skilled chemist will appreciate when such protection is required, and how such protecting groups may be put in place, and later removed.

For examples of protecting groups see one of the many general texts on the subject, for example, 'Protective Groups in Organic Synthesis' by Theodora Green (publisher: John Wiley & Sons). Protecting groups may be removed by any convenient method described in the literature or known to the skilled chemist as appropriate for the removal of the protecting group in question, such methods being chosen so as to effect removal of the protecting group with the minimum disturbance of groups elsewhere in the molecule.

Thus, if reactants include, for example, groups such as amino, carboxy or hydroxy it may be desirable to protect the group in some of the reactions mentioned herein.

By way of example, a suitable protecting group for an amino or alkylamino group is, for example, an acyl group, for example an alkanoyl group such as acetyl, an alkoxycarbonyl group, for example a methoxycarbonyl, ethoxycarbonyl or t-butoxycarbonyl group, an arylmethoxycarbonyl group, for example benzyloxycarbonyl, or an aroyl group, for example benzoyl. The deprotection conditions for the above protecting groups necessarily vary with the choice of protecting group. Thus, for example, an acyl group such as an alkanoyl or alkoxycarbonyl group or an aroyl group may be removed by, for example, hydrolysis with a suitable base such as an alkali metal hydroxide, for example lithium or sodium hydroxide. Alternatively an acyl group such as a tert-butoxycarbonyl group may be removed, for example, by treatment with a suitable acid as hydrochloric, sulfuric or phosphoric acid or trifluoroacetic acid and an arylmethoxycarbonyl group such as a benzyloxycarbonyl group may be removed, for example, by hydrogenation over a catalyst such as palladium-on-carbon, or by treatment with a Lewis acid for example boron tris(trifluoroacetate). A suitable alternative protecting group for a primary amino group is, for example, a phthaloyl group which may be removed by treatment with an alkylamine, for example dimethylaminopropylamine, or with hydrazine.

A suitable protecting group for a hydroxy group is, for example, an acyl group, for example an alkanoyl group such as acetyl, an aroyl group, for example benzoyl, or an arylmethyl group, for example benzyl. The deprotection conditions for the above protecting groups will necessarily vary with the choice of protecting group. Thus, for example, an acyl group such as an alkanoyl or an aroyl group may be removed, for example, by hydrolysis with a suitable base such as an alkali metal hydroxide, for example lithium, sodium hydroxide or ammonia. Alternatively an arylmethyl group such as a benzyl group may be removed, for example, by hydrogenation over a catalyst such as palladium-on-carbon.

A suitable protecting group for a carboxy group is, for example, an esterifying group, for example a methyl or an ethyl group which may be removed, for example, by hydrolysis with a base such as sodium hydroxide, or for example a t-butyl group which may be removed, for example, by treatment with an acid, for example an organic acid such as trifluoroacetic acid, or for example a benzyl group which may be removed, for example, by hydrogenation over a catalyst such as palladium-on-carbon.

Resins may also be used as a protecting group.

The methodology employed to synthesise a compound of Formula (I), or sub-formulae (I-I) to (I-XII), will vary depending on the nature of $R^1$, $R^2$, $R^3$, $R^4$, $R^6$ and $R^{10}$ and any substituent groups or subgroups associated therewith. Suitable processes for their preparation are described further in the accompanying Examples.

Once a compound of Formula (I), or sub-formulae (I-I) to (I-XII), has been synthesised by any one of the processes defined herein, the processes may then further comprise the additional steps of:

(i) removing any protecting groups present;
(ii) converting the compound Formula (I) into another compound of Formula (I);

(iii) forming a pharmaceutically acceptable salt, hydrate or solvate thereof; and/or (iv) forming a prodrug thereof.

An example of (ii) above is when a compound of Formula (I) is synthesised and then one or more of the groups $R^1$, $R^2$, $R^3$, $R^4$, $R^6$ and $R^{10}$ may be further reacted to change the nature of the group and provide an alternative compound of Formula (I).

The resultant compounds of Formula (I), or sub-formulae (I-I) to (I-XII), can be isolated and purified using techniques well known in the art.

The compounds of Formula (I) may be synthesised by the synthetic routes shown in the Examples section below.

Biological Activity

The biological assays described in the Examples section herein may be used to measure the pharmacological effects of the compounds of the present invention.

Although the pharmacological properties of the compounds of Formula (I) vary with structural change, as expected, the compounds of the invention were found to be active in a PMS2 in vitro assay and in some cases also in a MLH1 in vitro assay described in the Examples section.

Pharmaceutical Compositions

According to a further aspect of the invention there is provided a pharmaceutical composition which comprises a compound of the invention as defined hereinbefore, or a pharmaceutically acceptable salt, hydrate or solvate thereof, in association with a pharmaceutically acceptable diluent or carrier.

The compositions of the invention may be in a form suitable for oral use (for example as tablets, lozenges, hard or soft capsules, aqueous or oily suspensions, emulsions, dispersible powders or granules, syrups or elixirs), for topical use (for example as creams, ointments, gels, or aqueous or oily solutions or suspensions), for administration by inhalation (for example as a finely divided powder or a liquid aerosol), for administration by insufflation (for example as a finely divided powder) or for parenteral administration (for example as a sterile aqueous or oily solution for intravenous, subcutaneous, intramuscular, intraperitoneal or intramuscular dosing or as a suppository for rectal dosing).

The compositions of the invention may be obtained by conventional procedures using conventional pharmaceutical excipients, well known in the art. Thus, compositions intended for oral use may contain, for example, one or more colouring, sweetening, flavouring and/or preservative agents.

An effective amount of a compound of the present invention for use in therapy is an amount sufficient to treat or prevent a proliferative condition referred to herein, slow its progression and/or reduce the symptoms associated with the condition.

The amount of active ingredient that is combined with one or more excipients to produce a single dosage form will necessarily vary depending upon the individual treated and the particular route of administration. For example, a formulation intended for oral administration to humans will generally contain, for example, from 0.5 mg to 0.5 g of active agent (more suitably from 0.5 to 100 mg, for example from 1 to 30 mg) compounded with an appropriate and convenient amount of excipients which may vary from about 5 to about 98 percent by weight of the total composition.

The size of the dose for therapeutic or prophylactic purposes of a compound of the formula I will naturally vary according to the nature and severity of the conditions, the age and sex of the animal or patient and the route of administration, according to well-known principles of medicine.

In using a compound of the invention for therapeutic or prophylactic purposes it will generally be administered so that a daily dose in the range, for example, 0.1 mg/kg to 75 mg/kg body weight is received, given if required in divided doses. In general lower doses will be administered when a parenteral route is employed. Thus, for example, for intravenous or intraperitoneal administration, a dose in the range, for example, 0.1 mg/kg to 30 mg/kg body weight will generally be used. Similarly, for administration by inhalation, a dose in the range, for example, 0.05 mg/kg to 25 mg/kg body weight will be used. Oral administration may also be suitable, particularly in tablet form. Typically, unit dosage forms will contain about 0.5 mg to 0.5 g of a compound of this invention.

Therapeutic Uses and Applications

The present invention provides compounds that function as inhibitors of MLH1 and/or PMS2 activity (e.g. MLH1 activity or PMS2 activity or MLH1 and PMS2 activity).

The compounds of Formula (I), or a pharmaceutically acceptable salt thereof, therefore have potential therapeutic uses in a variety of disease states in which the inhibition of MLH1 and/or PMS2 activity is beneficial.

The present invention therefore provides a method of treating a disease or disorder in which the inhibition MLH1 and/or PMS2 activity (e.g. MLH1 activity or PMS2 activity or MLH1 and PMS2 activity) is beneficial in a patient in need of such treatment, said method comprising administering to said patient a therapeutically effective amount of a compound, or a pharmaceutically acceptable salt, hydrate or solvate thereof, or a pharmaceutical composition as defined herein.

The present invention provides a method of inhibiting MLH1 and/or PMS2 activity (e.g. MLH1 activity or PMS2 activity or MLH1 and PMS2 activity), in vitro or in vivo, said method comprising contacting a cell with an effective amount of a compound or a pharmaceutically acceptable salt, hydrate or solvate thereof as defined herein.

The present invention provides a method of treating a proliferative disorder in a patient in need of such treatment, said method comprising administering to said patient a therapeutically effective amount of a compound or a pharmaceutically acceptable salt, hydrate or solvate thereof as defined herein, or a pharmaceutical composition as defined herein.

The present invention provides a method of treating cancer in a patient in need of such treatment, said method comprising administering to said patient a therapeutically effective amount of a compound or a pharmaceutically acceptable salt, hydrate or solvate thereof as defined herein, or a pharmaceutical composition as defined herein.

The present invention provides a compound, or a pharmaceutically acceptable salt, hydrate or solvate thereof, or a pharmaceutical composition as defined herein for use in therapy.

The present invention provides a compound, or a pharmaceutically acceptable salt, hydrate or solvate thereof, or a pharmaceutical composition as defined herein for use as a medicament.

The present invention provides a compound or a pharmaceutically acceptable salt, hydrate or solvate thereof as defined herein, or a pharmaceutical composition as defined herein, for use in the treatment of a proliferative disorder.

The present invention provides a compound, or a pharmaceutically acceptable salt, hydrate or solvate thereof, or a pharmaceutical composition as defined herein for use in the treatment of cancer. In a particular embodiment, the cancer is human cancer. In a particular embodiment, the cancer is human cancer, in particular oestrogen positive cancers, such as breast cancer, or androgen receptor positive cancers, such as prostate cancer.

The present invention provides a compound, or a pharmaceutically acceptable salt, hydrate or solvate thereof, as defined herein for use in the inhibition of MLH1 and/or PMS2 activity (e.g. MLH1 activity or PMS2 activity or MLH1 and PMS2 activity). Preferably, there is provided a compound, or a pharmaceutically acceptable salt, hydrate or solvate thereof, as defined herein, for use in the inhibition of PMS2 activity; most preferably, for use in the inhibition of PMS2 and MLH1 activity.

The present invention provides a compound, or a pharmaceutically acceptable salt, hydrate or solvate thereof, as defined herein for use in the treatment of a disease or disorder in which the inhibition of MLH1 and/or PMS2 activity (e.g. MLH1 activity or PMS2 activity or MLH1 and PMS2 activity) is beneficial.

The present invention provides a use of a compound, or a pharmaceutically acceptable salt, hydrate or solvate thereof, as defined herein in the manufacture of a medicament for the treatment of a proliferative disorder.

The present invention provides a use of a compound, or a pharmaceutically acceptable salt, hydrate or solvate thereof, as defined herein in the manufacture of a medicament for the treatment of cancer.

The present invention provides a use of a compound, or a pharmaceutically acceptable salt, hydrate or solvate thereof, as defined herein in the manufacture of a medicament for the inhibition of MLH1 and/or PMS2 activity (e.g. MLH1 activity or PMS2 activity or MLH1 and PMS2 activity).

The present invention provides a use of a compound, or a pharmaceutically acceptable salt, hydrate or solvate thereof, as defined herein in the manufacture of a medicament for the treatment of a disease or disorder in which the inhibition of MLH1 and/or PMS2 activity (e.g. MLH1 activity or PMS2 activity or MLH1 and PMS2 activity) is beneficial.

The term "proliferative disorder", "proliferative condition" and "proliferative disease" are used interchangeably herein and pertain to an unwanted or uncontrolled cellular proliferation of excessive or abnormal cells which is undesired, such as, neoplastic or hyperplastic growth, whether in vitro or in vivo.

In the above-outlined aspects of the invention, the proliferative disorder is suitably cancer, and the cancer is suitably a human cancer. In particular, the compounds of the present invention will be useful for the treatment of any cancer in which a mis-match repair inhibition is beneficial. Any suitable cancer may be targeted (e.g. adenoid cystic carcinoma, adrenal gland tumor, amyloidosis, anal cancer, appendix cancer, astrocytoma, ataxia-telangiectasia, Beckwith-Wiedemann Syndrome, bile duct cancer (cholangiocarcinoma), Birt-Hogg-Dube Syndrome, bladder cancer, bone cancer, brain stem glioma, brain tumor, breast cancer, Carney Complex, central nervous system tumors, cervical cancer, colorectal cancer, Cowden Syndrome, craniopharyngioma, desmoplastic infantile ganglioglioma, ependymoma, esophageal cancer, Ewing sarcoma, eye cancer, eyelid cancer, familial adenomatous polyposis, familial GIST, familial malignant melanoma, familial non-VHL clear cell renal cell carcinoma, familial pancreatic cancer, gallbladder cancer, gastrointestinal stromal tumor—GIST, germ cell tumor, gestational trophoblastic disease, head and neck cancer, hereditary breast and ovarian cancer, hereditary diffuse gastric cancer, hereditary leiomyomatosis and renal cell cancer, hereditary mixed polyposis syndrome, hereditary pancreatitis, hereditary papillary renal carcinoma, juvenile polyposis syndrome, kidney cancer, lacrimal gland tumor, laryngeal and hypopharyngeal cancer, leukemia (acute lymphoblastic leukamia (ALL), acute myeloid leukemia (AML), B-cell prolymphocytic leukemia, hairy cell leukemia, chronic lymphocytic leukemia (CLL), chronic myeloid leukemia (CML), chronic T-cell lymphocytic leukemia, eosinophilic leukemia), Li-Fraumeni Syndrome, liver cancer, lung cancer (non-small cell lung cancer, small cell lung cancer), Lymphoma (Hodgkin, non-Hodgkin), Lynch Syndrome, mastocytosis, medulloblastoma, melanoma, meningioma, mesothelioma, multiple endocrine neoplasia Type 1 & 2, multiple myeloma, MUTYH (or MYH)-associated polyposis, myelodysplastic syndromes (MDS), nasal cavity and paranasal sinus Cancer, nasopharyngeal Cancer, neuroblastoma, neuroendocrine tumors (e.g. of the gastrointestinal tract, lung or pancreas), neurofibromatosis Type 1 & 2, nevoid basal cell carcinoma syndrome, oral and oropharyngeal cancer, osteosarcoma, ovarian/fallopian tube/peritoneal cancer, pancreatic cancer, parathyroid cancer, penile cancer, Peutz-Jeghers Syndrome, pheochromocytoma, paraganglioma, pituitary gland tumor, pleuropulmonary blastoma, prostate cancer, retinoblastoma, rhabdomyosarcoma, salivary gland cancer, sarcoma (e.g. Kaposi or soft tissue), skin cancer, small bowel cancer, stomach cancer, testicular cancer, thymoma and thymic carcinoma, thyroid cancer, tuberous sclerosis complex, uterine cancer, vaginal cancer, Von Hippel-Lindau syndrome, vulvar cancer, Waldenstrom's macroglobulinemia, Werner syndrome, Wilms Tumor and xeroderma pigmentosum). Particular cancers of interest include haematological cancers such as lymphomas (including diffuse large B-cell lymphoma (DLBCL), follicular lymphoma (FL), Burkitt lymphoma (BL) and angioimmunoblastic T-cell lymphoma (AITL)), leukaemias (including acute lymphoblastic leukaemia (ALL) and chronic myeloid leukaemia (CML)), multiple myeloma, breast cancer, non-small cell lung cancer (NSCLC), colorectal cancer, endometrial cancer, gastro-oesophageal cancer, neuroendocrine cancers, osteosarcomas, prostate cancer, pancreatic cancer, small intestine cancer, bladder cancer, rectal cancer, cholangiocarcinoma, CNS cancer, thyroid cancer, head and neck cancer, oesophageal cancer, and ovarian cancer.

The compounds of the present invention may also be used to treat triplet diseases.

Thus, a further aspect of the present invention provides a method of treating a triplet disorder (e.g. Huntington's disease (HD), myotonic dystrophy type 1 (DM1), fragile X syndrome type A (FRAXA), Friedreich's ataxia (FRDA), and spinocerebellar ataxias (SCAs)) in a patient in need of such treatment, said method comprising administering to said patient a therapeutically effective amount of a compound or a pharmaceutically acceptable salt, hydrate or solvate thereof as defined herein, or a pharmaceutical composition as defined herein.

According to a further aspect of the present invention, there is provided a compound, or a pharmaceutically acceptable salt, hydrate or solvate thereof, or a pharmaceutical composition as defined herein for use in the treatment of a triplet disorder. In a particular embodiment, the triplet disorder is selected from the group consisting of Huntington's disease (HD), myotonic dystrophy type 1 (DM1), fragile X syndrome type A (FRAXA), Friedreich's ataxia (FRDA), and spinocerebellar ataxias (SCAs).

According to a further aspect of the present invention, there is provided the use of a compound, or a pharmaceutically acceptable salt, hydrate or solvate thereof, as defined herein in the manufacture of a medicament for the treatment of a triplet disorder. In a particular embodiment, the triplet disorder is selected from the group consisting of Huntington's disease (HD), myotonic dystrophy type 1 (DM1), fragile X syndrome type A (FRAXA), Friedreich's ataxia (FRDA), and spinocerebellar ataxias (SCAs).

Routes of Administration

The compounds of the invention or pharmaceutical compositions comprising these compounds may be administered to a subject by any convenient route of administration, whether systemically, peripherally or topically (i.e., at the site of desired action).

Routes of administration include, but are not limited to, oral (e.g, by ingestion); buccal; sublingual; transdermal (including, e.g., by a patch, plaster, etc.); transmucosal (including, e.g., by a patch, plaster, etc.); intranasal (e.g., by nasal spray); ocular (e.g., by eye drops); pulmonary (e.g., by inhalation or insufflation therapy using, e.g., via an aerosol, e.g., through the mouth or nose); rectal (e.g., by suppository or enema); vaginal (e.g., by pessary); parenteral, for example, by injection, including intratumoral, subcutaneous, intradermal, intramuscular, intravenous, intra-arterial, intracardiac, intrathecal, intraspinal, intracapsular, subcapsular, intraorbital, intraperitoneal, intratracheal, subcuticular, intraarticular, subarachnoid, and intrasternal; by implant of a depot or reservoir, for example, subcutaneously or intramuscularly.

Combination Therapies

The compounds of the present invention may be administered as a sole therapy or may involve, in addition to a compound of the invention, conventional surgery or radiotherapy or chemotherapy or a targeted agent. Such chemotherapy or targeted agent may include one or more of the following categories:

(i) Antiproliferative/antineoplastic drugs and combinations thereof, as used in medical oncology, such as, but not limited to, alkylating agents (for example cis-platin, oxaliplatin, carboplatin, cyclophosphamide, nitrogen mustard, melphalan, chlorambucil, busulphan, temozolamide and nitrosoureas); antimetabolites (for example gemcitabine and antifolates such as fluoropyrimidines like 5-fluorouracil and tegafur, raltitrexed, methotrexate, cytosine arabinoside, and hydroxyurea); antitumour antibiotics (for example anthracyclines like adriamycin, bleomycin, doxorubicin, daunomycin, epirubicin, idarubicin, mitomycin-C, dactinomycin and mithramycin); antimitotic agents (for example *vinca* alkaloids like vincristine, vinblastine, vindesine and vinorelbine and taxoids like taxol and taxotere and polokinase inhibitors); and topoisomerase inhibitors (for example epipodophyllotoxins like etoposide and teniposide, amsacrine, topotecan and camptothecin);

(ii) cytostatic agents such as, but not limited to, antioestrogens (for example tamoxifen, fulvestrant, toremifene, raloxifene, droloxifene and iodoxyfene), antiandrogens (for example bicalutamide, flutamide, nilutamide and cyproterone acetate), LHRH antagonists or LHRH agonists (for example goserelin, leuprorelin and buserelin), steroid hormones, including progestogens (for example megestrol acetate) and corticosteroids (for example dexamethasone, prednisone and prednisolone), aromatase inhibitors (for example as anastrozole, letrozole, vorazole and exemestane) and inhibitors of 5α-reductase such as finasteride;

(iii) anti-invasion agents such as, but not limited to, c-Src kinase family inhibitors 4-(6-chloro-2,3-methylenedioxyanilino)-7-[2-(4-methylpiperazin-1-yl)ethoxy]-5-tetrahydropyran-4-yloxyquinazoline (AZD0530; International Patent Application WO 01/94341), N-(2-chloro-6-methylphenyl)-2-{6-[4-(2-hydroxyethyl)piperazin-1-yl]-2-methylpyrimidin-4-ylamino}thiazole-5-carboxamide (dasatinib, BMS-354825; J. Med. Chem., 2004, 47, 6658-6661), bosutinib (SKI-606), and metalloproteinase inhibitors such as marimastat, inhibitors of urokinase plasminogen activator receptor function or antibodies to Heparanase;

(iv) inhibitors of growth factor function such as, but not limited to, growth factor antibodies and growth factor receptor antibodies (for example the anti-erbB2 antibody trastuzumab [Herceptin™], the anti-EGFR antibody panitumumab, the anti-erbB1 antibody cetuximab [Erbitux, C225] and any growth factor or growth factor receptor antibodies disclosed by Stern et al. (Critical reviews in oncology/haematology, 2005, Vol. 54, pp 11-29); such inhibitors also include tyrosine kinase inhibitors, for example inhibitors of the epidermal growth factor family (for example EGFR family tyrosine kinase inhibitors such as N-(3-chloro-4-fluorophenyl)-7-methoxy-6-(3-morpholinopropoxy)quinazolin-4-amine (gefitinib, ZD1839), N-(3-ethynylphenyl)-6,7-bis(2-methoxyethoxy)quinazolin-4-amine (erlotinib, OSI-774) and 6-acrylamido-N-(3-chloro-4-fluorophenyl)-7-(3-morpholinopropoxy)-quinazolin-4-amine (CI 1033), erbB2 tyrosine kinase inhibitors such as lapatinib); inhibitors of the hepatocyte growth factor family; inhibitors of the insulin growth factor family; inhibitors of the platelet-derived growth factor family such as imatinib and/or nilotinib (AMN107); inhibitors of serine/threonine kinases (for example Ras/Raf signalling inhibitors such as farnesyl transferase inhibitors, for example sorafenib (BAY 43-9006), tipifarnib (R115777) and lonafarnib (SCH66336)), inhibitors of cell signalling through MEK and/or AKT kinases, c-kit inhibitors, abl kinase inhibitors, PI3 kinase inhibitors, Plt3 kinase inhibitors, CSF-1R kinase inhibitors, IGF receptor (insulin-like growth factor) kinase inhibitors; aurora kinase inhibitors and cyclin dependent kinase inhibitors such as CDK2 and/or CDK4 inhibitors;

(v) antiangiogenic agents such as, but not limited to, those which inhibit the effects of vascular endothelial growth factor, [for example the anti-vascular endothelial cell growth factor antibody bevacizumab (Avastin™) and for example, a VEGF receptor tyrosine kinase inhibitor such as vandetanib (ZD6474), vatalanib (PTK787), sunitinib (SU11248), axitinib (AG-013736) and pazopanib (GW 786034).

(vi) vascular damaging agents such as, but not limited to, Combretastatin A4 and compounds disclosed in International Patent Applications WO 99/02166, WO 00/40529, WO 00/41669, WO 01/92224, WO 02/04434 and WO 02/08213;

(vii) an endothelin receptor antagonist, for example zibotentan (ZD4054) or atrasentan;

(viii) antisense therapies, such as, but not limited to, those directed to targets listed above, such as ISIS 2503, an anti-ras antisense;

(ix) immunotherapy approaches, including for example cancer vaccines, antibody, viral (oncolytic viruses) and small molecule or cell therapy approaches to increase the immunogenicity of patient tumour cells and/or facilitate a cell mediated anti-tumour response. Such therapies could include, but are not limited to, OX40 agonists, cGAS-STING agonists, ENPP1 inhibitors, CD38 inhibitors, TBK1 inhibitors, A2a receptor antagonists, PI3 kinase inhibitors, TLR7/8 agonists, IDO inhibitors, Arginase inhibitors, BTK inhibitors and Bromodomain inhibitors; transduction with microbial vectors of cancer antigens, direct transduction of cancer antigens into antigen presenting cells, treatment with immune cells specific for cancer antigens (e.g. CAR-T), treatment with antibodies, antibody fragments and antibody drug conjugates that enable the immune system to recognise tumour cells.

Such conjoint treatment may be achieved by way of the simultaneous, sequential or separate dosing of the individual components of the treatment. Such combination products employ the compounds of this invention within the dosage range described hereinbefore and the other pharmaceutically-active agent within its approved dosage range.

According to this aspect of the invention there is provided a combination for use in the treatment of a cancer (for example a cancer involving a solid tumour) comprising a compound of the invention as defined hereinbefore, or a pharmaceutically acceptable salt or solvate thereof, and an anti-tumour agent.

According to this aspect of the invention there is provided a combination for use in the treatment of a proliferative condition, such as cancer (for example a cancer involving a solid tumour), comprising a compound of the invention as defined hereinbefore, or a pharmaceutically acceptable salt or solvate thereof, and any one of the anti-tumour agents listed herein above.

In a further aspect of the invention there is provided a compound of the invention or a pharmaceutically acceptable salt or solvate thereof, for use in the treatment of cancer in combination with another anti-tumour agent, optionally selected from one listed herein above.

In a further aspect of the invention there is provided a compound of the invention or a pharmaceutically acceptable salt or solvate thereof, for use in the treatment of cancer in combination with a tyrosine kinase inhibitor, optionally selected from one listed herein above.

Herein, where the term "combination" is used it is to be understood that this refers to simultaneous, separate or sequential administration. In one aspect of the invention "combination" refers to simultaneous administration. In another aspect of the invention "combination" refers to separate administration. In a further aspect of the invention "combination" refers to sequential administration. Where the administration is sequential or separate, the delay in administering the second component should not be such as to lose the beneficial effect of the combination.

According to a further aspect of the invention there is provided a pharmaceutical composition which comprises a compound of the invention, or a pharmaceutically acceptable salt or solvate thereof, in combination with an anti-tumour agent (optionally selected from one listed herein above), in association with a pharmaceutically acceptable diluent or carrier.

Combination Therapy with Immune Modulating Treatments
Immune Checkpoint Inhibitors Immune checkpoint proteins present on immune cells and/or cancer cells [e.g. CTLA4 (also known as cytotoxic T-lymphocyte-associated protein 4 and CD152), LAG3 (also known as lymphocyte-activation gene 3 and CD223), PD1 (also known as programmed cell death protein 1 and CD279), PD-L1 (also known as programmed death-ligand 1 and CD274), TIM-3 (also known as T-cell immunoglobulin mucin-3) and TIGIT (also known as T-cell Immunoreceptor with Ig and ITIM domains) are molecular targets that have been found to play an important role in regulating anti-tumour immune responses. Inhibitors of these immune checkpoint proteins (e.g. CTLA4, LAG3, PD1, PD-L1, TIM-3 and/or TIGIT inhibitors) promote an anti-tumour immune response that can be utilised to effectively treat certain forms of cancer.

Immune Stimulators

Monoclonal antibodies, bispecific antibodies, recombinant ligands and small molecule therapeutics that bind to stimulatory receptors on immune cells can facilitate an effective anti-tumour response. Such receptors may be involved in cell-to-cell contact for example contact between tumour cell and immune cell or between two types of immune cells, other receptors may bind to soluble factors that stimulate an immune response. In one such embodiment antibodies, bispecifics, recombinant proteins or small molecule therapeutics can activate stimulatory receptors, including, but not limited to, 4-1BB, OX40, cGAS-STING, CD27, CD40, and DR3 that enhance anti-tumour immunity.

Modulators of antigen processing may facilitate the presentation of neoantigenic peptides on the cell surface to enhance an effective anti-tumour response. In one such embodiment inhibitors of the endoplasmic reticulum aminopeptidases ERAP1 and ERAP2 may stimulate anti-tumour immunity.

In one aspect, the present invention relates to a combination comprising a compound as defined herein, or a pharmaceutically acceptable salt thereof, and an immune checkpoint inhibitor or immune stimulator as defined herein, or a pharmaceutically acceptable salt thereof, for use in the treatment of a proliferative disorder.

In another aspect, the present invention relates to a use of a combination comprising a compound as defined herein, or a pharmaceutically acceptable salt thereof, and an immune checkpoint inhibitor or immune stimulator as defined herein, or a pharmaceutically acceptable salt thereof, in the manufacture of a medicament for treating of a proliferative disorder.

In another aspect, the present invention relates to a method of treating of a proliferative disorder in a subject in need thereof comprising administering to said subject a combination comprising a compound as defined herein, or a pharmaceutically acceptable salt thereof, and an immune checkpoint inhibitor or immune stimulator as defined herein, or a pharmaceutically acceptable salt thereof, as defined herein.

In another aspect, the present invention relates to a compound as defined herein, or a pharmaceutically acceptable salt thereof, as defined herein for use in the treatment of a proliferative disorder, wherein the compound, or a pharmaceutically acceptable salt thereof, is for simultaneous, separate or sequential administration with an immune checkpoint inhibitor, or immune stimulator, or a pharmaceutically acceptable salt thereof.

In another aspect, the present invention relates to an immune checkpoint inhibitor or immune stimulator, or a pharmaceutically acceptable salt thereof, for use in the treatment of a proliferative disorder, wherein the immune checkpoint inhibitor is for simultaneous, separate or sequential administration with a compound as defined herein, or a pharmaceutically acceptable salt thereof, as defined herein.

In another aspect, the present invention relates to a use of a compound as defined herein, or a pharmaceutically acceptable salt thereof, as defined herein in the manufacture of a medicament for treating a proliferative disorder, wherein the medicament is for simultaneous, separate or sequential administration with an immune checkpoint inhibitor or immune stimulator, or a pharmaceutically acceptable salt thereof.

In another aspect, the present invention relates to a use of an immune checkpoint inhibitor or immune stimulator, or a pharmaceutically acceptable salt thereof, in the manufacture of a medicament for treating a proliferative disorder, wherein the medicament is for simultaneous, separate or sequential administration with a compound as defined herein, or a pharmaceutically acceptable salt thereof.

In another aspect, the present invention relates to a method of treating a proliferative disorder comprising administering to a subject in need thereof a therapeutically effective amount of a compound as defined herein, or a pharmaceutically acceptable salt thereof, as defined herein and an immune checkpoint inhibitor or immune stimulator as defined herein, or a pharmaceutically acceptable salt thereof, either sequentially, separately or simultaneously Any immune checkpoint inhibitor or immune stimulator may be used in the combination therapy defined herein.

In one embodiment, the immune stimulator is selected from a 4-1BB stimulator, a OX40 stimulator, a CD27 stimulator, a CD40 stimulator, and a DR3 stimulator. In another embodiment the immune checkpoint inhibitor is selected from a PD1-inhibitor, a PD-L1 inhibitor, a LAG3 inhibitor, CTLA-4 inhibitor, a TIM-3 inhibitor and/or a TIGIT inhibitor. In a particular embodiment, the immune checkpoint inhibitor is a PD1 or PD-L1 inhibitor.

PD-1 is a cell surface receptor protein present on immune cells such as T cells. PD-1 plays an important role in down-regulating the immune system and promoting self-tolerance by suppressing T cell activation. The PD-1 protein is an immune checkpoint that guards against autoimmunity through a dual mechanism of promoting apoptosis (pro-grammed cell death) in antigen specific T cells in lymph nodes, while simultaneously reducing apoptosis in regula-tory T cells (anti-inflammatory suppressive T cells).

PD-1 therefore inhibits the immune system. This prevents autoimmune diseases, but it can also prevent the immune system from killing cancer cells.

PD1 binds two ligands, PD-L1 and PD-L2. PD-L1 is of particular interest as it is highly expressed in several cancers and hence the role of PD1 in cancer immune evasion is well established. Monoclonal antibodies targeting PD-1 that boost the immune system are approved or are being devel-oped for the treatment of cancer. Many tumour cells express PD-L1, an immunosuppressive PD-1 ligand; inhibition of the interaction between PD-1 and PD-L1 can enhance T-cell responses in vitro and mediate preclinical antitumour activ-ity. This is known as immune checkpoint blockade.

Examples of drugs that target PD-1 include pembroli-zumab (Keytruda) and nivolumab (Opdivo). These drugs have been shown to be effective in treating several types of cancer, including melanoma of the skin, non-small cell lung cancer, kidney cancer, bladder cancer, head and neck can-cers, and Hodgkin lymphoma. They are also being studied for use against many other types of cancer. Examples of drugs in development include BMS-936559 (Bristol Myers Squibb), MGA012 (MacroGenics) and MEDI-0680 (Med-Immune).

Examples of drugs that inhibit PD-L1 include atezoli-zumab (Tecentriq), avelumab (Bavencio) and durvalumab (Imfinzi). These drugs have also been shown to be helpful in treating different types of cancer, including bladder cancer, non-small cell lung cancer, and Merkel cell skin cancer (Merkel cell carcinoma). They are also being studied for use against other types of cancer.

Examples of LAG3 inhibitors include BMS-986016/Relatlimab, TSR-033, REGN3767, MGDO13 (bispecific DART binding PD-1 and LAG-3), GSK2831781 and LAG525.

Examples of CTLA-4 inhibitors include MDX-010/Ipili-mumab, AGEN1884, and CP-675,206/Tremelimumab.

Examples of TIM-3 inhibitors include MBG453 (Novar-tis), TSR-022 (Tesaro), and LY3321367 (Lilly).

Examples of TIGIT inhibitors include Tiragolumab (MTIG7192A; RG6058; Genentech/Roche), AB154 (Arcus Bioscience), MK-7684 (Merck), BMS-986207 (Bristol-My-ers Squibb), ASP8374 (Astellas Pharma; Potenza Therapeu-tics).

In one embodiment, the immune checkpoint inhibitor is selected from BMS-986016/Relatlimab, TSR-033, REGN3767, MGDO13 (bispecific DART binding PD-1 and LAG-3), GSK2831781, LAG525, MDX-010/Ipilimumab, AGEN1884, and CP-675,206/Tremelimumab, pembroli-zumab, nivolumab, atezolizumab, avelumab, durvalumab, MBG453, TSR-022, LY3321367, Tiragolumab (MTIG7192A; RG6058), AB154, MK-7684, BMS-986207, and/or ASP8374 or a pharmaceutically acceptable salt or solvate thereof.

Combination Therapy with DNA Damage Response Modu-lators

The compounds of the present invention are particularly suited to use in combination with agents that act as DNA damage response modulators, e.g. PARP inhibitors, ATM inhibitors and ATR inhibitors.

In one aspect, the present invention relates to a combi-nation comprising a compound as defined herein, or a pharmaceutically acceptable salt thereof, and a DNA dam-age response modulator (e.g. a PARP inhibitor, an ATM inhibitor and/or an ATR inhibitor), or a pharmaceutically acceptable salt thereof, for use in the treatment of a prolif-erative disorder.

In another aspect, the present invention relates to a use of a combination comprising a compound as defined herein, or a pharmaceutically acceptable salt thereof, and a DNA damage response modulator (e.g. a PARP inhibitor, an ATM inhibitor and/or an ATR inhibitor), or a pharmaceutically acceptable salt thereof, in the manufacture of a medicament for treating of a proliferative disorder.

In another aspect, the present invention relates to a method of treating of a proliferative disorder in a subject in need thereof comprising administering to said subject a combination comprising a compound as defined herein, or a pharmaceutically acceptable salt thereof, and a DNA dam-age response modulator (e.g. a PARP inhibitor, an ATM inhibitor and/or an ATR inhibitor), or a pharmaceutically acceptable salt thereof, as defined herein.

In another aspect, the present invention relates to a compound as defined herein, or a pharmaceutically accept-able salt thereof, as defined herein for use in the treatment of a proliferative disorder, wherein the compound, or a pharmaceutically acceptable salt thereof, is for simultane-ous, separate or sequential administration with a DNA damage response modulator (e.g. a PARP inhibitor, an ATM inhibitor and/or an ATR inhibitor), or a pharmaceutically acceptable salt thereof.

In another aspect, the present invention relates to a use of a compound as defined herein, or a pharmaceutically accept-able salt thereof, as defined herein in the manufacture of a medicament for treating a proliferative disorder, wherein the medicament is for simultaneous, separate or sequential administration with a DNA damage response modulator (e.g. a PARP inhibitor, an ATM inhibitor and/or an ATR inhibitor), or a pharmaceutically acceptable salt thereof.

In another aspect, the present invention relates to a method of treating a proliferative disorder comprising administering to a subject in need thereof a therapeutically effective amount of a compound as defined herein, or a pharmaceutically acceptable salt thereof, as defined herein and a DNA damage response modulator (e.g. a PARP inhibitor, an ATM inhibitor and/or an ATR inhibitor), or a pharmaceutically acceptable salt thereof, either sequentially, separately or simultaneously Any DNA damage response modulator (e.g. a PARP inhibitor, an ATM inhibitor and/or an ATR inhibitor) may be used in the combination therapy defined herein.

Probe Compounds

The present invention further relates to novel probe molecules formed by linking a compound of the present invention as defined herein to a detection moiety via a linker group. The present invention also relates to methods of synthesising these novel probe molecules and to their use in assays and screens for determining the binding of a test molecule to the ATP-binding site of a target protein, such as, for example, the Mismatch Repair (MMR) component proteins PMS2 and MLH1, or for determining the location and/or quantity of such target proteins in a biological sample.

In one aspect, the present invention provides a probe compound comprising compound of the Formula (I), or sub-formulae (I-I) to (I-XII), or a salt thereof, bound to a detection moiety by a linker.

In another aspect, the present invention provides a method of synthesising a probe compound, or a salt thereof, as defined herein.

In another aspect, the present invention provides the use of a probe compound, or a salt thereof, as defined herein in a displacement assay to determine the binding affinity of a test molecule to the ATP-binding site of a target protein. In an embodiment, the target protein is selected from MLH1, PMS2 or HSP90. In a particular embodiment, the target protein is MLH1 or PMS2.

In another aspect, the present invention provides a probe compound, or a salt thereof, for use in a displacement assay to determine the binding affinity of a test molecule for the ATP-binding site of a target protein. In an embodiment, the target protein is selected from MLH1, PMS2 or HSP90. In a particular embodiment, the target protein is MLH1 or PMS2.

In another aspect, the present invention provides an assay for determining the binding affinity of a test molecule for the ATP-binding site of a target protein, the assay comprising:
 (i) incubating a test molecule with the target protein in the presence of a probe compound, or a salt thereof, as defined herein; and
 (ii) determining whether a probe compound is displaced from the ATP-binding site of the target protein.

In an embodiment, the target protein is selected from MLH1, PMS2 or HSP90. In a particular embodiment, the target protein is MLH1 or PMS2.

In another aspect, the present invention provides a method for determining the binding affinity of a test molecule for the ATP-binding site of a target protein, the assay comprising:
 (i) incubating a test molecule with the target protein in the presence of a probe compound, or a salt thereof, as defined herein; and
 (ii) determining whether a probe compound is displaced from the ATP-binding site of the target protein.

In another aspect, the present invention provides an assay for determining the location and/or quantity of a target protein present within a biological sample, the assay comprising:
 (i) contacting the biological sample with a probe compound, or a salt thereof, as defined herein; and
 (ii) determining location and/or quantity of the compound present within the sample by detecting the location and/or intensity of the detection moieties of the compounds of formula I present within the biological sample.

Suitably, the present invention relates to a probe compound of formula B, or a salt thereof:

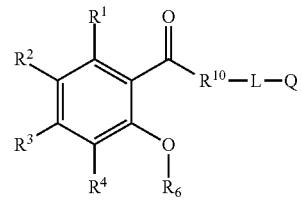

B wherein:
 $R^1$, $R^2$, $R^3$, $R^4$, and $R^6$ are each as defined herein;
 $R^{10}$ is a group $R^{10}$ as defined herein connected to L;
 L is a linker; and
 Q is a detection moiety.

The linker group L may be any suitable linker moiety that connects the detection moiety Q to the remainder of the probe compound of formula B.

Suitably, the linker group L is 3 to 30 atoms in length, more suitably, 4 to 20 atoms in length and even more suitably 5 to 18 atoms in length. In a particular group of probe compounds of formula I or II defined herein, L is 5 to 12 atoms in length.

The detection moiety Q can be any moiety that can enable the probe compound of formula I to be detected and quantified. As described further below, the probe compounds of formula I defined herein are designed to be used in displacement assays, whereby the ability of a test compound to displace the probe compound of formula I from the ATP-binding site of target protein (e.g. MLH1 or PMS2) can be used to determine the binding affinity of that test compound for the ATP-binding site of the target protein. Thus, the detection moiety Q can be any moiety that can be readily detected and quantified. In certain circumstances, the detection moiety Q enables any probe compounds of formula I that have been displaced (i.e. is "unbound") from the ATP-binding site of the target protein to be detected and quantified. In certain embodiments of the invention, this may be achieved by collecting any displaced or "unbound" compound of formula I from the test sample and assaying the sample to determine how much unbound probe compound is present. This will in turn give an indication of how much of the probe compound present in the sample has been displaced by the test compound.

It will therefore be appreciated that the nature of detection moiety Q is not critical as long as it can be used to enable the amount of the probe compound of formula I present in a sample to be determined. A person skilled in the art will be able to select a suitable detection moiety Q and a suitable methodology for detecting and quantifying the amount of the compound of formula I in a sample, in particular to detect the amount of the probe compound of formula I that has been displaced from the ATP binding site of a target protein by a test compound.

Suitably, the detection moiety Q is selected from the group consisting of a fluorophore, an oligonucleotide, a biomolecule, a molecular sensor, a protein, or a peptide.

In embodiments where the detection moiety Q is an oligonucleotide, a biomolecule, a molecular sensor, a protein, or a peptide, then any suitable technique known in the art for detecting and quantifying the amount of the oligonucleotide, biomolecule, molecular sensor, protein, or peptide present may be utilised. For example, a fluorescently labelled secondary probe may be used that is capable of specifically binding to the detection moiety Q of the probe compound of formula I and, once any excess of the secondary probe has been removed, the amount of binding of the secondary probe to detection moiety Q of the compound for formula I can be detected and quantified, thereby enabling the amount of the probe compound of formula I to be determined.

For example, if Q is an oligonucleotide, then a secondary probe having a suitable detectable label, e.g. a fluorophore or radio-label, and a complimentary oligonucleotide sequence capable of hybridising to Q can be used to detect and quantify the amount of the probe compound of formula I present in sample (and suitably the amount of the probe compound displaced from the ATP-binding site of the target protein by a test compound). Similarly, if Q is a protein or peptide, then a secondary probe may be an antibody capable of selectively binding to that protein or peptide and a suitable detectable label, e.g. a fluorophore or radio-label.

More suitably, the detection moiety Q is a fluorophore. In such cases, the compound for formula I can be used in a fluorescence polarisation assay. In a particular group of probe compounds of formula I, the detection moiety Q is a fluorophore selected from the group consisting of AlexaFluor dyes, Cyanine dyes, fluorescein, BODIPY or BODIPY derivatives (e.g. BODIPY TMR), TAMRA, Oregon Green dyes, FITC, Ru(bpy)3, Rhodamine dyes, Acridine orange, and Texas Red. In a further group of probe compounds of formula I, the detection moiety Q is a fluorophore selected from the group consisting of AlexaFluor-647, AlexaFluor-633, AlexaFluor-594, AlexaFluor-488, Cyanine-5B, Cyanine-3B, Fluorescein, BODIPY TMR, TAMRA, Oregon Green 488, Oregon Green 514, FITC, Ru(bpy)3, Rhodamine dyes, Acridine orange, and Texas Red.

A suitable salt of a probe compound of the invention is, for example, an acid-addition salt of a compound of the invention which is sufficiently basic, for example, an acid-addition salt with, for example, an inorganic or organic acid, for example hydrochloric, hydrobromic, sulfuric, phosphoric, trifluoroacetic, formic, citric methane sulfonate or maleic acid. In addition, a suitable salt of a compound of the invention which is sufficiently acidic is an alkali metal salt, for example a sodium or potassium salt, an alkaline earth metal salt, for example a calcium or magnesium salt, an ammonium salt or a salt with an organic base.

The present invention also encompasses probe compounds of the invention as defined herein which comprise one or more isotopic substitutions. For example, H may be in any isotopic form, including $^1H$, $^2H$ (D) and $^3H$ (T); C may be in any isotopic form, including $^{12}C$, $^{13}C$ and $^{14}C$; and O may be in any isotopic form, including $^{16}O$ and $^{18}O$; and the like.

It is also to be understood that certain probe compounds of the formula (I) may exist in solvated as well as unsolvated forms such as, for example, hydrated forms.

It is also to be understood that certain probe compounds of the formula (I) may exhibit polymorphism, and that the invention encompasses all such polymorphic forms.

Certain probe compounds of formula (I) may also exist in a number of different tautomeric forms and references to compounds of the formula (I) include all such forms.

Synthesis of the Probe Compounds

In another aspect, the present invention provides a method of synthesising a probe compound of formula B, or a salt thereof, as defined herein.

The probe compounds of the present invention can be prepared by any suitable technique known in the art.

EXAMPLES

While specific embodiments of the invention have been described herein for the purpose of reference and illustration, various modifications will be apparent to a person skilled in the art without departing from the scope of the invention as defined by the appended claims. Reference is made to the accompanying figures, in which:

ABBREVIATIONS

Figure 1:
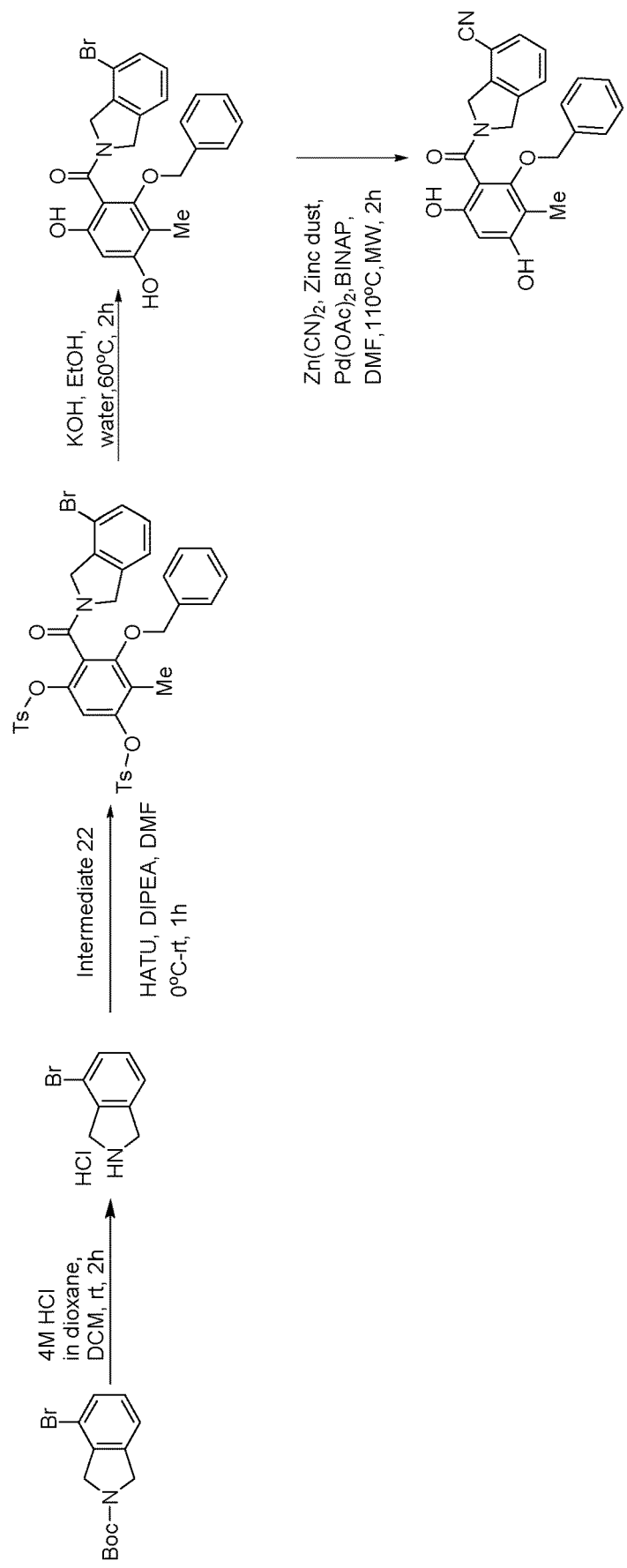
FIG. 1 shows the reaction scheme for 2-(2-(benzyloxy)-4,6-dihydroxy-3-methylbenzoyl)isoindoline-4-carbonitrile (Example 82)

Boc for tert-butyloxycarbonyl
DAST for diethylaminosulfur trifluoride
DBU for 1,8-diazabicyclo(5.4.0)undec-7-ene
DCC for dicyclohexylcarbodiimide
DCE for 1,1-dichloroethane
DCM for dichloromethane
DEA for diethanolamine
DEAD for diethyl azodicarboxylate
DIAD for diisopropyl azodicarboxylate
DIBAL for Diisobutylaluminium hydride
DIPEA for N,N-diisopropylethylamine, Hünig's base
DMA for N,N-dimethylacetamide
DMAP for 4-(dimethylamino) pyridine
DMF for N,N-dimethylformamide
DMSO for dimethylsulfoxide.
EDC for 1-Ethyl-3-(3-dimethylaminopropyl)carbodiimide
EtOAc for ethyl acetate
h for hours
HATU for N-[(dimethylamino)-1H-1,2,3-triazolo-[4,5-b]pyridin-1-ylmethylene]-N-methylmethanaminium hexafluorophosphate N-oxide
HBTU for (1H-benzotriazol-1-yloxy)(dimethylamino)-N,N-dimethylmethaniminium hexafluorophosphate
HOBT for N-hydroxybenzotriazole
HPLC for High Pressure Liquid Chromatography.
LAH for lithium aluminium hydride
IPA for isopropyl alcohol
LCMS for Liquid Chromatography-Mass Spectrometry
LDA for Lithium diisopropylamide
LiHMDS for Lithium bis(trimethylsilyl)amide
mCPBA for meta-chloroperoxybenzoic acid
MI for Molecular Ion
Min for minutes
$MgSO_4$ anhydrous magnesium sulfate
MW for microwave
NBS for N-bromosuccinamide
NCS for N-chlorosuccinamide
NFOBS for N-fluoro-o-benzenedisulfonimide
NFSI for N-fluorobenzenesulfonimide
NHS for N-hydroxysuccinimide
NIS for N-iodosuccinamide
NMM for N-methylmorpholine
NMP for 1-methyl-2-pyrrolidinone
NMR for Nuclear Magnetic Resonance.
$PdCl_2(PPh_3)_2$ for Bis(triphenylphosphine)palladium chloride
$Pd(dppf)_2Cl_2$ for [1,1'-bis(diphenylphosphino)ferrocene]dichloropalladium(II)
$Pd(dppf)_2Cl_2 \cdot DCM$ for [1,1'-bis(diphenylphosphino)ferrocene]dichloropalladium(II) complex with DCM
$(Pd(dba)_2)$ for bis(dibenzylideneacetone)palladium
Rbf for round bottomed flask
RT for Retention Time.
SCX-2 for a silica-based sorbent with a chemically bonded propylsulfonic acid functional group
SFC for supercritical fluid chromatography
TBAF for tetra-n-butylammonium fluoride
TBDMS for tert-butyldimethylsilyl
TFAA for trifluoroacetic anhydride
TFA for trifluoroacetic acid
THF for tetrahydrofuran
TPP for tripotassium phosphate
Ts for toluenesulfonyl
XPhos-Pd-G1 for 2-Dicyclohexylphosphino-2',4',6'-triisopropyl-1,1'-biphenyl)[2-(2-aminoethyl)phenyl)]palladium(II) chloride
XPhos-Pd-G2 for Chloro(2-dicyclohexylphosphino-2',4',6'-triisopropyl-1,1'-biphenyl)[2-(2'-amino-1,1'-biphenyl)]palladium(II)

Analytical Methods

Commercially available starting materials, reagents and dry solvents were used as supplied. Flash column chromatography or glass column chromatography was performed using Merck silica gel 230-400 mesh size. Flash chromatography was also performed on combi-flash RF Teledyne Isco machine. Preparative TLC was performed on Merck plates.

Liquid Chromatography-Mass Spectrometry Methods

Method-A

Waters Acquity UPLC with binary solvent manager, PDA detector and Acquity QDA performance mass detector, column: X-Bridge BEH C18, 50×2.1 mm, 2.5 micron, column temperature: 35° C., auto sampler temperature: 5° C., mobile phase A: 0.1% (v/v) formic acid in water (pH=2.70), Mobile Phase B: 0.1% formic acid (v/v) in water:acetonitrile (10:90), mobile phase gradient details: t=0 min (97% A, 3% B) flow: 0.8 mL/min; t=0.75 min (97% A, 3% B) flow: 0.8 mL/min; gradient to t=2.7 min (2% A, 98% B) flow: 0.8 mL/min; gradient to t=3 min (0% A, 100% B) flow: 1 mL/min; t=3.5 min (0% A, 100% B) flow: 1 mL/min; gradient to t=3.51 min (97% A, 3% B) flow: 0.8 mL/min; end of run at t=4 min (97% A, 3% B), Flow rate: 0.8 mL/min, analysis time 4 min. Mass detector parameter: ionization mode was cycled through positive and negative modes with cone voltage 10 V and 30 V and 0.8 kV capillary voltage, temperature of source and probe were 120° C. and 600° C. respectively.

Method-B

Waters Acquity with PDA detector and SQ Detector, column: X-Bridge BEH C18, 50×2.1 mm, 2.5 micron, column temperature: 35° C., auto sampler temperature: 5° C., mobile phase A: 5 mM ammonium bicarbonate in water (pH=7.35), mobile phase B: acetonitrile; mobile phase gradient details: t=0 min (97% A, 3% B) flow: 0.5 mL/min; t=0.2 min (97% A, 3% B) flow: 0.5 mL/min; gradient to t=2.7 min (2% A, 98% B) flow: 0.5 mL/min; gradient to t=3 min (0% A, 100% B) flow: 0.7 mL/min; t=3.5 min (0% A, 100% B) flow: 0.7 mL/min; gradient to t=3.51 min (97% A, 3% B) flow: 0.5 mL/min; end of run at t=4 min (97% A, 3% B), flow rate: 0.5 mL/min, analysis time 4 min. Mass detection parameter: ionization mode was cycled through positive and negative mode with cone voltage 10 V and 30 V and 3.25 kV capillary voltage, temperature of source and probe were 120° C. and 400° C. respectively.

Method-C

Waters Acquity UPLC with binary solvent manager, PDA detector and Acquity QDA performance mass detector, column: YMC Tri-art C18, 50×2 mm, 1.9 micron, column temperature: 35° C., auto sampler temperature: 5° C., mobile phase A: 0.1% (v/v) formic acid in water (pH=2.70), Mobile Phase B: 0.1% formic acid (v/v) in water:acetonitrile (10:90), mobile phase gradient details: t=0 min (97% A, 3% B) flow: 0.8 mL/min; t=0.75 min (97% A, 3% B) flow: 0.8 mL/min; gradient to t=2.7 min (2% A, 98% B) flow: 0.8 mL/min; gradient to t=3 min (0% A, 100% B) flow: 1 mL/min; t=3.5 min (0% A, 100% B) flow: 1 mL/min; gradient to t=3.51 min (97% A, 3% B) flow: 0.8 mL/min; end of run at t=4 min (97% A, 3% B), Flow rate: 0.8 mL/min, analysis time 4 min. Mass detector parameter: ionization mode was cycled through positive and negative modes with cone voltage 10 V and 30 V and 0.8 kV capillary voltage, temperature of source and probe were 120° C. and 600° C. respectively.

Method-D

Waters Acquity UPLC with quaternary solvent manager, SQ detector and Acquity QDA mass detector, column: X-Bridge BEH C18, 50*2.1 mm, 2.5 micron, column temperature: 35° C., auto sampler temperature: 5° C., mobile phase A: 0.1% (v/v) Formic acid in water (pH=2.70), mobile phase B: 0.1% (v/v) formic acid in water:acetonitrile (10:90), mobile phase gradient details: t=0 min (97% A, 3% B) flow: 0.8 mL/min; t=0.75 min (97% A, 3% B) flow: 0.8 mL/min; gradient to t=2.7 min (2% A, 98% B) flow: 0.8 mL/min; gradient to t=3 min (0% A, 100% B) flow: 1 mL/min; t=3.5 min (0% A, 100% B) flow: 1 mL/min; gradient to t=3.51 min (97% A, 3% B) flow: 0.8 mL/min; end of run at t=4 min (97% A, 3% B), Flow rate: 0.8 mL/min, analysis time 4 min. Mass detector parameter: ESI capillary probe, ionization mode cycled through positive and negative modes with cone voltage 10 V and 30V and 0.8 kV capillary voltage, temperature of source and probe were 120° C. and 400° C. respectively.

Method-E

Waters Acquity UPLC with binary solvent manager, PDA detector and Acquity QDA performance mass detector, column: Welch Xtimate C18, 50*2.1 mm, 1.8 micron, column temperature: 35° C., auto sampler temperature: 5° C., mobile phase A: 0.1% (v/v) formic acid in water (pH=2.70), Mobile Phase B: 0.1% formic acid (v/v) in water:acetonitrile (10:90), mobile phase gradient details: t=0 min (97% A, 3% B) flow: 0.8 mL/min; t=0.75 min (97% A, 3% B) flow: 0.8 mL/min; gradient to t=2.7 min (2% A, 98% B) flow: 0.8 mL/min; gradient to t=3 min (0% A, 100% B) flow: 1 mL/min; t=3.5 min (0% A, 100% B) flow: 1 mL/min; gradient to t=3.51 min (97% A, 3% B) flow: 0.8 mL/min; end of run at t=4 min (97% A, 3% B), Flow rate: 0.8 mL/min, analysis time 4 min. Mass detector parameter: ionization mode was cycled through positive and negative modes with cone voltage 10 V and 30 V and 0.8 kV capillary voltage, temperature of source and probe were 120° C. and 600° C. respectively.

NMR $^1$H Nuclear magnetic resonance (NMR) spectroscopy was carried out using a Bruker Avance-400 instrument operating at 400 MHz using the stated solvent at room temperature unless otherwise stated. Samples were prepared as solutions in a suitable deuterated solvent and referenced to the appropriate internal non-deuterated solvent peak or tetramethylsilane. Chemical shifts were recorded in ppm (δ) downfield of tetramethylsilane. In all cases, NMR data were consistent with the proposed structures. Characteristic chemical shifts (δ) are given in parts-per-million using conventional abbreviations for designation of major peaks: e.g. s, singlet; d, doublet; t, triplet; q, quartet; dd, doublet of doublets; dt, doublet of triplets; m, multiplet; br, broad.

Purification Methods

Preparative Purification by Reverse Phase HPLC

Preparatory HPLC Method-A

Shimadzu Prep-20-AD with binary pump with UV/Visible wave-length detector, Column: C18, 250×20 mm, 5 micron, column temperature: room temp., mobile phase A: 0.1% formic acid in water, mobile phase B: Acetonitrile:Methanol:2-Propanol(65:25:10); mobile phase gradient details: t=0 min (55% A, 45% B); t=17 min (55% A, 45% B); gradient to t=17.01 min (2% A, 98% B); t=19 min (2% A, 98% B); gradient to t=19.01 min (55% A, 45% B); end of run at t=21 min (55% A, 45% B), flow rate: 27 mL/min, analysis time 21 min.

Preparatory HPLC Method-B

Shimadzu Prep-20-AD with binary pump with UV/Visible wave-length detector, Column: C18, 250*20 mm, 5 micron, column temperature: room temp., mobile phase A: 0.1% formic acid in water, mobile phase B: Acetonitrile; mobile phase gradient details: t=0 min (72% A, 28% B); t=19 min (72% A, 28% B); gradient to t=19.01 min (2% A, 98% B); t=21 min (2% A, 98% B); gradient to t=21.01 min (72% A, 28% B); end of run at t=24 min (72% A, 28% B), flow rate: 20 mL/min, analysis time 24 min.

Preparatory HPLC Method-C

Shimadzu LC20AP purification system with UV detector. Column: YMC-Actus Triart prep 250*20 mm, 5 micron, room temperature. Compounds eluted with: Mobile phase A: 0.1% Formic acid in Milli Q water, mobile phase B: Acetonitrile; mobile phase gradient details: t=0 min (65% A, 35% B); gradient to t=17 min (35% A, 65% B); t=17.01 min (2% A, 98% B); gradient to t=19 min (2% A, 98% B); t=19.01 min (65% A, 35% B) to t=21 min (65% A, 35% B); flow rate=20 ml/min; analysis time 21 min.

Chiral Prep HPLC Purification Methods

The enantiomeric separation of compounds was achieved by Chiral Prep HPLC purification methods.

Below is a list of Chiral Prep HPLC purification methods and conditions used to resolve enantiomers or to determine enantiomeric purity (ee).

| Chiral Prep HPLC purification methods | Conditions for chiral resolution or ee determination |
|---|---|
| Method-A | Waters binary gradient with 600-controller pump with Waters 2487-UV/Visible wave-length detector, Column: YMC-CHIRAL ART CELLULOSE-SC, 250*20 mm, 5 micron, column temperature: room temp., mobile phase A: n-Heptane, mobile phase B: 2-propanol; with isocratic flow A:B~70:30, flow rate: 17 mL/min, analysis time 55 min. |

Synthesis

Several methods for the chemical synthesis of heterocyclic carboxamide compounds of the present application are described herein. These and/or other well-known methods may be modified and/or adapted in various ways to facilitate the synthesis of additional compounds within the scope of the present application and claims. Such alternative Methods and modifications should be understood as being within the spirit and scope of this application and claims. Accordingly, Methods set forth in the following descriptions, Schemes and Examples are intended for illustrative purposes and are not to be construed as limiting the scope of the disclosure.

In one approach (Scheme 1), compounds of formula [I] may be prepared by the reaction of a substituted aromatic carboxylic acid of formula [II] with oxalyl chloride or thionyl chloride in a solvent such as DCM, with an amine of general formula [III] in the presence of a tertiary amine base such as $Et_3N$, DIPEA or NMM. The reaction is suitably conducted at RT. After reaction work up, typically by liquid-liquid extraction, the reaction product is purified by flash column chromatography, reverse phase preparative HPLC or re-crystallisation (Method A). Compounds of compounds of formula [I] may also be prepared by the reaction of a substituted aromatic carboxylic acid of formula [II] with an amine of general formula [III] and a suitable coupling agent such as HBTU or HATU in a polar aprotic solvent such as DMA or DMF in the presence of a tertiary amine base such as $Et_3N$, DIPEA or NMM. After reaction work up, typically by liquid-liquid extraction, the reaction product is purified by flash column chromatography, reverse phase preparative HPLC or re-crystallisation (Method B). The bis-tosyl protected intermediate (from Method A or B) is then subject to base induced deprotection with a suitable base such as $K_2CO_3$ or KOH in a suitable protic solvent such as MeOH or EtOH. The reaction is suitably conducted at high temperature. After reaction work up, typically by liquid-liquid extraction, the reaction product is purified by flash column chromatography, reverse phase preparative HPLC or re-crystallisation, to yield compounds of general the Formula [I]

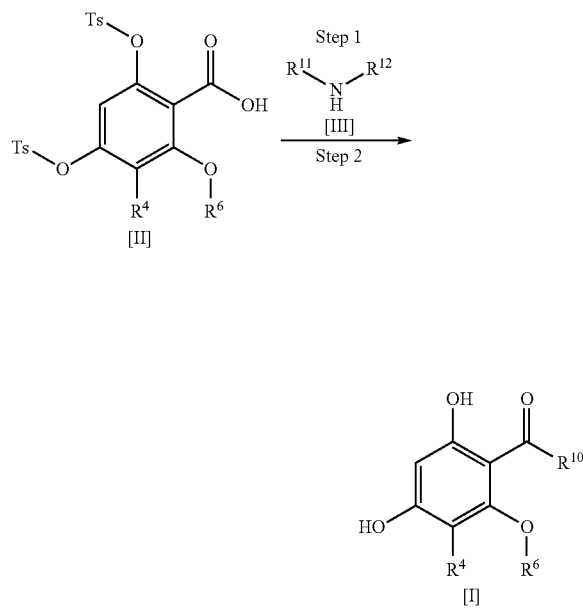

Scheme 1

Example 1: [2,4-dihydroxy-6-(pyrimidin-2-yl-methoxy)phenyl]-pyrrolidin-1-yl-methanone

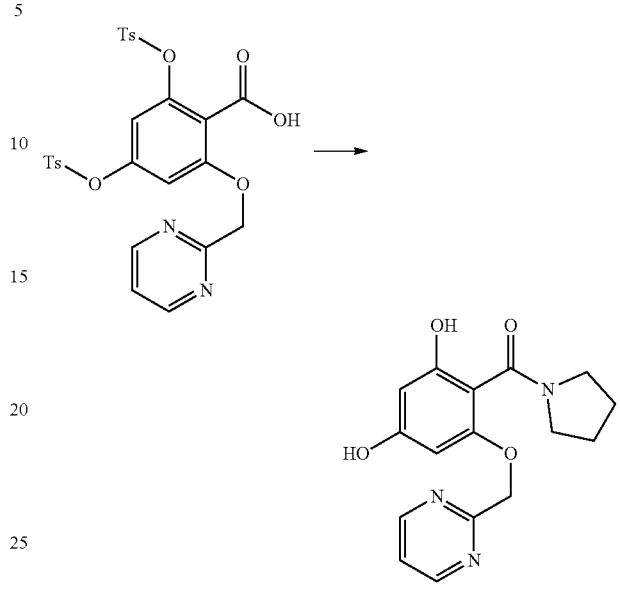

Example 1

Method 1

Step-1: 5-(pyrimidin-2-ylmethoxy)-4-(pyrrolidine-1-carbonyl)-1,3-phenylene bis(4-methylbenzene-sulfonate) (Intermediate 40)

To a solution of 2-(pyrimidin-2-ylmethoxy)-4,6-bis(tosyloxy)benzoic acid (Intermediate 25) (0.3 g, 0.525 mmol, 1 eq) in DMF (3 mL) were added HATU (0.29 g, 0.788 mmol, 1.5 eq), DIPEA (0.135 g, 1.051 mmol, 2.0 eq) and pyrrolidine (0.041 g, 0.578 mmol, 1.0 eq) at 0° C. under a nitrogen atmosphere. The reaction mixture was stirred at 0° C. for 30 min. The resulting reaction mixture was diluted with water (40 mL) and extracted with ethyl acetate (4×50 mL). The combined organic layer was dried over $Na_2SO_4$ and concentrated under vacuum. The crude material was purified by flash chromatography (product eluted with 15% MeOH in DCM) yielding 5-(pyrimidin-2-ylmethoxy)-4-(pyrrolidine-1-carbonyl)-1,3-phenylene bis(4-methylbenzenesulfonate) (Intermediate 40) (0.19 g, 58% yield).

$^1$H NMR (DMSO-d6, 400 MHz): δ 1.73-1.75 (m, 4H), 2.42 (s, 3H), 2.45 (s, 3H), 3.40-3.50 (m, 4H), 5.26 (d, J=3.2 Hz, 2H), 6.54 (d, J=1.6 Hz, 1H), 6.70 (d, J=2.0 Hz, 1H), 7.43-7.53 (m, 5H), 7.65-7.41 (m, 4H), 8.80 (d, J=4.8 Hz, 2H). LCMS (Method A): 2.204 min, MS: ES+624.20 (M+1)

Step-2: (2,4-dihydroxy-6-(pyrimidin-2-ylmethoxy) phenyl)(pyrrolidin-1-yl)methanone To a solution of 5-(pyrimidin-2-ylmethoxy)-4-(pyrrolidine-1-carbonyl)-1,3-phenylene bis(4-methylbenzenesulfonate) (Intermediate 40) (0.6 g, 0.481 mmol, 1 eq) in EtOH (0.6 mL) was added dropwise a solution of KOH (1.07 g, 19.24 mmol, 40 eq) in water (0.5 mL) at room temperature. The reaction mixture was heated at 80° C. for 2 h cooled, poured into ice-cold water (80 mL) and extracted with ethyl acetate (4×80 mL). The combined organic layer was dried over Na$_2$SO$_4$ and concentrated under vacuum. The crude material was purified by flash chromatography (product eluted with 7% MeOH in DCM) yielding (2,4-dihydroxy-6-(pyrimidin-2-ylmethoxy)phenyl)(pyrrolidin-1-yl)methanone (0.045 g, 15% Yield).

$^1$H NMR (DMSO-d6, 400 MHz): δ 1.75-1.81 (m, 4H), 3.21-3.23 (m, 2H), 3.31-3.33 (m, 2H), 5.16 (s, 2H), 5.79 (d, J=1.6 Hz, 1H), 5.92 (d, J=2.0 Hz, 1H), 7.45 (t, J=3.5 Hz, 1H), 8.82 (d, J=4.8 Hz, 2H), 9.36 (s, 1H), 9.41 (s, 1H). LCMS (Method A): 1.033 min, MS: ES+316.16 (M+1)

Example 2: (2-(cyclopentyloxy)-4,6-dihydroxyphenyl)(pyrrolidin-1-yl)methanone

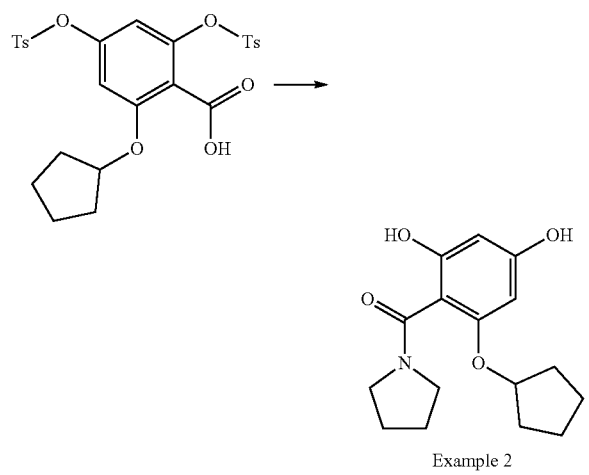

Example 2

Method 2

Step-1: Synthesis of 5-(cyclopentyloxy)-4-(pyrrolidine-1-carbonyl)-1,3-phenylene bis(4-methylbenzenesulfonate) (Intermediate 41)

To a solution of 2-(cyclopentyloxy)-4,6-bis(tosyloxy)benzoic acid (Intermediate 20) (0.5 g, 0.91 mmol, 1 eq) in DCM (5 mL) was added dropwise oxalyl chloride (0.13 g, 1.02 mmol, 1.0 eq) at 0° C. under nitrogen atmosphere. A catalytic amount of DMF (0.5 mL) was added to the reaction mixture at 0° C., and the reaction mixture was slowly warmed to room temperature and stirred for 2 h. The resulting mixture was concentrated under reduce pressure to obtained crude acid chloride. In another Rbf, a solution of pyrrolidine in THF (0.130 g, 1.83 mmol, 2.0 eq) was treated with TEA (0.18 g, 1.78 mmol, 2.0 eq) at 0° C. Crude acid chloride in DCM (5 mL) was added dropwise to the amine solution at 0° C. The reaction mixture was stirred at 0° C. for 30 min. The reaction mixture diluted with water (20 mL) and extracted in DCM (3×50 mL). The combined organic layer was washed with saturated NaHCO$_3$ solution (2×20 mL), dried over Na$_2$SO$_4$ and concentrated under vacuum yielding 5-(cyclopentyloxy)-4-(pyrrolidine-1-carbonyl)-1,3-phenylene bis(4-methylbenzenesulfonate) (Intermediate 41) as a brown oil (0.4 g, 72% yield). The crude material was used in the next step without purification.

$^1$H NMR (DMSO-d6, 400 MHz): 1.37-1.44 (m, 2H), 1.53-1.55 (m, 4H), 1.65-1.80 (m, 6H), 2.43-2.45 (m, 6H), 2.50-2.51 (m, 1H), 2.83-2.94 (m, 1H), 3.24-3.40 (m, 2H), 4.60-4.70 (m, 1H), 6.57-6.60 (m, 2H), 7.48-7.54 (m, 4H), 7.73-7.77 (m, 4H). LCMS (Method A): 2.509 min, MS: ES+600.15 (M+1)

Step-2: (2-(cyclopentyloxy)-4,6-dihydroxyphenyl)(pyrrolidin-1-yl)methanone

To a solution of 5-(cyclopentyloxy)-4-(pyrrolidine-1-carbonyl)-1,3-phenylene bis(4-methylbenzenesulfonate) (Intermediate 41) (0.2 g, 0.33 mmol, 1 eq) in MeOH (4 mL) was added KOH (0.74 g, 13.19 mmol, 40 eq) at room temperature. The reaction mixture was heated at 60° C. for 2 h. The resulting reaction mixture was poured into water (30 mL), acidified using saturated solution of KHSO$_4$ and extracted with ethyl acetate (4×50 mL). The combined organic layer was dried over Na$_2$SO$_4$ and concentrated under vacuum. The crude material was purified by flash chromatography (product eluted with 20% EtOAc in n-Hexane) yielding (2-(cyclopentyloxy)-4,6-dihydroxyphenyl)(pyrrolidin-1-yl)methanone (0.030 g, 30.9% Yield).

$^1$H NMR (DMSO-d6, 400 MHz): δ 1.53-1.64 (m, 6H), 1.71-1.82 (m, 6H), 3.05 (t, J=6.4 Hz, 2H), 3.32-3.34 (m, 2H), 4.64-4.66 (m, 1H), 5.86-5.91 (m, 2H), 9.30-9.34 (m, 2H). LCMS (Method A): 1.434 min, MS: ES+292.06 (M+1).

The following compounds were prepared according to the Methods described above using the indicated intermediates

| Ex. No. | Name | Structure | Data |
|---|---|---|---|
| 3 | (2-benzyloxy-4,6-dihydroxy-phenyl)-pyrrolidin-1-yl-methanone | | $^1$H NMR (DMSO-d6, 400 MHz): δ 1.74-1.82 (m, 4H), 3.10-3.13 (m, 2H), 3.36-3.38 (m, 2H), 5.03 (s, 2H), 5.97 (s, 2H), 7.31-7.40 (m, 5H), 9.50 (s, 2H). LCMS (Method A): 1.515 min, MS: ES+ 314.11 (M + 1) Using Intermediate 21 and pyrrolidine according to Method 2 |

| Ex. No. | Name | Structure | Data |
|---|---|---|---|
| 4 | (2-benzyloxy-4,6-dihydroxy-phenyl)-isoindolin-2-yl-methanone | 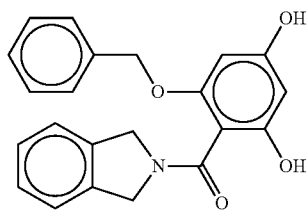 | $^1$H NMR (DMSO-d6, 400 MHz): δ 4.49 (s, 2H), 4.74 (s, 2H), 5.04 (s, 2H), 6.01 (s, 2H), 7.24-7.31 (m, 8H), 7.37-7.39 (m, 1H), 9.50 (s, 1H), 9.57 (s, 1H). LCMS (Method A): 1.719 min, MS: ES+ 362.17 (M + 1) Using Intermediate 21 and 2,3-dihydro-1H-isoindole according to Method 2 |
| 5 | (2-benzyloxy-4,6-dihydroxy-phenyl)-(1-piperidyl)methanone | 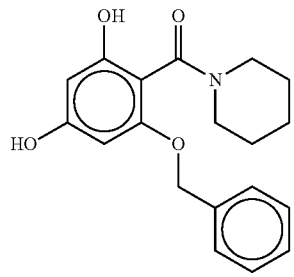 | $^1$H NMR (DMSO-d6, 400 MHz): δ 1.38-1.53 (m, 6H), 3.15-3.16 (m, 2H), 3.40-3.41 (m, 1H), 3.61-3.63 (m, 1H), 4.99 (s, 2H), 5.95 (s, 2H), 7.30-7.31 (m, 1H), 7.37-7.38 (m, 4H), 9.37 (s, 1H), 9.40 (s, 1H). LCMS (Method A): 1.632 min, MS: ES+ 328.17 (M + 1) Using Intermediate 21 and piperidine according to Method 2 |
| 6 | (2-benzyloxy-4,6-dihydroxy-phenyl)-[(3S)-3-hydroxypyrrolidin-1-yl]methanone | 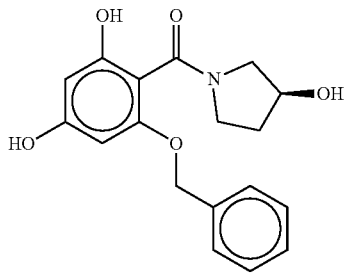 | $^1$H NMR (DMSO-d6, 400 MHz): δ 1.72-1.90 (m, 2H), 2.95-3.17 (m, 1H), 3.26-3.29 (m, 1H), 3.41-3.51 (m, 2H), 4.20-4.29 (m, 1H), 4.92-4.95 (m, 1H), 5.01 (s, 2H), 5.95 (s, 2H) 7.29-7.37 (m, 5H), 9.41 (s, 2H). LCMS (Method A): 1.192 min, MS: ES+ 330.12 (M + 1) Using Intermediate 21 and (3S)-3-pyrrolidinol according to Method 1. Note: Duplication of peaks observed in the $^1$H NMR-material is a mixture of rotamers. |
| 7 | (2-benzyloxy-4,6-dihydroxy-phenyl)-[(3R)-3-hydroxypyrrolidin-1-yl]methanone | 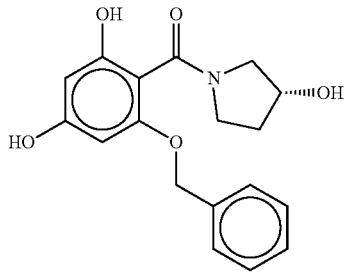 | $^1$H NMR (DMSO-d6, 400 MHz): δ 1.72-1.90 (m, 2H), 2.95-3.17 (m, 1H), 3.26-3.29 (m, 1H), 3.41-3.51 (m, 2H), 4.20-4.29 (m, 1H), 4.92-4.95 (m, 1H), 5.01 (s, 2H), 5.95 (s, 2H) 7.29-7.37 (m, 5H), 9.41-9.44 (m, 2H). LCMS (Method A): 1.180 min, MS: ES+ 330.17 (M + 1) Using Intermediate 21 and (3R)-3-pyrrolidinol according to Method 1. Note: Duplication of peaks observed in the $^1$H NMR-material is a mixture of rotamers. |
| 8 | (2-benzyloxy-4,6-dihydroxy-phenyl)-[(3R)-3-hydroxy-1-piperidyl]methanone | 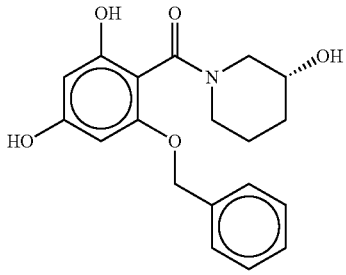 | $^1$H NMR (DMSO-d6, 400 MHz): δ 1.14-2.08 (m, 6H), 3.29-3.25 (m, 1H), 3.38-3.50 (m, 1H), 4.31-4.42 (m, 1H), 4.78-4.93 (m, 1H), 4.99 (d, J = 11.2 Hz, 2H), 5.93-5.96 (m, 2H) 7.29-7.38 (m, 5H), 9.39-9.42 (m, 2H). LCMS (Method A): 1.305 min, MS: ES+ 344.17 (M + 1) Using Intermediate 21 and (R)-3-hydroxypiperidine according to Method 1. Note: Duplication of peaks observed in the $^1$H NMR-material is a mixture of rotamers. |

-continued

| Ex. No. | Name | Structure | Data |
|---|---|---|---|
| 9 | (2-benzyloxy-4,6-dihydroxy-phenyl)-[(3S)-3-hydroxy-1-piperidyl] methanone | | $^1$H NMR (DMSO-d6, 400 MHz): δ 1.14-2.08 (m, 6H), 3.29-3.25 (m, 1H), 3.38-3.50 (m, 1H), 4.31-4.42 (m, 1H), 4.78-4.93 (m, 1H), 4.99 (d, J = 11.2 Hz, 2H), 5.93-5.96 (m, 2H) 7.29-7.38 (m, 5H), 9.39-9.42 (m, 2H). LCMS (Method A): 1.302 min, MS: ES+ 344.17 (M + 1) Using Intermediate 21 and (S)-3-hydroxypiperidine according to Method 1. Note: Duplication of peaks observed in the $^1$H NMR-material is a mixture of rotamers. |
| 10 | (2-benzyloxy-4,6-dihydroxy-3-methyl-phenyl)-pyrrolidin-1-yl-methanone | | $^1$H NMR (DMSO-d6, 400 MHz): δ 1.73-1.75 (m, 4H), 1.94 (s, 3H), 3.01-3.17 (m, 2H), 3.34-3.39 (m, 2H), 4.68-4.70 (m, 1H), 4.86-4.88 (m, 1H), 6.24 (s, 1H), 7.31-7.39 (m, 5H), 9.35 (s, 1H), 9.44 (s, 1H). LCMS (Method A): 1.638 min, MS: ES+ 328.17 (M + 1). Using Intermediate 22 and pyrrolidine according to Method 1 |
| 11 | (2-benzyloxy-3-ethyl-4,6-dihydroxy-phenyl)-pyrrolidin-1-yl-methanone | | $^1$H NMR (DMSO-d6, 400 MHz): δ 1.03 (t, J = 7.2 Hz, 3H), 1.73-1.75 (m, 4H), 3.13-3.16 (m, 2H), 3.34-3.40 (m, 2H), 4.68-4.70 (m, 1H), 4.90-4.92 (m, 1H), 6.23 (s, 1H), 6.32 (s, 1H), 6.55 (s, 6H), 7.32-7.41 (m, 5H), 9.34 (s, 1H), 9.41 (s, 1H). LCMS (Method A): 1.776 min, MS: ES+ 342.17 (M + 1). Using Intermediate 23 and pyrrolidine according to Method 2 |
| 12 | [2,4-dihydroxy-6-(2-pyridylmethoxy) phenyl]-pyrrolidin-1-yl-methanone | | $^1$H NMR (DMSO-d6, 400 MHz): δ 1.73-1.83 (m, 4H), 3.14 (t, J = 6.4 Hz, 2H), 3.40 (t, J = 6.8 Hz, 2H), 5.08 (s, 2H), 5.92 (d, J = 1.6 Hz, 1H), 5.96 (d, J = 1.6 Hz, 1H), 7.31 (dd, J = 6.8, 4.8 Hz, 1H), 7.39 (d, J = 8.0 Hz, 1H), 7.81-7.85 (m, 1H), 8.55 (d, J = 4.0 Hz, 1H), 9.44 (s, 1H), 9.47 (s, 1H). LCMS (Method A): 0.959 min, MS: ES+ 315.11 (M + 1) Using Intermediate 24 and pyrrolidine according to Method 1 |
| 13 | [2,4-dihydroxy-6-1-phenylethoxy] phenyl]-pyrrolidin-1-yl-methanone ISOMER 1 | | $^1$H NMR (DMSO-d6, 400 MHz): δ 1.42 (d, J = 7.6 Hz, 3H), 1.75-1.81 (m, 4H), 3.04-3.11 (m, 2H), 3.35-3.40 (m, 2H), 5.28-5.33 (m, 1H), 5.77 (s, 1H), 5.87 (d, J = 1.6 Hz, 1H), 7.23-7.28 (m, 1H), 7.31-7.34 (m, 4H), 9.44 (s, 2H). LCMS (Method A): 1.660 min, MS: ES+ 328.20 (M + 1) Using Intermediate 26 and pyrrolidine according to Method 1 Separated by chiral Prep HPLC (Method A) |

| Ex. No. | Name | Structure | Data |
|---|---|---|---|
| 14 | [2,4-dihydroxy-6-1-phenylethoxy]phenyl]-pyrrolidin-1-yl-methanone ISOMER 2 | 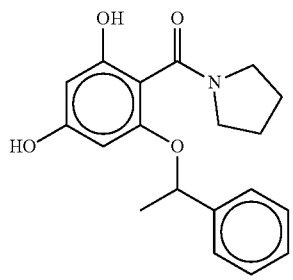 | $^1$H NMR (DMSO-d6, 400 MHz): δ 1.42 (d, J = 7.6 Hz, 3H), 1.75-1.81 (m, 4H), 3.04-3.11 (m, 2H), 3.35-3.40 (m, 2H), 5.28-5.33 (m, 1H), 5.77 (s, 1H), 5.87 (d, J = 1.6 Hz, 1H), 7.23-7.28 (m, 1H), 7.31-7.34 (m, 4H), 9.44 (s, 2H). LCMS (Method A): 1.661 min, MS: ES+ 328.20 (M + 1) Using Intermediate 26 and pyrrolidine according to Method 1 Separated by chiral Prep HPLC (Method A) |
| 15 | [2-[(4-fluorophenyl)methoxy]-4,6-dihydroxy-phenyl]-pyrrolidin-1-yl-methanone | 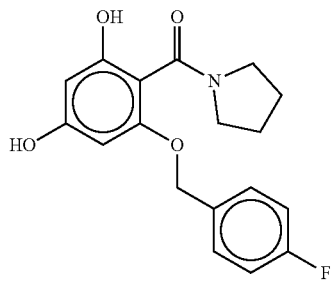 | $^1$H NMR (DMSO-d6, 400 MHz): δ 1.72-1.81 (m, 4H), 3.09 (t, J = 6.0 Hz, 2H), 3.65 (t, J = 6.4 Hz, 2H), 5.00 (s, 2H), 5.96 (s, 2H), 7.19-7.22 (m, 2H), 7.38-7.42 (m, 2H), 9.42 (s, 2H). LCMS (Method A): 1.504 min, MS: ES+ 332.17 (M + 1) Using Intermediate 27 and pyrrolidine according to Method 2 |
| 16 | [2,4-dihydroxy-6-[(4-methoxyphenyl)methoxy]phenyl]-pyrrolidin-1-yl-methanone | 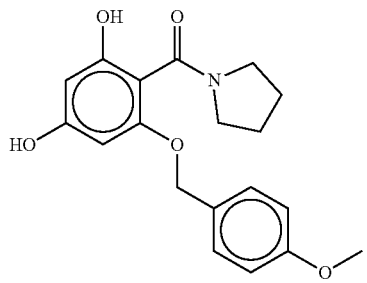 | $^1$H NMR (DMSO-d6, 400 MHz): δ 1.72-1.81 (m, 4H), 3.08 (t, J = 6.4 Hz, 2H), 3.34-3.36 (m, 2H), 3.74 (s, 3H), 4.92 (s, 2H), 5.94-5.96 (m, 2H), 6.92 (d, J = 8.8 Hz, 2H), 7.28 (d, J = 8.4 Hz, 2H), 9.40 (s, 2H). LCMS (Method A): 1.465 min, MS: ES+ 344.20 (M + 1) Using Intermediate 28 and pyrrolidine according to Method 2 |
| 17 | [2,4-dihydroxy-6-(m-tolylmethoxy)phenyl]-pyrrolidin-1-yl-methanone | 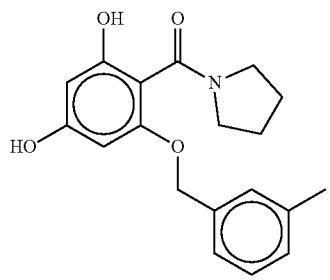 | $^1$H NMR (DMSO-d6, 400 MHz): δ 1.74-1.82 (m, 4H), 2.30 (s, 3H), 3.09-3.12 (t, J = 12.0 Hz, 2H), 3.36-3.39 (t, J = 12.0 Hz, 2H), 4.95 (s, 2H), 5.94-5.95 (d, J = 3.6 Hz, 2H), 7.10-7.16 (m, 3H), 7.23-7.27 (t, J = 14.8 Hz, 1H), 9.41 (s, 1H). LCMS (Method A): 1.598 min, MS: ES$^+$ 328.2 (M + 1) Using Intermediate 29 and pyrrolidine according to Method 2 |
| 18 | (2-benzyloxy-4,6-dihydroxy-phenyl)-(5,7-dihydropyrrolo[3,4-b]pyridin-6-yl)methanone | 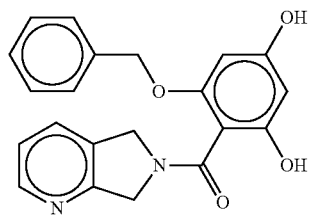 | $^1$H NMR (DMSO-d6, 400 MHz): δ 4.44-4.52 (m, 2H), 4.70-4.78 (m, 2H), 5.04 (s, 2H), 6.02 (s, 2H), 7.23-7.33 (m, 6H), 7.69-7.81 (m, 1H), 8.44-8.47 (dd, J = 12.4 Hz, 1H), 9.53-9.54 (d, J = 5.2 Hz, 1H), 9.61-9.62 (d, J = 2.4 Hz, 1H). LCMS (Method A): 1.338 min, MS: ES$^+$ 363.2 (M + 1) Using Intermediate 21 and 6,7-dihydro-5H-pyrrolo[3,4-b]pyridine according to Method 2 |

| Ex. No. | Name | Structure | Data |
|---|---|---|---|
| 19 | (2-benzyloxy-4,6-dihydroxy-phenyl)-(4-methoxyisoindolin-2-yl)methanone | | ¹H NMR (DMSO-d6, 400 MHz): δ 3.74-3.83 (m, 3H), 4.33-4.47 (m, 2H), 4.61-4.73 (m, 2H), 5.04 (s, 2H), 6.011-6.016 (d, J = 2.0 Hz, 2H), 6.83-6.97 (m, 2H), 7.24-7.32 (m, 6H), 9.51-9.53 (d, J = 7.6 Hz, 1H), 9.58-9.59 (d, J = 5.2 Hz, 1H). LCMS (Method A): 1.773 min, MS: ES⁺ 392.2 (M + 1)<br>Using Intermediate 21 and 2,3-Dihydro-4-methoxy-1H-isoindole according to Method 1 |
| 20 | [2,4-dihydroxy-6-(pyrimidin-4-ylmethoxy)phenyl]-pyrrolidin-1-yl-methanone | | ¹H NMR (DMSO-d6, 400 MHz): δ 1.77-1.85 (m, 4H), 3.14-3.18 (t, J = 13.2 Hz, 2H), 3.42-3.44 (t, J = 6.0 Hz, 2H), 5.12 (s, 2H), 5.89-5.90 (d, J = 2.0 Hz, 2H), 6.020-6.024 (d, J = 1.6 Hz, 2H), 7.48-7.49 (d, J = 4.0 Hz, 1H), 8.83-8.85 (d, J = 5.2 Hz, 1H), 9.156-9.159 (d, J = 1.2 Hz, 2H), 9.52 (s, 1H), 9.60 (s, 1H). LCMS (Method A): 1.138 min, MS: ES⁺ 316.2 (M + 1)<br>Using Intermediate 30 and pyrrolidine according to Method 1 |
| 21 | (2-((1H-pyrazol-3-yl)methoxy)-4,6-dihydroxyphenyl)(pyrrolidin-1-yl)methanone | | ¹H NMR (DMSO-d6, 400 MHz): δ 1.71-1.79 (m, 4H), 3.05-3.08 (m, 2H), 3.08-3.31 (m, 2H), 4.94 (s, 2H), 5.94 (s, 1H), 6.03 (d, J = 1.6 Hz, 1H), 6.21 (d, J = 2.0 Hz, 1H), 7.70 (s, 1H), 9.39 (s, 1H), 9.42 (s, 1H), 12.78 (s, 1H). LCMS (Method A): 1.046 min, MS: ES+ 304.11 (M + 1)<br>Using Intermediate 31 and pyrrolidine according to Method 1 (Boc-deprotection occurred in situ) |
| 22 | [2,4-dihydroxy-6-(1H-triazol-4-ylmethoxy)phenyl]-pyrrolidin-1-yl-methanone | | ¹H NMR (DMSO-d6, 400 MHz): δ 1.70-1.78 (m, 4H), 3.03-3.06 (t, J = 12.8 Hz, 2H), 3.30-3.33 (t, J = 13.2 Hz, 2H), 5.08 (s, 2H), 5.95-5.96 (d, J = 2.0 Hz, 1H), 6.054-6.059 (d, J = 2.0 Hz, 2H), 7.82 (s, 1H), 9.44 (s, 2H), 14.99 (s, 1H).<br>LCMS (Method B): 1.084 min, MS: ES⁺ 305.1 (M + 1)<br>Using Intermediate 36 and pyrrolidine according to Method 1 |
| 23 | (2-benzyloxy-4,6-dihydroxy-phenyl)-(5-bromoisoindolin-2-yl)methanone | | ¹H NMR (DMSO-d6, 400 MHz): δ 4.43-4.48 (m, 2H), 4.68-4.73 (m, 2H), 5.03 (s, 2H), 6.00 (s, 2H), 7.22-7.53 (m, 6H), 7.45-7.61 (m, 2H), 9.51 (s, 1H), 9.59 (s, 1H). LCMS (Method A): 2.123 min, MS: ES⁺ 440 (M+)<br>Using Intermediate 21 and 5-bromo-2,3-dihydro-1H-isoindole according to Method 1 |
| 24 | methyl 2-(2-benzyloxy-4,6-dihydroxy-benzoyl)isoindoline-5-carboxylate | | ¹H NMR (DMSO-d6, 400 MHz): δ 3.83-3.86 (m, 3H), 4.54 (s, 2H), 4.79 (s, 2H), 5.03 (s, 2H), 6.01 (s, 2H), 7.22-7.29 (m, 5H), 7.39-7.53 (m, 1H), 9.86-7.98 (m, 2H), 9.516-9.519 (d, J = 1.2 Hz, 1H), 9.59-9.60 (d, J = 2.4 Hz, 1H).<br>LCMS (Method A): 1.699 min, MS: ES⁺ 420.2 (M + 1)<br>Using Intermediate 21 and methyl isoindoline-5-carboxylate according to Method 1 |

| Ex. No. | Name | Structure | Data |
|---|---|---|---|
| 25 | (2-benzyloxy-4,6-dihydroxy-phenyl)-(5-methoxyisoindolin-2-yl)methanone | 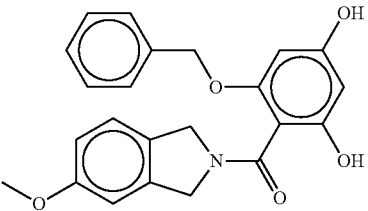 | $^1$H NMR (DMSO-d6, 400 MHz): δ 3.70-3.75 (d, 3H), 4.40-4.44 (d, 2H), 4.65-4.69 (d, 2H), 5.03 (s, 2H), 6.00 (s, 2H), 6.82-6.96 (m, 2H), 7.14-7.30 (m, 6H), 9.494-9.499 (d, J = 2.0 Hz, 1H), 9.565-9.576 (d, J = 4.4 Hz, 1H). LCMS (Method D): 1.980 min, MS: ES$^+$ 392.5 (M + 1) Using Intermediate 21 and 5-methoxyisoindoline according to Method 1 |
| 26 | (2-benzyloxy-4,6-dihydroxy-phenyl)-(5,6-dimethoxyisoindolin-2-yl)methanone | 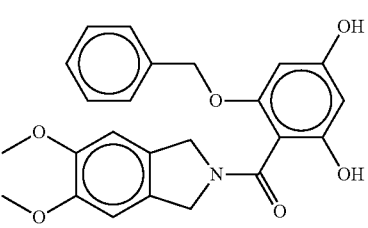 | $^1$H NMR (DMSO-d6, 400 MHz): δ 3.68 (s, 3H), 3.75 (s, 3H), 4.39 (s, 2H), 4.65 (s, 2H), 5.03 (s, 2H), 6.004-6.007 (d, J = 1.2 Hz, 2H), 6.86 (s, 1H), 6.98 (s, 1H), 7.23-7.31 (m, 5H), 9.49 (s, 1H), 9.56 (s, 1H). LCMS (Method D): 1.836 min, MS: ES$^+$ 422.5 (M + 1) Using Intermediate 21 and 5,6-dimethoxyisoindoline according to Method 1 |
| 27 | [2,4-dihydroxy-6-(1-phenylethoxy)phenyl]-isoindolin-2-yl-methanone | 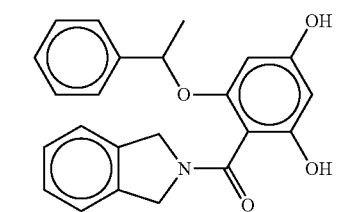 | $^1$H NMR (DMSO-d6, 400 MHz): δ 1.375-1.391 (d, J = 6.4 Hz, 3H), 4.48 (s, 2H), 4.75-4.78 (d, J = 3.2 Hz, 2H), 5.33-5.35 (d, J = 6.4 Hz, 2H), 5.85 (s, 1H), 5.941-5.945 (d, J = 1.6 Hz, 2H), 7.20-7.40 (m, 9H), 9.389 (s, 1H), 9.525 (s, 1H). LCMS (Method A): 1.925 min, MS: ES$^+$ 398.2 (M + 23) Using Intermediate 26 and isoindoline according to Method 1 |
| 28 | [2,4-dihydroxy-6-(1-phenylethoxy)phenyl]-(5-methoxyisoindolin-2-yl)methanone | 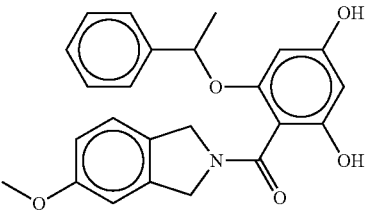 | $^1$H NMR (DMSO-d6, 400 MHz): δ 1.374-1.388 (d, J = 5.6 Hz, 3H), 3.71-3.76 (d, 3H), 4.42 (s, 2H), 4.46-4.77 (m, 2H), 5.33-5.34 (d, J = 5.6 Hz, 1H), 5.82 (s, 1H), 5.94 (s, 1H), 6.83-7.29 (m, 8H), 9.380 (s, 1H), 9.507 (s, 1H). LCMS (Method D): 2.040 min, MS: ES$^+$ 406.4 (M + 1) Using Intermediate 26 and 5-methoxyisoindoline according to Method 1 |
| 29 | [2,4-dihydroxy-6-(1-phenylethoxy)phenyl]-(5,6-dimethoxyisoindolin-2-yl)methanone | 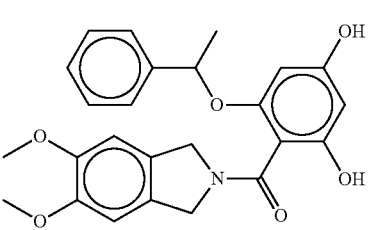 | $^1$H NMR (DMSO-d6, 400 MHz): δ 3.696 (s, 3H), 3.762 (s, 3H), 4.40 (s, 2H), 4.69 (s, 2H), 5.33-5.34 (d, J = 6.4 Hz, 1H), 5.844 (s, 1H), 5.937 (S, 1H), 6.86 (s, 1H), 7.00 (s, 1H), 7.21-729 (m, 5H), 9.36 (s, 1H), 9.49 (s, 1H). LCMS (Method A): 1.738 min, MS: ES$^+$ 436.1 (M + 1) Using Intermediate 26 and 5,6-dimethoxyisoindoline according to Method 1 |
| 30 | (2-benzyloxy-4,6-dihydroxy-3-methyl-phenyl)-(5,7-dihydropyrrolo[3,4-b]pyridin-6-yl)methanone | 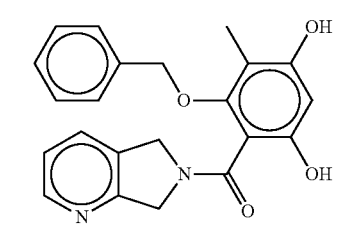 | $^1$H NMR (DMSO-d6, 400 MHz): δ 1.96 (s, 3H), 4.34-4.60 (m, 2H), 4.67-4.78 (m, 3H), 4.90-4.92 (d, J = 10.4 Hz, 1H), 6.30 (s, 1H), 7.21-7.35 (m, 6H), 7.66-7.81 (m, 1H), 8.41-8.46 (dd, J = 14.0 Hz, 1H), 9.59 (s, 2H). LCMS (Method A): 1.492 min, MS: ES$^+$ 477.3 (M + 1) Using Intermediate 22 and 6,7-dihydro-5H-pyrrolo[3,4-b]pyridine according to Method 1 |

| Ex. No. | Name | Structure | Data |
|---|---|---|---|
| 31 | 5,7-dihydropyrrolo[3,4-b]pyridin-6-yl-[4,6-dihydroxy-3-methyl-2-(m-tolylmethoxy)phenyl]methanone | | ¹H NMR (DMSO-d6, 400 MHz): δ 1.98 (s, 3H), 2.16 (s, 3H), 4.35-4.81 (m, 5H), 4.86-4.89 (d, J = 10.4 Hz, 1H), 6.30 (s, 1H), 7.018-7.035 (d, J = 6.8 Hz, 1H), 7.12-7.18 (m, 3H), 7.27-7.33 (m, 1H), 8.42-8.47 (dd, J = 18.4 Hz, 1H), 9.52-9.54 (d, J = 7.6 Hz, 1H), 9.58-9.59 (d, J = 4.8 Hz, 1H). LCMS (Method A): 1.584 min, MS: ES⁺ 391.1 (M + 1) Using Intermediate 33 and 6,7-dihydro-5H-pyrrolo[3,4-b]pyridine according to Method 1 |
| 32 | 5,7-dihydropyrrolo[3,4-b]pyridin-6-yl-[2,4-dihydroxy-6-(m-tolylmethoxy)phenyl]methanone | | ¹H NMR (DMSO-d6, 400 MHz): δ 2.07-2.10 (m, 3H), 4.43-4.51 (d, 2H), 4.70-4.78 (d, 2H), 4.99 (s, 2H), 6.02 (s, 2H), 7.00-7.14 (m, 4H), 7.28-7.34 (m, 1H), 7.69-7.83 (m, 1H), 8.43-8.48 (dd, J = 12.8 Hz, 1H), 9.55 (s, 1H), 9.62 (s, , 1H). LCMS (Method A): 1.454 min, MS: ES⁺ 377.2 (M + 1) Using Intermediate 29 and 6,7-dihydro-5H-pyrrolo[3,4-b]pyridine according to Method 1 |
| 33 | 5,7-dihydropyrrolo[3,4-b]pyridin-6-yl-[4,6-dihydroxy-3-methyl-2-(2-pyridylmethoxy)phenyl]methanone | | ¹H NMR (DMSO-d6, 400 MHz): δ 1.97 (s, 3H), 4.40-4.69 (m, 4H), 4.80-5.03 (m, 2H), 6.32 (s, 2H), 7.22-7.33 (m, 2H), 7.46-7.49 (dd, , J = 7.6 Hz, 1H), 7.68-7.80 (m, 2H), 8.41-8.46 (m, 2H), 9.58-9.63 (m, 2H). LCMS (Method A): 1.029 min, MS: ES⁺ 378.1 (M + 1) Using Intermediate 34 and 6,7-dihydro-5H-pyrrolo[3,4-b]pyridine according to Method 1 |
| 34 | [4,6-dihydroxy-3-methyl-2-(2-pyridylmethoxy)phenyl]-isoindolin-2-yl-methanone | | ¹H NMR (DMSO-d6, 400 MHz): δ 1.96 (s, 3H), 4.46-4.75 (m, 4H), 4.79-5.03 (m, 2H), 6.31 (s, 2H), 7.23-7.30 (m, 4H), 7.34-7.36 (d, J = 6.8 Hz, 1H), 7.46-7.48 (d, J = 7.6 Hz, 1H), 7.72-7.76 (m, 1H), 8.43-8.44 (d, J = 4.8 Hz, 1H), 9.54 (s, 1H), 9.58 (s, 1H). LCMS (Method A): 1.337 min, MS: ES⁺ 377.2 (M + 1) Using Intermediate 34 and isoindoline according to Method 1 |
| 35 | 5,7-dihydropyrrolo[3,4-b]pyridin-6-yl-[2,4-dihydroxy-6-(2-pyridylmethoxy)phenyl]methanone | | ¹H NMR (DMSO-d6, 400 MHz): δ 4.52-4.59 (d, 2H), 4.73-4.81 (d, 2H), 5.10 (s, 2H), 6.03-6.05 (m, 2H), 7.22-7.28 (m, 2H), 7.35-7.37 (d, J = 8.0 Hz, 1H), 7.66-7.69 (t, J = 13.6 Hz, 2H), 8.45-8.46 (d, J = 4.4 Hz, 1H), 9.34 (s, 1H), 9.38 (s, 1H). LCMS (Method A): 0.926 min, MS: ES⁺ 364.1 (M + 1) Using Intermediate 24 and 6,7-dihydro-5H-pyrrolo[3,4-b]pyridine according to Method 1 |
| 36 | (2-benzyloxy-4,6-dihydroxy-3-methyl-phenyl)-(3,4-dihydro-1H-isoquinolin-2-yl)methanone | | ¹H NMR (DMSO-d6, 400 MHz): δ 1.92-1.95 (d, 3H), 2.70-2.83 (m, 2H), 3.38-4.01 (m, 2H), 4.40-4.69 (m, 2H), 4.76-4.85 (m, 2H), 6.26-6.28 (m, 2H), 7.01-7.30 (m, 9H), 9.41 (s, 1H), 9.52 (s, 1H). LCMS (Method A): 1.977 min, MS: ES⁺ 390.2 (M + 1) Using Intermediate 22 and 1,2,3,4-tetrahydroisoquinoline according to Method 1. Note: Duplication of peaks observed in the ¹H NMR-material is a mixture of rotamers. |

-continued

| Ex. No. | Name | Structure | Data |
|---|---|---|---|
| 37 | [2,4-dihydroxy-6-(2-pyridylmethoxy)phenyl]-isoindolin-2-yl-methanone | 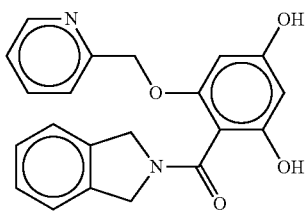 | $^1$H NMR (DMSO-d6, 400 MHz): δ 4.54 (s, 2H), 2.76 (s, 2H), 5.10 (s, 2H), 5.96-5.96 (d, J = 2.0 Hz, 1H), 6.014-6.018 (d, J = 1.6 Hz, 1H), 7.24-7.39 (m, 6H), 7.67-7.72 (m, 1H), 8.48-8.49 (d, J = 4.0 Hz, 1H), 9.51 (s, 1H), 9.62 (s, 1H). LCMS (Method A): 1.278 min, MS: ES$^+$ 363.1 (M + 1) Using Intermediate 24 and Isoindoline according to Method 1 |
| 38 | (2-benzyloxy-4,6-dihydroxy-3-methyl-phenyl)-(4-bromoisoindolin-2-yl)methanone | 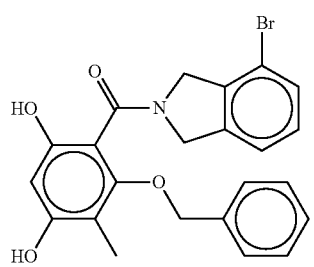 | $^1$H NMR (DMSO-d6, 400 MHz): δ 1.97-1.99 (d, 3H), 4.27-4.75 (m, 4H), 4.84-4.95 (m, 2H), 6.30-6.31 (d, J = 2.4 Hz, 1H), 7.25-7.41 (m, 7H), 7.47-7.52 (m, 1H), 9.52-9.60 (m, 2H). LCMS (Method D): 2.379 min, MS: ES$^+$ 354.4 (M + 1) Using Intermediate 22 and 4-bromoisoindoline according to Method 1. Note: Duplication of peaks observed in the $^1$H NMR-material is a mixture of rotamers. |
| 39 | (2-benzyloxy-4,6-dihydroxy-3-methyl-phenyl)-[4-(hydroxymethyl)isoindolin-2-yl]methanone | 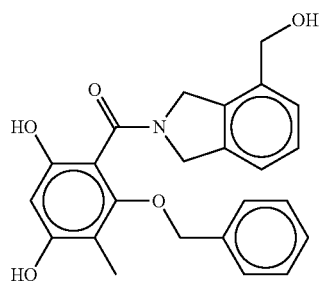 | $^1$H NMR (DMSO-d6, 400 MHz): δ 1.97-1.98 (d, 3H), 4.33-4.34 (d, 1H), 4.42-4.64 (m, 3H), 4.72-4.74 (d, 3H), 4.91-4.93 (d, 1H), 5.07-5.21 (m, 1H), 6.30 (S, 1H), 7.13-7.37 (m, 8H), 9.49-9.55 (m, 2H). LCMS (Method A): 1.571 min, MS: ES$^+$ 406.1 (M + 1) Using Intermediate 22 and 2,3-dihydro-1H-isoindole-4-methanol according to Method 1. Note: Duplication of peaks observed in the $^1$H NMR-material is a mixture of rotamers. |
| 40 | (2-benzyloxy-4,6-dihydroxy-3-methyl-phenyl)-[5-[(4-methylpiperazin-1-yl)methyl]isoindolin-2-yl]methanone | 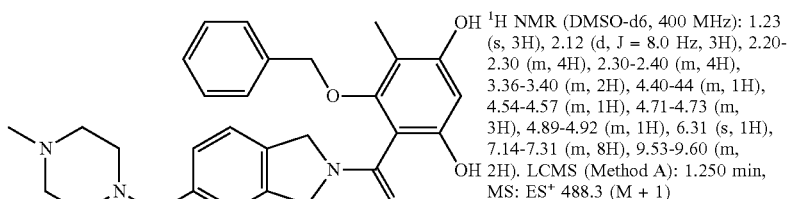 | $^1$H NMR (DMSO-d6, 400 MHz): 1.23 (s, 3H), 2.12 (d, J = 8.0 Hz, 3H), 2.20-2.30 (m, 4H), 2.30-2.40 (m, 4H), 3.36-3.40 (m, 2H), 4.40-44 (m, 1H), 4.54-4.57 (m, 1H), 4.71-4.73 (m, 3H), 4.89-4.92 (m, 1H), 6.31 (s, 1H), 7.14-7.31 (m, 8H), 9.53-9.60 (m, 2H). LCMS (Method A): 1.250 min, MS: ES$^+$ 488.3 (M + 1) Using Intermediate 22 and 2,3-dihydro-5-[(4-methyl-1-piperazinyl)methyl]-1H-isoindole according to Method 1 |
| 41 | (2-benzyloxy-4,6-dihydroxy-3-methyl-phenyl)-(6-methoxy-3,4-dihydro-1H-isoquinolin-2-yl)methanone | 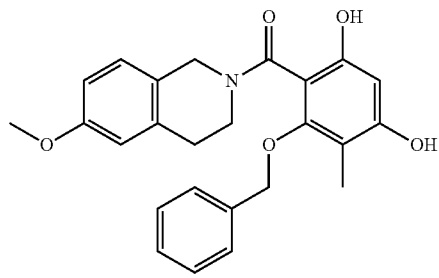 [SMILES: COc1ccc2c(c1)CCN(C(=O)c1c(O)cc(O)c(C)c1OCc1ccccc1)C2] | $^1$H NMR (DMSO-d6, 400 MHz): δ 1.92-1.95 (d, 3H), 2.68-2.73 (m, 2H), 3.70-3.71 (d, 3H), 3.96-4.85 (m, 6H), 6.26-6.28 (m, 1H), 6.68-6.71 (m, 1H), 6.79-6.95 (m, 1H), 7.16-7.29 (m, 5H), 9.38-9.40 (d, 1H), 9.52 (s, 1H). LCMS (Method A): 1.888 min, MS: ES$^+$ 420.2 (M + 1) Using Intermediate 22 and 6-methoxy-1,2,3,4-tetrahydroisoquinoline according to Method 1. Note: Duplication of peaks observed in the $^1$H NMR-material is a mixture of rotamers. |

| Ex. No. | Name | Structure | Data |
|---|---|---|---|
| 42 | (2-benzyloxy-4,6-dihydroxy-3-methyl-phenyl)-(3,4-dihydro-1H-2,7-naphthyridin-2-yl)methanone | | $^1$H NMR (DMSO-d6, 400 MHz): δ 1.93-1.96 (d, 3H), 2.74-2.79 (m, 2H), 3.44-3.45 (m, 1H), 3.68-4.98 (m, 1H), 4.46 (s, 1H), 4.58-4.89 (m, 3H), 6.27-6.29 (m, 1H), 7.11-7.31 (m, 6H), 7.26-7.49 (m, 2H), 9.40-9.46 (m, 1H), 9.56 (s, 1H). LCMS (Method A): 1.157 min, MS: ES$^+$ 391.1 (M + 1) Using Intermediate 22 and 1,2,3,4-tetrahydro-2,7-naphthyridine according to Method 1. Note: Duplication of peaks observed in the $^1$H NMR-material is a mixture of rotamers. |
| 43 | (2-benzyloxy-4,6-dihydroxy-3-methyl-phenyl)-(3,4-dihydro-1H-2,6-naphthyridin-2-yl)methanone | | $^1$H NMR (DMSO-d6, 400 MHz): δ 1.92-1.96 (d, 3H), 2.74-2.75 (m, 2H), 3.41-3.47 (m, 1H), 3.73-4.00 (m, 1H), 4.43-4.84 (m, 4H), 6.26-6.29 (m, 1H), 7.10-7.31 (m, 6H), 8.27-8.37 (m, 2H), 9.40-9.45 (d, 1H), 9.55 (s,1H). LCMS (Method A): 1.193 min, MS: ES$^+$ 391.2 (M + 1) Using Intermediate 22 and 1,2,3,4-tetrahydro-2,6-naphthyridine according to Method 1. Note: Duplication of peaks observed in the $^1$H NMR-material is a mixture of rotamers. |
| 44 | 3,4-dihydro-1H-isoquinolin-2-yl-[4,6-dihydroxy-3-methyl-2-(m-tolylmethoxy)phenyl]methanone | | $^1$H NMR (DMSO-d6, 400 MHz): δ 1.93-1.96 (d, 3H), 2.12-2.16 (m, 3H), 2.75-2.84 (m, 2H), 3.42-3.45 (m, 1H), 3.62-4.04 (m, 1H), 4.41-4.85 (m, 4H), 6.27-6.28 (m, 1H), 7.01-7.27 (m, 8H), 9.39-9.41 (d, 1H), 9.52 (s,1H). LCMS (Method A): 2.150 min, MS: ES$^+$ 404.3 (M + 1) Using Intermediate 33 and 1,2,3,4-tetrahydroisoquinoline according to Method 1. Note: Duplication of peaks observed in the $^1$H NMR-material is a mixture of rotamers. |
| 45 | 3,4-dihydro-1H-isoquinolin-2-yl-[4,6-dihydroxy-3-methyl-2-(2-pyridylmethoxy)phenyl]methanone | | $^1$H NMR (DMSO-d6, 400 MHz): δ 1.93-1.96 (d, 3H), 2.67-2.75 (m, 2H), 3.43-3.48 (m, 1H), 3.62-3.92 (m, 1H), 4.43 (s, 1H), 4.71-4.95 (m, 3H), 6.29 (s, 1H), 7.04-7.31 (m, 6H), 7.51-7.74 (m, 1H), 8.45 (s, 1H), 9.40-9.44 (d, 1H), 9.55 (s, 1H). LCMS (Method A): 1.362 min, MS: ES$^+$ 391.2 (M + 1). Using Intermediate 34 and 1,2,3,4-tetrahydroisoquinoline according to Method 1. Note: Duplication of peaks observed in the $^1$H NMR-material is a mixture of rotamers. |
| 46 | [4,6-dihydroxy-3-methyl-2-(2-pyridylmethoxy)phenyl]-(7-methoxy-3,4-dihydro-1H-isoquinolin-2-yl)methanone | | $^1$H NMR (DMSO-d6, 400 MHz): δ 1.93-1.95 (d, 3H), 2.67 (s, 2H), 3.42-3.44 (m, 1H), 3.55-3.91 (m, 4H), 4.41 (s, 1H), 4.68-4.95 (m, 3H), 6.29 (s, 1H), 6.64-6.82 (m, 2H), 7.01-7.03 (d, J = 8.0 Hz, 1H), 7.24-7.32 (m, 2H), 7.54-7.77 (m, 1H), 8.46 (s, 1H), 9.41-9.44 (d, 1H), 9.56 (s, 1H). LCMS (Method A): 1.381 min, MS: ES$^+$ 421.2 (M + 1) Using Intermediate 34 and 7-methoxy-1,2,3,4-tetrahydroisoquinoline according to Method 1. Note: Duplication of peaks observed in the $^1$H NMR-material is a mixture of rotamers. |

| Ex. No. | Name | Structure | Data |
|---|---|---|---|
| 47 | [4,6-dihydroxy-3-methyl-2-(2-pyridylmethoxy)phenyl]-(6-methoxy-3,4-dihydro-1H-isoquinolin-2-yl)methanone | | ¹H NMR (DMSO-d6, 400 MHz): δ 1.92-1.96 (d, 3H), 2.68-2.72 (m, 2H), 3.37-3.44 (m, 1H), 3.58-3.91 (m, 4H), 4.35 (s, 1H), 4.63-4.95 (m, 3H), 6.27-6.29 (m, 1H), 6.69 (s, 1H), 6.78-6.95 (m, 1H), 7.12-7.31 (m, 2H), 7.54-7.73 (m, 1H), 8.46 (s, 1H), 9.39-9.44 (m, 1H), 9.55 (s, 1H). LCMS (Method A): 1.329 min, MS: ES⁺ 421.1 (M + 1) Using Intermediate 34 and 6-methoxy-1,2,3,4-tetrahydroisoquinoline according to Method 1. Note: Duplication of peaks observed in the ¹H NMR-material is a mixture of rotamers. |
| 48 | 3,4-dihydro-1H-isoquinolin-2-yl-[2-[(4-fluorophenyl)methoxy]-4,6-dihydroxy-3-methyl-phenyl]methanone | | ¹H NMR (DMSO-d6, 400 MHz): δ 1.92-1.95 (d, 3H), 2.74-2.75 (m, 2H), 3.38-3.48 (m, 1H), 3.63-4.00 (m, 1H), 4.40-4.82 (m, 4H), 6.27-6.28 (d, 1H), 6.96-7.02 (m, 2H), 7.09-7.19 (m, 3H), 7.21-7.27 (m, 3H), 9.40-9.42 (d, 1H), 9.53 (s,1H). LCMS (Method A): 2.008 min, MS: ES⁺ 408.2 (M + 1) Using Intermediate 32 and 1,2,3,4-tetrahydroisoquinoline according to Method 1. Note: Duplication of peaks observed in the ¹H NMR-material is a mixture of rotamers. |
| 49 | (2-(benzyloxy)-4,6-dihydroxyphenyl)(5-((4-methylpiperazin-1-yl)methyl)isoindolin-2-yl)methanone | | ¹H NMR (DMSO-d6, 400 MHz): δ 1.23 (s, 3H), 2.70-2.77 (m, 4H), 3.29-3.59 (m, 4H), 4.50 (s, 2H), 4.75 (s, 2H), 5.04 (s, 2H), 6.03 (d, J = 11.6 Hz, 2H), 7.23-7.32 (m, 6H), 7.45-7.50 (m, 3H), 9.56-9.65 (m, 2H), 11.67 (brs, 2H). LCMS (Method E): 1.101 min, MS: ES+ 474.2 (M + 1) Using Intermediate 21 and 2,3-dihydro-5-[(4-methyl-1-piperazinyl)methyl]-1H-isoindole according to Method 1 |
| 50 | (4-aminoisoindolin-2-yl)(2-(benzyloxy)-4,6-dihydroxy-3-methylphenyl)methanone | | ¹H NMR (DMSO-d6, 400 MHz): δ 1.97 (s, 3H), 4.30-4.63 (m, 3H), 4.67-4.72 (m, 2H), 4.90-4.93 (m, 1H), 5.58 (brs, 2H), 6.31 (d, J = 4.4 Hz, 1H), 6.43-6.60 (m, 2H), 6.96-7.00 (m, 1H), 7.30-7.36 (m, 5H), 9.48-9.53 (m, 2H). LCMS (Method E): 1.750 min, MS: ES+ 391.3 (M + 1). Using Intermediate 22 and isoindolin-4-amine according to Method 1 Note: Duplication of peaks observed in the ¹H NMR-material is a mixture of rotamers |
| 51 | (2-(benzyloxy)-4,6-dihydroxy-3-methylphenyl)(4-vinylisoindolin-2-yl)methanone | | ¹H NMR (DMSO-d6, 400 MHz): δ 1.90 (d, J = 6.8 Hz, 3H), 4.44-4.66 (m, 2H), 4.72-4.91 (m, 4H), 5.27-5.41 (dd, J = 10.8, 11.6 Hz, 1H), ), 5.64-5.80 (dd, J = 17.6, 17.6 Hz, 1H), 6.31 (s, 1H), 6.52-6.59 (m, 1H), 6.75-6.82 (m, 1H), 7.24-7.36 (m, 6H), 7.39-7.52 (m, 2H), 9.51-9.58 (s, 1H). LCMS (Method A): 2.127 min, MS: ES+ 402.2 (M + 1) Using Intermediate 22 and 4-vinylisoindoline according to Method 1. Note: Duplication of peaks observed in the ¹H NMR-material is a mixture of rotamers |

| Ex. No. | Name | Structure | Data |
|---|---|---|---|
| 52 | (2-(benzyloxy)-4,6-dihydroxy-3-methylphenyl)(7-methoxy-3,4-dihydroisoquinolin-2(1H)-yl)methanone | 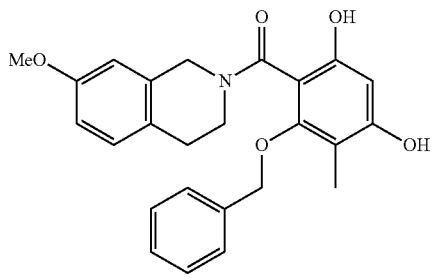 [SMILES: COc1ccc2c(c1)CN(C(=O)c1c(O)cc(O)c(C)c1OCc1ccccc1)CC2] | ¹H NMR (DMSO-d6, 400 MHz): δ 1.94 (d, J = 9.2 Hz, 3H), 2.68 (d, J = 6.4 Hz, 2H), 3.65 (s, 3H), 4.40 (s, 1H), 4.57-4.69 (m, 1H), 4.74-4.86 (m, 1H), 6.27 (s, 1H), 6.63-6.76 (m, 2H), 6.68 (s, 1H), 7.00-7.05 (m, 1H), 7.22-7.31 (m, 5H), 9.40 (s, 1H), 9.51 (d, J = 4.8 Hz, 1H). LCMS (Method A): 1.951 min, MS: ES+ 420.22 (M + 1) Using Intermediate 22 and 7-methoxy-1,2,3,4-tetrahydroisoquinoline according to Method 1. Note: Duplication of peaks observed in the ¹H NMR-material is a mixture of rotamers |
| 53 | (2-(benzyloxy)-4,6-dihydroxy-3-methylphenyl)(5,8-dihydro-1,7-naphthyridin-7(6H)-yl)methanone | 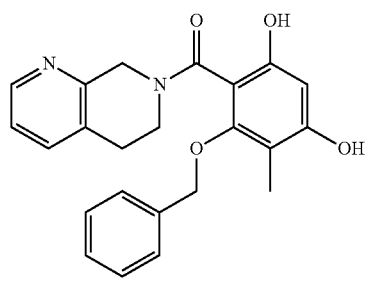 [SMILES: Cc1c(O)cc(O)c(C(=O)N2CCc3cccnc3C2)c1OCc1ccccc1] | ¹H NMR (DMSO-d6, 400 MHz): δ 1.94 (d, J = 17.6 Hz, 3H), 2.76 (s, 2H), 3.46-3.50 (m, 2H), 4.36-4.43 (m, 1H), 4.57-4.59 (m, 1H), 4.68-4.71 (m, 1H), 4.77-4.84 (m, 1H), 6.29 (d, J = 8.4 Hz, 1H), 7.16-7.31 (m, 6H), 7.51-7.56 (m, 1H), 8.30-8.43 (m, 1H), 9.45 (d, J = 11.6 Hz, 1H), 9.57 (d, J = 3.6 Hz, 1H). LCMS (Method A): 1.366 min, MS: ES+ 391.22 (M + 1) Using Intermediate 22 and 5,6,7,8-tetrahydro-1,7-naphthyridine according to Method 1. Note: Duplication of peaks observed in the ¹H NMR-material is a mixture of rotamers |
| 54 | (2-(benzyloxy)-4,6-dihydroxy-3-methylphenyl)(7,8-dihydro-1,6-naphthyridin-6(5H)-yl)methanone | 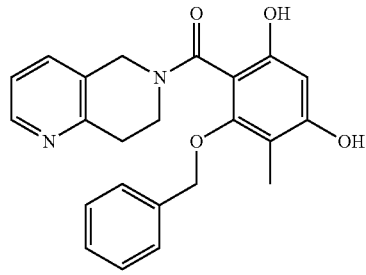 [SMILES: Cc1c(O)cc(O)c(C(=O)N2CCc3ncccc3C2)c1OCc1ccccc1] | ¹H NMR (DMSO-d6, 400 MHz): δ 1.95 (d, J = 17.6 Hz, 3H), 2.83-2.84 (m, 2H), 3.48-3.55 (m, 2H), 4.46-4.50 (m, 1H), 4.57-4.60 (m, 1H), 4.68-4.70 (m, 1H), 4.77-4.85 (m, 1H), 6.28 (d, J = 12.4 Hz, 1H), 7.20-7.29 (m, 5H), 7.48-7.50 (m, 1H), 7.69-7.71 (m, 1H), 8.35-8.36 (m, 1H), 9.46 (s, 1H), 9.55 (s, 1H). LCMS (Method E): 1.098 min, MS: ES+ 391.27 (M + 1) Using Intermediate 22 and 5,6,7,8-tetrahydro-1,6-naphthyridine according to Method 1. Note: Duplication of peaks observed in the ¹H NMR-material is a mixture of rotamers |
| 55 | (2-(benzyloxy)-4,6-dihydroxy-3-methylphenyl)(7,8-dihydropyrido[4,3-d]pyrimidin-6(5H)-yl)methanone | 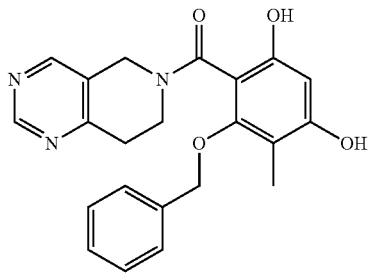 [SMILES: Cc1c(O)cc(O)c(C(=O)N2CCc3ncncc3C2)c1OCc1ccccc1] | ¹H NMR (DMSO-d6, 400 MHz): δ 1.95 (d, J = 18.4 Hz, 3H), 2.78-2.88 (m, 2H), 3.48-3.55 (m, 2H), 4.68-4.92 (m, 4H), 6.28 (d, J = 13.6 Hz, 1H), 7.16-7.31 (m, 5H), 8.72 (s, 1H), 8.92 (d, J = 10.4 Hz, 1H), 9.50 (s, 1H), 9.59 (s, 1H). LCMS (Method A): 1.378 min, MS: ES+ 392.12 (M + 1) Using Intermediate 22 and 5,6,7,8-tetrahydropyrido[4,3-d]pyrimidine according to Method 1. Note: Duplication of peaks observed in the ¹H NMR-material is a mixture of rotamers |

-continued

| Ex. No. | Name | Structure | Data |
|---|---|---|---|
| 56 | (2-(benzyloxy)-4,6-dihydroxy-3-methylphenyl)(5,8-dihydropyrido[3,4-d]pyrimidin-7(6H)-yl)methanone | 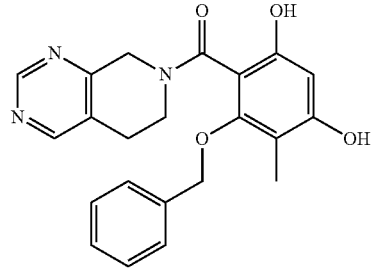 [SMILES: Cc1c(O)cc(O)c(C(=O)N2CCc3cncnc3C2)c1OCc1ccccc1] | ¹H NMR (DMSO-d6, 400 MHz): δ 1.95 (d, J = 20 Hz, 3H), 2.67-2.83 (m, 2H), 3.43-3.49 (m, 2H), 4.33-4.46 (m, 1H), 4.60-4.86 (m, 3H), 6.28 (d, J = 14.8 Hz, 1H), 7.14-7.24 (m, 3H), 7.30-7.32 (m, 2H), 8.54 (d, J = 6.8 Hz, 1H), 8.90-9.00 (m, 1H), 9.44-9.50 (m, 1H), 9.60 (d, J = 6.8 Hz, 1H). LCMS (Method E): 1.414 min, MS: ES+ 392.20 (M + 1) Using Intermediate 22 and 5,6,7,8-tetrahydropyrido[3,4-d]pyrimidine according to Method 1. Note: Duplication of peaks observed in the ¹H NMR-material is a mixture of rotamers |
| 57 | (3,4-dihydroisoquinolin-2(1H)-yl)(4,6-dihydroxy-3-methyl-2-((1-methyl-1H-pyrazol-3-yl)methoxy)phenyl)methanone | 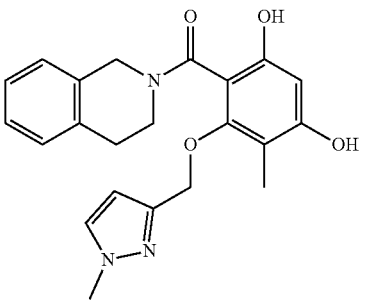 [SMILES: Cc1c(O)cc(O)c(C(=O)N2CCc3ccccc3C2)c1OCc1ccn(C)n1] | ¹H NMR (DMSO-d6, 400 MHz): δ 1.92 (d, J = 10 Hz, 3H), 2.68-2.82 (m, 2H), 3.75 (d, J = 11.6 Hz, 5H), 4.39-4.41 (m, 1H), 4.52-4.62 (m, 1H), 4.68-4.84 (m, 1H), 6.06-6.11 (m, 1H), 6.25 (d, J = 6.8 Hz, 1H), 7.00-7.02 (m, 3H), 7.10-7.26 (m, 2H), 7.52-7.58 (m, 1H), 9.37 (d, J = 11.6 Hz, 1H), 9.50 (s, 1H). LCMS (Method A): 1.534 min, MS: ES+ 394.20 (M + 1) Using Intermediate 35 and 1,2,3,4-tetrahydroisoquinoline according to Method 1. Note: Duplication of peaks observed in the ¹H NMR-material is a mixture of rotamers |
| 58 | (2-(benzyloxy)-4,6-dihydroxyphenyl)(3,4-dihydroisoquinolin-2(1H)-yl)methanone | 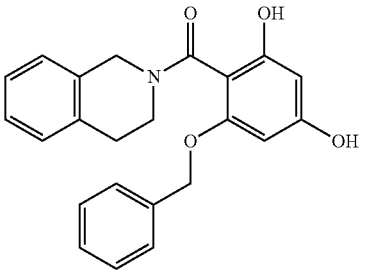 [SMILES: O=C(c1c(O)cc(O)cc1OCc1ccccc1)N1CCc2ccccc2C1] | ¹H NMR (DMSO-d6, 400 MHz): δ 2.67-2.75 (m, 2H), 3.44-3.56 (m, 2H), 4.74-5.00 (m, 4H), 5.95-5.99 (m, 2H), 7.03-7.23 (m, 9H), 9.48-9.50 (m, 2H). LCMS (Method A): 1.900 min, MS: ES+ 376.20 (M + 1) Using Intermediate 21 and 1,2,3,4-tetrahydroisoquinoline according to Method 1. Note: Duplication of peaks observed in the ¹H NMR-material is a mixture of rotamers |
| 59 | (2-(benzyloxy)-4,6-dihydroxy-3-methylphenyl)(isoindolin-2-yl)methanone | 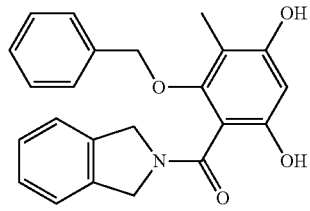 [SMILES: Cc1c(O)cc(O)c(C(=O)N2Cc3ccccc3C2)c1OCc1ccccc1] | ¹H NMR (DMSO-d6, 400 MHz): δ 1.97 (s, 3H), 4.43-4.58 (m, 2H), 4.71-4.76 (m, 3H), 4.90-4.92 (m, 1H), 6.30 (s, 1H), 7.24-7.38 (m, 9H), 9.51 (s, 1H), 9.56 (s, 1H). LCMS (Method E): 1.911 min, MS: ES+ 376.22 (M + 1) Using Intermediate 22 and isoindoline according to Method 1. |
| 60 | (2-(benzyloxy)-4,6-dihydroxy-3-methylphenyl)(7-((dimethylamino)methyl)-3,4-dihydroisoquinolin-2(1H)-yl)methanone | 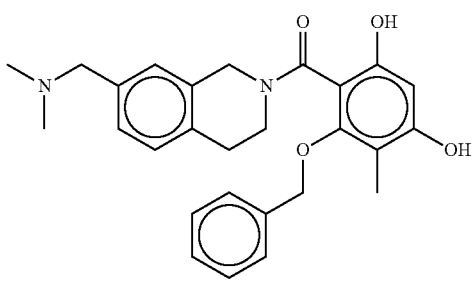 | ¹H NMR (DMSO-d6, 400 MHz, D₂O exchange); Material is a mixture of rotamers: δ ppm 1.87 and 1.93 (singlets, 3H), 2.26 (3, 3H), 2.38 (s, 3H), 2.68-2.79 (m, 3H), 3.35-3.44 (m, 2H), 3.44-3.54 (m, 1H), 3.62 (bs, 1H), 3.75 (bs, 1H), 3.98-4.02 (m, 1H), 4.33-4.38 (m, 1H), 4.51-4.80 (m, 3H), 6.21 (s, br, 1H), 7.10-7.25 (m, 7H), 7.49-7.51 (m, 1H). LCMS (Method A): 1.220 min, MS ES+ 447.2 (M + 1). Prepared using Intermediate 22 and Intermediate 42 according to Method 1. |

| Ex. No. | Name | Structure | Data |
|---|---|---|---|
| 61 | (2-(benzyloxy)-4,6-dihydroxy-3-methylphenyl)(6-((dimethylamino)methyl)-3,4-dihydroisoquinolin-2(1H)-yl)methanone | | High temperature ¹H NMR (DMSO-d6, 400 MHz, 335.1 K); Material is a mixture of rotamers: δ 1.97 (s, 3H), 2.30 (s, 6H), 2.77-2.79 (m, 2H), 3.45-3.46 (m, 2H), 3.49-3.51 (m, 2H), 3.53-3.58 (m, 2H), 4.74 (s, br, 2H), 6.28 (s, 1H), 7.09-7.25 (m, 8H), 9.15 (s, 1H, D₂O exchangeable), 9.28 (s, 1H, D₂O exchangeable). LCMS (Method A): 1.151 min, MS: ES+ 447.3 (M + 1). Prepared using Intermediate 22 and Intermediate 43 according to Method 1. |
| 62 | (S)-(2-(Benzyloxy)-4,6-dihydroxy-3-methylphenyl)(3-(hydroxymethyl)-3,4-dihydroisoquinolin-2(1H)-yl)methanone | | High temperature ¹H NMR (DMSO-d6, 400 MHz, 335 K); Material is a mixture of rotamers: δ 1.97 and 1.98 (singlets, 3H), 2.84-2.97 (m, 2H), 3.25-3.26 (m, 1H), 3.47-3.53 (m, 1H), 3.90-3.92 (m, 1H), 4.17-4.29 (m, 1H), 4.40-4.41 (m, 1H), 4.54-5.03 (m, 3H), 5.22-5.27 (m, 1H), 6.23-6.30 (m, 1H), 7.01-7.33 (m, 6H), 7.38-7.43 (m, 2H), 9.03-9.19 (m, 1H, D₂O exchangeable), 9.27 (m, 1H, D₂O exchangeable). LCMS (Method A): 1.829 min, MS: ES+ 420.3 (M + 1).<br>Prepared using Intermediate 22 and (S)-(1,2,3,4-tetrahydroisoquinolin-3-yl)methanol according to Method 1. |
| 63 | (2-(benzyloxy)-4,6-dihydroxy-3-methylphenyl)(1-(hydroxymethyl)isoindolin-2-yl)methanone | | High temperature ¹H NMR (DMSO-d6, 400 MHz, 335 K); Material is a mixture of rotamers: δ 1.99 (2 singlets, 3H), 3.53-3.59 (m, 1H), 3.96-3.97 (m, 1H), 4.55-4.99 (m, 5H), 5.26-5.28 (m, 1H), 6.30 (s, br, 1H), 7.08 (s, 1H), 7.26-7.45 (m, 8H), 9.24 (s, 1H, D₂O exchangeable), 9.32 (s, 1H, D₂O exchangeable). LCMS (Method A): 1.800 min, MS: ES+ 406.27 (M + 1).<br>Prepared using Intermediate 22 and (isoindolin-1-ylmethanol hydrochloride according to Method 1. |
| 64 | (R)-(2-(benzyloxy)-4,6-dihydroxy-3-methylphenyl)(3-(hydroxymethyl)-3,4-dihydroisoquinolin-2(1H)-yl)methanone | | High temperature ¹H NMR (DMSO-d6, 400 MHz, 335 K); Material is a mixture of rotamers: δ 1.95-1.97 (2 singlets, 3H), 2.83-2.88 (m, 1H), 2.92-2.02 (m, 1H), 3.25-3.31 (m, 1H), 3.45-3.46 (m, 1H), 4.17-5.26 (m, 5H), 6.23-6.29 (m, 1H), 7.01-7.21 (m, 7H), 7.29-7.43 (m, 2H), 9.01-9.26 (m, 2H, D₂O exchangeable). LCMS (Method A): 1.805 min, MS ES+: 420.17 (M + 1). Prepared using Intermediate 22 and (R)-(1,2,3,4-tetrahydroisoquinolin-3-yl)methanol according to Method 1. |
| 65 | (2-(Benzyloxy)-4,6-dihydroxy-3-methylphenyl)(1-(hydroxymethyl)-3,4-dihydroisoquinolin-2(1H)-yl)methanone | | High temperature ¹H NMR (DMSO-d6, 400 MHz, 340 K); material is a mixture of rotamers: δ 1.88-1.96 (m, 3H), 2.68-2.72 (m, 1H), 2.94-3.00 (m, 1H), 3.54-3.56 (m, 1H), 3.70-3.71 (m, 1H), 3.82-3.83 (m, 1H), 4.56-4.57 (m, 1H), 4.65-4.66 (m, 1H), 4.81-4.84 (m, 1H), 5.06-5.09 (m, 1H), 5.54-5.61 (m, 1H), 6.27 and 6.30 (2 singlets, 1H), 6.93-7.17 (m, 6H), 7.31-7.40 (m, 2H), 7.48 (m, 1H), 9.10 (bs, 2H, D₂O exchangeable). LCMS (Method A): 1.715 min, MS: ES+ 420.20 (M + 1). |

| Ex. No. | Name | Structure | Data |
|---|---|---|---|
| | | | Prepared using Intermediate 22 and Intermediate 44 according to Method 1. |
| 66 | (2-(Benzyloxy)-4,6-dihydroxy-3-methylphenyl)(4-(hydroxymethyl)-3,4-dihydroisoquinolin-2(1H)-yl)methanone | | High temperature ¹H NMR (DMSO-d6, 400 MHz, 340 K); material is a mixture of rotamers: δ 1.95 and 1.98 (singlets, 3H), 2.90-2.92 (m, 1H), 3.47-3.60 (m, 4H), 4.35-4.36 (m, 2H), 4.76-4.78 (m, 2H), 6.26 and 6.29 (singlets, 1H), 7.17-7.30 (m, 9H), 9.09-9.23 (m, 2H, D₂O exchangeable). LCMS (Method A): 1.809 min, MS ES+: 420.27 (M + 1). Prepared using Intermediate 22 and Intermediate 45 according to Method 1. |
| 67 | (2-(Benzyloxy)-4,6-dihydroxy-3-methylphenyl)(2,3-dihydro-4H-benzo[b][1,4]oxazin-4-yl)methanone | | High temperature ¹H NMR (DMSO-d6, 400 MHz); material is a mixture of rotamers: δ 1.97 (s, 3H), 3.64 (m, 1H), 3.88 (m, br, 1H), 4.18-4.20 (m, 2H), 4.86 (m, 2H), 6.25 (s, 1H), 6.75-6.87 (m, 2H), 6.99 (m, 2H), 7.30-7.38 (m, 5H), 9.37 (s, 2H, D₂O exchangeable). LCMS (Method A): 2.060 min, MS ES+ 392.22 (M + 1). Prepared using Intermediate 22 and 3,4-dihydro-2H-benzo[b][1,4]oxazine according to Method 2. |
| 68 | (2-(Benzyloxy)-4,6-dihydroxy-3-methylphenyl)(5-((dimethylamino)methyl)isoindolin-2-yl)methanone | | High temperature ¹H NMR (DMSO-d6, 400 MHz); material is a mixture of rotamers: δ 1.99 (s, 3H), 2.13 (s, 3H), 2.16 (s, 3H), 3.36-3.39 (m, 2H), 4.50-4.51 (m, 2H), 4.73-4.74 (m, 2H), 4.90-4.91 (m, 2H), 6.31 (s, 1H), 7.17-7.36 (m, 8H), 8.45 (s, br, 1H), 9.32 (s, br, 2H, D₂O exchangeable). LCMS (Method A): 1.160 min, MS: ES+ 433.27 (M + 1). Using Intermediate 22 and Intermediate 46 according to Method 1. |
| 69 | (2-(Benzyloxy)-4,6-dihydroxy-3-methylphenyl)(5-(morpholinomethyl)isoindolin-2-yl)methanone | | ¹H NMR (DMSO-d6, 400 MHz); material is a mixture of rotamers: δ 1.97 (s, 3H), 2.33 (bs, 4H), 3.43-3.46 (m, 2H), 3.54-3.56 (m, 4H), 4.41-4.43 (m, 2H), 4.72-4.92 (m, 4H), 6.31 (s, 1H), 7.17-7.36 (m, 8H), 9.51 (s, 1H, D₂O exchangeable). 9.55 (s, 1H, D₂O exchangeable). LCMS (Method A): 1.286 min, MS ES+: 475.17 (M + 1). Prepared using Intermediate 22 and Intermediate 47 according to Method 1. |

| Ex. No. | Name | Structure | Data |
|---|---|---|---|
| 70 | (2-(Benzyloxy)-4,6-dihydroxy-3-methylphenyl)(indolin-1-yl)methanone | | High temperature $^1$H NMR (DMSO-d6, 400 MHz, 350 K); material is a mixture of rotamers: δ 1.98 (s, 3H), 3.01-3.03 (m, 1H), 3.46-3.54 (m, 1H), 3.90-3.91 (m, 2H), 4.83-5.00 (m, 2H), 6.33 (s, 1H), 6.90-6.99 (m, 4H), 7.20-7.33 (m, 5H), 9.38 (s, br, 2H, D$_2$O exchangeable). LCMS (Method A): 2.003 min, MS ES+ 376.22 (M + 1).<br>Prepared using Intermediate 22 and indoline according to Method 1. |
| 71 | (2-(Benzyloxy)-4,6-dihydroxyphenyl)(indolin-1-yl)methanone | | High temperature $^1$H NMR (DMSO-d6, 400 MHz, 330 K); material is a mixture of rotamers: δ 2.99-3.05 (m, 2H), 3.80-3.82 (m, br, 2H), 5.00-5.03 (m, br, 2H), 6.04 (s, 2H), 7.16 7.27 (m, 8H), 8.15-8.17 (m, br 1H), 9.38-9.44 (m, 2H, D$_2$O exchangeable). LCMS (Method A): 1.921 min, MS ES+ 362.2 (M + 1).<br>Prepared using Intermediate 21 and indoline according to Method 1. |
| 72 | (2-(Benzyloxy)-4,6-dihydroxy-3-methylphenyl)(3,4-dihydroquinolin-1(2H)-yl)methanone | | High temperature $^1$H NMR (DMSO-d6, 400 MHz, 335 K); material is a mixture of rotamers: δ 1.84-1.90 (m, 2H), 1.94 (s, 3H), 2.65-2.67 (m, 2H), 3.53-3.69 (m, 2H), 4.84-4.85 (m, 2H), 6.20 (s, 1H), 6.95-6.97 (m, 2H), 7.09-7.10 (m, 1H), 7.30-7.39 (m, 6H), 9.90-9.24 (m, 2H, D$_2$O exchangeable). LCMS (Method A): 2.222 min, MS ES+ 390.22 (M + 1).<br>Prepared using Intermediate 22 and 1,2,3,4-tetrahydroquinoline according to Method 1. |
| 73 | (2-(Benzyloxy)-4,6-dihydroxyphenyl)(3,4-dihydroquinolin-1(2H)-yl)methanone | | High temperature $^1$H NMR (DMSO-d6, 400 MHz, 335 K); material is a mixture of rotamers: δ 1.80-1.85 (m, 2H), 2.63-2.67 (m, 1H), 3.46-3.53 (m, 2H), 3.75-3.76 (m, 1H), 4.77-4.95 (m, 2H), 5.87 (s, 1H) 5.94 (s, 1H), 6.90-6.99 (m, 2H), 7.07-7.09 (m, 1H), 7.25-7.34 (m, 6H), 9.25-9.32 (m, 2H, D$_2$O exchangeable). LCMS (Method A): 1.976 min, MS ES+ 376.30 (M + 1).<br>Prepared using Intermediate 21 and 1,2,3,4-tetrahydroquinoline according to Method 1. |
| 74 | (2-(Benzyloxy)-4,6-dihydroxy-3-methylphenyl)(1,3-dihydro-2H-pyrrolo[3,4-c]pyridin-2-yl)methanone | | $^1$H NMR (DMSO-d6, 400 MHz); material is a mixture of rotamers: δ 1.97 (s, 3H), 4.48-4.59 (m, 2H), 4.72-4.93 (m, 4H), 6.31 (s, 1H), 7.24-7.35 (m, 4H), 7.43-7.44 (m, 1H), 8.44-8.48 (m, 2H), 8.61 (s, 1H), 9.58-9.61 (m, 2H, D$_2$O exchangeable). LCMS (Method A): 1.103 min, MS ES+ 377.3 (M + 1).<br>Prepared using Intermediate 22 and 2,3-dihydro-1H-pyrrolo[3,4-c]pyridine.2HCl according to Method 1. |

| Ex. No. | Name | Structure | Data |
|---|---|---|---|
| 75 | (2-(Benzyloxy)-4,6-dihydroxy-3-methylphenyl)(4-((4-methylpiperazin-1-yl)methyl)isoindolin-2-yl)methanone | 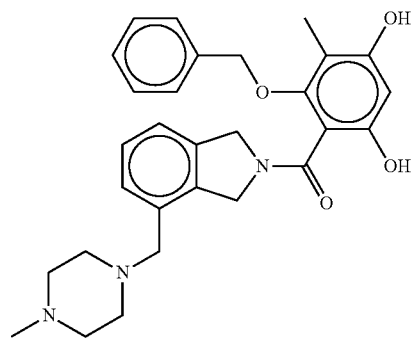 | High temperature ¹H NMR (DMSO-d6, 400 MHz, 340 K); material is a mixture of rotamers: δ 2.00 (s, 3H), 2.10-2.40 (m, 12H), 4.41-4.63 (m, 2H), 4.74-4.93 (m, 4H), 6.32 (s, 1H), 7.17-7.34 (m, 8H), 9.17 (bs, 2H, D₂O exchangeable). LCMS (Method A): 1.467 min, MS ES+: 488.22 (M + 1). Prepared using Intermediate 22 and Intermediate 48 according to Method 1. |
| 76 | (2-(Benzyloxy)-4,6-dihydroxy-3-methylphenyl)(4-(morpholinomethyl)isoindolin-2-yl)methanone | 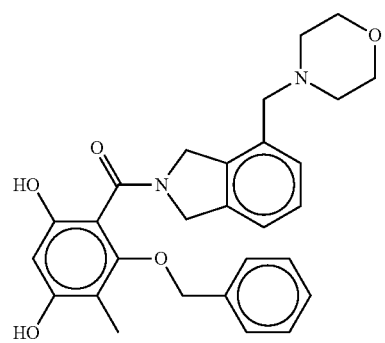 | ¹H NMR (DMSO-d6, 400 MHz); material is a mixture of rotamers: δ 1.97 and 1.98 (singlets, 3H), 2.19 (s, 2H), 2.35 (s, 2H), 3.34 (s, 1H), 3.40-3.49 (m, 3H), 3.57 (s, br, 2H), 4.44-4.45 (m, 1H), 4.54-4.56 (m, 1H), 4.67-4.73 (m, 2H), 4.79-4.80 (m, 1H), 4.90-4.93 (m, 1H), 6.30 and 6.31 (singlets, 1H), 7.13-7.21 (m, 2H), 7.26-7.27 (m, 4H), 7.32-7.36 (m, 2H), 9.48-9.50 (m, 1H, D₂O exchangeable), 9.54 (s, 1H, D₂O exchangeable). LCMS (Method A): 1.326 min, MS ES+ 475.2 (M + 1). Prepared using Intermediate 22 and Intermediate 49 according to Method 1. |
| 77 | 2-(2-(Benzyloxy)-4,6-dihydroxy-3-methylbenzoyl)-N,N-dimethyl-1,2,3,4-tetrahydroisoquinoline-7-carboxamide | 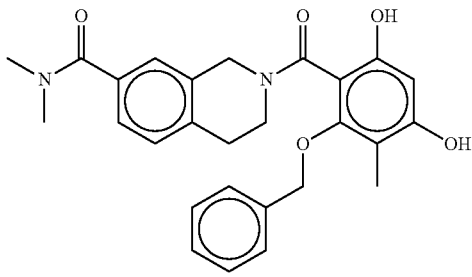 | High temperature ¹H NMR (DMSO-d6, 400 MHz, 330 K); material is a mixture of rotamers: δ 1.96 (s, 3H), 2.97 (s, br, 6H), 3.50-3.52 (m, 2H), 3.71-4.00 (m, 2H), 4.74-4.88 (m, 4H), 6.28 (s, 1H), 7.17-7.24 (m, 8H), 9.20 (s, 1H, D₂O exchangeable), 9.32 (s, 1H, D₂O exchangeable). LCMS (Method A): 1.744 min, MS ES+ 461.2 (M + 1). Prepared using Intermediate 22 and N, N-dimethyl-1, 2,3,4-tetrahydroisoquinoline-7-carboxamide (Intermediate 42a) according to Method 1. |
| 78 | 2-(2-(benzyloxy)-4,6-dihydroxy-3-methylbenzoyl)-N,N-dimethyl-1,2,3,4-tetrahydroisoquinoline-6-carboxamide | 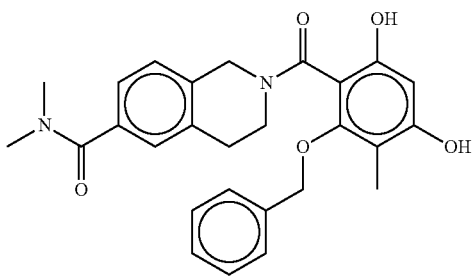 | High temperature ¹H NMR (DMSO-d6, 400 MHz, 335 K); material is a mixture of rotamers: δ 1.97 (s, 3H), 2.78-2.81 (m, 2H), 2.93-2.94 (s, br, 6H), 3.67-3.69 (m, 1H), 3.96-3.97 (m, 1H), 4.45-4.47 (m, 1H), 4.75-4.76 (m, 3H), 6.28 (s, 1H), 7.15-7.25 (m, 8H), 9.17 (s, 1H, D₂O exchangeable), 9.29 (s, 1H, D₂O exchangeable). LCMS (Method A): 1.648 min, MS ES+ 461.27 (M + 1). Prepared using Intermediate 22 and N, N-dimethyl-1,2,3,4-tetrahydroisoquinoline-6-carboxamide (Intermediate 43a) according to Method 1. |

| Ex. No. | Name | Structure | Data |
|---|---|---|---|
| 79 | (2-(Benzyloxy)-4,6-dihydroxy-3-methylphenyl)(4-((tetrahydrofuran-3-yl)amino)isoindolin-2-yl)methanone | | $^1$H NMR (DMSO-d6, 400 MHz); material is a mixture of rotamers: δ 1.75-1.76 (m, 1H), 1.98 (s, 3H), 2.07-2.33 (m, 1H), 3.50-3.55 (m, 2H), 3.60-3.69 (m, 2H), 4.32-4.35 (m, 2H), 4.59-4.63 (m, 1H), 4.67-4.74 (m, 2H), 4.90-4.92 (m, 1H), 5.33-5.48 (m, 1H), 6.30 and 6.31 (singlets, 1H), 6.41 (m, 1H), 6.60-6.61 (m, 1H), 7.03-7.11 (m, 1H), 7.27-7.36 (m, 5H), 9.46-9.56 (m, 2H, D$_2$O exchangeable). LCMS (Method A): 1.943 min, MS ES+ 461.2 (M + 1). Prepared using Intermediate 22 and Intermediate 50 according to Method 1. |
| 80 | (2-(Benzyloxy)-4,6-dihydroxy-3-methylphenyl)(4-(oxetan-3-ylamino)isoindolin-2-yl)methanone | | $^1$H NMR (DMSO-d6, 400 MHz); material is a mixture of rotamers: δ 1.98 and 1.99 (singlets, 3H), 4.35-4.53 (m, 5H), 4.55-4.60 (m, 1H), 4.68-4.77 (m, 2H), 4.83-4.86 (m, 2H), 5.93-6.18 (m, 1H), 6.31 and 6.32 (singlets, 1H), 6.50-6.64 (m, 1H), 7.00-7.08 (m, 1H), 7.28-7.38 (m, 5H), 9.48-9.54 (m, 2H, D$_2$O exchangeable). LCMS (Method A): 1.853 min, MS ES+ 447.20 (M + 1). Prepared using Intermediate 22 with Intermediate 51 according to Method 1. |
| 81 | (2-(Benzyloxy)-4,6-dihydroxy-3-methylphenyl)(4-(3-hydroxypiperidin-1-yl)isoindolin-2-yl)methanone | | $^1$H NMR (DMSO-d6, 400 MHz); material is a mixture of rotamers: δ 1.27-1.40 (m, 1H), 1.57-1.60 (m, 2H), 1.82 (m, 1H), 1.96 and 1.99 (singlets, 3H), 2.92 (m, 1H), 3.25-3.28 (m, 1H), 3.64 (m, br, 1H), 4.45-4.52 (m, 3H), 4.65-4.75 (m, 3H), 4.86-4.93 (m, 2H), 6.30 (m, 1H), 6.83-7.01 (m, 2H), 7.19-7.36 (m, 6H), 9.19-9.23 (m, 1H, D$_2$O exchangeable), 9.30 (s, 1H, D$_2$O exchangeable). LCMS (Method A): 1.905 min, MS ES+ 475.2 (M + 1). Prepared using Intermediate 22 and Intermediate 52 according to Method 1. |

Example 82: 2-(2-(benzyloxy)-4,6-dihydroxy-3-methylbenzoyl)isoindoline-4-carbonitrile (Reaction Scheme Shown in FIG. 1)

4-Bromoisoindoline hydrochloride

To a stirred solution of tert-butyl 4-bromo-isoindoline-2-carboxylate (0.5 g, 1.67 mmol, 1.0 eq.) in DCM at 0° C. (5 mL) was added dropwise 4N HCl in dioxane (5 mL) and the reaction stirred at room temperature for 2 h. Reaction completion was monitored by TLC (9:1; DCM:methanol). The resulting reaction mixture was concentrated under reduced pressure and the crude material (0.48 g) was purified by trituration using n-pentane (3×25 mL) to give the title compound (0.47 g, 2.00 mmol, Yield: 100%).

$^1$H NMR (DMSO-d6, D$_2$O-exchange 400 MHz): δ 4.48 (s, 2H), 4.62 (s, 2H), 7.34 (t, J=7.6, 15.6 Hz, 1H), 7.43 (d, J=7.6 Hz, 1H), 7.59 (d, J=7.6 Hz, 1H), 10.06 (s, 2H). LCMS (Method A): 0.766 min, MS: ES+198.03 (M+1).

5-(benzyloxy)-4-(4-bromoisoindoline-2-carbonyl)-6-methyl-1,3-phenylenebis(4-methylbenzenesulfonate)

Intermediate 22 (0.5 g, 0.86 mmol, 1.0 eq.) in DMF (5 mL) at 0° C. under nitrogen atmosphere was treated with HATU (0.48 g, 1.28 mmol, 1.5 eq.) and DIPEA (0.22 g, 1.71 mmol, 2.0 eq.) and stirred for 15 min. 4-Bromoisoindoline hydrochloride (0.17 g, 0.86 mmol, 1.0 eq.) was added and the resulting reaction mixture stirred at 0° C. for 1 h. Reaction completion was monitored by TLC (ethyl acetate: hexane 1:1). The reaction mixture was poured into water (50 mL) and extracted with ethyl acetate (4×50 mL). The combined organic layer was dried over sodium sulphate, filtered and concentrated under reduced pressure. The obtained crude material (0.6 g) was purified by flash chromatography (product was eluted in 2% methanol in DCM) yielding the title compound (0.45 g, 0.591 mmol, Yield: 69%).

LCMS (Method A): 2.860 min, MS: ES+764 (M+1).

((2-(Benzyloxy)-4,6-dihydroxy-3-methylphenyl)(4-bromoisoindolin-2-yl)methanone

To a stirred solution 5-(benzyloxy)-4-(4-bromoisoindoline-2-carbonyl)-6-methyl-1,3-phenylene bis(4-methylbenzenesulfonate) (0.1 g, 0.13 mmol, 1.0 eq.) in EtOH:water (2 mL, 1:1) was added aqueous KOH (0.29 g, 0.52 mmol, 40 eq. in minimum water) at room temperature. The resulting reaction mixture was heated to 60° C. and stirred for 2 h. Reaction completion was monitored on TLC (DCM:Methanol 9:1). The resulting reaction mixture was allowed to cool to room temperature, diluted with water (10 mL), neutralized with diluted HCl and extracted with ethyl acetate (4×20 mL). The combined organic layer was dried over $Na_2SO_4$, filtered and concentrated under reduced pressure. The crude material was purified by flash chromatography (product eluted by 6% methanol in DCM) to give the title compound (0.030 g, 0.066 mmol, Yield: 50%).

$^1$H NMR (DMSO-d6, 400 MHz): 1.98 (2 singlets, 3H), 4.27-4.57 (m, 2H), 4.63-4.75 (m, 2H), 4.84-4.95 (m, 2H), 6.30 (d, J=2.4 Hz, 1H), 7.22-7.41 (m, 7H), 7.47-7.52 (m, 1H), 9.52-9.60 (m, 2H). LCMS (Method A): 2.379 min, MS: ES+456.4 (M+1).

2-(2-(benzyloxy)-4,6-dihydroxy-3-methylbenzoyl) isoindoline-4-carbonitrile (2-(benzyloxy)-4,6-dihydroxy-3-methylphenyl)(4-bromoisoindolin-2-yl)methanone (0.2 g, 0.44 mmol, 1.0 eq) in DMF (2 mL) at room temperature was treated with zinc cyanide (0.027 g, 0.23 mmol, 0.54 eq), zinc powder (0.005 g, 0.088 mmol, 0.2 eq) and BINAP (0.002 g, 0.044 mmol, 0.1 eq). The reaction mixture was degassed ($N_2$ gas) for 10-15 mins. Pd(OAc)$_2$ (0.002 mg, 0.044 mmol, 0.1 eq) was added and the resulting reaction mixture heated to 100° C. and stirred for 1 h under microwave irradiation. The resulting reaction was allowed to cool to room temperature, poured into water (100 mL) and extracted with ethyl acetate (3×110 mL). The combined organic layer was dried over $Na_2SO_4$, filtered and concentrated under vacuum. The crude material was purified by flash chromatography (product eluted in 35% EtOAc in hexane) to give the title compound (0.05 g, 0.12 mmol. Yield: 28.38%,).

$^1$H NMR (DMSO-d6, 400 MHz): δ 1.99 (d, J=8.4 Hz, 3H), 4.48-4.52 (m, 1H), 4.62-4.93 (m, 5H), 6.31 (2 singlets, 1H), 7.18-7.28 (m, 5H), 7.45-7.61 (m, 1H), 7.73-7.79 (m, 2H), 9.57-9.65 (m, 2H). LCMS (Method A): 1.765 min, MS ES+401.2 (M+1).

Figure 2:
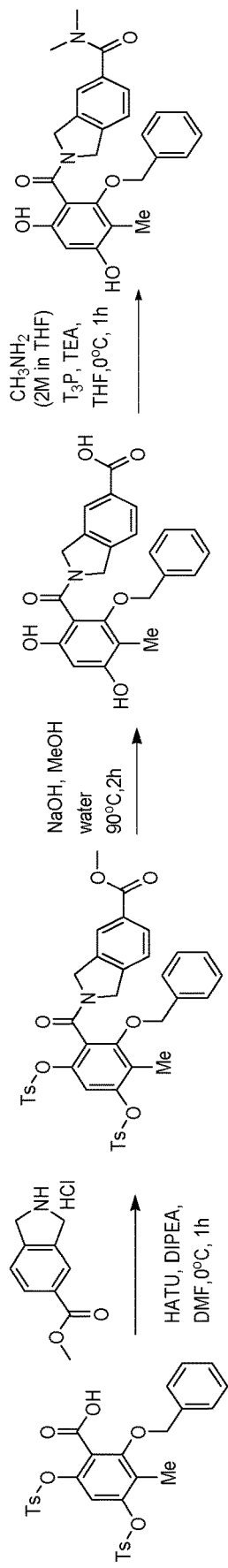
FIG. 2 shows the reaction scheme for 2-(2-(Benzyloxy)-4,6-dihydroxy-3-methylbenzoyl)-N,N-dimethylisoindoline-5-carboxamide (Example 83)

Example 83: 2-(2-(Benzyloxy)-4,6-dihydroxy-3-methylbenzoyl)-N,N-dimethylisoindoline-5-carboxamide (Reaction scheme shown in FIG. 2)

Methyl 2-(2-(benzyloxy)-3-methyl-4,6-bis(tosyloxy) benzoyl)isoindoline-5-carboxylate A stirred solution of Intermediate 22 (1.2 g, 2.06 mmol, 1.0 eq) in DMF (12 mL) at 0° C. under a nitrogen atmosphere was treated with HATU (1.17 g, 3.09 mmol, 1.5 eq.) and DIPEA (0.53 g, 4.12 mmol, 2.0 eq.) and stirred for 15 min. Methyl isoindoline-5-carboxylate hydrochloride (CAS: 127168-93-8) (0.40 g, 0.22 mmol, 1.1 eq.) was added and the reaction mixture stirred for 1 h at 0° C. The reaction mixture was diluted with ethyl acetate (120 mL) and washed with cold brine solution (3×100 mL). The organic layer was dried over $Na_2SO_4$, filtered and concentrated under reduced pressure. The crude material was purified by flash chromatography (product eluted by 0.8% methanol in DCM) to give the title compound (0.95 g, 1.28 mmol, Yield: 62%).

$^1$H NMR, compound is a mixture of rotamers. (DMSO-d6, 400 MHz): δ 1.87 (s, 3H), 2.13 (s, br, 3H), 2.46 (s, br, 3H), 3.75-3.87 (singlets, 3H), 4.40-4.79 (m, 4H), 6.88 (s, 1H), 7.19-7.32 (m, 8H), 7.51-7.56 (m, 3H), 7.67-7.80 (m, 5H), 7.86-7.93 (m, 1H). LCMS (Method A): 2.969 min, 254 nm, MS: ES+742.2 (M+1); 3.014 min, 210 nm, MS: ES+742.2 (M+1).

2-(2-(Benzyloxy)-4,6-dihydroxy-3-methylbenzoyl) isoindoline-5-carboxylic acid (Intermediate 58)

To a stirred solution of methyl 2-(2-(benzyloxy)-3-methyl-4,6-bis(tosyloxy)benzoyl)isoindoline-5-carboxylate (0.95 g, 1.28 mmol, 1.0 eq.) in EtOH:Water (1:1) (9.5 mL) at room temperature was added an aqueous solution of NaOH (0.51 g, 12.82 mmol, 10 eq. in 0.5 mL in water). The resulting reaction mixture was heated to 90° C. and stirred for 2 h. The reaction mixture was allowed to cool to room temperature, poured into water (125 mL) and neutralized with diluted HCl and extracted with ethyl acetate (4×100 mL). The combined organic layer was dried over $Na_2SO_4$, filtered and concentrated under reduced pressure. The crude material was triturated using n-pentane (3×30 mL) and dried using high vacuum to give the title compound (0.45 g, 1.07 mmol, Yield: 84%) which was used in the next step without purification.

LCMS (Method A): 1.555 min, MS: ES+420.20 (M+1).

2-(2-(Benzyloxy)-4,6-dihydroxy-3-methylbenzoyl)-N,N-dimethylisoindoline-5-carboxamide To a stirred solution of 2-(2-(benzyloxy)-4,6-dihydroxy-3-methylbenzoyl)isoindoline-5-carboxylic acid (0.2 g, 0.47 mmol, 1.0 eq.) and $(CH_3)_2NH$ (2M in THF) (0.52 g, 0.52 mmol, 1.1 eq.) in THF (2 mL, 10 v) at 0° C. were added $T_3P$ (50% in EtOAc) (0.22 g, 0.71 mmol, 1.5 eq.) and the reaction mixture stirred for 15 mins. TEA (0.096 g, 0.95 mmol, 2.0 eq.) was added and the reaction mixture stirred at 0° C. for 1 h. The resulting reaction mixture was poured into water (30 mL) and extracted by ethyl acetate (4×30 mL). The combined organic layer was dried over $Na_2SO_4$, filtered, and concentrated under reduced pressure. The crude material was purified by prep. TLC using 10% methanol in DCM yielding the title compound (0.03 g, 0.06 mmol, Yield: 14%).

$^1$H NMR (DMSO-d6, 400 MHz), compound is a mixture of rotamers: δ 1.97 (s, 3H), 2.87 (d, J=14.4 Hz, 3H), 2.95 (m, 3H), 4.43-4.47 (m, 1H), 4.56-4.59 (m, 1H), 4.71-4.81 (m, 3H), 4.91 (d, J=10.8 Hz, 1H), 6.30 (s, 1H), 7.22-7.43 (m, 8H), 9.54 (d, J=16.4 Hz, 2H). LCMS (Method A): 1.563 min, MS: ES+447.1 (M+1).

Example 84: 2-(2-(Benzyloxy)-4,6-dihydroxy-3-methylbenzoyl)-N-methylisoindoline-5-carboxamide

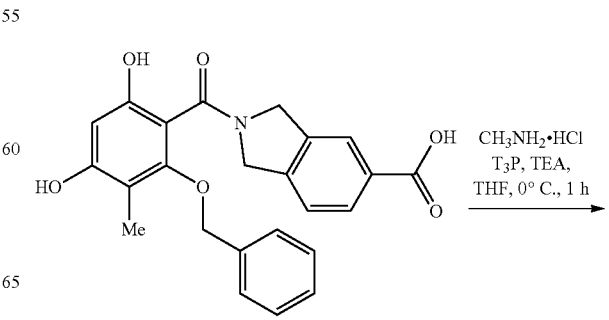

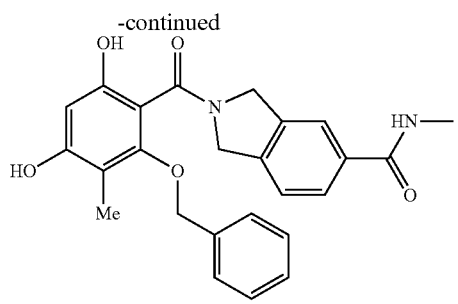

2-(2-(Benzyloxy)-4,6-dihydroxy-3-methylbenzoyl)-N-methylisoindoline-5-carboxamide A stirred solution of 2-(2-(benzyloxy)-4,6-dihydroxy-3-methylbenzoyl) isoindoline-5-carboxylic acid (0.1 g, 0.23 mmol, 1.0 eq.) (Intermediate 58) and MeNH$_2$·HCl (0.017 g, 0.26 mmol, 1.1 eq.) in THF (1 mL) at 0° C. under nitrogen atmosphere was treated with T$_3$P (0.11 g, 0.35 mmol, 1.5 eq.) and stirred for 15 min. TEA (0.048 g, 0.47 mmol, 2.0 eq.) was added to the resulting reaction mixture at 0° C. and stirred for 1 h. The reaction mixture was poured into water (20 mL) and extracted with ethyl acetate (3×20 mL). The combined organic layer was dried over sodium sulphate, filtered and concentrated under reduced pressure. The crude material (0.11 g) was purified by normal phase flash chromatography (silica gel: product eluted in 5.2% methanol in DCM) yielding the title compound (0.017 g, 0.039 mmol, Yield: 16%).

$^1$H NMR (DMSO-d6, 400 MHz), compound is a mixture of rotamers: δ ppm 1.99 (s, 3H), 2.76-2.79 (m, 3H), 3.18 (m, 1H) 4.47-4.63 (m, 2H), 4.73-4.84 (m, 2H), 4.93 (d, J=10.4 Hz, 2H), 6.32 (s, 1H), 7.26-7.40 (m, 5H), 7.68-7.76 (m, 1H), 7.81-7.97 (m, 1H), 8.93-8.46 (m, 1H), 9.53-9.58 (m, 2H). LCMS (Method A): 1.515 min, MS: ES+433.2 (M+1).

Figure 3:
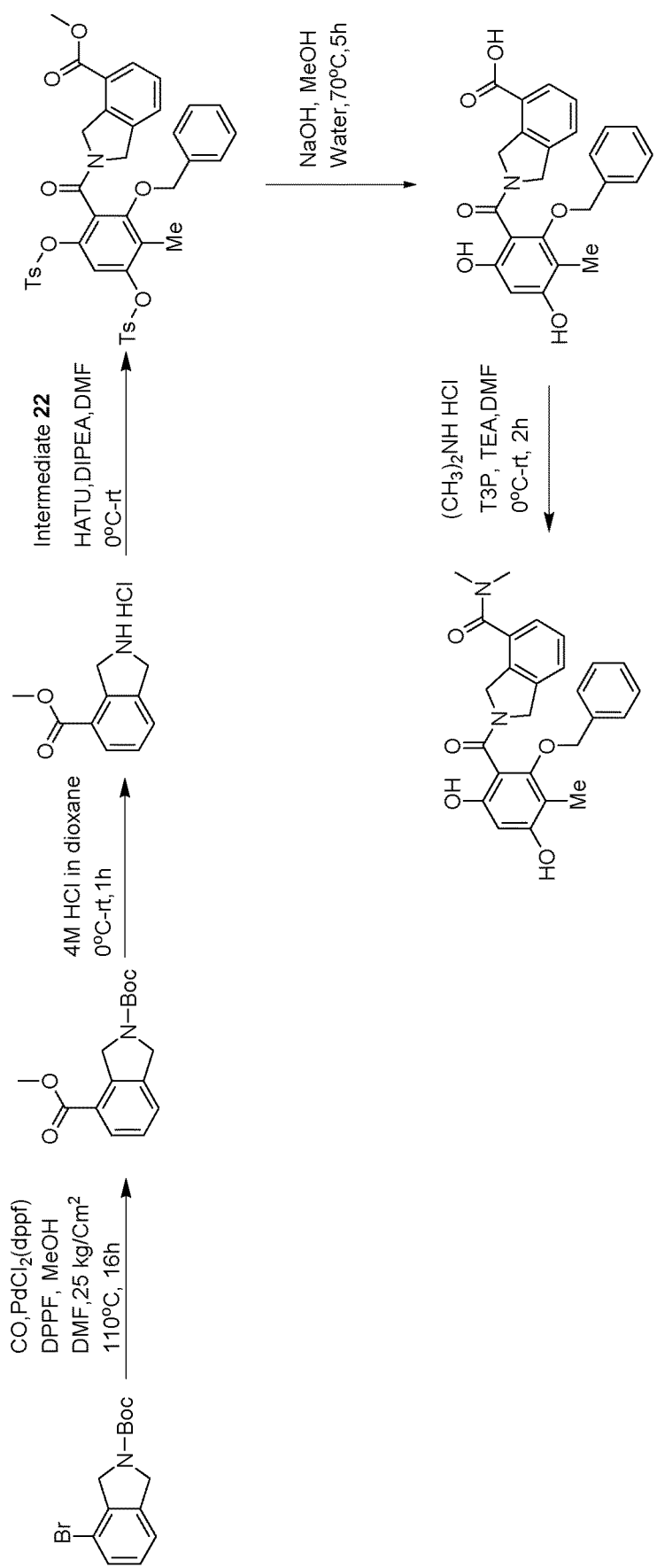
FIG. 3 shows the reaction scheme for 2-(2-(Benzyloxy)-4,6-dihydroxy-3-methylbenzoyl)-N,N-dimethylisoindoline-4-carboxamide (Example 85)

Example 85: 2-(2-(Benzyloxy)-4,6-dihydroxy-3-methylbenzoyl)-N,N-dimethylisoindoline-4-carboxamide (Reaction scheme shown in FIG. 3)

2-(t-Butyl) 4-methyl isoindoline-2,4-dicarboxylate

A stirred solution of t-butyl 4-bromoisoindoline-2-carboxylate (2.0 g, 6.73 mmol, 1.0 eq) (CAS: 1035235-27-8) in MeOH:DMF (10:1) (22 mL) in an autoclave at room temperature was treated with PdCl$_2$(dppf) (0.98 g, 1.28 mmol, 1.34 eq), DPPF (0.37 g, 0.673 mmol, 0.1 eq) and TEA (2.0 g, 2.01 mmol, 3.0 eq). 22 kg/cm$^2$ of CO (gas) was applied to reaction mixture which was heated to 110° C. and stirred for 24 h. The reaction mixture was allowed to cool to room temperature and filtered through a celite bed; water (60 mL) was added to filtrate which was extracted with ethyl acetate (3×50 mL). The combined organic layer was dried over Na$_2$SO$_4$, filtered and concentrated under vacuum. The crude material was purified by flash chromatography (product eluted in 5% ethyl acetate in hexane) yielding the title compound (1.5 g, 5.40 mmol. Yield: 80.6%).

$^1$H NMR (DMSO-d6, 400 MHz): δ 1.46 (s, 9H), 3.86 (s, 3H), 4.62 (d, J=10.4 Hz, 2H), 4.82 (d, J=10.0 Hz, 2H), 7.46 (t, J=7.6 Hz, 1H), 7.61 (t, br, 1H), 7.87 (d, J=7.2 Hz, 1H). LCMS (Method A): 2.172 min, MS: ES+222.2 (M−56).

Methyl isoindoline-4-carboxylate hydrochloride

A stirred solution of 2-(t-butyl) 4-methyl isoindoline-2,4-dicarboxylate (1.5 g, 5.41 mmol, 1.0 eq.) in DCM (15 mL) at room temperature was treated with 4M HCl in dioxane (7.5 mL) at 0° C. The reaction mixture was stirred for 1 h and then evaporated under reduced pressure and the resultant solid triturated using n-pentane (15 mL) to give the title compound (0.95 g, 5.36 mmol, Yield: 100%).

$^1$H NMR (DMSO-d6, 400 MHz): δ 3.89 (s, br, 3H), 4.55 (s, br, 2H), 4.75 (s, br, 2H), 7.55 (t, J=7.6 Hz, 1H), 7.70 (d, J=7.2 Hz, 1H), 7.93 (d, J=7.6 Hz, 1H), 10.0 (s, 2H). LCMS (Method A): 0.638 min, MS: ES+178.2 (M+1).

2-(2-(Benzyloxy)-3-methyl-4,6-bis(tosyloxy)benzoyl)isoindoline-4-carboxylate Carried out on 4 parallel batches at 0.5 g scale. A stirred solution of Intermediate 22 (0.5 g, 0.858 mmol, 1.0 eq) in DMF (2 mL) at 0° C. was treated with HATU (0.489 g, 1.28 mmol, 1.5 eq) and DIPEA (0.553 g, 4.29 mmol, 5.0 eq) and stirred for 10 min. Methyl isoindoline-4-carboxylate hydrochloride (0.201 g, 0.944 mmol, 1.1 eq.) dissolved in DMF (1 mL) was added dropwise to reaction mixture at 0-5° C. The resulting reaction mixture was stirred at room temperature for 16 h. The reaction mixture was poured onto ice-cold water (20 mL) and extracted with ethyl acetate (3×20 mL). The combined organic layer was dried through Na$_2$SO$_4$, filtered and concentrated under vacuum. The crude material was purified by flash chromatography (eluting product with 3% MeOH in DCM) yielding the title compound (2.0 g, 2.69 mmol Yield: 78.7%,) which was progressed to the next step without purification.

LCMS (Method A): 2.828 min, MS: ES+742.22.

2-(2-(Benzyloxy)-4,6-dihydroxy-3-methylbenzoyl)isoindoline-4-carboxylic acid (Intermediate 59)

To a stirred solution of methyl 2-(2-(benzyloxy)-3-methyl-4,6-bis(tosyloxy)benzoyl)isoindoline-4-carboxylate (1.0 g, 1.34 mmol, 1.0 eq.) in EtOH:Water (1:1) (10 mL) at room temperature was added NaOH (2.15 g, 53.92 mmol, 40 eq.). The reaction mixture was heated to 70° C. and stirred for 16 h. The reaction was cooled to 0-5° C. and acidified using saturated solution of KHSO$_4$ (pH 1-2). The aqueous layer was extracted with ethyl acetate (3×30 mL) and the combined organic layer dried over Na$_2$SO$_4$, filtered and concentrated under vacuum. The crude material was triturated using n-pentane (5 mL) and diethyl ether (5 mL) to give the title compound as a brown oil (0.5 g, 1.19 mmol. Yield: 88.5%).

$^1$H NMR (DMSO-d6, 400 MHz) compound is a mixture of rotamers: δ 1.98 (s, br, 3H), 4.11-4.13 (m, 2H), 4.46-4.72 (m, 2H), 4.85-5.01 (m, 2H), 6.31 (s, 1H), 7.23-7.96 (m, 8H), 9.51-9.59 (m, 2H), 13.02 (s, br, 1H). LCMS (Method A): 1.728 min, MS: ES+420.17 (M+1).

2-(2-(Benzyloxy)-4,6-dihydroxy-3-methylbenzoyl)-N,N-dimethylisoindoline-4-carboxamide A stirred solution of 2-(2-(benzyloxy)-4,6-dihydroxy-3-methylbenzoyl)isoindoline-4-carboxylic acid (0.250 g, 0.596 mmol, 1.0 eq) (Intermediate 59) in DMF (3 mL) at 0° C. was treated with T$_3$P (50% in EtOAc) (0.568 mL, 0.894 mmol, 1.5 eq), TEA (0.300 g, 2.98 mmol, 5.0 eq) and stirred for 10 mins. Dimethylamine hydrochloride (0.058 g, 0.715 mmol, 1.2 eq) was added to the reaction mixture at 0-5° C. The resulting reaction mixture was stirred at room temperature for 2 h. The reaction mixture was poured with ice-cold water (20 ml) and extracted with ethyl acetate (3×30 mL). The combined organic layer was dried through Na$_2$SO$_4$, filtered and concentrated under vacuum. The crude material was purified by flash chromatography (product eluted in 8% methanol in DCM), followed by prep TLC (5% MeOH:DCM system) yielding the title compound as an off white solid (0.034 g, 0.076 mmol. Yield: 12.8%).

High temperature $^1$H NMR (DMSO-d6, 400 MHz, 335 K): compound is a mixture of rotamers δ 1.99 (s, 3H), 2.92 (singlets, br, 6H), 4.43-4.93 (m, 6H), 6.30 (s, 1H), 7.24-7.46 (m, 8H), 9.27-9.33 (m, 2H). LCMS (Method A): 1.640 min, MS: ES+447.27 (M+1).

Example 86: 2-(2-(benzyloxy)-4,6-dihydroxy-3-methylbenzoyl)-N-methylisoindoline-4-carboxamide

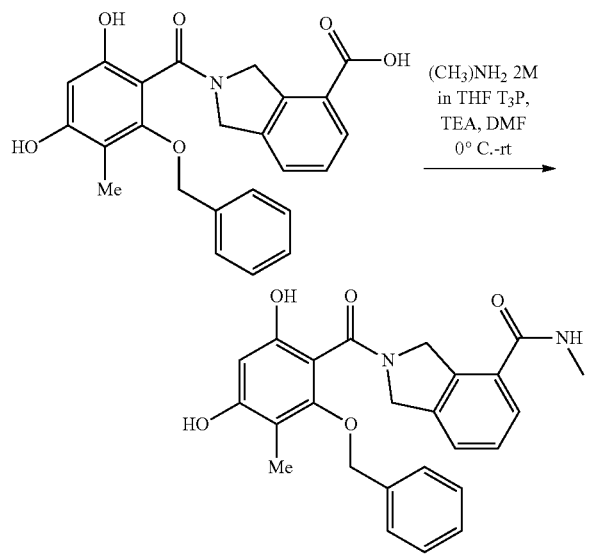

2-(2-(benzyloxy)-4,6-dihydroxy-3-methylbenzoyl)-N-methylisoindoline-4-carboxamide To a stirred solution of 2-(2-(benzyloxy)-4,6-dihydroxy-3-methylbenzoyl)isoindoline-4-carboxylic acid (0.250 g, 0.596 mmol, 1.0 eq) (Intermediate 59) in THF (3 ml) at 0° C. were added T$_3$P (50% in EtOAc) (0.284 g, 0.894 mmol, 1.5 eq) and TEA (0.180 g, 1.78 mmol, 3.0 eq). The resulting reaction was stirred at 0° C. for 10 mins. CH$_3$NH$_2$ (1M in THF) (0.22 g, 0.715 mmol, 1.2 eq.) was added dropwise into reaction mixture at 0° C. and the resulting reaction mixture stirred at room temperature for 16 h. The reaction mixture was poured into ice-cold water (20 mL) and extracted in ethyl acetate (3×30 mL). The combined organic layer was dried through Na$_2$SO$_4$, filtered and concentrated under vacuum. The crude material was purified by flash chromatography (product eluted using 8% methanol in DCM) followed by prep TLC yielding the title compound (0.017 g, 0.039 mmol. Yield: 6.6%).

High temperature $^1$H NMR (DMSO-d6, 400 MHz, 335 K) compound is a mixture of rotamers: δ1.99 (s, br, 3H), 2.71-2.82 (singlets, br, 3H) 4.54-4.97 (m, 6H), 6.31 (s, 1H), 7.26-7.62 (m, br, 8H), 8.44 (s, br, 1H), 9.49-9.58 (m, 2H). LCMS (Method A): 1.561 min, MS: ES+433.22 (M+1).

Example 87: N-(2-(2-(benzyloxy)-4,6-dihydroxy-3-methylbenzoyl)isoindolin-4-yl)acetamide

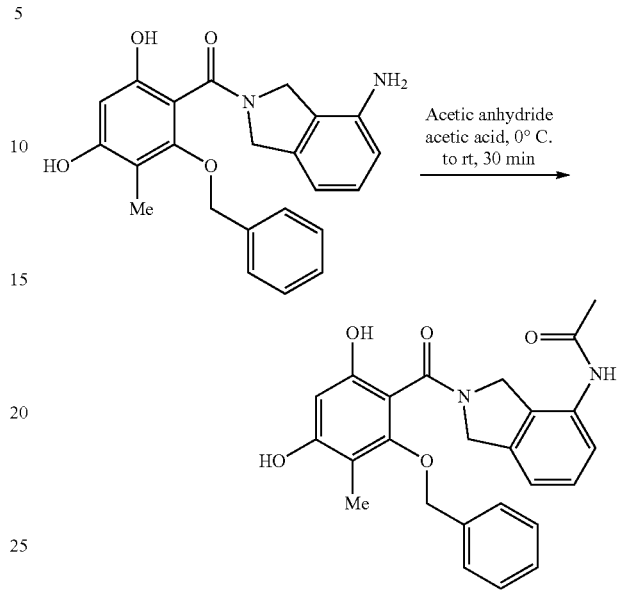

N-(2-(2-(benzyloxy)-4,6-dihydroxy-3-methylbenzoyl)isoindolin-4-yl)acetamide

A stirred solution of (4-aminoisoindolin-2-yl)(2-(benzyloxy)-4,6-dihydroxy-3-methylphenyl)methanone (0.06 g, 0.15 mmol, 1 eq.) in AcOH (0.5 mL) at 0° C. was treated with acetic anhydride (0.017 g, 0.17 mmol, 1.1 eq.). The resulting reaction mixture was stirred at room temperature for 30 min. Reaction completion was monitored by TLC (DCM:MeOH; 9.5:0.5). The reaction mixture was neutralized with sat. NaHCO$_3$ solution (PH-6-7) and extracted with ethyl acetate (3×50 mL). The combined organic layer was dried over Na$_2$SO$_4$, filtered and concentrated under vacuum. The crude material was purified by preparative TLC (5% MeOH in DCM) yielding the title compound as a white solid (0.040 g, 0.092 mmol. Yield: 58.8%).

High temperature $^1$H NMR (DMSO-d6, 400 MHz, 348K): compound is a mixture of rotamers: δ 1.99-2.11 (singlets, broad, 6H), 4.55-4.93 (m, 6H), 6.31 (s, 1H), 6.99-7.13 (m, 1H), 7.13 (s, br, 1H), 7.25-7.36 (m, 5H), 7.54-7.56 (m, 1H), 9.24-9.38 (m, 3H). LCMS (Method A): 1.616 min, MS: ES+433.2 (M+1).

Figure 4:
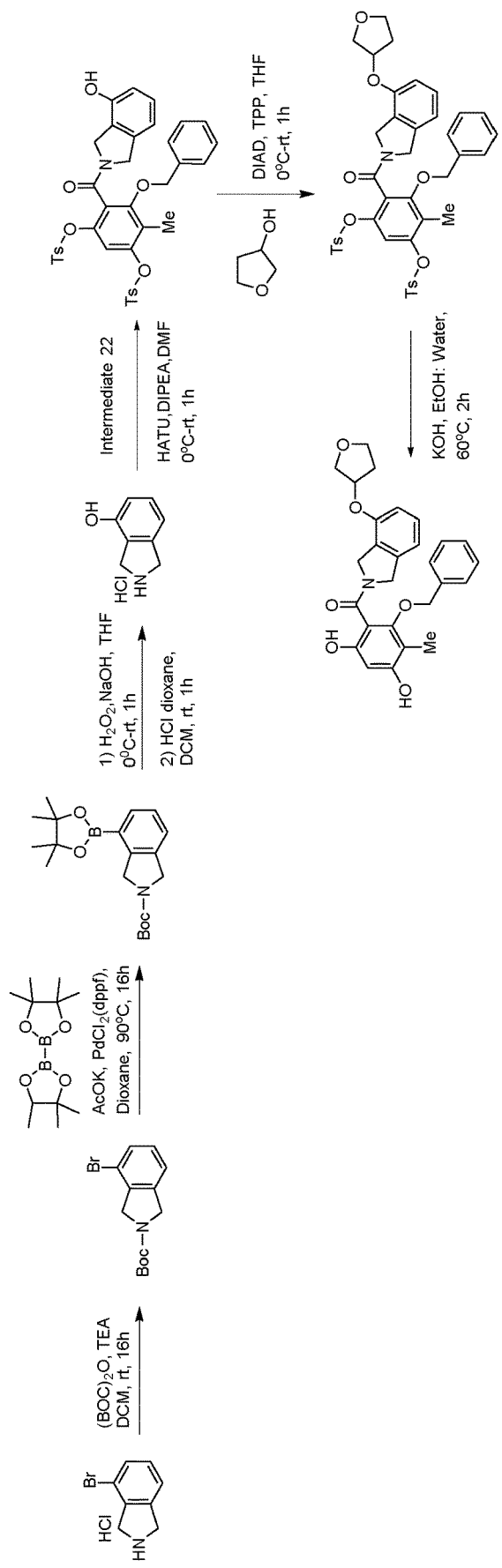
FIG. 4 shows the reaction scheme for ((2-(Benzyloxy)-4,6-dihydroxy-3-methylphenyl)(4-((tetrahydrofuran-3-yl)oxy)isoindolin-2-yl)methanone (Example 88)

Example 88: ((2-(Benzyloxy)-4,6-dihydroxy-3-methylphenyl)(4-((tetrahydrofuran-3-yl)oxy)isoindolin-2-yl)methanone (Reaction scheme shown in FIG. 4)

t-Butyl 4-bromoisoindoline-2-carboxylate

A stirred solution of 4-bromoisoindoline hydrochloride (CAS: 923590-95-8) (15 g, 64.38 mmol, 1.0 eq.) in DCM (150 mL) at room temperature was treated with TEA (19.50 g, 128.77 mmol, 2.0 eq.) and stirred for 15 min. Boc anhydride (28.10 g, 128.77 mmol, 2.0 eq.) was added and the reaction mixture stirred for 16 h. The resulting reaction mixture was poured into water (250 mL) and extracted with ethyl acetate (4×250 mL). The combined organic layer was dried over Na$_2$SO$_4$, filtered and concentrated under reduced pressure; the crude material was purified by flash chromatography (product was eluted with 2% ethyl acetate in hexane) yielding (15.4 g, 51.85 mmol, Yield: 81%).

$^1$H NMR (DMSO-d6, 400 MHz): δ 1.46 (s, 9H), 4.51 (d, J=9.6 Hz, 2H), 4.68 (d, J=10.4 Hz, 2H), 7.23-7.27 (m, 1H), 7.33-7.36 (m, 1H), 7.49 (d, J=7.4 Hz, 1H).

t-Butyl 4-(4,4,5,5-tetramethyl-1,3,2-dioxaborolan-2-yl)isoindoline-2-carboxylate 8 Reactions at 1 g scale carried out in parallel and product combined. A stirred solution of t-butyl 4-bromoisoindoline-2-carboxylate (1.0 g, 33.67 mmol, 1 eq.) in 1.4-dioxane (10 mL) at room temperature was treated with bis(pinacolato) diborane (1.01 g, 40.06 mmol, 1.19 eq.) and potassium acetate (0.66 g, 67.34 mmol, 2.0 eq.) and degassed with nitrogen gas for 15 min. PdCl$_2$(dppf) (0.49 g, 06.73 mmol, 0.2 eq.) was added and the resulting reaction mixture heated to 90° C. and stirred for 16 h. The resulting reaction mixture was allowed to cool to room temperature and filtered, the filtrate was concentrated under reduced pressure. The crude material was purified by flash chromatography (product eluted with 7% ethyl acetate in hexane) yielding the title compound (9 g, 26.08 mmol, Yield: 97%).

$^1$H NMR (DMSO-d6, 400 MHz): δ 1.30 (s, 12H), 1.46 (s, 9H), 4.55-4.58 (m, 2H), 4.65-4.67 (m, 2H), 7.28-7.31 (m, 1H), 7.45 (d, J=7.2 Hz, 1H), 7.58 (d, J=6.4 Hz, 1H). LCMS (Method A): 2.821 min, MS: ES+246.1 (M−100).

t-Butyl 4-hydroxyisoindoline-2-carboxylate

A stirred solution of t-butyl 4-(4,4,5,5-tetramethyl-1,3,2-dioxaborolan-2-yl)isoindoline-2-carboxylate (2.3 g, 6.66 mmol, 1.0 eq.) in THF (23 mL) at 0° C. was treated with NaOH (0.53 g, 13.33 mmol, 2.0 eq.) and H$_2$O$_2$ solution (0.95 g, 27.99 mmol, 4.2 eq.) added dropwise. The resulting reaction mixture was stirred at 0° C. for 1 h. The resulting reaction mixture was poured into water (80 mL) and neutralized with dil. HCl and extracted with ethyl acetate (3×100 mL). The combined organic layer was dried over Na$_2$SO$_4$, filtered, and concentrated under reduced pressure. The crude material was purified by flash chromatography (product eluted by 11% ethyl acetate in hexane) yielding the title compound (1.5 g, 6.37 mmol, Yield: 96%).

$^1$H NMR (CDCl$_3$-400 MHz): δ 1.54 (s, 9H), 4.65-4.70 (m, 3H), 4.81 (s, 1H), 6.71-6.85 (m, 2H), 7.14-7.19 (m, 1H). LCMS (Method A): 2.015 min, MS: ES+136.1 (M−100).

Isoindolin-4-ol hydrochloride

A stirred solution of t-butyl 4-hydroxyisoindoline-2-carboxylate (2.8 g, 11.91 mmol, 1.0 eq.) in DCM (28 mL) at 0° C. was treated with 4N HCl in dioxane (14 mL) added dropwise. The resulting reaction mixture was stirred for 1 h at room temperature. The resulting reaction mixture was concentrated under reduced pressure and the crude material triturated using n-pentane (3×50 mL) followed by drying under high vacuum yielding the title compound (1.8 g, 13.33 mmol, Yield: 87%).

$^1$H NMR (DMSO-d6, 400 MHz): δ 4.37 (s, 2H), 4.45 (s, 2H), 6.78-6.83 (m, 2H), 7.16-7.20 (m, 1H), 9.86 (s, br, 1H), 10.06 (s, 1H). LCMS (Method A): 0.169 min, MS: ES+136.1 (M+1).

5-(Benzyloxy)-4-(4-hydroxyisoindoline-2-carbonyl)-6-methyl-1,3-phenylene bis(4-methylbenzenesulfonate)

A stirred solution of Intermediate 22 (5 g, 8.59 mmol, 1.0 eq.) in DMF (50 mL) at 0° C. was treated with HATU (4.89 g, 12.88 mmol, 1.5 eq), DIPEA (2.21 g, 17.18 mmol, 2.0 eq.) and stirred for 15 min. Isoindolin-4-ol hydrochloride (1.6 g, 9.45 mmol, and 1.1 eq) was added and the reaction mixture stirred at room temperature for 1 h. The resulting reaction mixture was diluted with ethyl acetate (180 mL) and washed with cold brine solution (4×150 mL). The organic layer was dried over Na$_2$SO$_4$, filtered, and concentrated under reduced pressure. The crude material was purified by flash chromatography (product was eluted by 11% ethyl acetate in hexane) yielding the title compound (4 g, 5.72 mmol, Yield: 67%).

LCMS (Method A): 2.709 min, MS: ES+700.03 (M+1).

5-(Benzyloxy)-4-methyl-6-(4-((tetrahydrofuran-3-yl)oxy)isoindoline-2-carbonyl)-1,3-phenylene bis(4-methylbenzenesulfonate)

5-(Benzyloxy)-4-(4-hydroxyisoindoline-2-carbonyl)-6-methyl-1,3-phenylene-bis(4-methylbenzene sulfonate) (0.5 g, 0.71 mmol, 1 eq.), tetrahydrofuran-3-ol (CAS: 453-20-3) (0.062 g, 0.71 mmol, 1.0 eq.) and triphenyl phosphine (0.37 g, 1.43 mmol, 2.0 eq.) in THF (0.5 mL) were sonicated for 15 min at room temperature. DIAD (98%) (0.28 g, 1.43 mmol, 2.0 eq.) was added to the resulting reaction mixture dropwise under nitrogen atmosphere at 60° C. The resulting mixture was stirred at 60° C. for 30 min, allowed to cool to room temperature, poured into ice-water (70 mL) and extracted with ethyl acetate (3×75 mL). The combined organic layer was dried over Na$_2$SO$_4$, filtered, and concentrated under reduced pressure. The crude material was purified by flash chromatography (product was eluted in DCM) to give the title compound (0.26 g, 3.38 mmol, Yield: 47%).

LCMS (Method A): 2.677 min, MS: ES+770.2 (M+1).

((2-(Benzyloxy)-4,6-dihydroxy-3-methylphenyl)(4-((tetrahydrofuran-3-yl)oxy)isoindolin-2-yl)methanone A stirred solution of 5-(benzyloxy)-4-methyl-6-(4-((tetrahydrofuran-3-yl)oxy)isoindoline-2-carbonyl)-1,3-phenylene bis(4-methylbenzenesulfonate) (0.25 g, 3.25 mmol, 1.0 eq.) in EtOH:water (2.5 mL, 1:1) at room temperature was treated with aqueous KOH (0.72 g, 13.00 mmol, 40 eq. in minimum water). The resulting reaction mixture was heated to 60° C. and stirred for 2 h. The reaction mixture was allowed to cool to room temperature, poured into ice cooled water (50 mL) and neutralized with diluted HCl and extracted with ethyl acetate (4×50 mL). The combined organic layer was dried over Na$_2$SO$_4$, filtered, and concentrated under reduced pressure. The crude material was purified by flash chromatography (product eluted in 5.7% methanol in DCM) yielding the title compound (0.022 g, 0.04 mmol, Yield: 15%).

$^1$H NMR (DMSO-d6, 400 MHz), compound is a mixture of rotamers: δ 1.88-1.99 (M, 1H), 1.97 (2 singlets, 3H), 2.14-2.33 (m, 1H), 3.66-3.94 (m, 4H), 4.23-4.25 (m, 1H), 4.42-4.74 (m, 4H), 4.90-4.92 (m, 1H), 5.02-5.10 (m, 1H), 6.29 (2 singlets, 1H), 6.82-6.97 (m, 2H), 7.21-7.36 (m, 6H), 9.49-9.59 (m, 2H). LCMS (Method A): 1.869 min, MS: ES+462.2 (M+1).

Figure 5:
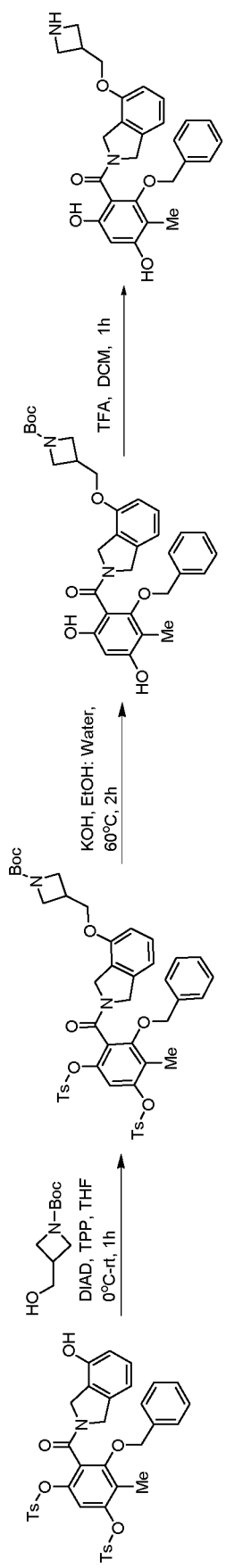
FIG. 5 shows the reaction scheme for (4-(Azetidin-3-yl methoxy) isoindolin-2-yl) (2-(benzyloxy)-4,6-dihydroxy-3-methylphenyl)methanone (Example 89)

Example 89: (4-(Azetidin-3-yl methoxy)isoindolin-2-yl) (2-(benzyloxy)-4,6-dihydroxy-3-methylphenyl) methanone (Reaction Scheme Shown in FIG. 5)

t-Butyl 3-(((2-(2-(benzyloxy)-3-methyl-4,6-bis(tosyloxy)benzoyl)isoindolin-4-yl)oxy)methyl)azetidine-1-carboxylate A mixture of 5-(benzyloxy)-4-(4-hydroxyisoindoline-2-carbonyl)-6-methyl-1,3-phenylene bis(4-methylbenzenesulfonate) (0.7 g, 1.00 mmol, 1.0 eq), t-butyl 3-(hydroxymethyl)azetidine-1-carboxylate (CAS: 142253-56-3) (0.18 g, 1.00 mmol, 1.0 eq) and triphenyl phosphine (0.52 g, 2.00 mmol, 2.0 eq) in THF (0.7 mL, minimum solvent to make a paste) was sonicated for 15 min at 35° C. The mixture was warmed to 60° C. and treated dropwise with DIAD (98%) (0.4 g, 2.00 mmol, 2.0 eq.), the resulting reaction mixture was stirred at 60° C. under a nitrogen atmosphere for 1 h. The reaction mixture was allowed to cool to room temperature, poured into ice-cold water (80 mL) and extracted with ethyl acetate (4×80 mL). The combined organic was dried over sodium sulphate, filtered, and concentrated under reduced pressure. The crude material (1.2 g) was purified by normal phase flash chromatography (230-400 mesh silica; product eluted in neat DCM) to give the title compound (0.5 g, 0.57 mmol, Yield: 57%).

LCMS (Method A): 2.860 min, MS ES+769.5 (M−100).

t-Butyl 3-(((2-(2-(benzyloxy)-4,6-dihydroxy-3-methylbenzoyl)isoindolin-4-yl)oxy)methyl)azetidine-1-carboxylate A stirred solution of t-butyl 3-(((2-(2-(benzyloxy)-3-methyl-4,6-bis(tosyloxy)benzoyl)isoindolin-4-yl)oxy)methyl)azetidine-1-carboxylate (0.5 g, 0.57 mmol, 1.0 eq.) in EtOH (5 mL) at room temperature was treated with an aqueous solution of KOH (1.29 g, 23.00 mmol, 40 eq.) in water (5 mL). The reaction mixture was heated to 60° C. for 2 h then allowed to cool to room temperature, poured into water (80 mL) and neutralized with dil·HCl, extracted with ethyl acetate (3×80 mL) and the combined organic layer dried over $Na_2SO_4$, filtered and concentrated under reduced pressure. The crude material was purified by flash chromatography (product eluted with 6% methanol in DCM) followed by prep. TLC (5% methanol in DCM) yielding the title compound (0.09 g, 0.16 mmol, Yield: 28%).

$^1$H NMR (DMSO-d6, 400 MHz), compound is a mixture of rotamers: δ 1.36-1.40 (2 singlets, 9H), 1.97-1.99 (2 singlets, 3H), 2.86-2.97 (m, 1H), 3.35-3.72 (m, 3H), 3.73-4.04 (m, 2H), 4.11-4.29 (m, 2H), 4.41-4.74 (m, 4H), 4.89-4.92 (m, 1H), 6.30 (s, 1H), 6.83-6.96 (m, 2H), 7.22-7.36 (m, 6H), 9.50-9.59 (m, 2H). LCMS (Method A): 2.188 min, purity: 100% MS ES+: 461.3 (M−100).

(4-(Azetidin-3-ylmethoxy)isoindolin-2-yl)(2-(benzyloxy)-4,6-dihydroxy-3-methylphenyl) methanone A stirred solution of t-butyl 3-(((2-(2-(benzyloxy)-4,6-dihydroxy-3-methylbenzoyl)isoindolin-4-yl)oxy)methyl)azetidine-1-carboxylate (0.08 g, 0.14 mmol, 1.0 eq.) in DCM (2.4 mL) at 0° C. was treated with TFA (0.8 mL) added dropwise. The reaction mixture was stirred at room temperature for 1 h, concentrated under reduced pressure, poured into water (15 mL), neutralized with saturated sodium bicarbonate solution, and extracted with ethyl acetate (4×15 mL). The combined organic layer was dried over $Na_2SO_4$, filtered, and concentrated under reduced pressure. The crude material was purified by trituration [n-pentane (20 ml)] and dried under high vacuum to give the title compound as an off white solid (0.030 g, 0.06 mmol, Yield: 46%).

$^1$H NMR (DMSO-d6, 400 MHz, 335K), compound is a mixture of rotamers: δ 1.99 (s, 3H), 3.41-3.43 (m, 1H), 3.72-3.73 (m, 1H), 3.95-4.20 (m, 4H), 4.40-4.92 (m, 7H), 6.30 (s, 1H), 6.86-7.02 (m, 2H), 7.24-7.35 (m, 6H), 9.53-9.62 (m, 2H). LCMS (Method A): 1.474 min, MS ES+: 461.3 (M+1).

Figure 6:
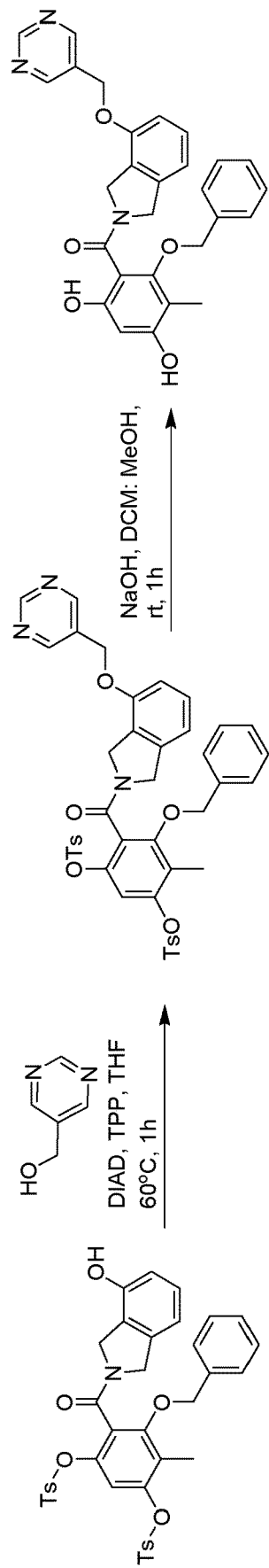
FIG. 6 shows the reaction scheme for (2-(Benzyloxy)-4,6-dihydroxy-3-methylphenyl)(4-(pyrimidin-5-ylmethoxy)isoindolin-2-yl)methanone (Example 90)

Example 90: (2-(Benzyloxy)-4,6-dihydroxy-3-methylphenyl)(4-(pyrimidin-5-ylmethoxy)isoindolin-2-yl) methanone (Reaction scheme shown in FIG. 6)

5-(Benzyloxy)-4-methyl-6-(4-(pyrimidin-5-ylmethoxy)isoindoline-2-carbonyl)-1,3-phenylene bis (4-methylbenzenesulfonate)

A mixture of 5-(Benzyloxy)-4-(4-hydroxyisoindoline-2-carbonyl)-6-methyl-1,3-phenylene bis(4-methylbenzenesulfonate) (0.5 g, 0.71 mmol, 1.0 eq.), pyrimidin-5-ylmethanol (0.078 g, 0.71 mmol, 1.0 eq.) (CAS: 25193-95-7) and triphenyl phosphine (0.37 g, 1.43 mmol, 2.0 eq.) in THF (0.5 mL, minimum solvent to make a paste) was sonicated for 15 min at 35° C. The reaction mixture was warmed to 60° C. and treated dropwise with DIAD (98%) (0.28 g, 1.43 mmol, 2.0 eq.). The reaction mixture was stirred at 60° C. under a nitrogen atmosphere for 1 h then allowed to cool to room temperature, poured into water (130 mL) and extracted with ethyl acetate (3×100 mL). The combined organic layer was dried over $Na_2SO_4$, filtered, and concentrated under reduced pressure. The crude material was purified by flash chromatography (3.4% methanol in DCM) to give the title compound (0.35 g, 0.45 mmol, Yield: 62%) which was carried forward to the next step without purification.

LCMS (Method A): 2.465 min, 2.586 min, MS: ES+778.1 (M+1).

(2-(Benzyloxy)-4,6-dihydroxy-3-methylphenyl)(4-(pyrimidin-5-ylmethoxy)isoindolin-2-yl)methanone A stirred solution of 5-(benzyloxy)-4-methyl-6-(4-(pyrimidin-5-ylmethoxy)isoindoline-2-carbonyl)-1,3-phenylene bis(4-methylbenzenesulfonate) (0.2 g, 0.25 mmol, 1.0 eq.) in DCM:Methanol (9:1) (2 mL) at room temperature was treated with NaOH (0.05 g, 1.26 mmol, 5.0 eq.) and stirred for 1 h. The resulting reaction mixture was poured into water (25 mL), neutralized with dil. HCl and extracted with ethyl acetate (3×25 mL). The combined organic layer was dried over $Na_2SO_4$, filtered, and concentrated under reduced pressure. The crude material was purified by prep. TLC (10% MeOH in DCM) followed by prep. HPLC purification yielding (0.012 g, 0.024 mmol, Yield: 9%).

High temperature $^1$H NMR (DMSO-d6, 400 MHz, 340K), compound is a mixture of rotamers: δ 1.96 (s, 3H), 4.50-4.51 (m, 2H), 4.66-4.75 (m, 4H), 5.18-5.28 (m, 2H), 6.27 (2 singlets, 1H), 6.84-7.02 (m, 2H), 7.22-7.32 (m, 6H), 8.78 (s, 1H), 8.90 (s, 1H), 9.08-9.14 (m, 1H). LCMS (Method A): 1.678 min, MS ES+484.27 (M+1).

Example 91: 1-(2-(2-(Benzyloxy)-4,6-dihydroxy-3-methylbenzoyl)isoindolin-4-yl)azetidine-3-carbonitrile

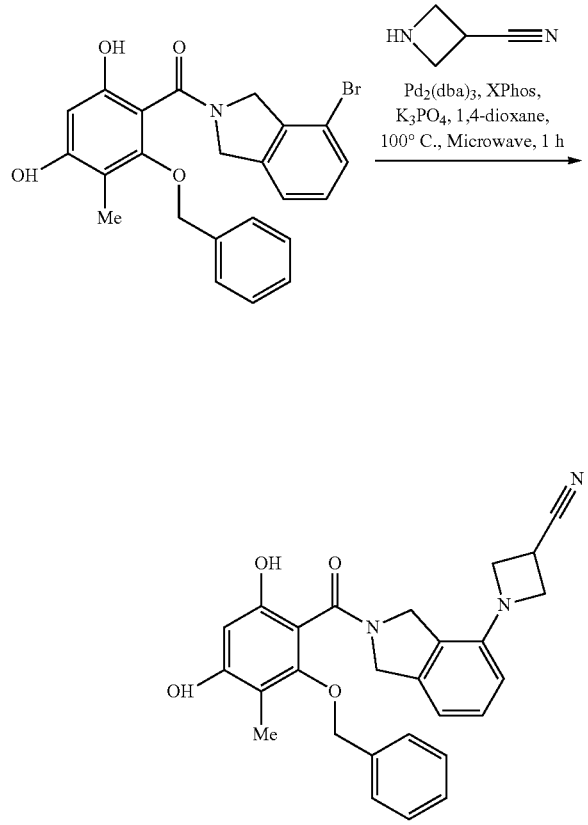

1-(2-(2-(Benzyloxy)-4,6-dihydroxy-3-methylbenzoyl)isoindolin-4-yl)azetidine-3-carbonitrile A stirred solution of (2-(benzyloxy)-4,6-dihydroxy-3-methylphenyl)(4-bromoisoindolin-2-yl)methanone (0.3 g, 0.66 mmol, 1.0 eq.) in 1,4-dioxane (3 mL) at room temperature was treated with azetidine-3-carbonitrile (0.117 g, 0.99 mmol, 1.5 eq) (CAS: 345954-83-8) and $K_3PO_4$ (0.420 g, 1.90 mmol, 3 eq). The reaction mixture was degassed using $N_2$ gas for 10 min. $Pd_2(dba)_3$ (0.060 g, 0.06 mmol, 0.1 eq) and X-phos (0.063 g, 0.13 mmol, 0.2 eq) were added and the resulting reaction mixture heated to 100° C. and stirred for 1 h under microwave irradiation. The resulting reaction mixture was filtered through celite bed, poured into ice-cold water (100 mL) and extracted using ethyl acetate (3×100 mL). The combined organic layer was dried over $Na_2SO_4$, filtered and concentrated under reduced pressure. The crude material was purified by flash chromatography (product eluted in 3% MeOH:DCM) followed by prep. HPLC purification (MeCN:MeOH:IPA) yielding the title compound (0.005 g, 0.010 mmol, Yield: 1.61%).

$^1$H NMR (DMSO-d6, 400 MHz), compound is a mixture of rotamers: δ 1.97 (2 singlets, 3H), 3.49-3.75 (m, 1H), 3.84-4.07 (m, 3H), 4.07-4.08 (m, 1H), 4.18-4.22 (m, 1H), 4.34-4.39 (m, 1H), 4.47-4.74 (m, 3H), 4.91 (m, 1H), 6.30-6.36 (m, 2H), 6.66-6.83 (m, 1H), 7.11-7.19 (m, 1H), 7.26-7.37 (m, 5H), 9.51-9.58 (m, 2H). LCMS (Method A): 1.862 min, MS ES+456.22 (M+1).

Figure 7:
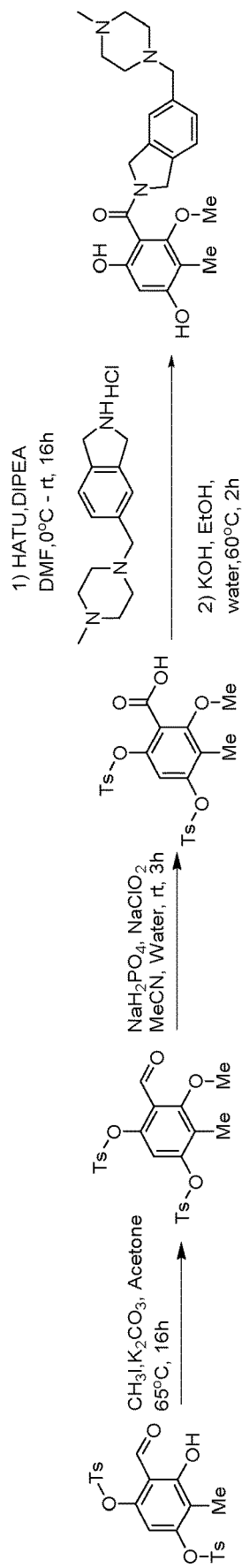
FIG. 7 shows the reaction scheme for (4,6-Dihydroxy-2-methoxy-3-methylphenyl)(5-((4-methylpiperazin-1-yl)methyl)isoindolin-2-yl)methanone (Example 92)

Example 92: (4,6-Dihydroxy-2-methoxy-3-methylphenyl)(5-((4-methylpiperazin-1-yl)methyl)isoindolin-2-yl)methanone (Reaction Scheme Shown in FIG. 7)

4-Formyl-5-methoxy-6-methyl-1,3-phenylene bis(4-methylbenzenesulfonate) (Intermediate 54)

A stirred solution of 4-formyl-5-hydroxy-6-methyl-1,3-phenylene bis(4-methylbenzenesulfonate) (2.0 g, 4.19 mmol, 1.0 eq) Intermediate 2 in DMF (20 mL) at room temperature was treated with $K_2CO_3$ (1.45 g, 10.49 mmol, 2.5 eq) and $CH_3I$ (0.89 g, 6.29 mmol, 1.5 eq). The resulting reaction mixture was heated to 65° C. and stirred for 4 h. The reaction mixture was poured into ice-cold water (100 mL) and extracted in ethyl acetate (3×100 mL). The combined organic layer was dried over $Na_2SO_4$, filtered, and concentrated under reduced pressure. The crude material was purified by flash chromatography (product eluted in 12% ethyl acetate in hexane) yielding as an off-white solid (1.2 g, Yield: 58.29%, 2.44 mmol).

$^1$H NMR (DMSO-d6, 400 MHz): δ 1.86 (s, 3H), 2.44 (s, 3H), 2.46 (s, 3H), 3.65 (s, 3H), 6.68 (s, 1H), 7.48-7.53 (m, 4H), 7.70-7.76 (m, 4H), 9.93 (s, 1H). LCMS (Method A): 2.588 min. MS: ES+491.12 (M+1).

2-Methoxy-3-methyl-4,6-bis(tosyloxy)benzoic acid (Intermediate 60)

A stirred solution of 4-formyl-5-methoxy-6-methyl-1,3-phenylene bis(4-methylbenzenesulfonate) (1.1 g, 2.24 mmol, 1.0 eq.) (Intermediate 54) in MeCN:Water (1:1) (20 mL) at room temperature was treated with $NaH_2PO_4$ (0.806 g, 6.72 mmol, 3.0 eq.) and $NaClO_2$ (0.74 g, 8.2 mmol, 3.7 eq.) and the reaction mixture stirred at room temperature for 3 h. The resulting reaction mixture was evaporated, diluted with water (20 mL), acidified using 1N HCl solution and extracted with ethyl acetate (2×100 mL). The combined organic layer was dried over $Na_2SO_4$, filtered, and concentrated under reduce pressure yielding the title compound as an off white solid (1.0 g, 1.97 mmol. Yield: 88.1%).

$^1$H NMR (DMSO-d6, 400 MHz): δ 1.85 (s, 3H), 2.45 (s, 6H), 3.64 (s, 3H), 6.66 (s, 1H), 7.49-7.52 (m, 4H), 7.72-7.73 (m, 4H), 13.60 (bs, 1H). LCMS (Method A): 2.137 min, MS: ES+507.02

5-Methoxy-4-methyl-6-(5-((4-methylpiperazin-1-yl)methyl)isoindoline-2-carbonyl)-1,3-phenylene bis(4-methylbenzenesulfonate)

A stirred solution of 2-methoxy-3-methyl-4,6-bis(tosyloxy)benzoic acid (0.5 g, 0.987 mmol, 1.0 eq) (Intermediate 60) in DMF (5 mL) at 0° C. was treated with HATU (0.487 g, 1.28 mmol, 1.3 eq) and DIPEA (0.637 g, 4.93 mmol, 5.0 eq) and stirred for 10 mins. 5-((4-methylpiperazin-1-yl)methyl) isoindoline hydrochloride (0.290 g, 1.08 mmol, 1.1 eq.) was added and the resulting reaction mixture was stirred at room temperature for 16 h. The reaction mixture was poured into ice-cold water (50 mL) and extracted in ethyl acetate (3×100 mL). The combined organic layer was washed with brine solution (30 mL), dried over $Na_2SO_4$, filtered, and concentrated under vacuum. The crude material was purified by flash chromatography (eluting product 3% methanol in DCM) yielding the title compound as an off white solid (0.350 g, Yield: 49.24%, 0.486 mmol) which was progressed to the next step.

(4,6-Dihydroxy-2-methoxy-3-methylphenyl)(5-((4-methylpiperazin-1-yl)methyl)isoindolin-2-yl)methanone A stirred solution of 5-methoxy-4-methyl-6-(5-((4-methylpiperazin-1-yl) methyl) isoindoline-2-carbonyl)-1,3-phenylene bis(4-methylbenzenesulfonate) (0.3 g, 0.416 mmol, 1.0 eq.) in EtOH:H$_2$O (4 mL) (3:1) at room temperature was treated with KOH (0.933 g, 16.66 mmol, 40 eq.) and heated to 60° C. and stirred for 2 h. The resulting reaction mixture cooled to room temperature and concentrated under vacuum. The obtained crude material was acidified using saturated solution of KHSO$_4$. The aqueous layer was concentrated under vacuum and extracted using 20% IPA:CHCl$_3$ (3×30 mL). The combined organic layer was dried over Na$_2$SO$_4$, filtered, and concentrated under reduced pressure. The crude material was purified by prep HPLC (0.1% formic acid water in acetonitrile) yielding the title compound as an off-white solid (0.02 g, 0.048 mmol, Yield: 11.7%).

High temperature $^1$H NMR (DMSO-d6, 400 MHz, 340K): δ 1.95 (s, 3H), 2.18 (s, 3H), 2.30-2.50 (m, 8H), 3.44-3.46 (m, 2H), 3.64 (s, 3H), 4.50 (s, 2H), 4.75 (s, 2H), 6.26 (s, 1H), 7.18-7.20 (m, 2H), 7.28-7.29 (m, 1H), 9.19 (bs, 2H). LCMS (Method A): 0.854 min, MS: ES+412.32 (M+1).

Figure 8:
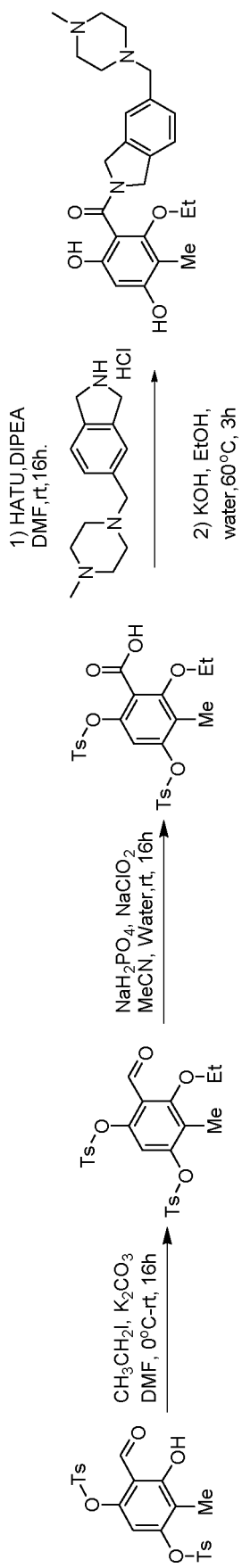
FIG. 8 shows the reaction scheme for (2-Ethoxy-4,6-dihydroxy-3-methylphenyl)(5-((4-methylpiperazin-1-yl)methyl)isoindolin-2-yl)methanone (Example 93)

Example 93: (2-Ethoxy-4,6-dihydroxy-3-methylphenyl)(5-((4-methylpiperazin-1-yl)methyl)isoindolin-2-yl)methanone (Reaction Scheme Shown in FIG. 8)

5-Ethoxy-4-formyl-6-methyl-1,3-phenylene bis(4-methylbenzenesulfonate) (Intermediate 55)

A stirred solution of 4-formyl-5-hydroxy-6-methyl-1,3-phenylene bis(4-methylbenzenesulfonate) (2.0 g, 4.19 mmol, 1.0 eq) Intermediate 2 in DMF (20 mL) at room temperature was treated with K$_2$CO$_3$ (2.89 g, 20.9 mmol, 5.0 eq) and ethyl bromide (2.89 g, 6.29 mmol, 1.5 eq) and the resulting reaction mixture stirred for 16 h. The reaction mixture was poured into ice-cold water (100 mL) and extracted in ethyl acetate (3×30 mL). The combined organic layer washed with cold water (2×50 mL), dried over Na$_2$SO$_4$, filtered, and concentrated under reduced pressure. The crude material was purified by flash chromatography (product eluted with 13% ethyl acetate in hexane) yielding as off-white solid (1.5 g, 2.97 mmol. Yield: 71.0%).

$^1$H NMR (DMSO-d6, 400 MHz): Compound is a mixture of rotamers: δ 1.07-1.27 and 1.20-1.24 (m, 3H), 1.77 and 1.85 (singlets, 3H) 2.44-2.50 (singlets, 6H), 3.35-3.40 and 3.78-3.82 (m, 2H), 6.44 and 6.71 (singlets, 1H), 7.48-7.53 (m, 4H), 7.69-7.80 (m, 4H), 9.86 and 9.92 (singlets, 1H). LCMS (Method A): 2.721 min, MS: ES+505.7 (M+1).

2-Ethoxy-3-methyl-4,6-bis(tosyloxy)benzoic acid (Intermediate 61)

A solution of 5-ethoxy-4-formyl-6-methyl-1,3-phenylene bis(4-methylbenzenesulfonate) (1.4 g, 2.77 mmol, 1.0 eq.) (Intermediate 55) in MeCN:Water (1:1) (15 mL) at room temperature was treated with NaH$_2$PO$_4$ (1.16 g, 9.71 mmol, 3.5 eq.) and NaClO$_2$ (1.25 g, 13.87 mmol, 5.0 eq.) and the reaction mixture stirred for 16 h. The reaction mixture was evaporated and the crude material diluted with water (30 mL), acidified using dil. HCl solution and extracted with ethyl acetate (3×30 mL). The combined organic layer was dried over Na$_2$SO$_4$, filtered, and concentrated under reduced pressure; the crude material was purified by flash chromatography using silica gel eluting product with 10% ethyl acetate in hexane yielding the title compounds as an off white solid (0.6 g, 1.15 mmol. Yield: 41.7%).

$^1$H NMR (DMSO-d6, 400 MHz): Compound is a mixture of rotamers: δ 1.16-1.24 (m, 3H), 1.84 and 2.00 (singlets, 3H), 2.44-2.51 (s, br, 6H), 3.78-3.83 and 4.00-4.06 (m, 2H), 6.66 and 6.68 (singlets, 1H), 7.49-7.58 (m, 4H), 7.71-7.80 (m, 4H), 13.59 (s, 1H). LCMS (Method A): 2.455 min, MS: ES+521.12 (M+1).

5-Ethoxy-4-methyl-6-(5-((4-methylpiperazin-1-yl)methyl)isoindoline-2-carbonyl)-1,3-phenylene bis(4-methylbenzenesulfonate)

A stirred solution of 2-ethoxy-3-methyl-4,6-bis(tosyloxy) benzoic acid (0.4 g, 0.768 mmol, 1.0 eq) (Intermediate 61) in DMF (2 mL) at 0° C. was treated with HATU (0.438 g, 1.01 mmol, 1.5 eq) and DIPEA (0.495 g, 3.84 mmol, 5.0 eq) and stirred for 10 mins. 5-((4-methylpiperazin-1-yl) methyl) isoindoline hydrochloride (0.226 g, 0.845 mmol, 1.1 eq.) dissolved in DMF (1 mL) was added dropwise and the reaction mixture stirred at room temperature for 16 h. The reaction mixture was poured into ice-cold water (20 mL) and extracted in ethyl acetate (2×30 mL). The combined organic layer was washed with cold water (3×50 mL), dried over Na$_2$SO$_4$, filtered, and concentrated under vacuum. The crude material was purified by flash chromatography (eluting product with 4% methanol in DCM) yielding the title compound as an off white solid (0.350 g, 0.476 mmol. Yield: 62%) which was progressed directly to the next step.

(2-Ethoxy-4,6-dihydroxy-3-methylphenyl)(5-((4-methylpiperazin-1-yl)methyl)isoindolin-2-yl)methanone A stirred solution of 5-ethoxy-4-methyl-6-(5-((4-methylpiperazin-1-yl)methyl)isoindoline-2-carbonyl)-1,3-phenylene bis(4-methylbenzenesulfonate) (0.320 g, 0.436 mmol, 1.0 eq.) in EtOH:H$_2$O (3 mL) (2:1) at room temperature was treated with KOH (0.978 g, 17.44 mmol, 40 eq.) and heated to 60° C. for 3 h. The resulting reaction mixture was allowed to cool to room temperature, poured into water (10 mL) and acidified using saturated solution of KHSO$_4$ and extracted using 20% IPA in CHCl$_3$ (3×20 mL). The combined organic layer was dried over Na$_2$SO$_4$, filtered, and concentrated under reduced pressure. The crude material was purified by prep HPLC (0.1% formic acid/water in acetonitrile) yielding the title compound as an off-white solid (0.025 g, 0.058 mmol, Yield: 13.5%).

$^1$H NMR (DMSO-d6, 400 MHz): δ 1.17 (t, J=6.8 Hz, 3H), 1.92 (s, 3H), 2.13-2.14 (m, 3H), 2.15-2.50 (m, 8H), 3.41-3.44 (m, 2H), 3.78-3.84 (m, 2H), 4.42-4.53 (m, 2H), 4.72 (s, br, 2H), 6.24 (s, 1H), 7.16-7.22 (m, 2H), 7.29-7.32 (m, 1H), 9.40 (s, 1H, D$_2$O exchangeable), 9.48 (s, 1H, D$_2$O exchangeable). LCMS (Method A): 1.021 min, MS: ES+426.32 (M+1).

Figure 9:
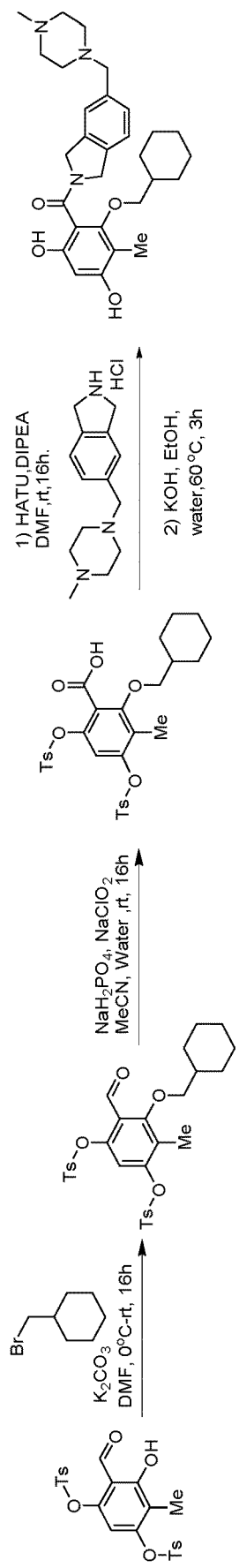
FIG. 9 shows the reaction scheme for (2-(Cyclohexylmethoxy)-4,6-dihydroxy-3-methylphenyl)(5-((4-methylpiperazin-1-yl)methyl)isoindolin-2-yl)methanone (Example 94)

Example 94: (2-(Cyclohexylmethoxy)-4,6-dihydroxy-3-methylphenyl)(5-((4-methylpiperazin-1-yl)methyl)isoindolin-2-yl)methanone (Reaction Scheme Shown in FIG. 9)

5-(Cyclohexylmethoxy)-4-formyl-6-methyl-1,3-phenylene bis(4-methylbenzenesulfonate) (Intermediate 56)

A stirred solution of 4-formyl-5-hydroxy-6-methyl-1,3-phenylene-bis(4-methylbenzenesulfonate) (2.0 g, 4.19 mmol, 1.0 eq) in DMF (20 mL) at 0° C. was treated with $K_2CO_3$ (2.89 g, 20.9 mmol, 5.0 eq) and bromomethyl cyclohexane (1.11 g, 6.29 mmol, 1.5 eq) and stirred for 10 mins. The reaction mixture was gradually raised to room temperature and stirred for 16 h. The reaction mixture was poured into ice-cold water (20 mL) and extracted in ethyl acetate (3×30 mL). The combined organic layer was dried over $Na_2SO_4$, filtered, and concentrated under vacuum. Crude material was purified by flash chromatography (product eluted with 12% ethyl acetate in hexane) yielding the title compound (1.4 g, 2.44 mmol. Yield: 58.3%).

$^1$H NMR (DMSO-d6, 400 MHz): Compound is a mixture of rotamers: δ 0.97-1.00 (m, 2H), 1.11-1.26 (m, 3H), 1.67-1.73 (m, 5H), 1.77 and 1.83 (singlets, 3H), 2.33-2.45 (singlets, 6H), 3.49 and 3.70 (m, 2H), 5.77 (s, 1H), 6.44 and 6.70 (singlets, 1H), 7.48-7.53 (m, 4H), 7.71-7.81 (m, 4H), 9.86 and 9.90 (singlets, 1H). LCMS (Method A): 3.250 min, MS: ES+573.13 (M+1).

2-(Cyclohexylmethoxy)-3-methyl-4,6-bis(tosyloxy) benzoic acid (Intermediate 62)

A solution of 5-(cyclohexylmethoxy)-4-formyl-6-methyl-1,3-phenylene bis(4-methylbenzenesulfonate) (1.4 g, 2.44 mmol, 1.0 eq.) (Intermediate 56) in MeCN:Water (1:1) (15 mL) at room temperature was treated with $NaH_2PO_4$ (1.02 g, 8.55 mmol, 3.5 eq.) and $NaClO_2$ (1.10 g, 12.22 mmol, 5.0 eq.) and stirred for 16 h. The mixture was evaporated and the crude material diluted with water (30 mL) and extracted with ethyl acetate (3×30 mL). The combined organic layer was dried over $Na_2SO_4$, filtered, and concentrated under reduced pressure. The crude material was purified by flash chromatography (eluting product using 15% ethyl acetate in hexane) yielding the title compound (0.950 g, 1.61 mmol. Yield: 66.4%).

$^1$H NMR (DMSO-d6, 400 MHz): δ0.95-1.10 (m, 2H), 1.11-1.22 (m, 3H), 1.61-1.69 (m, 6H), 1.82 (s, br, 3H), 2.44 (s, br, 6H), 3.54 (m, br, 2H), 4.03 (q, J=6.8 Hz, 14.0 Hz, 2H), 6.69 (s, 1H), 7.49-7.52 (m, 4H), 7.70-7.73 (m, 4H), 13.59 (s, 1H). LCMS (Method A): 2.657 min, MS: ES+589.2 (M+1).

5-(Cyclohexylmethoxy)-4-methyl-6-(5-((4-methylpiperazin-1-yl)methyl)isoindoline-2-carbonyl)-1,3-phenylene bis(4-methylbenzenesulfonate)

A stirred solution of 2-(Cyclohexylmethoxy)-3-methyl-4,6-bis(tosyloxy)benzoic acid (0.4 g, 0.679 mmol, 1.0 eq) (Intermediate 62) in DMF (2 mL) at 0° C. was treated with HATU (0.387 g, 1.01 mmol, 1.5 eq) and DIPEA (0.438 g, 3.39 mmol, 5.0 eq) for 10 mins. 5-((4-methylpiperazin-1-yl) methyl) isoindoline hydrochloride (0.217 g, 0.815 mmol, 1.1 eq.) dissolved in DMF (1 mL) was added dropwise at 0-5° C. The resulting reaction mixture was gradually raised to room temperature and stirred for 16 h. The reaction mixture was poured onto ice-cold water (50 mL) and extracted with ethyl acetate (2×50 mL). The combined organic layer was washed with cold water (3×100 mL), dried over $Na_2SO_4$, filtered, and concentrated under vacuum. The crude material was purified by flash chromatography (eluting product with 8% methanol in DCM) yielding the title compound as an off white solid (0.350 g, 0.436 mmol. Yield: 62.0%) which was used directly in the next step.

(2-(Cyclohexylmethoxy)-4,6-dihydroxy-3-methylphenyl)(5-((4-methylpiperazin-1-yl)methyl)isoindolin-2-yl)methanone A stirred solution of 5-(cyclohexylmethoxy)-4-methyl-6-(5-((4-methylpiperazin-1-yl)methyl)isoindoline-2-carbonyl)-1,3-phenylene bis(4-methylbenzenesulfonate) (0.330 g, 0.414 mmol, 1.0 eq.) in EtOH:$H_2O$ (2:1) was treated with KOH (0.923 g, 16.45 mmol, 40 eq.) at room temperature. The reaction mixture was heated to 60° C. and stirred for 3 h. The reaction mixture was allowed to cool to room temperature, poured into water (20 mL), acidified using $KHSO_4$ solution) and extracted in 20% IPA in $CHCl_3$ (3×30 mL). The combined organic layer was dried over $Na_2SO_4$, filtered, and concentrated under reduced pressure. The crude material was purified by prep HPLC (0.1% formic acid water in acetonitrile) yielding the title compound as an off-white solid (0.030 g, 0.060 mmol, Yield: 14.8%).

$^1$H NMR (DMSO-d6, 400 MHz): Compound is a mixture of rotamers: δ 0.88-0.94 (m, 2H), 1.02-1.24 (m, 3H), 1.56-1.60 (m, 6H), 1.91 (s, 3H), 2.18 and 2.19 (singlets, 3H), 2.29-2.50 (m, 6H), 3.63 (m, 2H), 4.49 (s, 2H), 4.70 (s, 2H), 6.24 (s, 1H), 7.10-7.22 (m, 2H), 7.30-7.33 (m, 1H), 9.37 (s, br, 1H), 9.47 (s, br, 1H). 4 protons obscured by solvent peaks. LCMS (Method A): 1.372 min, MS: ES+494.37 (M+1).

Figure 10:
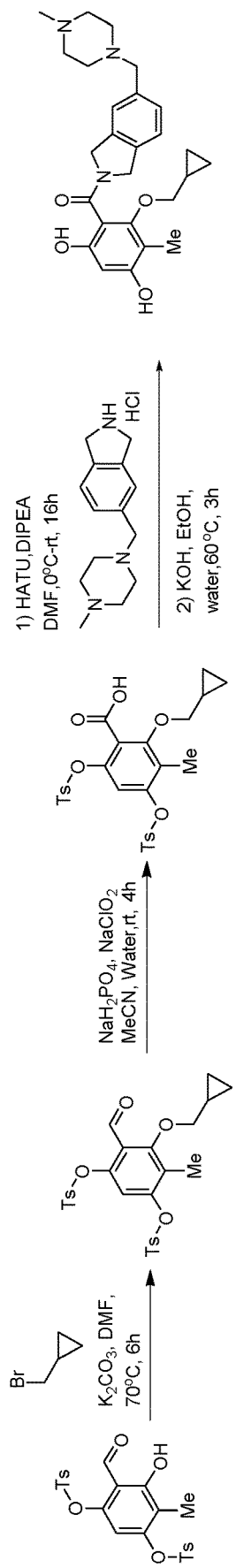
FIG. 10 shows the reaction scheme for (2-(Cyclopropylmethoxy)-4,6-dihydroxy-3-methylphenyl)(5-((4-methylpiperazin-1-yl)methyl)isoindolin-2-yl)methanone (Example 95)

Example 95: (2-(Cyclopropylmethoxy)-4,6-dihydroxy-3-methylphenyl)(5-((4-methylpiperazin-1-yl) methyl)isoindolin-2-yl)methanone (Reaction Scheme Shown in FIG. 10)

5-(Cyclopropylmethoxy)-4-formyl-6-methyl-1,3-phenylene bis(4-methylbenzenesulfonate) (Intermediate 57)

A stirred solution of 4-formyl-5-hydroxy-6-methyl-1,3-phenylene bis(4-methylbenzenesulfonate) Intermediate 2(1.0 g, 2.09 mmol, 1.0 eq) in DMF (10 mL) at room temperature was treated with $K_2CO_3$ (0.72 g, 5.24 mmol, 2.5 eq) and (bromomethyl)cyclopropane (0.420 g, 3.14 mmol, 1.5 eq). The reaction mixture was heated to 70° C. and stirred for 6 h. The reaction mixture was poured into ice-cold water (50 mL) and extracted in ethyl acetate (3×50 mL). The combined organic layer was washed with water (2×50 mL) and brine solution (2×50 mL). The combined organic layer was dried over $Na_2SO_4$, filtered, and concentrated under vacuum. The crude material was purified by flash chromatography (product eluted in 13.1% ethyl acetate:hexane) yielding the title compound (0.86 g, 1.62 mmol. Yield: 77.2%).

$^1$H NMR (DMSO-d6, 400 MHz): δ 0.075-0.18 (m, 2H), 0.40-0.49 (m, 2H), 0.96-1.01 (m, 1H), 1.82 (s, 3H), 2.42 and 2.44 (2 singlets, 6H), 3.53-3.61 (m, 2H), 6.74 (s, 1H), 7.46-7.51 (m, 4H), 7.68-7.75 (m, 4H), 9.95 (s, 1H). LCMS (Method A): 2.726 min. MS: ES+531.1 (M+1).

2-(Cyclopropylmethoxy)-3-methyl-4,6-bis(tosyloxy) benzoic acid (Intermediate 63)

A solution of 5-(cyclopropylmethoxy)-4-formyl-6-methyl-1,3-phenylene bis(4-methylbenzenesulfonate) (0.86 g, 1.62 mmol, 1.0 eq.) (Intermediate 57) in MeCN:Water (1:1) (10 mL) at room temperature was treated with $NaH_2PO_4$ (0.583 g, 4.86 mmol, 3.0 eq.) and $NaClO_2$ (0.542 g, 5.99 mmol, 3.7 eq.). The reaction mixture was stirred at room temperature for 4 h, poured into ice-cold water (50 mL), acidified using dil. HCl and extracted with ethyl acetate (3×50 mL). The combined organic layer was dried over $Na_2SO_4$, filtered, and concentrated under reduced pressure. The crude material was triturated using n-pentane (10 mL), diethyl ether (10 mL) and further dried using high vacuum yielding to give the title compound as an off white sticky solid (0.610 g, 1.11 mmol. Yield: 68.9%).

$^1$H NMR (DMSO-d6, 400 MHz): δ 0.12-0.16 (m, 2H), 0.44-0.47 (m, 2H), 1.00-1.10 (m, 1H), 1.83 (s, 3H), 2.43 (s, 6H), 3.58-3.64 (m, 2H), 6.69 (s, 1H), 7.48-7.51 (m, 4H), 7.70-7.77 (m, 4H), 13.58 (bs, 1H). LCMS (Method A): 2.487 min, MS: ES+569.2 (M+23).

5-(Cyclopropylmethoxy)-4-methyl-6-(5-((4-methylpiperazin-1-yl)methyl)isoindoline-2-carbonyl)-1,3-phenylene bis(4-methylbenzenesulfonate)

A stirred solution of 2-(cyclopropylmethoxy)-3-methyl-4,6-bis(tosyloxy)benzoic acid (0.510 g, 0.933 mmol, 1.0 eq) (Intermediate 63) in DMF (5 mL) at 0° C. was treated with HATU (0.460 g, 1.21 mmol, 1.3 eq) and DIPEA (0.80 mL, 4.66 mmol, 5.0 eq). 5-((4-methylpiperazin-1-yl)methyl) isoindoline hydrochloride (0.274 g, 1.02 mmol, 1.1 eq.) was added and the reaction mixture raised to room temperature and stirred for 16 h. The reaction mixture was poured with ice-cold water (100 mL) and extracted in ethyl acetate (3×110 mL). The combined organic layer was dried over $Na_2SO_4$, filtered, and concentrated under vacuum. The crude material was purified by column chromatography (eluting product with 20% EtOAc in Hexane) yielding the title compound (0.490 g, 0.64 mmol. Yield: 69.1%) which was progressed to the next step.

(2-(Cyclopropylmethoxy)-4,6-dihydroxy-3-methylphenyl)(5-((4-methylpiperazin-1-yl)methyl)isoindolin-2-yl)methanone A stirred solution of 5-(cyclopropylmethoxy)-4-methyl-6-(5-((4-methylpiperazin-1-yl)methyl)isoindoline-2-carbonyl)-1,3-phenylene bis(4-methylbenzenesulfonate) (0.47 g, 0.62 mmol, 1.0 eq.) in $EtOH:H_2O$ (1:1) at room temperature was treated with KOH (1.38 g, 24.59 mmol, 40 eq.). The reaction mixture was heated to 60° C. and stirred for 3 h. The resulting reaction mixture was allowed to cool to room temperature, poured into water (20 mL) and acidified using $KHSO_4$ solution and extracted into EtOAc (3×30 mL). The aqueous layer was further extracted with 10% IPA in $CHCl_3$ (3×50 mL). The combined organic layer was dried over $Na_2SO_4$, filtered, and concentrated under reduced pressure. The crude material was purified by prep HPLC using 0.05% $NH_3$ in water:acetonitrile. The pure fractions were lyophilized yielding the title compound as an off-white solid (0.050 g, 0.11 mmol. Yield: 17.9%).

$^1$H NMR (DMSO-d6, 400 MHz): Compound is a mixture of rotamers: δ 0.17 (m, 2H), 0.43 (m, 2H), 1.04-1.06 (m, 1H), 1.92 (s, 3H), 2.12 and 2.13 (singlets, 3H), 2.30-2.49 (m, 8H), 3.40-3.43 (m, 2H), 3.58 (m, 2H), 4.45-4.48 (m, 2H), 4.70-4.71 (m, br, 2H), 6.23 (s, 1H), 7.16-7.22 (m, 2H), 7.29-7.32 (m, 1H), 9.47 (bs, 2H, $D_2O$ exchangeable). LCMS (Method B): 4.732 min, MS: ES+452.4 (M+1).

Figure 11:
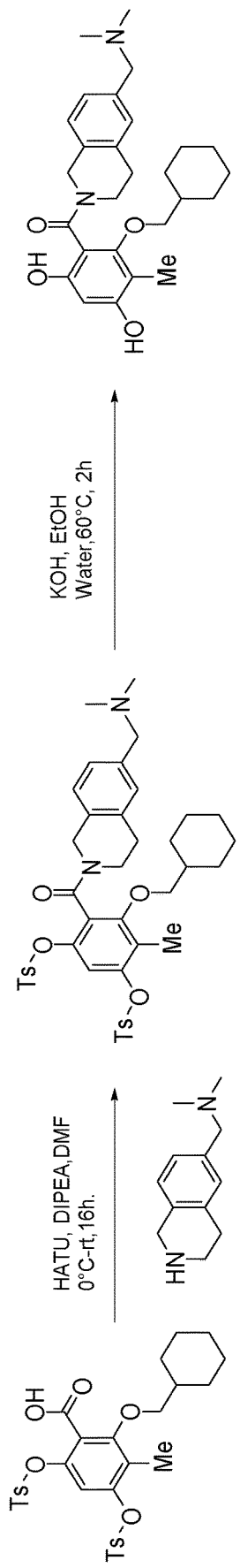
FIG. 11 shows the reaction scheme for (2-(Cyclohexylmethoxy)-4,6-dihydroxy-3-methylphenyl)(6-((dimethylamino)methyl)-3,4-dihydroisoquinolin-2(1H)-yl)methanone (Example 96)

Example 96: (2-(Cyclohexylmethoxy)-4,6-dihydroxy-3-methylphenyl)(6-((dimethylamino) methyl)-3,4-dihydroisoquinolin-2(1H)-yl)methanone (Reaction Scheme Shown in FIG. 11)

5-(Cyclohexylmethoxy)-4-(6-((dimethyl amino) methyl)-1,2,3,4-tetrahydroisoquinoline-2-carbonyl)-6-methyl-1,3-phenylene bis(4-methylbenzenesulfonate)

To a stirred solution 2-(cyclohexylmethoxy)-3-methyl-4,6-bis(tosyloxy)benzoic acid (Intermediate 62) (0.3 g, 0.51 mmol, 1 eq) at 0° C. in DMF (3 mL) were added HATU (0.29 g, 0.76 mmol, 1.5 eq) and DIPEA (0.13 g, 1.02 mmol, 2 eq) and the mixture stirred for 15 min. N, N-dimethyl-1-(1,2,3,4-tetrahydroisoquinolin-6-yl)methanamine (Intermediate 43) (0.12 g, 0.66 mmol, 1.3 eq) was added and stirring continued at room temperature for 16 h. The reaction mixture was poured into ice cold water (60 mL) and extracted using ethyl acetate (3×60 mL). The combined organic layer was washed with ice cold water (3×80 mL), dried over $Na_2SO_4$, filtered and concentrated under vacuum. Crude material was purified by flash chromatography (product eluted in 4% MeOH in DCM) to give the title compound as a yellow solid (0.3 g, Yield: 77.4%) which was used directly in the next step.

Example 96: (2-(Cyclohexylmethoxy)-4,6-dihydroxy-3-methylphenyl)(6-((dimethylamino)methyl)-3,4-dihydroisoquinolin-2(1H)-yl)methanone A stirred solution of 5-(cyclohexylmethoxy)-4-(6-((dimethyl amino) methyl)-1, 2, 3, 4-tetrahydro-isoquinoline-2-carbonyl)-6-methyl-1, 3-phenylene bis (4-methylbenzenesulfonate) (0.27 g, 0.35 mmol, 1 eq.) in $EtOH:H_2O$ (2:1) (3 mL) at room temperature was treated with KOH (0.790 g, 14.1 mmol, 40 eq.). The reaction mixture was heated to 60° C. and stirred for 2 h, poured into ice cold water (50 mL), neutralized using saturated solution of $KHSO_4$ solution and extracted in ethyl acetate (3×60 mL). The combined organic layer was dried over $Na_2SO_4$, filtered and concentrated under vacuum. The crude material was purified by column chromatography followed by Prep HPLC purification (Method C) to give the title compound as an off white solid (0.012 g, Yield: 7.5%). $^1$H NMR High temperature (DMSO-d6, 400 MHz, 351K): δ 0.85-0.87 (m, 2H), 1.01-1.12 (m, 3H), 1.51-1.53 (m, 6H), 1.92 (s, 3H), 2.15 (s, 6H), 2.66-2.81 (m, 2H), 3.33 (s, 2H), 3.45-3.48 (m, 2H), 4.42-4.66 (m, 2H), 6.21 (s, 1H), 7.06 (s, 3H), 9.37 (s, 2H). LCMS (Method D): 1.806 min, 97.60%, 254 nm, MS: ES+453.4 (M+1). HPLC (Method A): 4.639 min, 97.99%, 230 nm.

Synthesis of Intermediates

In one approach (Scheme 2), substituted aromatic carboxylic acid of formula [II] may be prepared by Pinnick oxidation of a substituted aromatic aldehyde of formula [IV] with an oxidising agent such as sodium chlorite ($NaClO_2$), in monosodium phosphate buffered solution ($NaH_2PO_4$)aq in a polar solvent such as acetonitrile or THF. The reaction is suitably conducted at RT or by thermal heating. After reaction work up, typically by a liquid-liquid extraction, the reaction product is purified by flash column chromatography, reverse phase preparative HPLC or re-crystallisation. Intermediate substituted aromatic aldehyde compounds of general formula [IV] may be prepared by reaction of an intermediate bis-Ts protected phenol intermediate compound of general formula [V] with a halide of general formula [VI] in a polar solvent such as DMF or DMA with a base such as $K_2CO_3$ or $Cs_2CO_3$. The reaction is suitably conducted under thermal heating. After reaction work up, typically by a liquid-liquid extraction, the reaction product is purified by flash column chromatography, reverse phase preparative HPLC or re-crystallisation. Intermediate bis-Ts protected phenol intermediate compounds of general formula [V] are prepared by reaction of a tri-phenol compound of general formula [VII] with tosyl chloride, in a polar solvent such as acetone or THF with a base such as $K_2CO_3$ or $Cs_2CO_3$. The reaction is suitably conducted at 0° C. or RT.

After reaction work up, typically by a liquid-liquid extraction, the reaction product is purified by flash column chromatography, reverse phase preparative HPLC or re-crystallisation, to yield Intermediate bis-Ts protected phenol intermediate compounds of general formula [V].

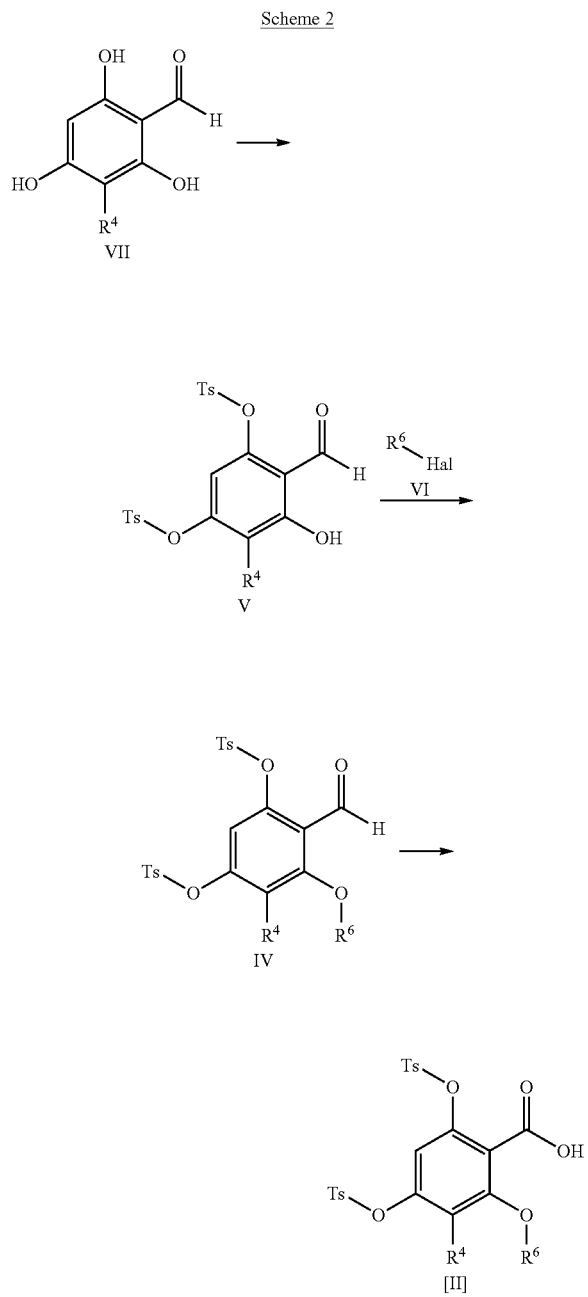

Scheme 2

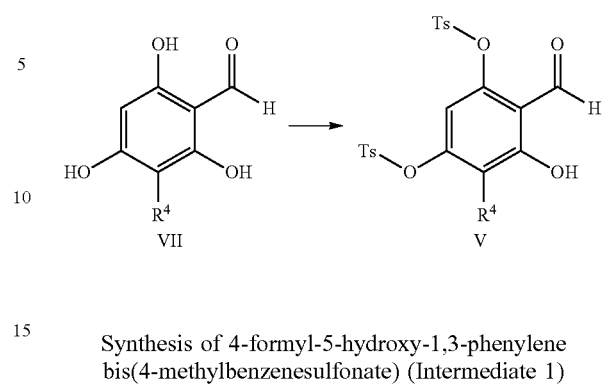

Scheme 3

Synthesis of 4-formyl-5-hydroxy-1,3-phenylene bis(4-methylbenzenesulfonate) (Intermediate 1)

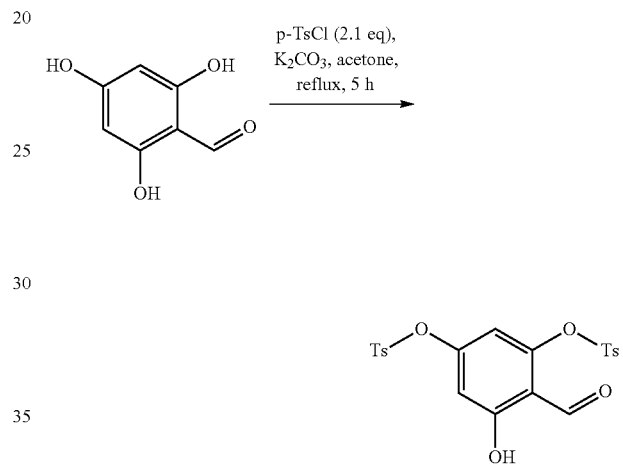

In one approach (Scheme 3), bis-tosyl protected phenol intermediate compounds of general formula [V] were prepared by reaction of a 1,3,5-triphenolbenzaldehyde derivative of general formula [VII] with para-toluenesulfonylchloride in a polar solvent such as acetonitrile or acetone, with a base such as $K_2CO_3$ or $Na_2CO_3$. The reaction is suitably conducted at RT or by thermal heating. After reaction work up, typically by a liquid-liquid extraction, the reaction product was purified by flash column chromatography, reverse phase preparative HPLC or re-crystallisation.

To a solution of 2,4,6-trihydroxybenzaldehyde (CAS #487-70-7) (5 g, 32.2 mmol, 1.0 eq) in acetone (200 mL) was added $K_2CO_3$ (22.27 g, 161 mmol, 5.0 eq) and p-toluene sulphonyl chloride (12.90, 67.7 mmol, 2.1 eq) at room temperature. The reaction mixture was heated at 60° C. for 4 h. The resulting reaction mixture was allowed to cool to room temperature and concentrated under reduced pressure. The crude material was diluted with water (300 mL) and extracted in EtOAc (3×400 mL). The combined organic layer was washed with brine solution (200 mL), dried over sodium sulphate and concentrated under reduced pressure to give crude material which was purified by column chromatography using silica gel (eluting product using 8.7% ethyl acetate in hexane) yielding 4-formyl-5-hydroxy-1,3-phenylene bis(4-methylbenzenesulfonate) (Intermediate 1) as a yellow solid (5.9 g, Yield: 39.3%).

$^1$H NMR (DMSO-$d^6$, 400 MHz): δ 2.44 (d, J=2.4 Hz, 6H), 6.38 (d, J=2.4 Hz, 1H), 6.66 (d, J=2.4 Hz, 1H), 7.47-7.54 (m, 4H), 7.69 (d, J=8.0 Hz, 2H), 7.78 (d, J=8.4 Hz, 2H), 9.89 (s, 1H), 11.52 (s, 1H). LCMS: 2.441 min, MS: ES+461.30 (M−1)

The following compounds were prepared according to the method described above using the indicated intermediates

| Intermediate No. | Name | Structure | Data |
|---|---|---|---|
| 2 | 4-formyl-5-hydroxy-6-methyl-1,3-phenylene bis(4-methylbenzenesulfonate) | | $^1$H NMR (DMSO-d6, 400 MHz): δ 1.77 (s, 1H), 2.45 (d, J = 8.0 Hz, 6H), 6.45 (s, 1H), 7.51-7.54 (m, 4H), 7.74-7.81 (m, 4H), 9.86 (s, 1H), 11.82 (s, 1H). LCMS (Method A): 2.582 min, MS: ES+ 477 (M + 1) Using 2,4,6-trihydroxy-3-methylbenzaldehyde (CAS-55743-13-0) |
| 3 | 4-ethyl-6-formyl-5-hydroxy-1,3-phenylene bis(4-methylbenzenesulfonate) | | $^1$H NMR (DMSO-d6, 400 MHz): δ 0.89 (t, J = 7.6 Hz, 3H), 2.35-2.37 (m, 2H), 2.45 (d, 7.2 Hz, 6H), 6.46 (s, 1H), 7.51-7.55 (m, 4H), 7.77-7.82 (m, 4H), 9.86 (s, 1H), 11.88 (s, 1H). LCMS (Method A): 2.727 min, MS: ES+ 491 (M + 1) Using 3-ethyl-2,4,6-trihydroxybenzaldehyde (CAS 412021-94-4) |

In one approach (Scheme 4), bis-tosyl protected alkoxyphenol intermediate compounds of general formula [IV] were prepared by reaction of a bis-tosyl protected phenol intermediate of general formula [V] with a compound of general formula [VI] with a base such as $Cs_2CO_3$ or $K_2CO_3$ in a polar aprotic solvent such as DMF or DMA. The reaction is suitably conducted at RT or by thermal heating. After reaction work up, typically by a liquid-liquid extraction, the reaction product was purified by flash column chromatography, reverse phase preparative HPLC or re-crystallisation Scheme 4

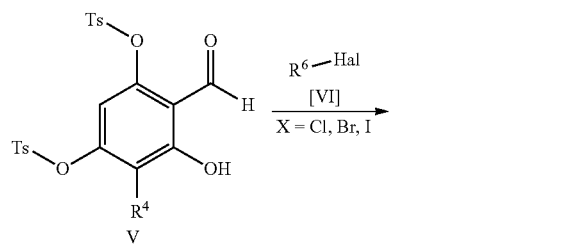

Synthesis of 5-(cyclopentyloxy)-4-formyl-1,3-phenylene bis(4-methylbenzenesulfonate) (Intermediate 4)

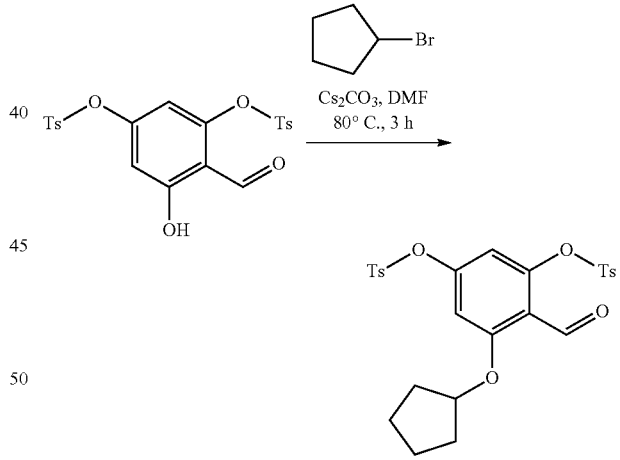

To a solution of 4-formyl-5-hydroxy-1,3-phenylene bis(4-methylbenzenesulfonate) (Intermediate 1) (3 g, 6.48 mmol, 1.0 eq) in DMF (20 mL) was added $Cs_2CO_3$ (2.10 g, 6.44 mmol, 1.0 eq) and bromocyclopentane (1.44 g, 9.66 mmol, 1.5 eq) at room temperature. The reaction mixture was heated to 80° C. and stirred for 3 h. The cooled reaction mixture was diluted with water (200 mL) and extracted in EtOAc (3×250 mL). The combined organic layer was washed with brine solution (200 mL), dried over sodium sulphate and concentrated under reduce pressure. The obtained crude material was purified by column chromatography using silica gel (eluting product using 10.2% ethyl acetate in hexane) yielding 5-(cyclopentyloxy)-4-formyl-1,

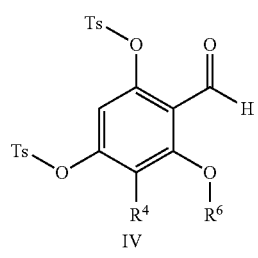

3-phenylene bis(4-methylbenzenesulfonate) (Intermediate 4) as a yellow oil (2.1 g, Yield: 61.0%). ¹H NMR (DMSO-d⁶, 400 MHz): δ 1.53-1.62 (m, 8H), 2.42 (d, J=4.8 Hz, 6H), 4.60-4.80 (m, 1H), 6.45 (d, J=1.60 Hz, 1H), 6.75 (d, J=1.6 Hz, 1H), 7.46-7.52 (m, 4H), 7.66-7.76 (m, 4H), 9.92 (s, 1H). LCMS: 2.788 min, MS: ES+531.17 (M+1)

The following compounds were prepared according to the Method described above using the indicated intermediates

| Int. No. | Name | Structure | Data |
|---|---|---|---|
| 5 | 5-(benzyloxy)-4-formyl-1,3-phenylene bis(4-methylbenzenesulfonate) | | ¹H NMR (DMSO-d6, 400 MHz): δ 2.44 (d, J = 2.4 Hz, 6H), 5.15 (s, 2H), 6.46 (d, J = 2.8 Hz, 1H), 7.07 (d, J = 2.0 Hz, 1H), 7.40-7.41 (m, 4H), 7.46-7.51 (m, 4H), 7.65 (d, J = 8.4 Hz, 2H), 7.74 (d, J = 8.4 Hz, 2H), 9.99 (s, 1H). LCMS (Method A): 2.594 min, MS: ES+ 575.06 (M + 23) Using 4-formyl-5-hydroxy-1,3-phenylene bis(4-methylbenzenesulfonate) (Intermediate 1) and benzylbromide |
| 6 | 5-(benzyloxy)-4-formyl-6-methyl-1,3-phenylene bis(4-methylbenzenesulfonate) | | ¹H NMR (DMSO-d6, 400 MHz): δ 1.83 (d, J = 9.20 Hz, 3H), 2.44 (d, J = 8.0 Hz, 6H), 4.80 (s, 2H), 6.75 (s, 1H), 7.31-7.37 (m, 5H), 7.49-7.54 (m, 4H), 7.71-7.77 (m, 4H), 9.87 (s, 1H). LCMS (Method A): 2.697 min, MS: ES+ 589.10 (M + 23) Using 4-formyl-5-hydroxy-6-methyl-1,3-phenylene bis(4-methylbenzenesulfonate) Intermediate 2 and benzylbromide |
| 7 | 5-(benzyloxy)-4-ethyl-6-formyl-1,3-phenylene bis(4-methylbenzenesulfonate) | | ¹H NMR (DMSO-d6, 400 MHz): δ 0.89 (t, J = 7.6 Hz, 3H), 2.32-2.34 (q, 2H), 2.45 (d, J = 9.2 Hz, 6H), 4.82 (s, 2H), 6.79 (s, 1H), 7.35-7.40 (m, 5H), 7.51-7.55 (m, 4H), 7.73-7.80 (m, 4H), 9.91 (s, 1H). LCMS (Method A): 2.763 min, MS: ES+ 603.15 (M + 23) Using 4-ethyl-6-formyl-5-hydroxy-1,3-phenylene bis(4-methylbenzenesulfonate) Intermediate 3 and benzylbromide |
| 8 | 4-formyl-5-(pyridin-2-ylmethoxy)-1,3-phenylene bis(4-methylbenzenesulfonate) | | ¹H NMR (DMSO-d6, 400 MHz): δ 2.44 (d, J = 4.8 Hz, 6H), 5.19 (s, 2H), 6.50 (d, J = 2.0 Hz, 1H), 7.40 (d, J = 2.0 Hz, 1H), 7.36-7.39 (m, 4H), 7.48-7.54 (m, 1H), 7.67-7.75 (m, 4H), 7.84-7.89 (m, 1H), 8.57 (d, J = 4.8, 1H), 10.05 (s, 1H). LCMS (Method A): 2.339 min, MS: ES+ 554.1 (M + 1) Using 4-formyl-5-hydroxy-1,3-phenylene bis(4-methylbenzenesulfonate) (Intermediate 1) and 2-(bromomethyl)pyridine hydrobromide |

-continued

| Int. No. | Name | Structure | Data |
|---|---|---|---|
| 9 | 4-formyl-5-(pyrimidin-2-ylmethoxy)-1,3-phenylene bis(4-methylbenzene-sulfonate) | | $^1$H NMR (DMSO-d6, 400 MHz): δ 2.42-2.44 (m, 6H), 5.38 (s, 2H), 6.49 (d, J = 2.0 Hz, 1H), 6.93 (d, J = 2.4 Hz, 1H), 7.44-7.51 (m, 5H), 7.66-7.68 (m, 4H), 8.12 (d, J = 5.2 Hz, 2H), 10.83 (s, 1H). LCMS (Method A): 2.243 min, MS: ES+ 555.0 (M + 1) Using 4-formyl-5-hydroxy-1,3-phenylene bis(4-methylbenzenesulfonate) (Intermediate 1) and 2-(bromomethyl)-pyrimidine hydrochloride |
| 10 | 4-formyl-5-(1-phenylethoxy)-1,3-phenylene bis(4-methylbenzene-sulfonate) | | $^1$H NMR (DMSO-d6, 400 MHz): δ 1.48 (d, J = 6.0 Hz, 3H), 2.41-2.45 (m, 6H), 5.58-5.68 (m, 1H), 6.40 (d, J = 1.60 Hz, 1H), 6.91 (d, J = 2.0 Hz, 1H), 7.31-7.38 (m, 5H), 7.39-7.42 (m, 4H), 7.50-7.59 (m, 4H), 10.05 (s, 1H). LCMS (Method A): 2.800 min, MS: ES+ 589.1 (M + 23) Using 4-formyl-5-hydroxy-1,3-phenylene bis(4-methylbenzenesulfonate) (Intermediate 1) and (1-bromoethyl)benzene |
| 11 | 5-((4-fluorobenzyl)oxy)-4-formy-1,3-phenylene bis(4-methylbenzene-sulfonate) | | $^1$H NMR (DMSO-d6, 400 MHz): δ 2.44 (s, 6H), 5.14 (s, 2H), 6.46 (d, J = 2.0 Hz, 1H), 7.08 (d, J = 2.0 Hz, 1H), 7.21-7.26 (m, 2H), 7.45-7.52 (m, 6H), 7.65-7.67 (m, 2H), 7.74-7.76 (m, 2H), 9.99 (s, 1H). LCMS (Method A): 2.636 min, MS: ES+ 593.10 (M + 23) Using 4-formyl-5-hydroxy-1,3-phenylene bis(4-methylbenzenesulfonate) (Intermediate 1) and 4-fluorobenzylbromide |
| 12 | 4-formyl-5-((4-methoxybenzyl)oxy)-1,3-phenylene bis(4-methylbenzene-sulfonate) | | $^1$H NMR (DMSO-d6, 400 MHz): δ 2.44 (s, 6H), 3.77 (s, 3H), 5.06 (s, 2H), 6.44 (d, J = 2.0 Hz, 1H), 6.95 (d, J = 8.40 Hz, 2H), 7.08 (d, J = 2.0 Hz, 1H), 7.33-7.35 (m, 2H), 7.46-7.52 (m, 4H), 7.65 (d, J = 9.2 Hz, 2H), 7.76 (d, J = 8.0 Hz, 2H), 9.95 (s, 1H). LCMS (Method A): 2.573 min, MS: ES+ 605.1 (M + 23) Using 4-formyl-5-hydroxy-1,3-phenylene bis(4-methylbenzenesulfonate) (Intermediate 1) and 4-methoxybenzylbromide |

-continued

| Int. No. | Name | Structure | Data |
|---|---|---|---|
| 13 | 4-formyl-5-((3-methylbenzyl)oxy)-1,3-phenylene bis(4-methylbenzene-sulfonate) | | $^1$H NMR (DMSO-d6, 400 MHz): δ 2.32 (s, 3H), 2.44 (d, J = 2.4 Hz, 6H), 5.10 (s, 2H), 6.45 (d, J = 1.6 Hz, 1H), 7.06 (d, J = 2.0 Hz, 1H), 7.17-7.29 (m, 4H), 7.47-7.51 (m, 4H), 7.65 (d, J = 8.4 Hz, 2H), 7.73 (d, J = 8.4 Hz, 2H), 9.99 (s, 1H). LCMS (Method A): 2.691 min, MS: ES+ 589.20 (M + 23) Using 4-formyl-5-hydroxy-1,3-phenylene bis(4-methylbenzenesulfonate) (Intermediate 1) and 3-methylbenzylbromide |
| 14 | 4-formyl-5-(pyrimidin-4-ylmethoxy)-1,3-phenylene bis(4-methylbenzene-sulfonate) | | LCMS (Method A): 2.508 min, MS: ES+ 555.1 (M + 1) Using 4-formyl-5-hydroxy-1,3-phenylene bis(4-methylbenzenesulfonate) (Intermediate 1) and 4-(Bromomethyl)pyrimidine |
| 15 | tert-butyl3-((2-formyl-3,5-bis(tosyloxy)phenoxy)methyl)-1H-pyrazole-1-carboxylate | | 1H NMR (DMSO-d6, 400 MHz): δ 1.58 (s, 9H), 2.44 (s, 6H), 5.15 (s, 2H), 6.48 (d, 2.0 Hz, 1H), 6.58 (d, J = 2.8 Hz, 1H), 7.11 (d, 2.0 Hz, 1H), 7.47-7.52 (m, 4H), 7.66 (d, J = 8.4 Hz, 2H), 7.67 (d, 8.4 Hz, 2H), 8.29 (d, 2.8 Hz, 1H), 9.97 (s, 1H). LCMS (Method A): 2.672 min, MS: ES+ 665.00 (M + 23) Using 4-formyl-5-hydroxy-1,3-phenylene bis(4-methylbenzenesulfonate) (Intermediate 1) and tert-butyl 3-(bromomethyl)-1H-pyrazole-1-carboxylate |
| 16 | 5-((4-fluorobenzyl)oxy)-4-formyl-6-methyl-1,3-phenylene bis(4-methylbenzene-sulfonate) | | $^1$H NMR (DMSO-d6, 400 MHz): δ 1.81 (s, 3H), 2.44 (d, J = 7.6 Hz, 6H), 4.80 (s, 2H), 6.74 (s, 1H), 7.18-7.23 (m, 2H), 7.36-7.40 (m, 2H), 7.49-7.54 (m, 4H), 7.71-7.77 (m, 4H), 9.86 (s, 1H). LCMS (Method A): 2.817 min, MS: ES+ 607.1 (M + 23) Using 4-formyl-5-hydroxy-6-methyl-1,3-phenylene bis(4-methylbenzenesulfonate) Intermediate 2 and 4-fluorobenzylbromide |

| Int. No. | Name | Structure | Data |
|---|---|---|---|
| 17 | 4-formyl-6-methyl-5-((3-methylbenzyl)oxy)-1,3-phenylene bis(4-methylbenzenesulfonate) | | 1H NMR (DMSO-d6, 400 MHz): δ 1.82 (s, 3H), 2.30 (s, 3H), 2.45 (d, J = 8.0 Hz, 6H), 4.75 (s, 2H), 6.72 (s, 1H), 7.09 (d, J = 7.2 Hz, 1H), 7.17 (d, J = 7.6 Hz, 2H), 7.23-7.27 (m, 1H), 7.48-7.53 (m, 4H), 7.70-7.76 (m, 4H), 9.87 (s, 1H). LCMS (Method A): 2.825 min, MS: ES+ 603.1 (M + 23) Using 4-formyl-5-hydroxy-6-methyl-1,3-phenylene bis(4-methylbenzenesulfonate) Intermediate 2 and 3-methylbenzylbromide |
| 18 | 4-formyl-6-methyl-5-(pyridin-2-ylmethoxy)-1,3-phenylene bis(4-methylbenzenesulfonate) | | $^1$H NMR (DMSO-d6, 400 MHz): δ 1.83 (s, 3H), 2.44 (d, J = 8.0 Hz, 6H), 4.87 (s, 2H), 6.74 (s, 1H), 7.36-7.39 (m, 1H), 7.47-7.53 (m, 5H0, 7.70-7.76 (m, 4H), 7.81-7.86 (m, 1H), 8.54 (d, J = 4.0 Hz, 1H), 9.92 (s, 1H). LCMS (Method A): 2.420 min, MS: ES+ 568.1 (M + 1) Using 4-formyl-5-hydroxy-6-methyl-1,3-phenylene bis(4-methylbenzenesulfonate) Intermediate 2 and 2-(bromomethyl)pyridine hydrobromide |
| 19 | 4-formyl-6-methyl-5-((1-methyl-1H-pyrazol-3-yl)methoxy)-1,3-phenylene bis(4-methylbenzenesulfonate) | | 1H NMR (DMSO-d6, 400 MHz): δ 1.82 (s, 3H), 2.43 (s, 3H), 2.45 (s, 3H), 3.79 (s, 3H), 4.76 (s, 2H), 6.10 (s, 1H), 6.70 (s, 1H), 7.48-7.53 (m, 4H), 7.63-7.78 (m, 5H), 9.79 (s, 1H). LCMS (Method E): 2.395 min, MS: ES+ 571.11 (M + 1) Using 4-formyl-5-hydroxy-6-methyl-1,3-phenylene bis(4-methylbenzenesulfonate) Intermediate 2 and 3-(chloromethyl)-1-methyl-1H-pyrazole hydrochloride |
| 54 | 4-Formyl-5-methoxy-6-methyl-1,3-phenylene bis(4-methylbenzenesulfonate) | | $^1$H NMR (DMSO-d6, 400 MHz): δ 1.86 (s, 3H), 2.44 (s, 3H), 2.46 (s, 3H), 3.65 (s, 3H), 6.68 (s, 1H), 7.48-7.53 (m, 4H), 7.70-7.76 (m, 4H), 9.93 (s, 1H). LCMS (Method A): 2.588 min. MS: ES+ 491.12 (M + 1). Using 4-formyl-5-hydroxy-6-methyl-1,3-phenylene bis(4-methylbenzenesulfonate) (Intermediate 2) |

| Int. No. | Name | Structure | Data |
|---|---|---|---|
| 55 | 5-Ethoxy-4-formyl-6-methyl-1,3-phenylene bis(4-methylbenzene-sulfonate) | | ¹H NMR (DMSO-d6, 400 MHz): Compound is a mixture of rotamers: δ 1.07-1.27 and 1.20-1.24 (m, 3H), 1.77 and 1.85 (singlets, 3H) 2.44-2.50 (singlets, 6H), 3.35-3.40 and 3.78-3.82 (m, 2H), 6.44 and 6.71 (singlets, 1H), 7.48-7.53 (m, 4H), 7.69-7.80 (m, 4H), 9.86 and 9.92 (singlets, 1H). LCMS (Method A): 2.721 min, MS: ES+ 505.7 (M + 1). Using 4-formyl-5-hydroxy-6-methyl-1,3-phenylene bis(4-methylbenzenesulfonate) (Intermediate 2) |
| 56 | 5-(Cyclohexylmethoxy)-4-formyl-6-methyl-1,3-phenylene bis(4-methylbenzene-sulfonate) | | ¹H NMR (DMSO-d6, 400 MHz): Compound is a mixture of rotamers: δ 0.97-1.00 (m, 2H), 1.11-1.26 (m, 3H), 1.67-1.73 (m, 5H), 1.77 and 1.83 (singlets, 3H), 2.33-2.45 (singlets, 6H), 3.49 and 3.70 (m, 2H), 5.77 (s, 1H), 6.44 and 6.70 (singlets, 1H), 7.48-7.53 (m, 4H), 7.71-7.81 (m, 4H), 9.86 and 9.90 (singlets, 1H). LCMS (Method A): 3.250 min, MS: ES+ 573.13 (M + 1). Using 4-formyl-5-hydroxy-6-methyl-1,3-phenylene-bis(4-methylbenzenesulfonate) |
| 57 | 5-(Cyclopropylmethoxy)-4-formyl-6-methyl-1,3-phenylene bis(4-methylbenzene-sulfonate) | | ¹H NMR (DMSO-d6, 400 MHz): δ 0.075-0.18 (m, 2H), 0.40-0.49 (m, 2H), 0.96-1.01 (m, 1H), 1.82 (s, 3H), 2.42 and 2.44 (2 singlets, 6H), 3.53-3.61 (m, 2H), 6.74 (s, 1H), 7.46-7.51 (m, 4H), 7.68-7.75 (m, 4H), 9.95 (s, 1H). LCMS (Method A): 2.726 min, MS: ES+ 531.1 (M + 1). Using 4-formyl-5-hydroxy-6-methyl-1,3-phenylene bis(4-methylbenzenesulfonate) Intermediate 2 |

In one approach (Scheme 5), substituted aromatic carboxylic acids of formula [II] were prepared by a Pinnick oxidation of a substituted aromatic aldehyde of formula [IV] with an oxidising agent such as sodium chlorite (NaClO$_2$), in monosodium phosphate buffered solution (NaH$_2$PO$_4$)aq in a polar solvent such as acetonitrile or THF. The reaction is suitably conducted at RT or by thermal heating. After reaction work up, typically by a liquid-liquid extraction, the reaction product was purified by flash column chromatography, reverse phase preparative HPLC or re-crystallisation.

Scheme 5

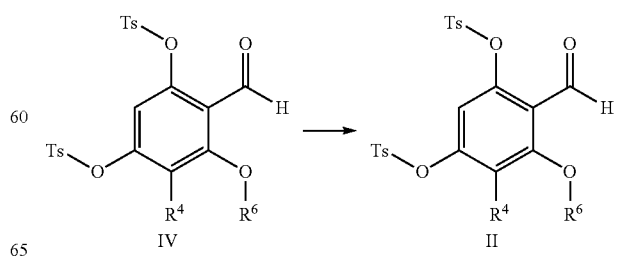

Synthesis of 2-(cyclopentyloxy)-4,6-bis(tosyloxy)benzoic acid (Intermediate 20)

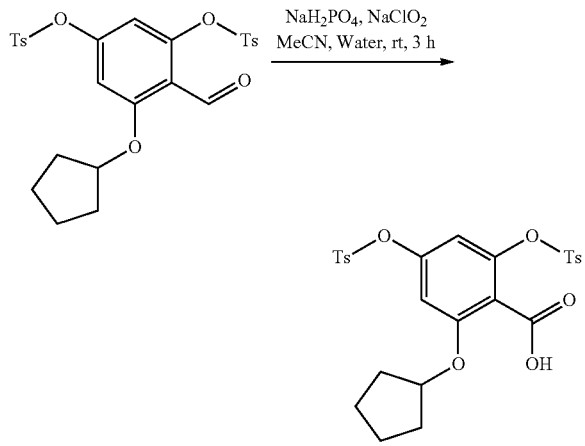

To a solution of 4 5-(cyclopentyloxy)-4-formyl-1,3-phenylene bis(4-methylbenzenesulfonate) (0.8 g, 1.51 mmol, 1 eq) in acetonitrile:water (1:1) (20 mL) was added NaH$_2$PO$_4$ (0.36 g, 3.00 mmol, 2 eq) and NaClO$_2$ (0.496 g, 5.48 mmol, 3.6 eq) at room temperature. The reaction mixture was stirred at room temperature for 16 h. Solvent was removed under vacuum and the isolated crude material diluted with water (70 mL), acidified using formic acid, and extracted in EtOAc (3×150 mL). The combined organic layer was dried over sodium sulphate and concentrated under reduced pressure. The obtained crude material was purified by flash chromatography using silica gel (eluting product using 35.3% ethyl acetate in hexane) yielding 2-(cyclopentyloxy)-4,6-bis(tosyloxy)benzoic acid (Intermediate 20) as an oil (0.35 g, Yield: 42.5%). $^1$H NMR (DMSO-d$^6$, 400 MHz): δ 1.43-1.61 (m, 6H), 1.66-1.70 (m, 2H), 2.43 (d, J=9.2 Hz, 6H), 4.68-4.69 (m, 1H), 6.52 (d, J=2.0 Hz, 1H), 6.61 (d, J=1.6 Hz, 1H), 7.46-7.51 (m, 4H), 7.69-7.74 (m, 4H), 13.29 (s, 1H). LCMS: 2.395 min, MS: ES+569.11 (M+23).

The following compounds were prepared according to the Methods described above using the indicated intermediates

| No | Name | Structure | Data |
|---|---|---|---|
| 21 | 2-(benzyloxy)-4,6-bis(tosyloxy)benzoic acid | | $^1$H NMR (DMSO-d6, 400 MHz): δ 2.42 (s, 6H), 4.96 (s, 2H), 6.53 (d, J = 1.6 Hz, 1H), 6.68-6.70 (m, 1H), 7.33-7.36 (m, 5H), 7.41-7.48 (m, 4H), 7.67-7.75 (m, 4H), 13.70 (brs, 1H). LCMS (Method A): 2.293 min, MS: ES+ 591.1 (M + 23) Using 5-(benzyloxy)-4-formyl-1,3-phenylene bis(4-methylbenzenesulfonate) Intermediate 5 |
| 22 | 2-(benzyloxy)-3-methyl-4,6-bis(tosyloxy)benzoic acid | | $^1$H NMR (DMSO-d6, 400 MHz): δ 1.84 (s, 3H), 2.45 (d, J = 1.20 Hz, 6H), 4.80 (s, 2H), 6.73 (s, 1H), 7.33-7.39 (m, 5H), 7.50-7.53 (m, 4H), 7.72-7.75 (m, 4H), 13.74 (s, 1H). LCMS (Method A): 2.464 min, MS: ES+ 605.20 (M + 23) Using 5-(benzyloxy)-4-formyl-6-methyl-1,3-phenylene bis(4-methylbenzenesulfonate) Intermediate 6 |
| 23 | 2-(benzyloxy)-3-ethyl-4,6-bis(tosyloxy)benzoic acid | | $^1$H NMR (DMSO-d6, 400 MHz): δ 0.92 (t, J = 7.6 Hz, 3H), 2.35-2.37 (m, 2H), 2.45 (d, J = 2.4 Hz, 6H), 4.86 (s, 2H), 6.76 (s, 1H), 7.35-7.38 (m, 5H), 7.50-7.54 (m, 4H), 7.74-7.77 (m, 4H), 13.83 (s, 1H). LCMS (Method A): 2.510 min, MS: ES+ 619.10 (M + 23) Using 5-(benzyloxy)-4-ethyl-6-formyl-1,3-phenylene bis(4-methylbenzenesulfonate) Intermediate 7 |

| No | Name | Structure | Data |
|---|---|---|---|
| 24 | 2-(pyridin-2-ylmethoxy)-4,6-bis(tosyloxy)benzoic acid | | ¹H NMR (DMSO-d6, 400 MHz): δ 2.44 (d, J = 7.2 Hz, 6H), 5.11 (s, 2H), 6.55 (d, J = 2.0 Hz, 1H), 6.90 (d, J = 2.0 Hz, 1H), 7.35-7.38 (m, 2H), 7.47-7.50 (m, 4H), 7.67-7.73 (m, 4H), 7.82-7.86 (m, 1H), 8.56 (t, J = 1.6 Hz, 1H), 13.54 (s, 1H). LCMS (Method A): 2.069 min, MS: ES+ 570.1 (M + 1)<br>Using 4-formyl-5-(pyridin-2-ylmethoxy)-1,3-phenylene bis(4-methylbenzenesulfonate) Intermediate 8 |
| 25 | 2-(pyrimidin-2-ylmethoxy)-4,6-bis(tosyloxy)benzoic acid | | ¹H NMR (DMSO-d6, 400 MHz): δ 2.43 (d, J = 3.2 Hz, 6H), 5.22 (s, 2H), 6.54 (d, J = 2.0 Hz, 1H), 6.71 (d, J = 1.6 Hz, 1H), 7.44-7.51 (m, 5H), 7.65-7.70 (m, 4H), 8.81 (d, J = 4.8 Hz, 2H), 13.50 (s, 1H). LCMS (Method A): 2.087 min, MS: ES+ 571.1 (M + 1)<br>Using 4-formyl-5-(pyrimidin-2-ylmethoxy)-1,3-phenylene bis(4-methylbenzenesulfonate) Intermediate 9 |
| 26 | 2-(1-phenylethoxy)-4,6-bis(tosyloxy)benzoic acid | | ¹H NMR (DMSO-d6, 400 MHz): δ 1.40 (d, J = 6.0 Hz, 3H), 2.42 (d, J = 4.8 Hz, 6H), 5.45-5.49 (m, 1H), 6.44 (d, J = 1.6 Hz, 1H), 6.68 (s, 1H), 7.27-7.33 (m, 5H), 7.35-7.56 (m, 6H), 7.65 (d, J = 9.0 Hz, 2H), 13.48 (s, 1H). LCMS (Method A): 2.529 min, MS: ES+ 605.1 (M + 23)<br>Using 4-formyl-5-(1-phenylethoxy)-1,3-phenylene bis(4-methylbenzenesulfonate) Intermediate 10 |
| 27 | 2-((4-fluorobenzyl)oxy)-4,6-bis(tosyloxy)benzoic acid | | ¹H NMR (DMSO-d6, 400 MHz): δ 2.44 (d, J = 4.0 Hz, 6H), 5.05 (s, 2H), 6.50 (d, J = 2.0 Hz, 1H), 6.93 (d, J = 2.0 Hz, 1H), 7.22 (t, J = 8.8 Hz, 2H), 7.37-7.40 (m, 2H), 7.48-7.51 (m, 4H), 7.67 (d, J = 7.6 Hz, 2H), 7.73 (d, J = 8.4 Hz, 2H), 13.42 (s, 1H).<br>LCMS (Method A): 2.355 min, MS: ES+ 609.1 (M + 23)<br>Using 5-((4-fluorobenzyl)oxy)-4-formyl-1,3-phenylene bis(4-methylbenzenesulfonate) Intermediate 11 |
| 28 | 2-((4-methoxybenzyl)oxy)-4,6-bis(tosyloxy)benzoic acid | | ¹H NMR (DMSO-d6, 400 MHz): δ 2.44 (d, J = 2.4 Hz, 6H), 3.76 (s, 3H), 4.95 (s, 2H), 6.50 (d, J = 2.0 Hz, 1H), 6.89-6.94 (m, 3H), 7.28 (t, J = 8.8 Hz, 2H), 7.41-7.56 (m, 24), 7.64-7.69 (m, 2H), 7.73-7.78 (m, 2H), 13.38 (s, 1H). LCMS (Method A): 2.329 min, MS: ES+ 621.1 (M + 23)<br>Using 4-formyl-5-((4-methoxybenzyl)oxy)-1,3-phenylene bis(4-methylbenzenesulfonate) Intermediate 12 |

| No | Name | Structure | Data |
|---|---|---|---|
| 29 | 2-((3-methylbenzyl)oxy)-4,6-bis(tosyloxy)benzoic acid | | ¹H NMR (DMSO-d6, 400 MHz): δ 2.30 (s, 3H), 2.44 (d, J = 3.6 Hz, 6H), 5.00 (s, 2H), 6.50 (d, J = 1.2 Hz, 1H), 6.90 (d, J = 2.0 Hz, 1H), 7.10-7.15 (m, 3H), 7.25-7.28 (m, 1H), 7.48-7.51 (m, 4H), 7.67 (d, J = 8.4 Hz, 2H), 7.73 (d, J = 8.4 Hz, 2H), 13.42 (s, 1H). LCMS (Method A): 2.397 min, MS: ES+ 605.1 (M + 1) Using 4-formyl-5-((3-methylbenzyl)oxy)-1,3-phenylene bis(4-methylbenzenesulfonate) Intermediate 13 |
| 30 | 2-(pyrimidin-4-ylmethoxy)-4,6-bis(tosyloxy)benzoic acid | | ¹H NMR (DMSO-d6, 400 MHz): δ 2.43 (d, J = 5.6 Hz, 6H), 5.13 (s, 2H), 6.59 (d, J = 1.6 Hz, 1H), 7.43-7.49 (m, 6H), 7.67-7.74 (m, 4H), 8.82 (d, J = 5.2 Hz, 1H), 9.16 (d, J = 0.8 Hz, 1H), 13.74 (s, 1H). LCMS (Method A): 2.312 min, MS: ES+ 571.1 (M + 1) Using 4-formyl-5-(pyrimidin-4-ylmethoxy)-1,3-phenylene bis(4-methylbenzenesulfonate) Intermediate 14 |
| 31 | 2-((1-(tert-butoxycarbonyl)-1H-pyrazol-3-yl)methoxy)-4,6-bis(tosyloxy)benzoic acid | | 1H NMR (DMSO-d6, 400 MHz): δ 1.58 (s, 9H), 2.44 (s, 6H), 5.15 (s, 2H), 6.48 (d, 2.0 Hz, 1H), 6.58 (d, 2.8 Hz, 1H), 7.11 (d, 2.0 Hz, 1H), 7.47-7.52 (m, 4H), 7.66 (d, 8.4 Hz, 2H), 7.67 (d, J = 8.4 Hz, 2H), 8.29 (d, 2.8 Hz, 1H), 9.97 (s, 1H). LCMS (Method A): 2.672 min, MS: ES+ 665.00 (M + 23) Using tert-butyl 3-((2-formyl-3,5-bis(tosyloxy)phenoxy)methyl)-1H-pyrazole-1-carboxylate Intermediate 15 |
| 32 | 2-((4-fluorobenzyl)oxy)-3-methyl-4,6-bis(tosyloxy)benzoic acid | | ¹H NMR (DMSO-d6, 400 MHz): δ 1.84 (s, 3H), 2.45 (d, J = 1.2 Hz, 6H), 4.79 (s, 2H), 6.72 (s, 1H), 7.19-7.23 (m, 2H), 7.37-7.40 (m, 2H), 7.50-7.53 (m, 4H), 7.72-7.74 (m, 4H), 13.75 (s, 1H). LCMS (Method A): 2.517 min, MS: ES+ 623.1 (M + 23) Using 5-((4-fluorobenzyl)oxy)-4-formyl-6-methyl-1,3-phenylene bis(4-methylbenzenesulfonate) Intermediate 16 |
| 33 | 3-methyl-2-((3-methylbenzyl)oxy)-4,6-bis(tosyloxy)benzoic acid | | ¹H NMR (DMSO-d6, 400 MHz): δ 1.84 (s, 3H), 2.30 (s, 3H), 2.44 (s, 6H), 4.75 (s, 2H), 6.71 (s, 1H), 7.13-7.16 (m, 3H), 7.23-7.25 (m, 1H), 7.49-7.52 (m, 4H), 7.73 (d, J = 8.4 Hz, 4H), 13.75 (s, 1H). LCMS (Method A): 2.583 min, MS: ES+ 619.1 (M + 23) Using 4-formyl-6-methyl-5-((3-methylbenzyl)oxy)-1,3-phenylene bis(4-methylbenzenesulfonate) Intermediate 17 |

| No | Name | Structure | Data |
|---|---|---|---|
| 34 | 3-methyl-2-(pyridin-2-ylmethoxy)-4,6-bis(tosyloxy)benzoic acid | | ¹H NMR (DMSO-d6, 400 MHz): δ 1.85 (s, 3H), 2.44 (d, J = 1.6 Hz, 6H), 4.89 (s, 2H), 6.74 (s, 1H), 7.37-7.40 (m, 1H), 7.48-7.52 (m, 5H), 7.72-7.74 (m, 4H), 7.85-7.89 (m, 1H), 8.54 (d, J = 4.4 Hz, 1H), 13.75 (s, 1H). LCMS (Method A): 2.112 min, MS: ES+ 584.1 (M + 1)<br>Using 4-formyl-6-methyl-5-(pyridin-2-ylmethoxy)-1,3-phenylene bis(4-methylbenzenesulfonate) Intermediate 18 |
| 35 | 3-Methyl-2-((1-methyl-1H-pyrazol-3-yl)methoxy)-4,6-bis(tosyloxy)benzoic acid | | 1H NMR (DMSO-d6, 400 MHz): δ 1.80 (s, 3H), 2.45 (s, 6H), 3.83 (s, 3H), 4.72 (s, 2H), 6.14 (d, 2.0 Hz, 1H), 6.71 (s, 1H), 7.49-7.52 (m, 4H), 7.64 (d, 2.0 Hz, 1H), 7.63-7.78 (m, 4H). LCMS (Method E): 2.249 min, MS: ES+ 587.16 (M + 1)<br>Using 4-formyl-6-methyl-5-((1-methyl-1H-pyrazol-3-yl)methoxy)-1,3-phenylene bis(4-methylbenzenesulfonate) Intermediate 19 |
| 36 | 2-((1-tosyl-1H-1,2,3-triazol-4-yl)methoxy)-4,6-bis(tosyloxy)benzoic acid | | LCMS (Method A): 2.228 min, MS: ES+ 560.10 (M − 155, tosyl)<br>Using 4-formyl-5-((1-tosyl-1H-1,2,3-triazol-4-yl)methoxy)-1,3-phenylene bis(4-methylbenzenesulfonate) Intermediate 38 |
| 58 | 2-(2-(Benzyloxy)-4,6-dihydroxy-3-methylbenzoyl)isoindoline-5-carboxylic acid | | LCMS (Method A): 1.555 min, MS: ES+ 420.20 (M + 1).<br>Using methyl 2-(2-(benzyloxy)-3-methyl-4,6-bis(tosyloxy)benzoyl)isoindoline-5-carboxylate |
| 59 | 2-(2-(Benzyloxy)-4,6-dihydroxy-3-methylbenzoyl)isoindoline-4-carboxylic acid | | ¹H NMR (DMSO-d6, 400 MHz) compound is a mixture of rotamers: δ 1.98 (s, br, 3H), 4.11-4.13 (m, 2H), 4.46-4.72 (m, 2H), 4.85-5.01 (m, 2H), 6.31 (s, 1H), 7.23-7.96 (m, 8H), 9.51-9.59 (m, 2H), 13.02 (s, br, 1H). LCMS (Method A): 1.728 min, MS: ES+ 420.17 (M + 1).<br>Using methyl 2-(2-(benzyloxy)-3-methyl-4,6-bis(tosyloxy)benzoyl)isoindoline-4-carboxylate |

-continued

| No | Name | Structure | Data |
|---|---|---|---|
| 60 | 2-Methoxy-3-methyl-4,6-bis(tosyloxy)benzoic acid | | $^1$H NMR (DMSO-d6, 400 MHz): δ 1.85 (s, 3H), 2.45 (s, 6H), 3.64 (s, 3H), 6.66 (s, 1H), 7.49-7.52 (m, 4H), 7.72-7.73 (m, 4H), 13.60 (bs, 1H). LCMS (Method A): 2.137 min, MS: ES+ 507.02 Using 4-formyl-5-methoxy-6-methyl-1,3-phenylene bis(4-methylbenzenesulfonate) (Intermediate 54) |
| 61 | 2-Ethoxy-3-methyl-4,6-bis(tosyloxy)benzoic acid | | $^1$H NMR (DMSO-d6, 400 MHz): Compound is a mixture of rotamers: δ 1.16-1.24 (m, 3H), 1.84 and 2.00 (singlets, 3H), 2.44-2.51 (s, br, 6H), 3.78-3.83 and 4.00-4.06 (m, 2H), 6.66 and 6.68 (singlets, 1H), 7.49-7.58 (m, 4H), 7.71-7.80 (m, 4H), 13.59 (s, 1H). LCMS (Method A): 2.455 min, MS: ES+ 521.12 (M + 1). Using 5-ethoxy-4-formyl-6-methyl-1,3-phenylene bis(4-methylbenzenesulfonate) (Intermediate 55) |
| 62 | 2-(Cyclohexylmethoxy)-3-methyl-4,6-bis(tosyloxy)benzoic acid | | $^1$H NMR (DMSO-d6, 400 MHz): δ 0.95-1.10 (m, 2H), 1.11-1.22 (m, 3H), 1.61-1.69 (m, 6H), 1.82 (s, br, 3H), 2.44 (s, br, 6H), 3.54 (m, br, 2H), 4.03 (q, J = 6.8 Hz, 14.0 Hz, 2H), 6.69 (s, 1H), 7.49-7.52 (m, 4H), 7.70-7.73 (m, 4H), 13.59 (s, 1H). LCMS (Method A): 2.657 min, MS: ES+ 589.2 (M + 1). Using 5-(cyclohexylmethoxy)-4-formyl-6-methyl-1,3-phenylene bis(4-methylbenzenesulfonate) (Intermediate 56) |
| 63 | 2-(Cyclopropylmethoxy)-3-methyl-4,6-bis(tosyloxy)benzoic acid | | $^1$H NMR (DMSO-d6, 400 MHz): δ 0.12-0.16 (m, 2H), 0.44-0.47 (m, 2H), 1.00-1.10 (m, 1H), 1.83 (s, 3H), 2.43 (s, 6H), 3.58-3.64 (m, 2H), 6.69 (s, 1H), 7.48-7.51 (m, 4H), 7.70-7.77 (m, 4H), 13.58 (bs, 1H). LCMS (Method A): 2.487 min, MS: ES+ 569.2 (M + 23). Using 5-(cyclopropylmethoxy)-4-formyl-6-methyl-1,3-phenylene bis(4-methylbenzenesulfonate) (Intermediate 57) |

Additional Procedures

Figure 12:
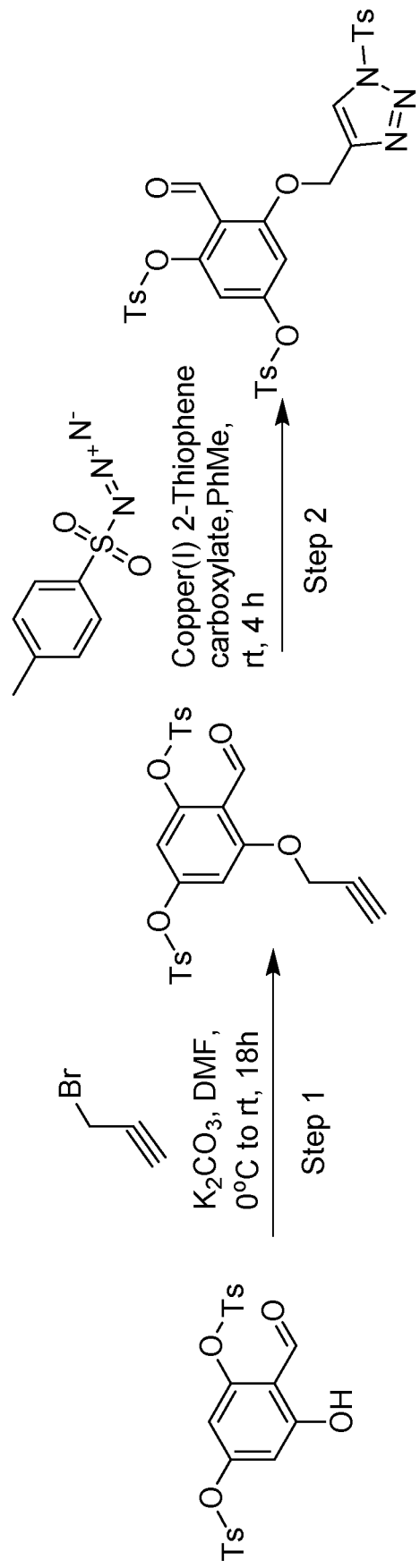
FIG. 12 shows the reaction scheme for 4-formyl-5-(prop-2-yn-1-yloxy)-1,3-phenylene bis(4-methylbenzenesulfonate) (Intermediate 37)

Synthesis of 4-formyl-5-(prop-2-yn-1-yloxy)-1,3-phenylene bis(4-methylbenzenesulfonate) (Intermediate 37) (Reaction Scheme Shown in FIG. 12)

To a solution of 4-formyl-5-hydroxy-1,3-phenylene bis(4-methylbenzenesulfonate) (Intermediate 1) (2.0 g, 4.32 mmol, 1.0 eq) in DMF (20 mL) was added K$_2$CO$_3$ (1.8 g, 13.0 mmol, 2.0 eq) at 0° C. under a nitrogen atmosphere. 3-Bromoprop-1-yne (CAS #106-96-7) (0.613 g, 5.2 mmol, 1.5 eq) was added dropwise to the reaction mixture at 0° C. The reaction was stirred at room temperature overnight. The resulting reaction mixture was diluted with water (100 mL) and extracted with ethyl acetate (3×30 mL) yielding 4-formyl-5-(prop-2-yn-1-yloxy)-1,3-phenylene bis(4-methylbenzenesulfonate) (Intermediate 37) (3.0 g, 74% yield). This material was progressed to the next step without further purification.

$^1$H NMR (CDCl3-d6, 400 MHz): δ 2.48 (s, 3H), 2.49 (s, 3H), 3.51 (s, 1H), 4.73-4.75 (m, 2H), 6.60 (d, J=2.0 Hz, 1H), 6.88 (d, J=2.0 Hz, 1H), 7.35-7.40 (m, 4H), 7.75-7.78 (m, 4H), 10.09 (s, 1H). LCMS (Method B): 2.820 min, MS: ES+502.01 (M+1)

Synthesis of 4-formyl-5-((1-tosyl-1H-1,2,3-triazol-4-yl)methoxy)-1,3-phenylene bis(4-methylbenzenesulfonate) (Intermediate 38)

To a solution of 4-formyl-5-(prop-2-yn-1-yloxy)-1,3-phenylene bis(4-methylbenzenesulfonate) (Intermediate 37) (2.0 g, 4.00 mmol, 1.0 eq) in toluene (20 mL) was added copper(I) thiophene-2-carboxylate (0.030, 0.16 mmol, 0.04 eq) at 0° C. under nitrogen atmosphere. p-Toluenesulfonyl azide (0.0.945 g, 4.8 mmol, 1.2 eq) was added to the reaction mixture at 0° C. The reaction was stirred at room temperature for 2 h and the resulting reaction mixture diluted with water (100 mL) and extracted with ethyl acetate (3×300 mL). The combined organic layer was dried under reduced pressure. The obtained crude material was purified by column chromatography (product eluted with 1% MeOH in DCM) yielding 4-formyl-5-((1-tosyl-1H-1,2,3-triazol-4-yl)methoxy)-1,3-phenylene bis(4-methylbenzenesulfonate) (Intermediate 38) (2.8 g, 19% yield).

$^1$H NMR (CDCl3, 400 MHz): δ 2.47 (s, 3H), 2.49 (s, 6H), 5.17 (s, 2H), 6.59 (d, J=2.0 Hz, 1H), 6.80 (d, J=2.0 Hz, 1H), 7.33-7.43 (m, 6H), 7.71-7.75 (m, 4H), 8.03-8.06 (m, 2H), 8.31 (s, 1H), 10.05 (s, 1H). LCMS (Method B): 3.02 min, MS: ES+699.52 (M+1)

Figure 13:
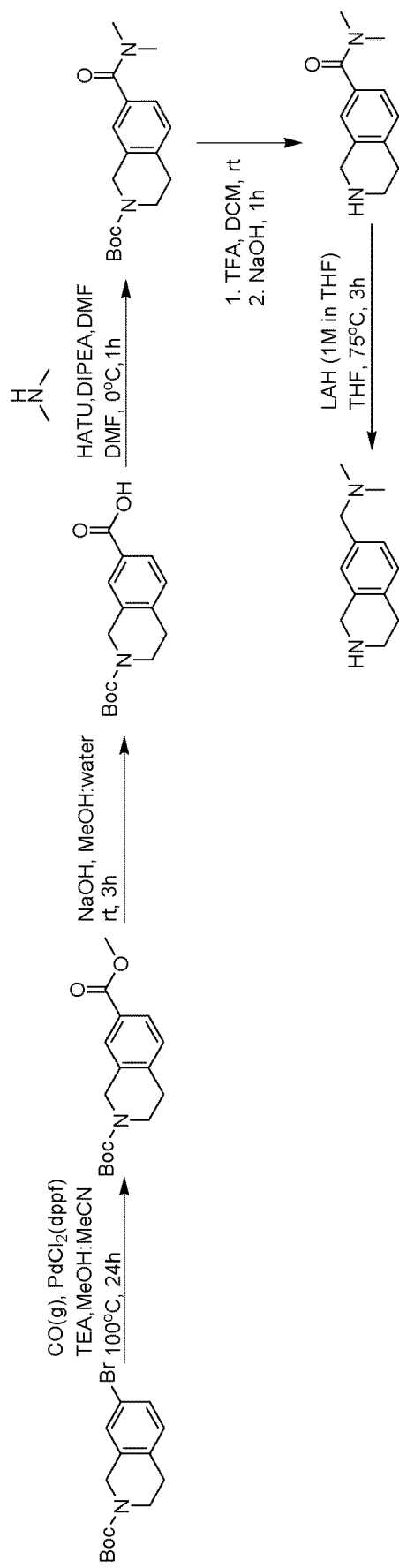
FIG. 13 shows the reaction scheme for N,N-Dimethyl-1-(1,2,3,4-tetrahydroisoquinolin-7-yl)methanamine (Intermediate 42)

Synthesis of N,N-Dimethyl-1-(1,2,3,4-tetrahydroisoquinolin-7-yl)methanamine (Intermediate 42) (Reaction Scheme Shown in FIG. 13)

2-(t-Butyl) 7-methyl 3,4-dihydroisoquinoline-2,7(1H)-dicarboxylate

To a stirred solution of t-butyl 7-bromo-3,4-dihydroisoquinoline-2(1H)-carboxylate (5.0 g, 16.0 mmol, 1.0 eq) in MeOH (66 mL) and MeCN (16 mL) in an autoclave was added TEA (3.23 g, 3.20 mmol, 2.0 eq) at room temperature. The reaction mixture was degassed (N$_2$ gas) for 15 min. PdCl$_2$(dppf) (0.93 g, 1.28 mmol, 0.08 eq) was added and 22 kg/cm$^2$ CO$_{(gas)}$ pressure was applied with heat (100° C.) for 16 h. The reaction mixture was concentrated under vacuum and the crude material purified by flash column chromatography (220-400 silica; product eluted by 2.5% ethyl acetate in hexane) to give the title compound (3.5 g, 12.02 mmol, Yield: 75%).

$^1$H NMR (DMSO-d6, 400 MHz): δ 1.43 (s, 9H), 2.84 (t, J=6 Hz, 2H), 3.56 (t, J=5.6 Hz, 2H), 3.81 (s, 3H), 4.56 (m, 2H), 7.31 (d, J=8 Hz, 1H), 7.74-7.78 (m, 2H). LCMS (Method A): 2.111 min, MS: ES+192.18 (M+1-100).

2-(t-butoxycarbonyl)-1,2,3,4-tetrahydroisoquinoline-7-carboxylic acid

To a stirred solution of 2-(t-butyl) 7-methyl 3,4-dihydroisoquinoline-2,7(1H)-dicarboxylate (3.5 g, 12.02 mmol, 1.0 eq.) in MeOH:water (9:1) (50 mL) was added NaOH (2.40 g, 60.1 mmol, 5.0 eq.) at room temperature and the mixture stirred for 3 h. The resulting mixture was poured into water (60 mL) and neutralized (dil. HCl), extracted with ethyl acetate (3×90 mL) and the combined organic layer dried over Na$_2$SO$_4$, filtered, and concentrated under reduced pressure. Crude material was purified by trituration using n-pentane (250 mL) yielding the title compounds as a brown oil (3.5 g, 12.63 mmol. Yield: 100%).

$^1$H NMR (DMSO-d6, 400 MHz): δ ppm 1.42 (s, 9H), 2.75 (t, J=5.6 Hz, 2H), 3.52-3.55 (m, 2H), 4.48 (brs, 2H), 7.05 (d, J=7.6 Hz, 1H), 7.66-7.694 (m, 2H). —COOH proton not observed. LCMS (Method A): 1.783 min, MS: ES+178.17 (M-100)

t-Butyl 7-(dimethylcarbamoyl)-3,4-dihydroisoquinoline-2(1H)-carboxylate

A stirred solution of 2-(t-butoxycarbonyl)-1,2,3,4-tetrahydroisoquinoline-7-carboxylic acid (2.5 g, 9.2 mmol, 1.0 eq) in DMF (25 mL) at 0° C. was treated with HATU (5.14 g, 13.53 mmol, 1.5 eq), DIPEA (2.32 g, 18.04 mmol, 2.0 eq) and dimethyl amine (2M in THF) (0.44 g, 99.23 mmol, 1.1 eq.) added dropwise. The reaction was allowed to warm to room temperature and stirred for 1 h. Reaction completion was monitored by TLC (DCM:MeOH; 9:1). The reaction mixture was diluted with ethyl acetate (45 mL), washed with chilled brine solution (4×50 mL); the organic layer dried Na$_2$SO$_4$, filtered and concentrated under vacuum. The crude material was purified by flash chromatography (product eluted with 4% methanol in DCM) yielding the title compound as an off white solid (2.1 g, 11.49 mmol. Yield: 76%).

$^1$H NMR (DMSO-d6, 400 MHz): δ 1.44 (s, 9H), 2.80 (t, J=6 Hz, 2H), 2.92-2.97 (2 singlets, 6H), 3.57 (t, J=6 Hz, 2H), 4.52 (s, 2H), 7.21-7.22 (m, 3H). LCMS (Method A): 1.687 min, MS: ES+249.05 (M−56).

N,N-Dimethyl-1,2,3,4-tetrahydroisoquinoline-7-carboxamide (Intermediate 42a)

tert-Butyl 7-(dimethylcarbamoyl)-3,4-dihydroisoquinoline-2(1H)-carboxylate (2.1 g, 6.90 mmol, 1.0 eq.) in DCM (21 mL) at 0° C. was treated dropwise with TFA (2.1 mL) and the reaction mixture stirred at room temperature for 1 h. The resulting reaction mixture was concentrated under reduced pressure, poured into water (60 mL) and neutralized with 1M NaOH solution and extracted using DCM (5×60 mL). The combined organic layer was dried over Na$_2$SO$_4$, filtered and concentrated under reduced pressure to give the title compound as an oil (1.8 g, 8.81 mmol. Yield: 78%).

$^1$H NMR (DMSO-d6, 400 MHz): 2.74-2.85 (t, br, 2H), 2.92-2.94 (singlets, broad, 6H), 2.93-3.03 (t, br, 2H), 3.91 (s, br, 2H), 7.08-7.30 (m, 3H). LCMS (Method B): 0.463 min, MS: ES+205.25 (M+1).

N,N-Dimethyl-1-(1,2,3,4-tetrahydroisoquinolin-7-yl)methanamine (Intermediate 42)

N,N-dimethyl-1,2,3,4-tetrahydroisoquinoline-7-carboxamide (Intermediate 42a) (0.2 g, 0.97 mmol, 1.0 eq.) in THF (2 ml) at 0° C. was treated dropwise with LiAlH$_4$ (1M in THF) (2.84 mL, 2.9 eq). The resulting reaction mixture was heated to 80° C. and stirred for 3 h. Reaction completion was monitored by TLC (methanol:DCM 8:2). The reaction mixture was allowed to cool to 0° C. and basified (1M NaOH), extracted with ethyl acetate (3×25 mL) and the combined organic layer dried over Na$_2$SO$_4$, filtered and concentrated under reduced pressure yielding the title compound as yellow oil (0.18 g, 0.94 mmol, Yield: 97%).

$^1$H NMR (DMSO-d6, 400 MHz): 2.64-2.67 (t, br, 2H), 2.92-2.94 (t, br, 2H), 3.23-3.34 (2 singlets, br, 6H), 3.81 (s, br, 2H), 6.90-7.04 (m, 3H). LCMS (Method B): 1.52 min, MS: ES+191.28 (M+1).

Figure 14:
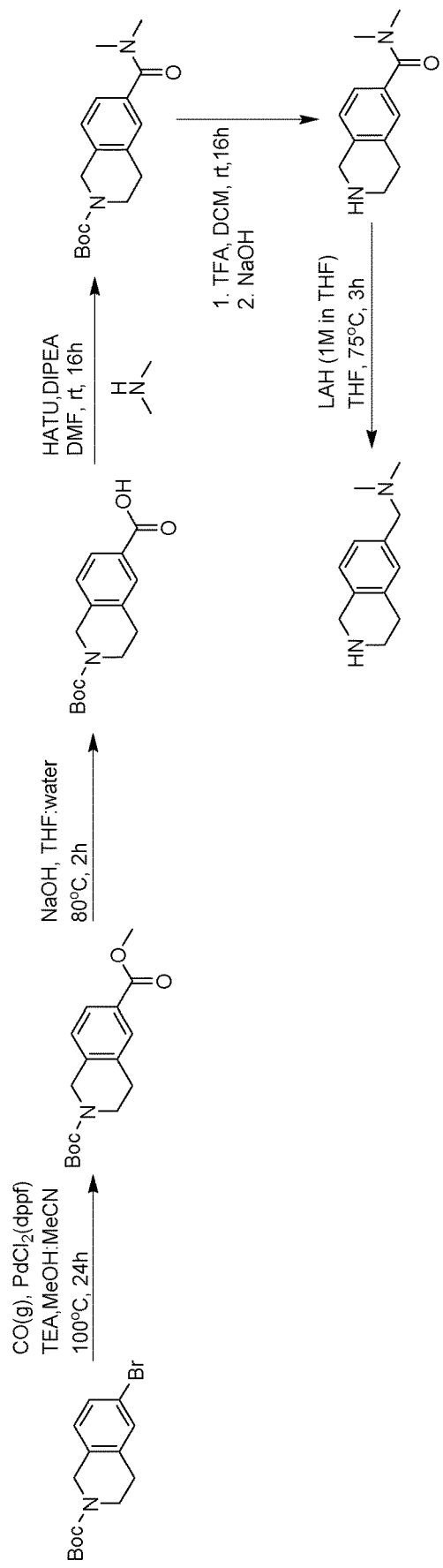
FIG. 14 shows the reaction scheme for N,N-Dimethyl-1-(1,2,3,4-tetrahydroisoquinolin-6-yl)methanamine (Intermediate 43)

Synthesis of N,N-Dimethyl-1-(1,2,3,4-tetrahydroisoquinolin-6-yl)methanamine (Intermediate 43) (Reaction Scheme Shown in FIG. 14)

2-(t-Butyl) 6-methyl 3,4-dihydroisoquinoline-2,6(1H)-dicarboxylate

A stirred solution of t-butyl 6-bromo-3,4-dihydroisoquinoline-2(1H)-carboxylate (5.0 g, 16.0 mmol, 1.0 eq.) in methanol (45 mL) and acetonitrile (10 mL) was treated with PdCl$_2$(dppf) (0.95 g, 1.28 mmol, 0.08 eq) and TEA (3.23 g, 3.20 mmol, 2.0 eq) in an autoclave. The resulting reaction mixture was taken 22 kg/cm$^2$ CO(g) pressure and heated to 100° C. for 24 h. The cooled reaction mixture was filtered through a celite bed, washed with ethyl acetate (50 mL) and the combined filtrate concentrated under vacuum. The obtained crude material was purified by flash chromatography (product eluted by 5% ethyl acetate in hexane) yielding the title compound (3.8 g, 13.04 mmol. Yield: 81.4%).

¹H NMR (DMSO-d6, 400 MHz): δ 1.43 (s, 9H), 2.85 (t, J=6.0 Hz, 2H), 3.57 (t, J=6.0 Hz, 2H), 3.84 (s, 3H), 4.57 (s, 2H), 7.32 (d, J=8.0 Hz, 1H), 7.76-7.77 (m, 2H). LCMS (Method A): 2.233 min, MS: ES+192.18 (M+1-100).

2-(tert-Butoxycarbonyl)-1,2,3,4-tetrahydroisoquinoline-6-carboxylic acid

To a stirred solution of 2-(tert-butyl) 6-methyl 3,4-dihydroisoquinoline-2,6(1H)-dicarboxylate (3.8 g, 13.0 mmol, 1.0 eq.) in methanol:water (1:1) (20 mL) at room temperature was added NaOH (2.6 g, 65.0 mmol, 5.0 eq.). The resulting reaction mixture was heated to 70° C. and stirred for 2 h. The resulting mixture was allowed to cool to 0-5° C., acidified using 1 N HCl solution and extracted with ethyl acetate (3×30 mL). The combined organic layer was dried over Na₂SO₄, filtered, and distilled under vacuum yielding the title compound as a brown oil (3.5 g, 13.7 mmol, Yield: 97.2%).

¹H NMR (DMSO-d6, 400 MHz): δ 1.43 (s, 9H), 2.84 (t, J=5.6 Hz, 2H), 3.57 (t, J=5.6 Hz, 2H), 4.56 (s, 2H), 7.29 (d, J=8.0 Hz, 1H), 7.74-7.75 (m, 2H), 12.90 (s, 1H). LCMS (Method A): 1.837 min, MS: ES, 178.17 (M+1-100).

tert-butyl 6-(dimethylcarbamoyl)-3,4-dihydroisoquinoline-2(1H)-carboxylate

To a stirred solution of 2-(tert-butoxycarbonyl)-1,2,3,4-tetrahydroisoquinoline-6-carboxylic acid (3.5 g, 12.6 mmol, 1.0 eq) in DMF (10 ml) at 0° C.-5° C. were added HATU (7.19 g, 18.9 mmol, 1.5 eq) and DIPEA (3.25 g, 25.4 mmol, 2.0 eq). The reaction mixture was stirred for 30 mins at 0° C.-5° C. Dimethyl amine (2M in THF) (6.94 mL, 13.88 mmol, 1.1 eq.) was added dropwise at 0-5° C. The resulting reaction was gradually raised to room temperature and stirred for 16 h. Reaction completion was monitored by TLC (ethyl acetate:hexane 1:1). The reaction mixture was poured onto ice-cold water (100 mL), extracted into ethyl acetate (2×50 mL) and the combined organic layer washed with cold water (50 mL), dried with Na₂SO₄, filtered and concentrated under vacuum. The crude material was purified by flash chromatography (eluting product with 4% methanol in DCM) to give the title compound (3.5 g, 11.49 mmol. Yield: 91.14%).

¹H NMR (DMSO-d6, 400 MHz): δ 1.43 (s, 9H), 2.79 (t, J=6.0 Hz, 2H), 2.96-2.99 (singlets, br, 6H), 3.56 (t, J=6.0 Hz, 2H), 4.52 (s, 2H), 7.20-7.24 (m, 3H). LCMS (Method A): 1.775 min, MS: ES+249.05 (M−56).

N,N-Dimethyl-1,2,3,4-tetrahydroisoquinoline-6-carboxamide (Intermediate 43a)

To a stirred solution of t-butyl 6-(dimethyl carbamoyl)-3,4-dihydroisoquinoline-2(1H)-carboxylate (3.5 g, 11.50 mmol, 1.0 eq.) in DCM (4 mL) at 0-5° C. was treated dropwise with TFA (17.5 mL). The resulting reaction mixture was stirred at room temperature for 2 h. Reaction completion was monitored by TLC (methanol:DCM 9:1). The resulting reaction was concentrated, and remaining TFA was removed by co-distillation with DCM (2×10 mL) followed by n-pentane (10 mL); the crude material was dried over high vacuum to give crude material as the TFA salt (3.6 g). Of this material, 1.6 g was taken into DCM (30 mL), cooled to 0-5° C., basified using 1N NaOH solution and extracted with dichloromethane (3×30 mL). The combined organic layer was dried over Na₂SO₄, filtered, and concentrated under reduced pressure to give the title compound (0.9 g, 4.40 mmol. Yield: 88.53%).

¹H NMR (DMSO-d6, 400 MHz): δ 2.70 (t, J=5.2 Hz, 2H), 2.91-2.96 (m, 8H), 3.87 (s, 2H), 7.04-7.13 (m, 3H). LCMS (Method B): 1.40 min, MS: ES+205.25 (M+1).

N,N-Dimethyl-1-(1,2,3,4-tetrahydroisoquinolin-6-yl) methanamine (Intermediate 43)

A stirred solution of N,N-dimethyl-1,2,3,4-tetrahydroisoquinoline-6-carboxamide (Intermediate 43a) (0.5 g, 2.44 mmol, 1.0 eq.) in THF (5 mL) at 0-5° C. was treated dropwise with LiAlH₄ (2M in THF) (3.54 mL, 2.9 eq) and stirred for 10 mins. The resulting reaction mixture was heated to 75° C. and stirred for 3 h. Reaction completion was monitored by TLC (DCM:MeOH 4:1). The reaction mixture was allowed to cool to 0-5° C., basified using 1N NaOH solution and extracted with dichloromethane (2×20 mL). The combined organic layer was dried over Na₂SO₄, filtered and concentrated under reduced pressure to give the title compound as yellow oil (0.350 g, 1.84 mmol, Yield: 75.43%).

¹H NMR (DMSO-d6, 400 MHz): δ 2.09-2.11 (m, 6H), 2.64-2.65 (m, 2H), 2.90-2.91 (m, 2H), 3.27-3.29 (m, 2H), 3.78-3.80 (m, 2H), 6.93-6.99 (m, 3H). LCMS (Method B): 1.39 min, MS: ES+191.28 (M+1).

Synthesis of 1,2,3,4-tetrahydroisoquinolin-1-yl)methanol (Intermediate 44)

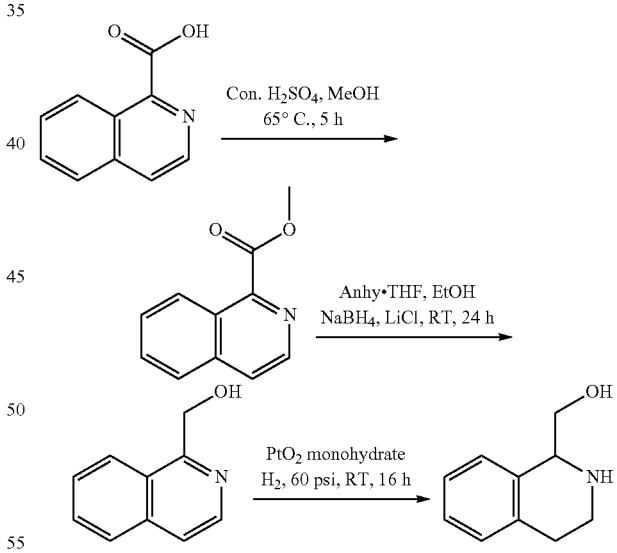

Methyl isoquinoline-1-carboxylate

A stirred solution of isoquinoline-1-carboxylic acid (7.0 g, 40.46 mmol, 1.0 eq) (CAS: 486-73-7) in MeOH (350 mL) at room temperature was treated dropwise with cH₂SO₄ (15 mL). The reaction mixture was heated to 65° C. and stirred for 5 h. The reaction mixture was carefully poured into saturated NaHCO₃ (50 mL) and extracted with DCM (500 mL). The aq. layer was extracted with DCM (200 mL). The combined organic layer was dried over Na₂SO₄, filtered and concentrated under reduced pressure yielding the title compound (4.7 g, 25.10 mmol. Yield: 62.16%).

LCMS (Method A): 1.484 min, MS: ES+188.13 (M+1).

Isoquinolin-1-ylmethanol

A stirred solution of methyl isoquinoline-1-carboxylate (4.5 g, 24.03 mmol, 1.0 eq) in THF (350 mL) and EtOH (40 mL) at room temperature were treated with $NaBH_4$ (1.8 g, 48.07 mmol, 2.0 eq) and LiCl (2.03 g, 48.07, 2.0 eq). The reaction mixture was stirred at room temperature for 24 h. The reaction mixture was quenched into ice cold water (200 mL) and extracted with DCM (2×200 mL). The combined organic layer was dried over $Na_2SO_4$, filtered and concentrated under reduced pressure. The crude was purified by flash chromatography (product eluted in 2% MeOH in DCM) yielding the title compound (1.2 g, 7.53 mmol. Yield: 39.16%).

$^1$H NMR (DMSO-d6, 400 MHz): δ 5.05 (d, J=5.2 Hz, 2H), 5.42 (t, J=5.2 Hz, 1H), 7.69 (t, J=7.6 Hz, 1H), 7.76-7.80 (m, 2H), 7.98 (d, J=8 Hz, 1H), 8.35 (d, J=8.4 Hz, 1H), 8.42 (d, J=5.6 Hz, 1H). LCMS (Method A): 0.376 min, MS: ES+160.12 (M+1).

1,2,3,4-tetrahydroisoquinolin-1-yl)methanol (Intermediate 44)

A stirred solution of isoquinolin-1-ylmethanol (1.0 g, 6.28 mmol, 1.0 eq) in MeOH (100 mL) at room temperature in autoclave was treated with $PtO_2$ monohydrate (0.129 g, 0.56 mmol, 0.09 eq). The resulting reaction mixture was stirred at room temperature for 16 h under 60 psi pressure of $H_2$ (gas). Reaction completion was monitored by TLC (DCM:MeOH; 9:1). The reaction mixture was filtered through celite bed and concentrated under reduced pressure yielding the title compound (0.85 g, 5.20 mmol. Yield: 85.0%,).

LCMS (Method B): 1.46 min, MS: ES+164.16 (M+1). The crude material was used in next step without purification.

Synthesis of (1,2,3,4-tetrahydroisoquinolin-4-yl)methanol (Intermediate 45)

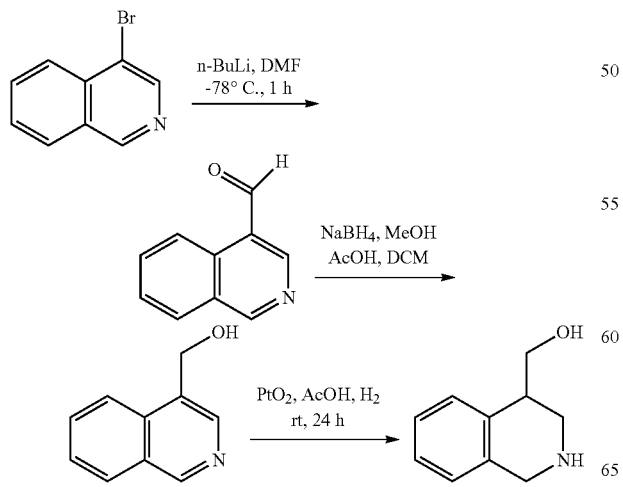

Isoquinoline-4-carbaldehyde

A stirred solution of 4-bromoisoquinoline (4.0 g, 19.4 mmol, 1.0 eq) (CAS: 532-97-4) in THF (40 ml) at −78° C. was treated dropwise with n-BuLi (8.5 mL, 21.3 mmol, 1.1 eq), then DMF (2.8 mL, 38.8 mmol, 2.0 eq) was added dropwise; the resulting reaction mixture was stirred at −78° C. for 30 min. The reaction mixture was poured into saturated solution of $NH_4Cl$ (50 mL) and extracted with diethyl ether (4×25 mL). The combined organic layer was dried over $Na_2SO_4$, filtered and concentrated under vacuum. The crude was purified by flash chromatography using neutral alumina; (product eluted in 5% EtOAc in hexane) yielding the title compound (1.8 g, 11.46 mmol. Yield: 37.07%).

$^1$H NMR (DMSO-d6, 400 MHz): δ 7.85 (t, J=7.2 Hz, 1H), 8.01-8.05 (m, 1H), 8.32 (d, J=8 Hz, 1H), 9.07-9.10 (m, 2H), 9.61 (s, 1H), 10.42 (s, 1H). LCMS (Method A): 1.369 min, MS: ES+158.0 (M+1).

Isoquinolin-4-ylmethanol

A stirred solution of isoquinoline-4-carbaldehyde (1.8 g, 11.4 mmol, 1.0 eq) in EtOH (260 mL at room temperature) was treated with $NaBH_4$ (0.43 g, 11.4 mmol, 1.0 eq) added portionwise. The reaction mixture was stirred at room temperature for 40 min. Water (100 mL) was added to the reaction mixture and stirred for 20 minutes. AcOH (4.1 mL, 68.4 mmol, 6.0 eq) was added drop wise to the reaction mixture at room temperature. The reaction mixture was extracted with DCM (200 mL) and washed with saturated solution of $NaHCO_3$ (50 mL). The combined organic layer was dried by $Na_2SO_4$, filtered, and concentrated under vacuum. The crude was purified by flash chromatography (product eluted in 30% EtOAc in hexane) yielding the title compound (0.7 g, 4.39 mmol. Yield: 38.4%).

$^1$H NMR (DMSO-d6, 400 MHz): δ 4.94 (d, J=5.0 Hz, 2H), 5.40 (t, J=5.2 Hz 1H), 7.70 (t, J=7.6 Hz, 1H), 7.82 (t, J=7.6 Hz, 1H), 8.14 (d, J=8.4 Hz, 2H), 8.48 (s, 1H), 9.24 (s, 1H). LCMS (Method A): 0.264 min, MS: ES+160.2 (M+1).

(1,2,3,4-tetrahydroisoquinolin-4-yl)methanol (Intermediate 45)

A stirred solution of isoquinolin-4-ylmethanol (0.5 g, 3.14 mmol, 1.0 eq) in MeOH (20 mL) in an autoclave at room temperature was treated with $PtO_2$ monohydrate (0.064 g, 0.28 mmol, 0.09 eq); 60 psi of $H_2$(gas) was applied and the mixture stirred for 16 h at room temperature. The reaction mixture was filtered through a small Millipore filter, washed with MeOH (3×25 mL) and the combined filtrate concentrated under vacuum yielding the tile compound (0.19 g, 1.16 mmol. Yield: 19.7%).

LCMS (Method A): 1.67 min, MS: ES+164.16 (M+1).

Figure 15:
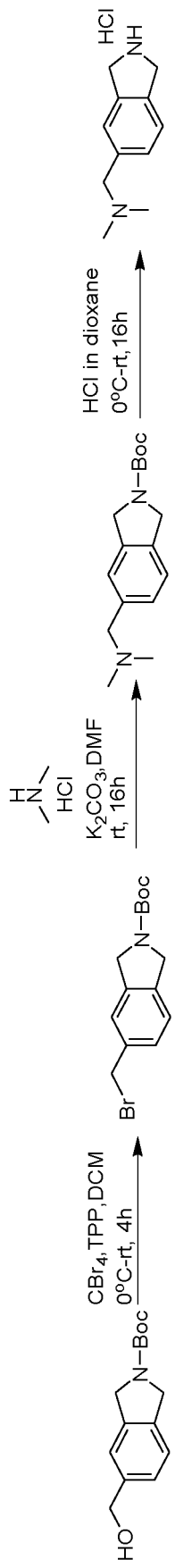
FIG. 15 shows the reaction scheme for 1-(isoindolin-5-yl)-N,N-dimethylmethanamine hydrochloride (Intermediate 46)

Synthesis of 1-(isoindolin-5-yl)N,N-dimethylmethanamine hydrochloride (Intermediate 46) (Reaction Scheme Shown in FIG. 15)

t-Butyl-5-(bromomethyl)isoindoline-2-carboxylate

To a stirred solution of t-butyl 5-(hydroxymethyl) isoindoline-2-carboxylate (3.0 g, 12.0 mmol, 1.0 eq) in DCM (30 mL) at 0° C. were added $PPh_3$ (4.73 g, 18.04 mmol, 1.5 eq) and $CBr_4$ (2.99 g, 18.04 mmol, 1.5 eq). The resulting reaction mixture was stirred at room temperature for 3 h and then evaporated under reduced pressure. The crude material was purified by flash chromatography (product eluted in 20% EtOAc/hexane) yielding the title compound (2.7 g, 8.64 mmol. Yield: 71.05%).

$^1$H NMR (DMSO-d6, 400 MHz): δ 1.45 (s, 9H), 4.57 (d, J=8.4 Hz, 4H), 4.72 (s, 2H), 7.30-7.41 (m, 3H). LCMS (Method A): 2.278 min. MS: ES+212.1 (M−100).

t-Butyl 5-((dimethylamino)methyl)isoindoline-2-carboxylate

A stirred solution of t-butyl 5-(bromomethyl) isoindoline-2-carboxylate (1.5 g, 4.80 mmol, 1.0 eq) in DMF (10 mL) at room temperature was treated with $K_2CO_3$ (4.65 g, 33.6 mmol, 7.0 eq) and stirred for 20 min. Dimethylamine. HCl (0.980 g, 12.0 mmol, 2.5 eq) was added to the reaction mixture at room temperature and stirred for 16 h. The resulting reaction mixture was poured onto ice-cold water (100 mL) and extracted into ethyl acetate (3×30 mL). The combined organic layer was dried over $Na_2SO_4$, filtered and concentrated under vacuum. The crude material was purified by flash chromatography (product eluted in 8% ethyl acetate in hexane) to give the title compound (0.550 g, 1.99 mmol. Yield: 41.41%).

$^1$H NMR (DMSO-d6, 400 MHz): δ 1.53 (s, 9H), 2.90 (s, 3H), 2.98 (s, 3H), 4.66-4.70 (m, 4H), 7.21-7.33 (m, 3H). LCMS (Method A): 1.074 min, MS: ES+277.21 (M+1).

1-(isoindolin-5-yl)N,N-dimethylmethanamine hydrochloride (Intermediate 46)

A stirred solution of t-butyl 5-((dimethylamino)methyl) isoindoline-2-carboxylate (0.55 g, 1.98 mmol, 1.0 eq.) in DCM (5 mL) at 0-5° C. was treated with 4M HCl in dioxane (5 mL). The resulting reaction mixture stirred at room temperature for 16 h. Reaction completion was monitored by TLC (methanol:DCM 9:1). The resulting reaction mixture was evaporated under reduced pressure and the crude material was triturating using diethyl ether (5 mL) yielding the title compound (0.350 g, 1.98 mmol, Yield: 100%) which was used in next step without purification.

LCMS (Method B): 1.28 min, MS: ES+177.13 (M+1).

Synthesis of 4-(isoindolin-5-ylmethyl) morpholine hydrochloride (Intermediate 47)

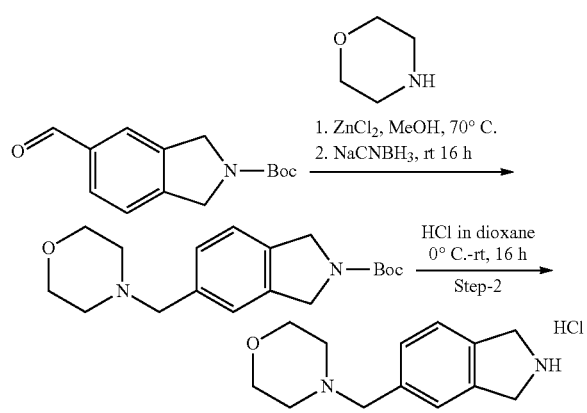

t-Butyl 5-(morpholinomethyl)isoindoline-2-carboxylate

Conducted as two parallel batches of 0.35 g. A stirred solution of t-butyl 5-formylisoindoline-2-carboxylate (0.35 g, 1.41 mmol, 1.0 eq) in MeOH (5 mL) at room temperature was treated with morpholine (0.12 g, 1.41 mmol, 1.0 eq) and $ZnCl_2$ (0.09 g, 0.70 mmol, 0.5 eq). The resulting reaction mixture was heated to 70° C. and stirred for 6 h. $NaCNBH_3$ (0.17 g, 2.82 mmol, 2.0 eq) was added portionwise to the reaction mixture at 0° C. The reaction mixture was stirred at room temperature for 16 h. The reaction mixture was concentrated under vacuum, the crude material was poured into water (50 mL) and extracted with ethyl acetate (3×100 mL). The combined organic layer washed with brine solution (2×50 mL), dried over $Na_2SO_4$, filtered and concentrated under vacuum. The crude material was purified by flash chromatography (product eluted in 3% MeOH in DCM) yielding the title compound (0.61 g, 1.91 mmol. Yield: 67.6%).

$^1$H NMR (DMSO-d6, 400 MHz): δ 1.45 (s, 9H), 2.33-2.34 (m, 4H), 3.45 (s, 2H), 3.55-3.57 (m, 4H), 4.48-4.56 (m, 4H), 7.20-7.28 (m, 3H). LCMS (Method A): 1.192 min, MS: ES+319.26 (M+1).

4-(isoindolin-5-ylmethyl) morpholine hydrochloride (Intermediate 47)

To a stirred solution of t-butyl 5-(morpholinomethyl) isoindoline-2-carboxylate (0.25 g, 0.78 mmol, 1.0 eq) in DCM (2 mL) was added 4M HCl in 1,4-dioxane (2.5 mL) at 0° C. The reaction mixture was stirred at room temperature for 2 h. The reaction mixture was concentrated under reduced pressure and the crude material triturated using diethyl ether (2×20 mL) to give the title compound (0.26 g, 1.19 mmol, Yield 100%).

$^1$H NMR (DMSO-d6, 400 MHz): δ 3.06-3.09 (m, 2H), 3.18-3.21 (m, 2H), 3.80-3.93 (m, 4H), 4.34-4.35 (m, 2H), 4.52 (s, br, 4H), 7.48 (d, J=8 Hz, 1H), 7.63-7.65 (m, 2H), 10.20 (s, 2H). LCMS (Method A): 1.54 min, MS: ES+219.33 (M+1).

Figure 16:
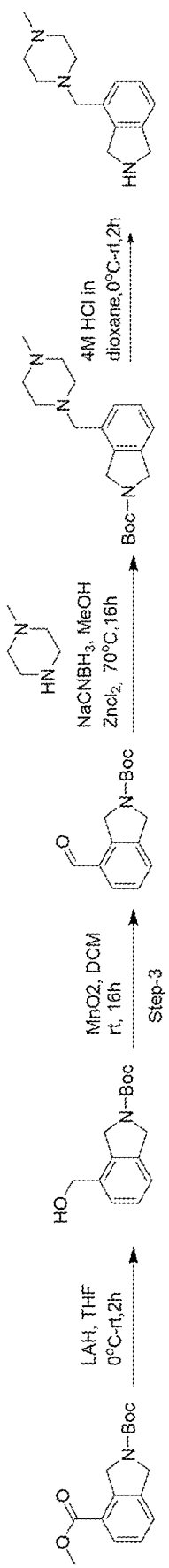
FIG. 16 shows the reaction scheme for 4-((4-Methylpiperazin-1-yl)methyl) isoindoline hydrochloride (Intermediate 48).

Synthesis of 4-((4-Methylpiperazin-1-yl)methyl) isoindoline hydrochloride (Intermediate 48) (Reaction Scheme Shown in FIG. 16)

t-Butyl-4-(hydroxymethyl)isoindoline-2-carboxylate

A stirred solution of 2-(t-butyl)-4-methyl isoindoline-2, 4-dicarboxylate (4.0 g, 14.4 mmol, 1.0 eq) in THF (80 mL) at 0° C. was treated dropwise with $LiAlH_4$ solution (1.0 M in THF) (14.4 mL, 14.4 mmol, 1.0 eq). The resulting reaction mixture was stirred at 0° C. for 1 h and carefully poured onto ice cold saturated $NH_4Cl$ in water (50 mL) and extracted with ethyl acetate (3×100 mL). The combined organic layer was dried over $Na_2SO_4$, filtered and concentrated under vacuum yielding the title compound (3.5 g, 14.05 mmol. Yield: 97.34%).

$^1$H NMR (DMSO-d6, 400 MHz): δ 1.46 (s, 9H), 4.46-4.48 (m, 2H), 4.56-4.59 (m, 4H), 5.16-5.20 (m, 1H), 7.21-7.28 (m, 3H). LCMS (Method A): 1.609 min, MS: ES+150.1 (M−100).

t-Butyl 4-formylisoindoline-2-carboxylate

To a stirred solution of t-butyl 4-(hydroxymethyl) isoindoline-2-carboxylate (3.5 g, 14.04 mmol, 1.0 eq) in DCM (70 mL) was added MnO$_2$ (35 g, 10% w/w) at room temperature. The resulting reaction mixture was stirred at room temperature for 16 h, filtered through a celite bed, washed with 10% MeOH in DCM (3×100 mL) and the combined filtrate concentrated under vacuum. The crude material was purified by flash chromatography (product eluted with 8% ethyl acetate in n-hexane) to give the title compound (2.0 g, 8.08 mmol. Yield: 57.6%).

$^1$H NMR (DMSO-d6, 400 MHz): 1.46-1.47 (m, 9H), 4.61 (d, J=10.4 Hz, 2H), 4.83 (d, J=8 Hz, 2H), 7.58 (t, J=6.4 Hz, 1H), 7.67 (t, J=5.6 Hz, 1H), 7.90 (d, J=6.0 Hz, 1H), 10.06 (d, J=5.6 Hz, 1H). LCMS (Method A): 1.993 min, MS: ES+192.1 (M−56).

t-Butyl-4-((4-methylpiperazin-1-yl)methyl)isoindoline-2-carboxylate

Three batches of 0.3 g scale progressed in parallel. A stirred solution of t-butyl 4-formylisoindoline-2-carboxylate (0.3 g, 1.21 mmol, 1.0 eq) in MeOH (10 mL) at room temperature was treated with N-methyl piperazine (0.121 g, 1.21 mmol, 1.0 eq) and ZnCl$_2$ (0.078 g, 0.60 mmol, 0.5 eq). The reaction mixture was heated to 70° C. and stirred for 16 h. NaCNBH$_3$ (0.152 g, 2.42 mmol, 2.0 eq) was added portionwise to the reaction mixture at 0° C. The resulting reaction mixture was stirred at room temperature for 16 h. The reaction mixture was concentrated under vacuum, poured into water (50 mL) and extracted with ethyl acetate (3×100 mL). The combined organic layer was washed by brine solution (30 mL), dried with Na$_2$SO$_4$, filtered and concentrated under vacuum. The crude material was purified by flash chromatography (product eluted with 4% MeOH in DCM) to give the title compound (0.6 g, 1.80 mmol. Yield 49.7%).

$^1$H NMR (DMSO-d6, 400 MHz): δ 1.46 (s, 9H), 2.61-2.63 (m, 5H), 2.95-2.97 (m, br, 4H), 3.34-3.35 (m, br, 4H), 4.57-4.63 (m, 4H), 7.19-7.25 (m, 3H). LCMS (Method A): 1.212 min, MS: ES+332.37 (M+1).

4-((4-Methylpiperazin-1-yl)methyl) isoindoline hydrochloride (Intermediate 48)

To a stirred solution of t-butyl 4-((4-methylpiperazin-1-yl) methyl)isoindoline-2-carboxylate (0.3 g, 0.9 mmol, 1.0 eq) in DCM (2 mL) was added 4M HCl in dioxane (1 mL) at 0° C. The resulting reaction mixture was stirred at room temperature for 2 h. The reaction mixture was concentrated under vacuum yielding the title compound which was used directly in the next step (0.3 g, Yield: quantitative, 1.29 mmol).

LCMS (Method A): 0.165 min, MS: ES+232.19 (M+1).

Synthesis of 4-(isoindolin-4-ylmethyl)morpholine hydrochloride (Intermediate 49)

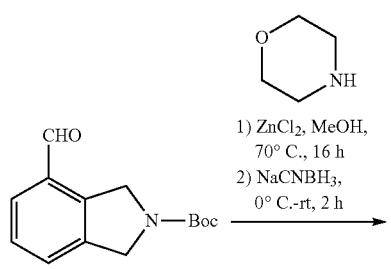

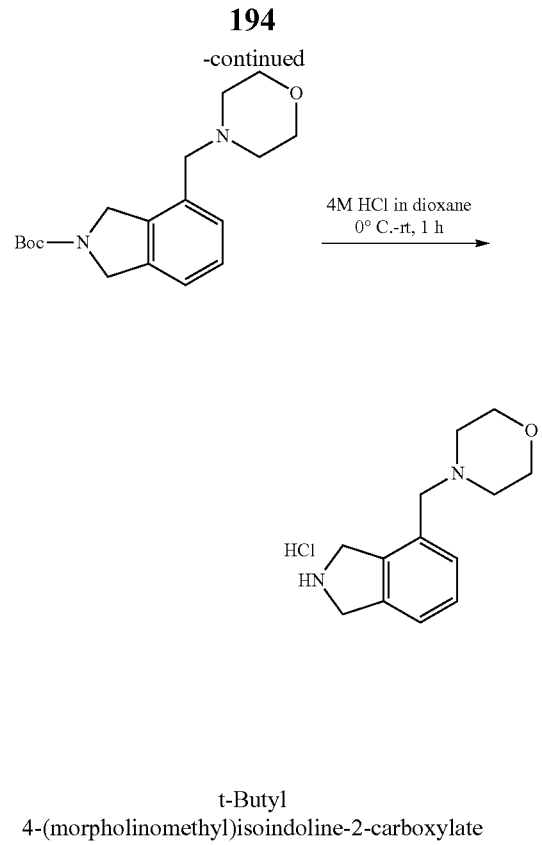

t-Butyl 4-(morpholinomethyl)isoindoline-2-carboxylate

2 Batches of 0.4 g scale were progressed in parallel. A stirred solution of t-butyl 4-formylisoindoline-2-carboxylate (0.4 g, 1.62 mmol, 1.0 eq) in MeOH (5 mL) at room temperature were treated with morpholine (0.169 g, 1.94 mmol, 1.2 eq) and ZnCl$_2$ (0.110 g, 0.810 mmol, 0.5 eq). The reaction mixture was heated to 70° C. and stirred for 16 h. NaCNBH$_3$ (0.203 g, 3.23 mmol, 2.0 eq) was added portion wise to the reaction mixture at 0° C. The reaction mixture was stirred at room temperature for 2 h. The reaction mixture was concentrated under vacuum and the crude material purified by flash chromatography (product eluted with 30% ethyl acetate in hexane) to give the title compound (0.6 g, 1.89 mmol. Yield: 58.25%).

$^1$H NMR (DMSO-d6, 400 MHz): δ ppm 1.45-1.46 (m, 9H), 2.33 (m, br, 4H), 3.43 (s, 2H), 3.55-3.56 (m, 4H), 4.56-4.64 (m, 4H), 7.18-7.24 (m, 3H). LCMS (Method A): 1.221 min, MS: ES+319.2 (M+1).

4-(isoindolin-4-ylmethyl)morpholine hydrochloride (Intermediate 49)

A stirred solution of t-butyl 4-(morpholinomethyl)isoindoline-2-carboxylate (0.6 g, 1.89 mmol, 1.0 eq) in DCM (5 mL) was cooled to 0° C. and 4M HCl in dioxane (6 mL) was added dropwise. The reaction mixture was stirred at room temperature for 1 h. The reaction mixture was concentrated under vacuum and the crude material triturated using n-pentane (3×10 mL) followed by diethyl ether (10 mL) and dried under high vacuum yielding to give the title compound as a pink solid (0.6 g, 2.36 mmol. Yield 100%).

$^1$H NMR (DMSO-d6, 400 MHz): δ 3.16-3.27 (m, 4H), 3.85-3.93 (m, 4H), 4.34-4.35 (m, 2H), 4.51-4.54 (m, 2H), 4.81-4.84 (m, 2H), 7.44-7.51 (m, 2H), 7.68-7.70 (m, 1H), 10.2 (s, 2H). LCMS (Method B): 1.65 min, MS: ES+219.03 (M+1).

Synthesis of N-(tetrahydrofuran-3-yl)isoindolin-4-amine hydrochloride salt (Intermediate 50)

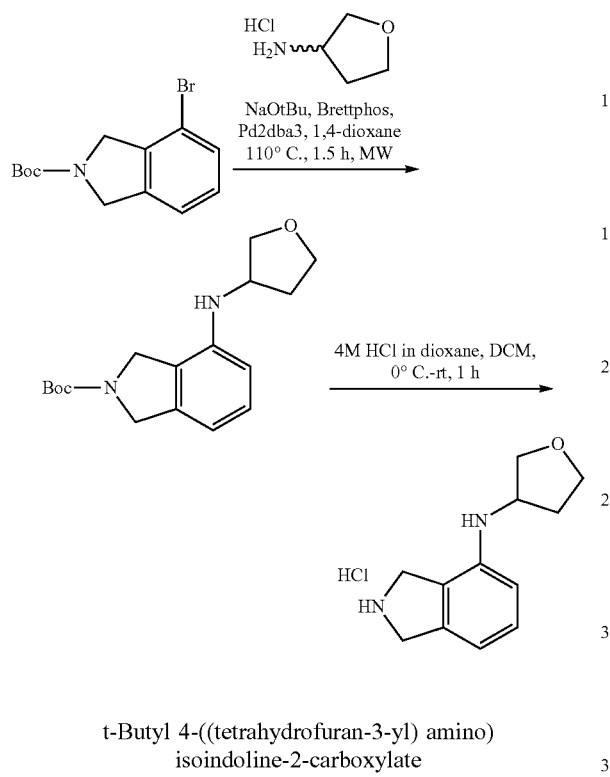

t-Butyl 4-((tetrahydrofuran-3-yl) amino)isoindoline-2-carboxylate t-Butyl 4-bromoisoindoline-2-carboxylate (1.00 g, 3.36 mmol, 1 eq), tetrahydrofuran-3-amine hydrochloride (0.624 g, 5 mmol, 1.5 eq) and 1, 4-dioxane (5 mL) were placed in a 35 mL microwave glass tube and the mixture degassed at room temperature using $N_2$ gas for 30 min. NaOtBu (0.805 g, 8.38 mmol, 2.5 eq) and Brettphos (0.108 g, 0.20 mmol, 0.06 eq) were added to reaction mixture and again purged with $N_2$ for 10 min. $Pd_2(dba)_3$ (0.092 g, 0.10 mmol, 0.03 eq) was added and the reaction heated to 110° C. under microwave irradiation for 1.5 h. The reaction mixture was filtered through celite and washed with ethyl acetate (2×50 mL). The combined filtrate was poured to ice-cold water (100 mL) and extracted in ethyl acetate (3×100 mL). The combined organic layer was dried over $Na_2SO_4$, filtered, and concentrated under vacuum. The crude material was purified by flash chromatography (product eluted in 20% EtOAc in hexane) to give the title compound as a yellow solid (0.6 g, Yield: 58.82%, 1.97 mmol).

$^1$H NMR (DMSO-d6, 400 MHz): δ ppm 1.47 (s, 9H), 1.83-1.86 (m, 1H), 2.13-2.19 (m, 1H), 3.55-3.59 (m, 1H), 3.69-3.74 (m, 1H), 3.79-3.85 (m, 1H), 3.88-3.92 (m, 1H), 4.01-4.02 (m, 1H), 4.42 (d, J=4.4 Hz, 2H), 4.49-4.52 (m, 2H), 5.34-5.39 (m, 1H, $D_2O$ exchangeable), 6.42-6.45 (m, 1H), 6.53-6.57 (m, 1H), 7.06-7.10 (m, 1H). LCMS (Method A): 2.038 min, MS: ES+249.15 (M−56).

N-(tetrahydrofuran-3-yl)isoindolin-4-amine hydrochloride salt (Intermediate 50)

A stirred solution of t-butyl 4-((tetrahydrofuran-3-yl) amino) isoindoline-2-carboxylate (0.550 g, 1.81 mmol, 1.0 eq) in DCM (5 mL) at 0° C. was treated dropwise with 4M HCl in dioxane (0.5 mL). The reaction mixture was stirred for 1 h at RT. The reaction mixture was concentrated under vacuum and crude material triturated using n-pentane (3×10 mL) followed by diethyl ether (10 mL) to give solid that was dried under high vacuum to give the title compound (0.50 g, 2.08 mmol. Yield 100%).

$^1$H NMR (DMSO-d6, 400 MHz): δ 1.82-1.84 (m, 1H), 2.15-2.24 (m, 1H), 3.57-3.60 (m, 2H), 3.69-3.74 (m, 1H), 3.81-3.92 (m, 2H), 4.30-4.33 (m, 2H), 4.35-4.40 (m, 2H), 6.54 (d, J=8.0 Hz, 1H), 6.64 (d, J=7.6 Hz, 1H), 7.16 (t, J=8 Hz, 15.6 Hz, 1H). LCMS (Method A): 0.702 min. MS: ES+205.18 (M+1).

Synthesis of N-(Oxetan-3-yl)isoindolin-4-amine·TFA salt (Intermediate 51)

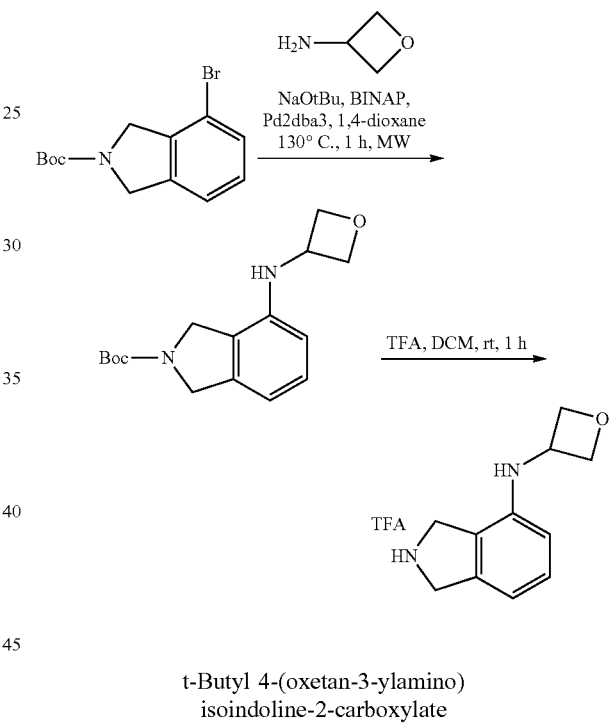

t-Butyl 4-(oxetan-3-ylamino)isoindoline-2-carboxylate

A mixture of tert-butyl 4-bromoisoindoline-2-carboxylate (1.00 g, 3.36 mmol, 1 eq) and oxetan-3-amine (0.735 g, 6.71 mmol, 2 eq) in 1, 4-dioxane (5 mL) at room temperature in a 35 mL microwave glass vial was treated with NaOtBu (0.451 g, 4.70 mmol, 1.4 eq) and the mixture degassed using $N_2$ gas for 10 min. BINAP (0.125 g, 0.20 mmol, 0.06 eq) and $Pd_2(dba)_3$ (0.120 g, 0.13 mmol, 0.04 eq) were added and again purged with $N_2$ for 10 min. The reaction resulting reaction mixture was heated to 130° C. under microwave irradiation for 1.5 h. The reaction mixture was filtered through celite, washed with ethyl acetate (2×50 mL) and the combined filtrate poured onto ice-cold water (100 mL) and extracted in ethyl acetate (3×100 mL). The combined organic layer was dried over $Na_2SO_4$, filtered, and concentrated under vacuum. The crude material was purified by flash chromatography (product eluted in 20% EtOAc in hexane) yielding the title compound as a yellow solid (0.8 g, 2.76 mmol. Yield: 78.16%).

$^1$H NMR (DMSO-d6, 400 MHz): δ 1.47 (2 singlets, 9H), 4.44-4.58 (m, 7H), 4.83 (t, J=6 Hz, 12 Hz, 2H), 5.99-6.02 (m, 1H), 6.16-6.18 (m, 1H), 6.59 (t, J=7.6 Hz, 14.8 Hz, 1H), 7.05 (t, J=7.6 Hz, 1H). LCMS (Method A): 2.051 min, MS: ES+235.1 (M−56).

N-(Oxetan-3-yl)isoindolin-4-amine·TFA salt (Intermediate 51)

A stirred solution of t-butyl 4-((tetrahydrofuran-3-yl) amino) isoindoline-2-carboxylate (0.4 g, 1.32 mmol, 1.0 eq) in DCM (5 mL) at 0° C. was treated dropwise with 4M HCl in dioxane (1.5 mL). The reaction mixture was stirred at room temperature for 1 h. The reaction mixture was concentrated under vacuum and the crude material triturated using n-pentane (3×10 mL) followed by diethyl ether (10 mL) and dried under high vacuum to give the title compound (0.4 g, 1.2 mmol. Yield: 91%).

$^1$H NMR (DMSO-d6, 400 MHz): δ 4.30-4.47 (m, 6H), 4.52-4.61 (m, 1H), 4.83 (t, J=6.4 Hz, 2H), 6.26 (d, J=8 Hz, 1H), 6.66 (d, J=8 Hz, 1H), 7.16 (t, J=8 Hz, 1H). 9.42 (m, 3H) LCMS (Method A): 0.735 min, MS: ES+191.2 (M+1).

Synthesis of 1-(isoindolin-4-yl)piperidin-3-ol hydrochloride (Intermediate 52)

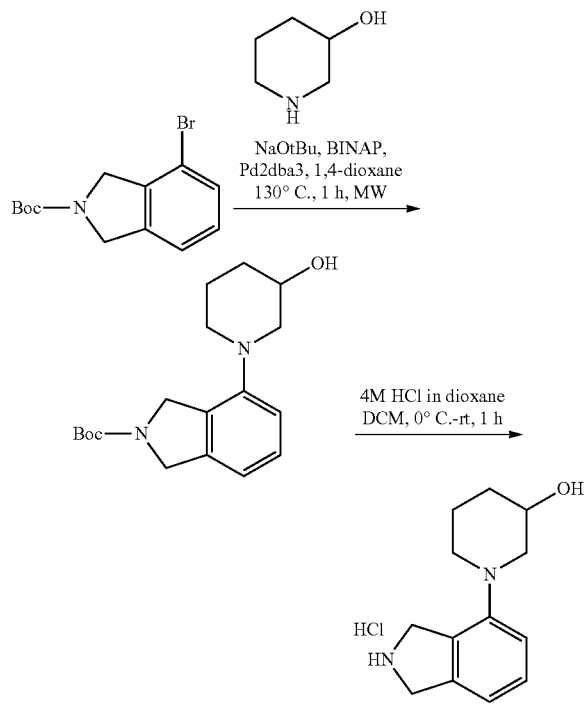

t-butyl 4-(3-hydroxypiperidin-1-yl)isoindoline-2-carboxylate t-Butyl 4-bromoisoindoline-2-carboxylate (1.00 g, 3.36 mmol, 1 eq), piperidin-3-ol (0.670 g, 6.63 mmol, 2 eq) and NaOtBu (0.451 g, 4.70 mmol, 1.4 eq) in 1,4-dioxane (5 mL) were added to a 35 mL microwave glass tube. The reaction mixture was degassed using N$_2$ gas for 10 min. BINAP (0.125 g, 0.20 mmol, 0.06 eq) and Pd$_2$(dba)$_3$ (0.120 g, 0.13 mmol, 0.04 eq) were added to the reaction mixture which was again purged with N$_2$ for 10 min. The reaction was heated to 130° C. under microwave irradiation for 1.5 h. The reaction mixture was filtered through a celite bed and washed with ethyl acetate (2×50 mL). The combined filtrate was poured to ice cold water (100 mL) and extracted in ethyl acetate (3×100 mL). The combined organic layer was dried over Na$_2$SO$_4$, filtered, and concentrated under vacuum. The crude material was purified by flash chromatography (product eluted in 20% EtOAc in hexane) yielding the title compound as a yellow solid (0.6 g, Yield: 56.23%, 1.89 mmol).

$^1$H NMR (DMSO-d6, 400 MHz): δ ppm 1.24 (m, 1H), 1.46 (s, 9H), 1.5 (m, 1H), 1.74 (m, 1H), 1.99 (m, 1H), 3.06 (m, 2H), 3.17-3.23 (m, 2H), 3.59 (m, 1H), 4.52-4.56 (m, 3H), 4.81-4.84 (m, 1H), 6.84 (t, J=7.6 Hz, 15.6 Hz, 1H), 6.93 (t, J=8 Hz, 16.8 Hz, 1H), 7.20-7.22 (m, 1H). LCMS (Method A): 1.929 min, MS: ES+319.3 (M+1).

1-(isoindolin-4-yl)piperidin-3-ol hydrochloride (Intermediate 52)

A stirred solution of t-butyl 4-(3-hydroxypiperidin-1-yl) isoindoline-2-carboxylate (0.5 g, 1.57 mmol, 1.0 eq) in DCM (5 mL) at 0° C. was treated dropwise with 4M HCl in dioxane (5 mL). The reaction mixture was stirred at room temperature for 1 h. The reaction mixture was concentrated under vacuum and the crude material triturated using n-pentane (3×10 mL) followed by diethyl ether (10 mL) and dried under high vacuum yielding the title compound as brown solid (0.500 g, 1.97 mmol, Yield 100%).

$^1$H NMR (DMSO-d6, 400 MHz): δ 1.24-1.35 (m, 1H), 1.60-1.63 (m, 1H), 1.80-1.90 (m, 2H), 2.55-2.60 (m, 1H), 2.68-2.74 (m, 1H), 3.09-3.12 (m, 1H), 3.18-3.21 (m, 1H), 3.71 (bs, 1H), 4.46 (s, br, 4H), 6.99-7.01 (m, 1H), 7.05-7.07 (m, 1H), 7.33 (t, J=7.6 Hz, 15.6 Hz, 1H), 9.98 (s, 2H). LCMS (Method A): 0.555 min, MS ES+219.2 (M+1).

Synthesis of 5-((4-methylpiperazin-1-yl) methyl) isoindoline. HCl salt (Intermediate 53)

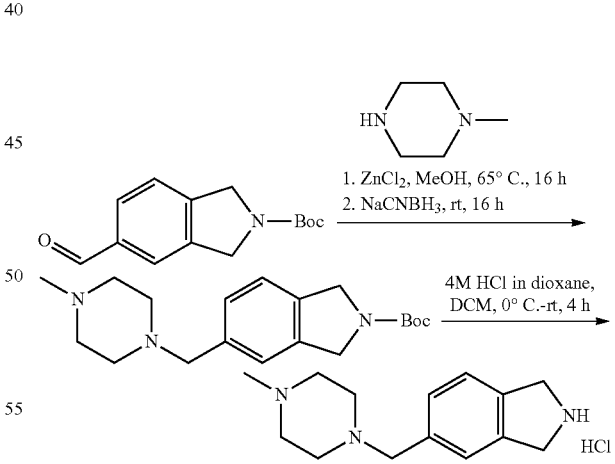

t-Butyl 5-((4-methylpiperazin-1-yl) methyl) isoindoline-2-carboxylate

A stirred solution of t-butyl 5-formylisoindoline-2-carboxylate (4.0 g, 16.17 mmol, 1.0 eq) in MeOH (100 mL) at room temperature was treated with N-methyl piperazine (1.61 g, 16.17 mmol, 1.0 eq) and ZnCl$_2$ (1.04 g, 8.05 mmol, 0.5 eq). The reaction mixture was heated to 70° C. and stirred for 16 h. The resulting reaction mixture was allowed to cool to 0° C. and treated with NaCNBH$_3$ (2.02 g, 32.2 mmol, 2.0 eq). The resulting reaction mixture was stirred at room temperature for 16 h. The reaction mixture was concentrated under vacuum, water (100 mL) was added and extracted using ethyl acetate (3×150 mL). The combined organic layer was dried over Na$_2$SO$_4$, filtered, and concentrated under vacuum. The crude material was purified by flash chromatography (product was eluted at 6% MeOH in DCM) yielding the title compound (4.3 g, Yield: 80.21%, 12.98 mmol).

$^1$H NMR (DMSO-d6) (400 MHz): 1.45 (s, 9H), 2.23 (s, 3H), 2.40-2.50 (m, 8H) (piperazine proton merged), 2.45 (s, 2H), 4.54-4.56 (m, 4H), 7.19-7.26 (m, 3H). LCMS (Method A): 0.945 min, MS: ES+332.32 (M+1).

5-((4-methylpiperazin-1-yl) methyl) isoindoline.
HCl salt (Intermediate 53)

A stirred solution of t-butyl 5-((4-methylpiperazin-1-yl)methyl)isoindoline-2-carboxylate (1.3 g, 3.92 mmol, 1.0 eq) in DCM (5 mL) at 0° C. was treated dropwise with 4M HCl in dioxane (1 mL). The reaction mixture was stirred at room temperature for 2 h. The reaction mixture was concentrated under vacuum yielding the title compound (1.3 g, Yield: quantitative, 5.62 mmol).

$^1$H NMR (DMSO-d6, 400 MHz): 2.78 (s, 3H), 3.20-3.59 (m, br, 4H), 3.82-3.84 (m, br, 4H), 4.32-4.35 (m, 2H), 4.51 (s, br, 4H), 7.48 (d, J=7.6 Hz, 1H), 7.64 (s, 2H), 10.15 (s, 1H). LCMS (Method B): 1.33 min, MS: ES+232.37 (M+1).

Biological Assays

Fluorescence Polarisation Assay for MLH1
(Protocol for all Examples Except Examples 64, 76, 90 and 95)

Test compounds, as 10 mM DMSO stocks, were dispensed into a Black Fluotrac 200 384 well medium binding plate (Greiner Bio-One, item number 781076) using a Labcyte Echo acoustic liquid handler. For single point screening, test compounds were added to wells in columns 1-22 whilst DMSO was added to wells in columns 23 and 24 in order to normalise the plate. For potency determination, serial dilutions of test compounds were added to wells in columns 3-22 and DMSO volume was normalised across the plate.

20 µL of a 2× solution (200 nM) of recombinant N-terminal MLH1 (residues 15-340) in assay buffer (25 mM HEPES, pH 7.5, 250 mM NaCl, 10 mM MgCl$_2$, 0.01% Triton X-100, 5 mM Dithiothreitol) was added to all wells in columns 2-23 for potency determination or columns 1-23 for single point screening. 20 µL assay buffer was added to all wells in columns 1 and 24 (column 24 only for single point screening) using a MultiDrop Combi (ThermoFisher). Plates were centrifuged for 1 minute at 250×g and were incubated at room temperature for 30 minutes prior to the addition of 20 µL of 2×(10 nM) of 5-((5-(4-((2-(2,4-dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate (referred to hereinafter as "probe compound") in assay buffer (prepared from a 100 µM DMSO stock) with a MultiDrop Combi (ThermoFisher). The final concentration of N-terminal MLH1 was 100 nM and the final concentration of probe compound was 5 nM.

Compound plates were centrifuged for 1 minute at 250×g for 1 minute and were incubated at room temperature for 15 minutes before being read on a PheraStar FSX (fitted with 384-well aperture spoon and 540 590 590 FP optic module). The gain and focus were adjusted before each plate was read so that the polarisation of a no enzyme control (column 24) was equal to 35 mP. Data were normalised against the no inhibitor controls (column 23) and no enzyme controls (column 24).

Fluorescence Polarisation Assay for MLH1
(Protocol for Examples 64, 76, 90 and 95)

Test compounds, as 10 mM DMSO stocks, were dispensed into a 384-well Low Flange Black Flat Bottom Polystyrene Non-binding Surface plate (Corning®, item number 3575) using a Labcyte Echo acoustic liquid handler. Test compounds were added to wells in columns 1-22 whilst DMSO was added to wells in columns 23 and 24 in order to normalise the plate. 20 µL of a 2× solution (200 nM) of recombinant N-terminal MLH1 (residues 15-340) in assay buffer (25 mM HEPES, pH 7.5, 250 mM NaCl, 10 mM MgCl$_2$, 0.01% Triton X-100, 5 mM dithiothreitol) was added to all wells in columns 1-23 and 20 µL assay buffer was added to all wells in column 24 using an E1-ClipTip pipette (ThermoFisher). Plates were centrifuged for 1 minute at 250×g and were incubated at room temperature for 30 minutes prior to the addition of 20 µL of 2×(10 nM) 5-((5-(4-((2-(2,4-dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate in assay buffer (prepared from a 1 mM DMSO stock) with an E1-ClipTip pipette (ThermoFisher). The final concentration of N-terminal MLH1 was 100 nM and the final concentration of the probe compound was 5 nM. Compound plates were centrifuged for 1 minute at 250 xg for 1 minute and immediately read on a PheraStar FSX (fitted with 384-well aperture spoon and 590 675 675 FP optic module). The gain and focus were adjusted before each plate was read so that the polarisation of a no enzyme control (column 24) was equal to 35 mP. Data were normalised against the no inhibitor controls (column 23) and no enzyme controls (column 24).

Data obtained in this assay is shown in Table B1 below.

Fluorescence Polarisation Assay for PMS2

Test compounds, as 10 mM DMSO stocks, were dispensed into a Black Fluotrac 200 384 well medium binding plate (Greiner Bio-One, item number 781076) using a Labcyte Echo acoustic liquid handler. For single point screening, test compounds were added to wells in columns 1-22 whilst DMSO was added to wells in columns 23 and 24 in order to normalise the plate. For potency determination, serial dilutions of test compounds were added to wells in columns 3-22 and DMSO volume was normalised across the plate.

20 µL of a 2× solution (20 nM) of recombinant N-terminal PMS2 (residues 1-365) in assay buffer (25 mM HEPES, pH 7.5, 250 mM NaCl, 10 mM MgCl$_2$, 0.01% Triton X-100, 5 mM Dithiothreitol) was added to all wells in columns 2-23 for potency determination or columns 1-23 for single point screening. 20 µL assay buffer was added to all wells in columns 1 and 24 (column 24 only for single point screening) using a MultiDrop Combi (ThermoFisher). Plates were centrifuged for 1 minute at 250×g and were incubated at room temperature for 30 minutes prior to the addition of 20

μL of 2×(20 nM) of 5-((5-(4-((2-(2,4-dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate (referred to hereinafter as "probe compound") in assay buffer (prepared from a 100 μM DMSO stock) with a MultiDrop Combi (ThermoFisher). The final concentration of N-terminal PMS2 was 10 nM and the final concentration of probe compound was 5 nM.

Compound plates were centrifuged for 1 minute at 250×g for 1 minute and were incubated at room temperature for 1 hour before being read on a PheraStar FSX (fitted with 384-well aperture spoon and 540 590 590 FP optic module). The gain and focus were adjusted before each plate was read so that the polarisation of a no enzyme control (column 24) was equal to 35 mP. Data were normalised against the no inhibitor controls (column 23) and no enzyme controls (column 24).

Data obtained in this assay is shown in Table B1 below.

TABLE B1

*>10 μM
**1-10 μM
***less than 1 μM

| Example | Name | MLH1 IC$_{50}$ | PMS2 IC$_{50}$ |
|---|---|---|---|
| 1 | [2,4-dihydroxy-6-(pyrimidin-2-ylmethoxy)phenyl]-pyrrolidin-1-yl-methanone | * | * |
| 2 | [2-(cyclopentoxy)-4,6-dihydroxy-phenyl]-pyrrolidin-1-yl-methanone | * | * |
| 3 | (2-benzyloxy-4,6-dihydroxy-phenyl)-pyrrolidin-1-yl-methanone | * | * |
| 4 | (2-benzyloxy-4,6-dihydroxy-phenyl)-isoindolin-2-yl-methanone | *** | *** |
| 5 | (2-benzyloxy-4,6-dihydroxy-phenyl)-(1-piperidyl)methanone | * | * |
| 6 | (2-benzyloxy-4,6-dihydroxy-phenyl)-[(3S)-3-hydroxypyrrolidin-1-yl]methanone | * | * |
| 7 | (2-benzyloxy-4,6-dihydroxy-phenyl)-[(3R)-3-hydroxypyrrolidin-1-yl]methanone | * | * |
| 8 | (2-benzyloxy-4,6-dihydroxy-phenyl)-[(3R)-3-hydroxy-1-piperidyl]methanone | * | * |
| 9 | (2-benzyloxy-4,6-dihydroxy-phenyl)-[(3S)-3-hydroxy-1-piperidyl]methanone | * | * |
| 10 | (2-benzyloxy-4,6-dihydroxy-3-methyl-phenyl)-pyrrolidin-1-yl-methanone | * | ** |
| 11 | (2-benzyloxy-3-ethyl-4,6-dihydroxy-phenyl)-pyrrolidin-1-yl-methanone | * | * |
| 12 | [2,4-dihydroxy-6-(2-pyridylmethoxy)phenyl]-pyrrolidin-1-yl-methanone | * | * |
| 13 | [2,4-dihydroxy-6-[(1R)-1-phenylethoxy]phenyl]-pyrrolidin-1-yl-methanone | * | * |
| 14 | [2,4-dihydroxy-6-[(1R)-1-phenylethoxy]phenyl]-pyrrolidin-1-yl-methanone | * | * |
| 15 | [2-[(4-fluorophenyl)methoxy]-4,6-dihydroxy-phenyl]-pyrrolidin-1-yl-methanone | * | * |
| 16 | [2,4-dihydroxy-6-[(4-methoxyphenyl)methoxy]phenyl]-pyrrolidin-1-yl-methanone | * | * |
| 17 | [2,4-dihydroxy-6-(m-tolylmethoxy)phenyl]-pyrrolidin-1-yl-methanone | * | * |
| 18 | (2-benzyloxy-4,6-dihydroxy-phenyl)-(5,7-dihydropyrrolo[3,4-b]pyridin-6-yl)methanone | ** | ** |
| 19 | (2-benzyloxy-4,6-dihydroxy-phenyl)-(4-methoxyisoindolin-2-yl)methanone | *** | *** |
| 20 | [2,4-dihydroxy-6-(pyrimidin-4-ylmethoxy)phenyl]-pyrrolidin-1-yl-methanone | * | * |
| 21 | 2,4-dihydroxy-6-(1H-pyrazol-3-ylmethoxy)phenyl]-pyrrolidin-1-yl-methanone | * | * |
| 22 | [2,4-dihydroxy-6-(1H-triazol-4-ylmethoxy)phenyl]-pyrrolidin-1-yl-methanone | * | * |
| 23 | (2-benzyloxy-4,6-dihydroxy-phenyl)-(5-bromoisoindolin-2-yl)methanone | *** | *** |
| 24 | methyl 2-(2-benzyloxy-4,6-dihydroxy-benzoyl)isoindoline-5-carboxylate | *** | *** |
| 25 | (2-benzyloxy-4,6-dihydroxy-phenyl)-(5-methoxyisoindolin-2-yl)methanone | *** | *** |
| 26 | (2-benzyloxy-4,6-dihydroxy-phenyl)-(5,6-dimethoxyisoindolin-2-yl)methanone | ** | *** |
| 27 | [2,4-dihydroxy-6-(1-phenylethoxy)phenyl]-isoindolin-2-yl-methanone | ** | *** |
| 28 | [2,4-dihydroxy-6-(1-phenylethoxy)phenyl]-(5-methoxyisoindolin-2-yl)methanone | ** | *** |
| 29 | [2,4-dihydroxy-6-(1-phenylethoxy)phenyl]-(5,6-dimethoxyisoindolin-2-yl)methanone | ** | *** |
| 30 | (2-benzyloxy-4,6-dihydroxy-3-methyl-phenyl)-(5,7-dihydropyrrolo[3,4-b]pyridin-6-yl)methanone | * | *** |
| 31 | 5,7-dihydropyrrolo[3,4-b]pyridin-6-yl-[4,6-dihydroxy-3-methyl-2-(m-tolylmethoxy)phenyl]methanone | * | *** |
| 32 | 5,7-dihydropyrrolo[3,4-b]pyridin-6-yl-[2,4-dihydroxy-6-(m-tolylmethoxy)phenyl]methanone | ** | *** |
| 33 | 5,7-dihydropyrrolo[3,4-b]pyridin-6-yl-[4,6-dihydroxy-3-methyl-2-(2-pyridylmethoxy)phenyl]methanone | * | ** |
| 34 | [4,6-dihydroxy-3-methyl-2-(2-pyridylmethoxy)phenyl]-isoindolin-2-yl-methanone | * | ** |
| 35 | 5,7-dihydropyrrolo[3,4-b]pyridin-6-yl-[2,4-dihydroxy-6-(2-pyridylmethoxy)phenyl]methanone | ** | ** |
| 36 | (2-benzyloxy-4,6-dihydroxy-3-methyl-phenyl)-(3,4-dihydro-1H-isoquinolin-2-yl)methanone | * | *** |
| 37 | [2,4-dihydroxy-6-(2-pyridylmethoxy)phenyl]-isoindolin-2-yl-methanone | ** | ** |
| 38 | (2-benzyloxy-4,6-dihydroxy-3-methyl-phenyl)-(4-bromoisoindolin-2-yl)methanone | * | *** |
| 39 | (2-benzyloxy-4,6-dihydroxy-3-methyl-phenyl)-[4-(hydroxymethyl)isoindolin-2-yl]methanone | * | *** |
| 40 | (2-benzyloxy-4,6-dihydroxy-3-methyl-phenyl)-[5-[(4-methylpiperazin-1-yl)methyl]isoindolin-2-yl]methanone | * | *** |
| 41 | (2-benzyloxy-4,6-dihydroxy-3-methyl-phenyl)-(6-methoxy-3,4-dihydro-1H-isoquinolin-2-yl)methanone | * | *** |
| 42 | (2-benzyloxy-4,6-dihydroxy-3-methyl-phenyl)-(3,4-dihydro-1H-2,7-naphthyridin-2-yl)methanone | * | ** |
| 43 | (2-benzyloxy-4,6-dihydroxy-3-methyl-phenyl)-(3,4-dihydro-1H-2,6-naphthyridin-2-yl)methanone | * | ** |
| 44 | 3,4-dihydro-1H-isoquinolin-2-yl-[4,6-dihydroxy-3-methyl-2-(m-tolylmethoxy)phenyl]methanone | * | *** |

TABLE B1-continued

*>10 μM
**1-10 μM
***less than 1 μM

| Example | Name | MLH1 IC$_{50}$ | PMS2 IC$_{50}$ |
|---|---|---|---|
| 45 | 3,4-dihydro-1H-isoquinolin-2-yl-[4,6-dihydroxy-3-methyl-2-(2-pyridylmethoxy)phenyl]methanone | * | * |
| 46 | [4,6-dihydroxy-3-methyl-2-(2-pyridylmethoxy)phenyl]-(7-methoxy-3,4-dihydro-1H-isoquinolin-2-yl)methanone | * | * |
| 47 | [4,6-dihydroxy-3-methyl-2-(2-pyridylmethoxy)phenyl]-(6-methoxy-3,4-dihydro-1H-isoquinolin-2-yl)methanone | * | * |
| 48 | 3,4-dihydro-1H-isoquinolin-2-yl-[2-[(4-fluorophenyl)methoxy]-4,6-dihydroxy-3-methyl-phenyl]methanone | * | *** |
| 49 | (2-(benzyloxy)-4,6-dihydroxyphenyl)(5-((4-methylpiperazin-1-yl)methyl)isoindolin-2-yl)methanone | ** | *** |
| 50 | (4-aminoisoindolin-2-yl)(2-(benzyloxy)-4,6-dihydroxy-3-methylphenyl)methanone | * | *** |
| 51 | (2-benzyloxy)-4,6-dihydroxy-3-methylphenyl)(4-vinylisoindolin-2-yl)methanone | * | *** |
| 52 | (2-benzyloxy)-4,6-dihydroxy-3-methylphenyl)(7-methoxy-3,4-dihydroisoquinolin-2(1H)-yl)methanone | * | *** |
| 53 | (2-benzyloxy)-4,6-dihydroxy-3-methylphenyl)(5,8-dihydro-1,7-naphthyridin-7(6H)-yl)methanone | * | ** |
| 54 | (2-benzyloxy)-4,6-dihydroxy-3-methylphenyl)(7,8-dihydro-1,6-naphthyridin-6(5H)-yl)methanone | * | ** |
| 55 | (2-benzyloxy)-4,6-dihydroxy-3-methylphenyl)(7,8-dihydropyrido[4,3-d]pyrimidin-6(5H)-yl)methanone | * | ** |
| 56 | (2-benzyloxy)-4,6-dihydroxy-3-methylphenyl)(5,8-dihydropyrido[3,4-d]pyrimidin-7(6H)-yl)methanone | * | ** |
| 57 | (3,4-dihydroisoquinolin-2(1H)-yl)(4,6-dihydroxy-3-methyl-2-((1-methyl-1H-pyrazol-3-yl)methoxy)phenyl)methanone | * | * |
| 58 | (2-benzyloxy)-4,6-dihydroxyphenyl)(3,4-dihydroisoquinolin-2(1H)-yl)methanone | ** | ** |
| 59 | (2-benzyloxy)-4,6-dihydroxy-3-methylphenyl)(isoindolin-2-yl)methanone | * | *** |
| 60 | (2-benzyloxy)-4,6-dihydroxy-3-methylphenyl)(7-((dimethylamino)methyl)-3,4-dihydroisoquinolin-2(1H)-yl)methanone | * | *** |
| 61 | (2-benzyloxy)-4,6-dihydroxy-3-methylphenyl)(6-((dimethylamino)methyl)-3,4-dihydroisoquinolin-2(1H)-yl)methanone | * | *** |
| 62 | (S)-(2-(Benzyloxy)-4,6-dihydroxy-3-methylphenyl)(3-(hydroxymethyl)-3,4-dihydroisoquinolin-2(1H)-yl)methanone | * | ** |
| 63 | (2-benzyloxy)-4,6-dihydroxy-3-methylphenyl)(1-(hydroxymethyl)isoindolin-2-yl)methanone | * | ** |
| 64 | (R)-(2-(benzyloxy)-4,6-dihydroxy-3-methylphenyl)(3-(hydroxymethyl)-3,4-dihydroisoquinolin-2(1H)-yl)methanone | * | ** |
| 65 | (2-(Benzyloxy)-4,6-dihydroxy-3-methylphenyl)(1-(hydroxymethyl)-3,4-dihydroisoquinolin-2(1H)-yl)methanone | * | * |
| 66 | (2-(Benzyloxy)-4,6-dihydroxy-3-methylphenyl)(4-(hydroxymethyl)-3,4-dihydroisoquinolin-2(1H)-yl)methanone | * | ** |
| 67 | (2-(Benzyloxy)-4,6-dihydroxy-3-methylphenyl)(2,3-dihydro-4/7-benzo[b][1,4]oxazin-4-yl)methanone | * | * |
| 68 | (2-(Benzyloxy)-4,6-dihydroxy-3-methylphenyl)(5-((dimethylamino)methyl)isoindolin-2-yl)methanone | * | *** |
| 69 | (2-(Benzyloxy)-4,6-dihydroxy-3-methylphenyl)(5-(morpholinomethyl)isoindolin-2-yl)methanone | * | *** |
| 70 | (2-(Benzyloxy)-4,6-dihydroxy-3-methylphenyl)(indolin-1-yl)methanone | * | ** |
| 71 | (2-(Benzyloxy)-4,6-dihydroxyphenyl)(indolin-1-yl)methanone | ** | ** |
| 72 | (2-(Benzyloxy)-4,6-dihydroxy-3-methylphenyl)(3,4-dihydroquinolin-1(2H)-yl)methanone | * | ** |
| 73 | (2-(Benzyloxy)-4,6-dihydroxyphenyl)(3,4-dihydroquinolin-1(2H)-yl)methanone | ** | ** |
| 74 | (2-(Benzyloxy)-4,6-dihydroxy-3-methylphenyl)(1,3-dihydro-2H-pyrrolo[3,4-c]pyridin-2-yl)methanone | * | *** |
| 75 | (2-(Benzyloxy)-4,6-dihydroxy-3-methylphenyl)(4-((4-methylpiperazin-1-yl)methyl)isoindolin-2-yl)methanone | * | *** |
| 76 | (2-(Benzyloxy)-4,6-dihydroxy-3-methylphenyl)(4-(morpholinomethyl)isoindolin-2-yl)methanone | * | ** |
| 77 | 2-(2-(Benzyloxy)-4,6-dihydroxy-3-methylbenzoyl)-N,N-dimethyl-1,2,3,4-tetrahydroisoquinoline-7-carboxamide | * | *** |
| 78 | 2-(2-(benzyloxy)-4,6-dihydroxy-3-methylbenzoyl)-N,N-dimethyl-1,2,3,4-tetrahydroisoquinoline-6-carboxamide | * | *** |
| 79 | (2-(Benzyloxy)-4,6-dihydroxy-3-methylphenyl)(4-((tetrahydrofuran-3-yl)amino)isoindolin-2-yl)methanone | * | *** |
| 80 | (2-(Benzyloxy)-4,6-dihydroxy-3-methylphenyl)(4-(oxetan-3-ylamino)isoindolin-2-yl)methanone | ** | *** |
| 81 | (2-(Benzyloxy)-4,6-dihydroxy-3-methylphenyl)(4-(3-hydroxypiperidin-1-yl)isoindolin-2-yl)methanone | * | *** |
| 82 | 2-(2-(benzyloxy)-4,6-dihydroxy-3-methylbenzoyl)isoindoline-4-carbonitrile | * | *** |
| 83 | 2-(2-(Benzyloxy)-4,6-dihydroxy-3-methylbenzoyl)-N,N-dimethylisoindoline-5-carboxamide | * | *** |
| 84 | 2-(2-(Benzyloxy)-4,6-dihydroxy-3-methylbenzoyl)-N-methylisoindoline-5-carboxamide | * | *** |
| 85 | 2-(2-(Benzyloxy)-4,6-dihydroxy-3-methylbenzoyl)-N,N-dimethylisoindoline-4-carboxamide | * | *** |
| 86 | 2-(2-(Benzyloxy)-4,6-dihydroxy-3-methylbenzoyl)-N-methylisoindoline-4-carboxamide | * | ** |
| 87 | N-(2-(2-(Benzyloxy)-4,6-dihydroxy-3-methylbenzoyl)isoindolin-4-yl)acetamide | * | *** |

TABLE B1-continued

*>10 μM
**1-10 μM
***less than 1 μM

| Example | Name | MLH1 IC$_{50}$ | PMS2 IC$_{50}$ |
|---|---|---|---|
| 88 | ((2-(Benzyloxy)-4,6-dihydroxy-3-methylphenyl)(4-((tetrahydrofuran-3-yl)oxy)isoindolin-2-yl)methanone | * | *** |
| 89 | (4-(Azetidin-3-yl methoxy) isoindolin-2-yl) (2-(benzyloxy)-4,6-dihydroxy-3-methylphenyl)methanone | * | *** |
| 90 | (2-(Benzyloxy)-4,6-dihydroxy-3-methylphenyl)(4-(pyrimidin-5-ylmethoxy)isoindolin-2-yl)methanone | * | *** |
| 91 | 1-(2-(2-(Benzyloxy)-4,6-dihydroxy-3-methylbenzoyl)isoindolin-4-yl)azetidine-3-carbonitrile | * | *** |
| 92 | (4,6-Dihydroxy-2-methoxy-3-methylphenyl)(5-((4-methylpiperazin-1-yl)methyl)isoindolin-2-yl)methanone | * | *** |
| 93 | (2-Ethoxy-4,6-dihydroxy-3-methylphenyl)(5-((4-methylpiperazin-1-yl)methyl)isoindolin-2-yl)methanone | * | *** |
| 94 | (2-(Cyclohexylmethoxy)-4,6-dihydroxy-3-methylphenyl)(5-((4-methylpiperazin-1-yl)methyl)isoindolin-2-yl)methanone | * | *** |
| 95 | (2-(Cyclopropylmethoxy)-4,6-dihydroxy-3-methylphenyl)(5-((4-methylpiperazin-1-yl)methyl)isoindolin-2-yl)methanone | * | *** |

The invention claimed is:

1. A compound, or a pharmaceutically acceptable salt, hydrate or solvate thereof, having the structural Formula (I), shown below:

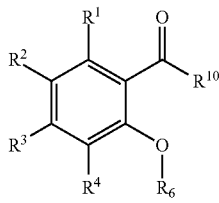

Formula (I)

wherein $R^1$ and $R^3$ are both hydroxy;

$R^2$ is hydrogen or fluoro;

$R^4$ is selected from the group consisting of hydrogen, halogen, (1-6C)alkyl, (3-6C)cycloalkyl and (3-6C)cycloalkyl (1-2C)alkyl, wherein the said (1-6C)alkyl is optionally substituted by one or more $R^{5a}$ and the said (3-6C)cycloalkyl and (3-6C)cycloalkyl (1-2C)alkyl groups are optionally substituted with one or more $R^{5b}$, where each $R^{5a}$ is independently selected from halogen or (1-4C)alkoxy and each $R^{5b}$ is independently selected from the group consisting of halogen, (1-4C)alkyl and (1-4C)alkoxy;

$R^6$ is (1-6C)alkyl, (3-8C)cycloalkyl, (3-8C)cycloalkyl (1-2C)alkyl or a 4- to 7-membered heterocyclyl ring comprising one heteroatom selected from N, O or S, or a group having a structure according to formula (A) shown below:

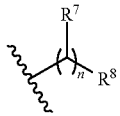

(A)

wherein $R^7$ is hydrogen or (1-3C)alkyl;

n is 1 or 2;

$R^8$ is aryl or heteroaryl, wherein the said aryl or heteroaryl is optionally substituted with one or more $R^9$; where each $R^9$ is independently selected from the group consisting of hydroxy, cyano, halogen, (1-3C)alkyl, (1-3C) alkoxy, (2-3C) alkenyl and (2-3C) alkynyl;

$R^{10}$ is —$NR^{11}R^{12}$, wherein $R^{11}$ and $R^{12}$ are linked, such that, together with the nitrogen atom to which they are attached, they form a 5-7 membered monocyclic heterocyclic ring that is fused to either a 5-6 membered monocyclic heteroaromatic ring or a benzene ring, thereby forming a 8-11 membered bicyclic heteroaryl ring;

wherein any one or more of the rings present in $R^{10}$ is independently optionally substituted with one or more $R^{13}$, each $R^{13}$ is independently selected from the group consisting of halogen, cyano, oxo, epoxy and a group

-$L^1$-$X^1$-$Q^1$ wherein:

$L^1$ is absent or (1-3C)alkylene;

$X^1$ is absent or is selected from the group consisting of —O—, —C(O)—, —C(O)—O—, —O—C(O)—, —S(O)$_{0-2}$—, —C(O)—N($R^{14}$)—, —N($R^{14}$)—C(O)—, —N$R^{14}$—, —N($R^{14}$)—C(O)—N$R^{14}$—, —SO$_2$N($R^{14}$)—, and —N($R^{14}$)SO$_2$—, wherein $R^{14}$ is, at each occurrence, independently selected from the group consisting of hydrogen, hydroxy, cyano, (1-4C)alkyl, (2-4C) alkenyl and (2-4C) alkynyl, wherein any (1-4C) alkyl, (2-4C) alkenyl or (2-4C) alkynyl in $R^{14}$ is independently optionally substituted with one or more groups selected from the group consisting of halogen and hydroxy;

$Q^1$ is selected from the group consisting of hydrogen, (1-6C)alkyl, (2-6C) alkenyl, (2-6C) alkynyl, (3-8C) cycloalkyl, (3-8C)cycloalkyl (1-3C)alkyl, aryl, aryl (1-3C)alkyl, heterocyclyl, heterocyclyl (1-3C)alkyl, heteroaryl and heteroaryl (1-3C)alkyl, wherein any (1-6C)alkyl, (2-6C) alkenyl, (2-6C) alkynyl, (3-8C) cycloalkyl, (3-8C)cycloalkyl (1-3C)alkyl, aryl, aryl (1-3C)alkyl, heterocyclyl, heterocyclyl (1-3C)alkyl, heteroaryl or heteroaryl (1-3C)alkyl in $Q^1$ is optionally substituted with one or more groups $R^{15}$; and each $R^{15}$ is independently selected from the group consisting of hydroxy, cyano, oxo, halogen, (1-3C)alkyl, (1-3C)alkoxy, —$NR^{15a}R^{15b}$, —C(O)—$R^{15a}$, —C(O)—$OR^{15a}$, —O—C(O)—$R^{15a}$, —C(O)—$NR^{15a}R^{15b}$, —N($R^{15b}$)C(O)—$R^{15a}$, —S(O)$_{0-2}R^{15a}$, —S(O)$_2NR^{15a}R^{15b}$, and —N($R^{15b}$)—S(O)$_2R^{15a}$, wherein $R^{15a}$ and $R^{15b}$ are each independently hydrogen or (1-3C)alkyl, and wherein any (1-3C)alkyl moiety present in a $R^{15a}$ or $R^{15b}$ group is optionally further substituted by one or more substituents independently selected from hydroxy, cyano, halogen, —$OR^{15c}$, —NR$^{15}$CR$^{15d}$ and —C(O)—R$^{15c}$, wherein R$^{15c}$ and R$^{15d}$ are both independently selected from hydrogen and (1-2C)alkyl.

2. The compound, or pharmaceutically acceptable salt, hydrate or solvate thereof, according to claim 1, wherein
R$^2$ is hydrogen; and
R$^4$ is selected from the group consisting of hydrogen, fluoro, chloro (1-4C)alkyl, cyclopropyl and cyclobutyl, wherein the said (1-4C)alkyl is optionally substituted by one R$^{5a}$ and the said cyclopropyl and cyclobutyl groups are optionally substituted with one R$^{5b}$.

3. The compound, or pharmaceutically acceptable salt, hydrate or solvate thereof, according to claim 1, wherein
R$^7$ is hydrogen or methyl; and
n is 1.

4. The compound, or pharmaceutically acceptable salt, hydrate or solvate thereof, according to claim 1, wherein R$^8$ is phenyl or 5-6 membered heteroaryl containing 1, 2 or 3 ring heteroatoms independently selected from N and O, wherein the said phenyl or 5-6 membered heteroaryl is optionally substituted with one, two or three R$^9$.

5. The compound, or pharmaceutically acceptable salt, hydrate or solvate thereof, according to claim 1, wherein R$^8$ has any one of the following structures:

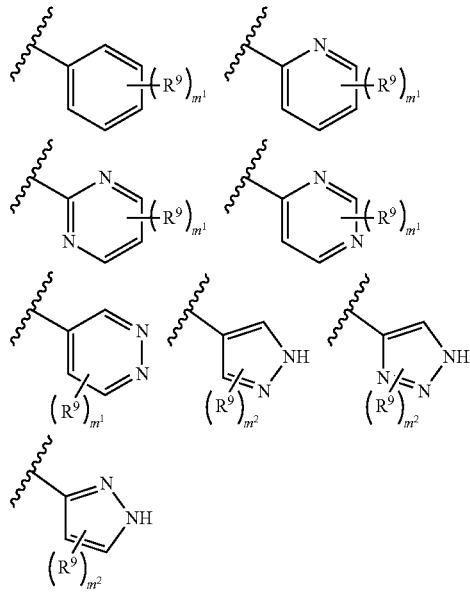

wherein each m$^1$ is independently 0, 1, 2 or 3; and each m$^2$ is independently 0, 1 or 2.

6. The compound, or pharmaceutically acceptable salt, hydrate or solvate thereof, according to claim 1, wherein R$^8$ has the following structure:

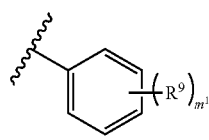

wherein m$^1$ is 0, 1, 2 or 3.

7. The compound, or pharmaceutically acceptable salt, hydrate or solvate thereof, according to claim 1, wherein each R$^9$ is independently selected from the group consisting of hydroxy, halogen, (1-3C)alkyl, (1-3C)alkoxy, (2-3C) alkenyl and (2-3C) alkynyl.

8. The compound, or pharmaceutically acceptable salt, hydrate or solvate thereof, according to claim 1, wherein
R$^{11}$ and R$^{12}$ are linked, such that, together with the nitrogen atom to which they are attached, they form any one of the following ring systems:

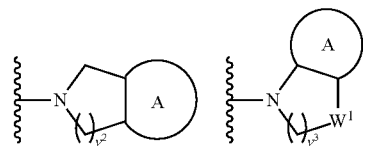

wherein
v$^2$ and v$^3$ are each independently 1 or 2;
W$^1$ is CH, N or O;
each ring A is a benzene ring or a 5-6 membered heteroaromatic ring; and
any ring is optionally substituted with one or two R$^{13}$.

9. The compound, or pharmaceutically acceptable salt, hydrate or solvate thereof, according to claim 1, wherein
R$^{11}$ and R$^{12}$ are linked, such that, together with the nitrogen atom to which they are attached, they form any one of the following ring systems:

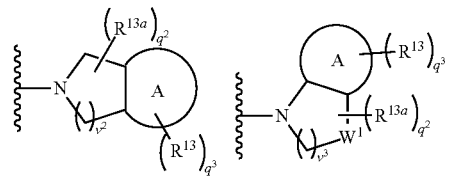

wherein
v$^1$ is 1, 2 or 3;
v$^2$ and v$^3$ are each independently 1 or 2;
W$^1$ is CH, N or O;
each ring A is a benzene ring or a 5-6 membered heteroaromatic ring containing 1, 2 or 3 N atoms;
each R$^{13a}$ is independently selected from the group consisting of oxo, hydroxy, halo, (1-3C)alkyl and (1-3C) alkoxy, wherein any (1-3C)alkyl and (1-3C)alkoxy in R$^{13a}$ is optionally substituted with one or more groups independently selected from the group consisting of hydroxy and halo;
each q$^2$ is independently 0, 1 or 2; and
each q$^3$ is independently 0 or 1.

10. The compound, or pharmaceutically acceptable salt, hydrate or solvate thereof, according to claim 1, wherein R$^{11}$ and R$^{12}$ are linked, such that, together with the nitrogen atom to which they are attached, they form any one of the following ring systems:

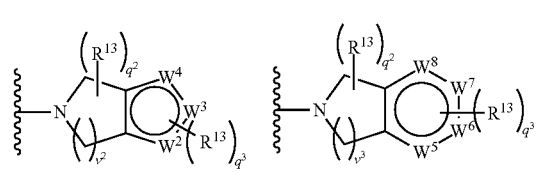

-continued

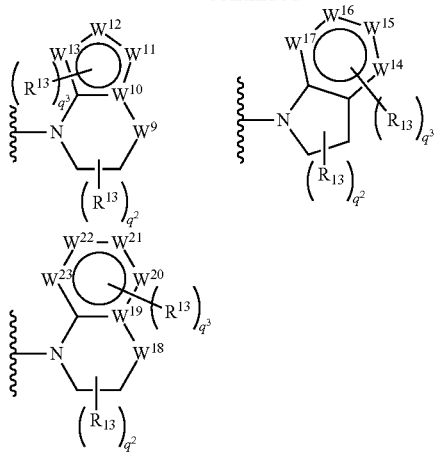

wherein
each $q^2$ is independently 0 or 1;
each $q^3$ is independently 0.1 or 2;
$v^2$ and $v^3$ are each independently 1 or 2;
$W^2$, $W^3$ and $W^4$ are each independently CH, N or O, providing that only zero, one or two of $W^2$, $W^3$ and $W^4$ are N or O;
$W^5$, $W^6$, $W^7$ and $W^8$ are each independently CH, N or O, providing that only zero, one or two of $W^5$, $W^6$, $W^7$ and $W^8$ are N or O;
$W^9$ is N, O or $CH_2$;
$W^{10}$ is C or N;
$W^{11}$, $W^{12}$ and $W^{13}$ are each independently CH, N or O, providing that only zero, one or two of $W^{11}$, $W^{12}$ and $W^{13}$ are N or O;
$W^{14}$, $W^{15}$, $W^{16}$ and $W^{17}$ are each independently CH, N or O, providing that only zero, one or two of $W^{14}$, $W^{15}$, $W^{16}$ and $W^{17}$ are N or O;
$W^{18}$ is N, O or $CH_2$;
$W^{19}$ is C or N; and
$W^{20}$, $W^{21}$, $W^{22}$ and $W^{23}$ are each independently CH, N or O, providing that only zero, one or two of $W^{20}$, $W^{21}$, $W^{22}$ and $W^{23}$ are N or O.

11. The compound, or pharmaceutically acceptable salt, hydrate or solvate thereof, according to claim 1, wherein $R^{11}$ and $R^{12}$ are linked, such that, together with the nitrogen atom to which they are attached, they form any one of the following ring systems:

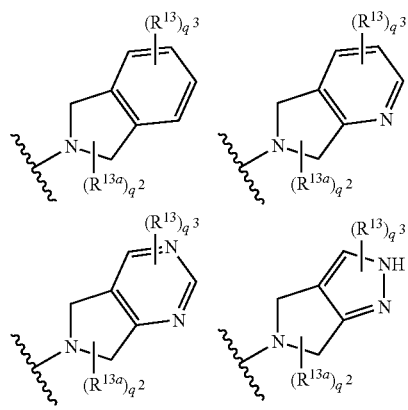

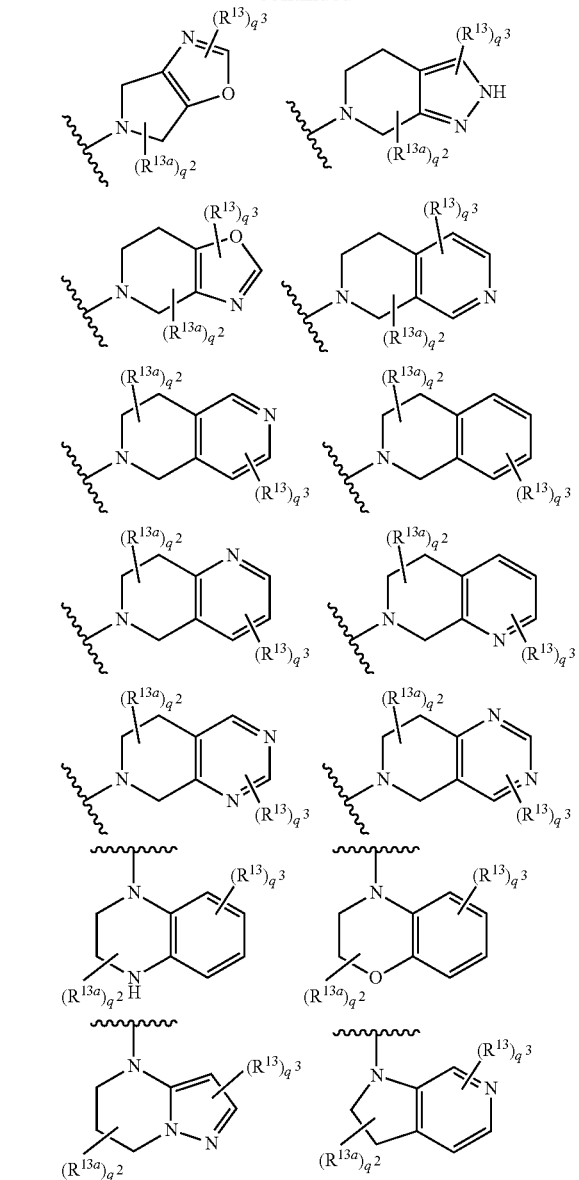

wherein
each $q^2$ is independently 0 or 1 and each $q^3$ is independently 0, 1 or 2; and
each $R^{13a}$ is independently selected from the group consisting of oxo, hydroxy, halo, (1-3C)alkyl and (1-3C)alkoxy, wherein any (1-3C)alkyl and (1-3C)alkoxy in $R^{13a}$ is optionally substituted with one or more groups independently selected from the group consisting of hydroxy and halo.

12. The compound, or pharmaceutically acceptable salt, hydrate or solvate thereof, according to claim 1, wherein $R^{11}$ and $R^{12}$ are linked, such that, together with the nitrogen atom to which they are attached, they form the following ring system:

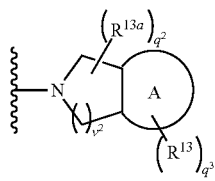

wherein $v^2$ is 1 or 2;

ring A is a benzene ring or a 5-6 membered heteroaromatic ring containing 1, 2 or 3 heteroatoms independently selected from N and O;

each $R^{13a}$ is independently selected from the group consisting of oxo, hydroxy, halo, (1-3C)alkyl and (1-3C) alkoxy, wherein any (1-3C)alkyl and (1-3C)alkoxy in $R^{13a}$ is optionally substituted with one or more groups independently selected from the group consisting of hydroxy and halo;

each $q^2$ is independently 0, 1 or 2; and each $q^3$ is independently 0 or 1.

13. The compound, or pharmaceutically acceptable salt, hydrate or solvate thereof, according to claim 1, wherein $R^{11}$ and $R^{12}$ are linked, such that, together with the nitrogen atom to which they are attached, they form any one of the following ring systems:

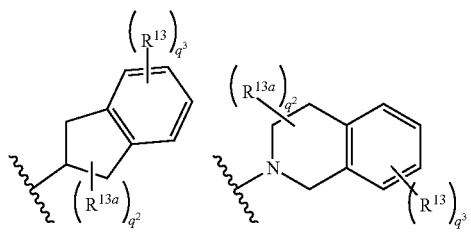

wherein each $q^2$ is independently 0 or 1 and each $q^3$ is independently 0, 1 or 2; and each $R^{13a}$ is independently selected from the group consisting of oxo, hydroxy, halo, (1-3C)alkyl and (1-3C) alkoxy, wherein any (1-3C)alkyl and (1-3C)alkoxy in $R^{13a}$ is optionally substituted with one or more groups independently selected from the group consisting of hydroxy and halo.

14. The compound, or pharmaceutically acceptable salt, hydrate or solvate thereof, according to claim 1, wherein $L^1$ is absent or (1-2C)alkylene;

$X^1$ is absent or is selected from the group consisting of —O—, —C(O)—, —C(O)—O—, —O—C(O)—, —S(O)$_{0-2}$—, —C(O)—N($R^{14}$)—, —N($R^{14}$)—C(O)—, or —N$R^{14}$—, where $R^{14}$ is, at each occurrence, independently selected from the group consisting of hydrogen, hydroxy, cyano, (1-4C)alkyl and (2-4C) alkenyl, wherein any (1-4C)alkyl or (2-4C) alkenyl in $R^{14}$ is independently optionally substituted with one or more groups selected from the group consisting of halogen and hydroxy; and $Q^1$ is selected from the group consisting of hydrogen, (1-6C)alkyl, (2-6C) alkenyl, aryl, heterocyclyl and heteroaryl, wherein any (1-6C)alkyl, (2-6C) alkenyl, aryl, heterocyclyl or heteroaryl in $Q^1$ is optionally substituted with one or more groups $R^{15}$.

15. The compound, or pharmaceutically acceptable salt, hydrate or solvate thereof, according to claim 1, wherein $L^1$ is absent or (1-2C)alkylene;

$X^1$ is absent or is selected from the group consisting of —O—, —C(O)—, —C(O)—O—, —N($R^{14}$)—C(O)—, or —N$R^{14}$—, where $R^{14}$ is, at each occurrence, independently selected from the group consisting of hydrogen, cyano, (1-4C)alkyl and (2-4C) alkenyl; and $Q^1$ is selected from the group consisting of hydrogen, (1-4C)alkyl, (2-4C) alkenyl, phenyl, 5-6 membered heterocyclyl containing 1 or 2 heteroatoms independently selected from N and O, and 5-6 membered heteroaryl containing 1 or 2 heteroatoms independently selected from N and O, wherein any (1-4C)alkyl, (2-4C) alkenyl, phenyl, 5-6 membered heterocyclyl or 5-6 membered heteroaryl in $Q^1$ is optionally substituted with one, two or three groups $R^{15}$.

16. The compound, or pharmaceutically acceptable salt, hydrate or solvate thereof, according to claim 1, wherein each $R^{15}$ is independently selected from the group consisting of hydroxy, cyano, halogen, (1-3C)alkyl, (1-3C)alkoxy, —N$R^{15a}R^{15b}$ and —C(O)—N$R^{15a}R^{15b}$, wherein $R^{15a}$ and $R^{15b}$ are each independently hydrogen or (1-3C)alkyl.

17. The compound, or pharmaceutically acceptable salt, hydrate or solvate thereof, according to claim 1, wherein the compound is selected from any one of the following:

[2,4-dihydroxy-6-(pyrimidin-2-ylmethoxy)phenyl]-pyrrolidin-1-yl-methanone;

[2-(cyclopentoxy)-4,6-dihydroxy-phenyl]-pyrrolidin-1-yl-methanone;

(2-benzyloxy-4,6-dihydroxy-phenyl)-pyrrolidin-1-yl-methanone;

(2-benzyloxy-4,6-dihydroxy-phenyl)-isoindolin-2-yl-methanone;

(2-benzyloxy-4,6-dihydroxy-phenyl)-(1-piperidyl)methanone;

(2-benzyloxy-4,6-dihydroxy-phenyl)-[(3S)-3-hydroxy-pyrrolidin-1-yl]methanone;

(2-benzyloxy-4,6-dihydroxy-phenyl)-[(3R)-3-hydroxy-pyrrolidin-1-yl]methanone;

(2-benzyloxy-4,6-dihydroxy-phenyl)-[(3R)-3-hydroxy-1-piperidyl]methanone;

(2-benzyloxy-4,6-dihydroxy-phenyl)-[(3S)-3-hydroxy-1-piperidyl]methanone;

(2-benzyloxy-4,6-dihydroxy-3-methyl-phenyl)-pyrrolidin-1-yl-methanone;

(2-benzyloxy-3-ethyl-4,6-dihydroxy-phenyl)-pyrrolidin-1-yl-methanone;

[2,4-dihydroxy-6-(2-pyridylmethoxy)phenyl]-pyrrolidin-1-yl-methanone;

[2,4-dihydroxy-6-[(1R)-1-phenylethoxy]phenyl]-pyrrolidin-1-yl-methanone;

[2,4-dihydroxy-6-[(1R)-1-phenylethoxy]phenyl]-pyrrolidin-1-yl-methanone;

[2-[(4-fluorophenyl) methoxy]-4,6-dihydroxy-phenyl]-pyrrolidin-1-yl-methanone;

[2,4-dihydroxy-6-[(4-methoxyphenyl) methoxy]phenyl]-pyrrolidin-1-yl-methanone;

[2,4-dihydroxy-6-(m-tolylmethoxy)phenyl]-pyrrolidin-1-yl-methanone;

(2-benzyloxy-4,6-dihydroxy-phenyl)-(5,7-dihydropyrrolo[3,4-b]pyridin-6-yl)methanone;

(2-benzyloxy-4,6-dihydroxy-phenyl)-(4-methoxyisoindolin-2-yl)methanone;

[2,4-dihydroxy-6-(pyrimidin-4-ylmethoxy)phenyl]-pyrrolidin-1-yl-methanone;

2,4-dihydroxy-6-(1H-pyrazol-3-ylmethoxy)phenyl]-pyrrolidin-1-yl-methanone;

[2,4-dihydroxy-6-(1H-triazol-4-ylmethoxy)phenyl]-pyrrolidin-1-yl-methanone;

(2-benzyloxy-4,6-dihydroxy-phenyl)-(5-bromoisoindolin-2-yl)methanone;

methyl 2-(2-benzyloxy-4,6-dihydroxy-benzoyl) isoindoline-5-carboxylate;

(2-benzyloxy-4,6-dihydroxy-phenyl)-(5-methoxyisoindolin-2-yl)methanone;

(2-benzyloxy-4,6-dihydroxy-phenyl)-(5,6-dimethoxyisoindolin-2-yl)methanone;

[2,4-dihydroxy-6-(1-phenylethoxy)phenyl]-isoindolin-2-yl-methanone;

[2,4-dihydroxy-6-(1-phenylethoxy)phenyl]-(5-methoxyisoindolin-2-yl)methanone;

[2,4-dihydroxy-6-(1-phenylethoxy)phenyl]-(5,6-dimethoxyisoindolin-2-yl)methanone;

(2-benzyloxy-4,6-dihydroxy-3-methyl-phenyl)-(5,7-dihydropyrrolo[3,4-b]pyridin-6-yl)methanone;

5,7-dihydropyrrolo[3,4-b]pyridin-6-yl-[4,6-dihydroxy-3-methyl-2-(m-tolylmethoxy)phenyl]methanone;

5,7-dihydropyrrolo[3,4-b]pyridin-6-yl-[2,4-dihydroxy-6-(m-tolylmethoxy)phenyl]methanone;

5,7-dihydropyrrolo[3,4-b]pyridin-6-yl-[4,6-dihydroxy-3-methyl-2-(2-pyridylmethoxy)phenyl]methanone;

[4,6-dihydroxy-3-methyl-2-(2-pyridylmethoxy)phenyl]-isoindolin-2-yl-methanone;

5,7-dihydropyrrolo[3,4-b]pyridin-6-yl-[2,4-dihydroxy-6-(2-pyridylmethoxy)phenyl]methanone;

(2-benzyloxy-4,6-dihydroxy-3-methyl-phenyl)-(3,4-dihydro-1H-isoquinolin-2-yl)methanone;

[2,4-dihydroxy-6-(2-pyridylmethoxy)phenyl]-isoindolin-2-yl-methanone;

(2-benzyloxy-4,6-dihydroxy-3-methyl-phenyl)-(4-bromoisoindolin-2-yl)methanone;

(2-benzyloxy-4,6-dihydroxy-3-methyl-phenyl)-[4-(hydroxymethyl) isoindolin-2-yl]methanone;

(2-benzyloxy-4,6-dihydroxy-3-methyl-phenyl)-[5-[(4-methylpiperazin-1-yl) methyl]isoindolin-2-yl]methanone;

(2-benzyloxy-4,6-dihydroxy-3-methyl-phenyl)-(6-methoxy-3,4-dihydro-1H-isoquinolin-2-yl)methanone;

(2-benzyloxy-4,6-dihydroxy-3-methyl-phenyl)-(3,4-dihydro-1H-2,7-naphthyridin-2-yl)methanone;

(2-benzyloxy-4,6-dihydroxy-3-methyl-phenyl)-(3,4-dihydro-1H-2,6-naphthyridin-2-yl)methanone;

3,4-dihydro-1H-isoquinolin-2-yl-[4,6-dihydroxy-3-methyl-2-(m-tolylmethoxy)phenyl]methanone;

3,4-dihydro-1H-isoquinolin-2-yl-[4,6-dihydroxy-3-methyl-2-(2-pyridylmethoxy)phenyl]methanone;

[4,6-dihydroxy-3-methyl-2-(2-pyridylmethoxy)phenyl]-(7-methoxy-3,4-dihydro-1H-isoquinolin-2-yl)methanone;

[4,6-dihydroxy-3-methyl-2-(2-pyridylmethoxy)phenyl]-(6-methoxy-3,4-dihydro-1H-isoquinolin-2-yl)methanone;

3,4-dihydro-1H-isoquinolin-2-yl-[2-[(4-fluorophenyl) methoxy]-4,6-dihydroxy-3-methyl-phenyl]methanone;

(2-(benzyloxy)-4,6-dihydroxyphenyl)(5-((4-methylpiperazin-1-yl) methyl) isoindolin-2-yl)methanone;

(4-aminoisoindolin-2-yl) (2-(benzyloxy)-4,6-dihydroxy-3-methylphenyl)methanone;

(2-(benzyloxy)-4,6-dihydroxy-3-methylphenyl) (4-vinylisoindolin-2-yl)methanone;

(2-(benzyloxy)-4,6-dihydroxy-3-methylphenyl) (7-methoxy-3,4-dihydroisoquinolin-2(1H)-yl)methanone;

(2-(benzyloxy)-4,6-dihydroxy-3-methylphenyl) (5,8-dihydro-1,7-naphthyridin-7 (6H)-yl)methanone;

(2-(benzyloxy)-4,6-dihydroxy-3-methylphenyl) (7,8-dihydro-1,6-naphthyridin-6 (5H)-yl)methanone;

(2-(benzyloxy)-4,6-dihydroxy-3-methylphenyl) (7,8-dihydropyrido [4,3-d]pyrimidin-6 (5H)-yl)methanone;

(2-(benzyloxy)-4,6-dihydroxy-3-methylphenyl) (5,8-dihydropyrido [3,4-d]pyrimidin-7 (6H)-yl)methanone;

(3,4-dihydroisoquinolin-2(1H)-yl) (4,6-dihydroxy-3-methyl-2-((1-methyl-1H-pyrazol-3-yl) methoxy)phenyl)methanone;

(2-(benzyloxy)-4,6-dihydroxyphenyl) (3,4-dihydroisoquinolin-2(1H)-yl)methanone;

(2-(benzyloxy)-4,6-dihydroxy-3-methylphenyl) (isoindolin-2-yl)methanone;

(2-(benzyloxy)-4,6-dihydroxy-3-methylphenyl) (7-((dimethylamino) methyl)-3,4-dihydroisoquinolin-2(1H)-yl)methanone;

(2-(benzyloxy)-4,6-dihydroxy-3-methylphenyl) (6-((dimethylamino) methyl)-3,4-dihydroisoquinolin-2(1H)-yl)methanone;

(S)-(2-(Benzyloxy)-4,6-dihydroxy-3-methylphenyl) (3-(hydroxymethyl)-3,4-dihydroisoquinolin-2(1H)-yl) methanone;

(2-(benzyloxy)-4,6-dihydroxy-3-methylphenyl) (1-(hydroxymethyl) isoindolin-2-yl)methanone;

(R)-(2-(benzyloxy)-4,6-dihydroxy-3-methylphenyl) (3-(hydroxymethyl)-3,4-dihydroisoquinolin-2(1H)-yl) methanone;

(2-(Benzyloxy)-4,6-dihydroxy-3-methylphenyl) (1-(hydroxymethyl)-3,4-dihydroisoquinolin-2(1H)-yl)methanone;

(2-(Benzyloxy)-4,6-dihydroxy-3-methylphenyl) (4-(hydroxymethyl)-3,4-dihydroisoquinolin-2(1H)-yl)methanone;

(2-(Benzyloxy)-4,6-dihydroxy-3-methylphenyl) (2,3-dihydro-4H-benzo[b][1,4]oxazin-4-yl)methanone;

(2-(Benzyloxy)-4,6-dihydroxy-3-methylphenyl)(5-((dimethylamino) methyl) isoindolin-2-yl)methanone;

(2-(Benzyloxy)-4,6-dihydroxy-3-methylphenyl)(5-(morpholinomethyl) isoindolin-2-yl)methanone;

(2-(Benzyloxy)-4,6-dihydroxy-3-methylphenyl) (indolin-1-yl)methanone;

(2-(Benzyloxy)-4,6-dihydroxyphenyl) (indolin-1-yl)methanone;

(2-(Benzyloxy)-4,6-dihydroxy-3-methylphenyl) (3,4-dihydroquinolin-1 (2H)-yl)methanone;

(2-(Benzyloxy)-4,6-dihydroxyphenyl) (3,4-dihydroquinolin-1 (2H)-yl)methanone;

(2-(Benzyloxy)-4,6-dihydroxy-3-methylphenyl) (1,3-dihydro-2H-pyrrolo [3,4-c]pyridin-2-yl)methanone;

(2-(Benzyloxy)-4,6-dihydroxy-3-methylphenyl) (4-((4-methylpiperazin-1-yl) methyl) isoindolin-2-yl)methanone;

(2-(Benzyloxy)-4,6-dihydroxy-3-methylphenyl) (4-(morpholinomethyl) isoindolin-2-yl)methanone;

2-(2-(Benzyloxy)-4,6-dihydroxy-3-methylbenzoyl)-N,N-dimethyl-1,2,3,4-tetrahydroisoquinoline-7-carboxamide;

2-(2-(benzyloxy)-4,6-dihydroxy-3-methylbenzoyl)-N,N-dimethyl-1,2,3,4-tetrahydroisoquinoline-6-carboxamide;

(2-(Benzyloxy)-4,6-dihydroxy-3-methylphenyl) (4-((tetrahydrofuran-3-yl) amino) isoindolin-2-yl)methanone;

(2-(Benzyloxy)-4,6-dihydroxy-3-methylphenyl) (4-(oxetan-3-ylamino) isoindolin-2-yl)methanone;
(2-(Benzyloxy)-4,6-dihydroxy-3-methylphenyl) (4-(3-hydroxypiperidin-1-yl) isoindolin-2-yl)methanone;
2-(2-(Benzyloxy)-4,6-dihydroxy-3-methylbenzoyl) isoindoline-4-carbonitrile;
2-(2-(Benzyloxy)-4,6-dihydroxy-3-methylbenzoyl)-N,N-dimethylisoindoline-5-carboxamide;
2-(2-(Benzyloxy)-4,6-dihydroxy-3-methylbenzoyl)-N,N-methylisoindoline-5-carboxamide;
2-(2-(Benzyloxy)-4,6-dihydroxy-3-methylbenzoyl)-N,N-dimethylisoindoline-4-carboxamide;
2-(2-(benzyloxy)-4,6-dihydroxy-3-methylbenzoyl)-N-methylisoindoline-4-carboxamide;
N-(2-(2-(Benzyloxy)-4,6-dihydroxy-3-methylbenzoyl) isoindolin-4-yl) acetamide;
((2-(Benzyloxy)-4,6-dihydroxy-3-methylphenyl) (4-((tetrahydrofuran-3-yl)oxy) isoindolin-2-yl)methanone;
(4-(Azetidin-3-yl methoxy) isoindolin-2-yl) (2-(benzyloxy)-4,6-dihydroxy-3-methylphenyl) methanone;
(2-(Benzyloxy)-4,6-dihydroxy-3-methylphenyl) (4-(pyrimidin-5-ylmethoxy) isoindolin-2-yl)methanone;
1-(2-(2-(Benzyloxy)-4,6-dihydroxy-3-methylbenzoyl) isoindolin-4-yl) azetidine-3-carbonitrile;
(4,6-Dihydroxy-2-methoxy-3-methylphenyl)(5-((4-methylpiperazin-1-yl) methyl) isoindolin-2-yl)methanone;
(2-Ethoxy-4,6-dihydroxy-3-methylphenyl)(5-((4-methylpiperazin-1-yl) methyl) isoindolin-2-yl)methanone;
(2-(Cyclohexylmethoxy)-4,6-dihydroxy-3-methylphenyl) (5-((4-methylpiperazin-1-yl) methyl) isoindolin-2-yl) methanone;
(2-(Cyclopropylmethoxy)-4,6-dihydroxy-3-methylphenyl)(5-((4-methylpiperazin-1-yl) methyl) isoindolin-2-yl)methanone; and
(2-(Cyclohexylmethoxy)-4,6-dihydroxy-3-methylphenyl) (6-((dimethylamino) methyl)-3,4-dihydroisoquinolin-2 (1H)-yl)methanone.

18. A pharmaceutical composition comprising a compound as defined in claim 1, or a pharmaceutically acceptable salt, hydrate or solvate thereof, in admixture with a pharmaceutically acceptable diluent or carrier.

19. A method of treating a proliferative disorder in a patient in need of such treatment, said method comprising administering to said patient a therapeutically effective amount of a compound, or a pharmaceutically acceptable salt, hydrate or solvate thereof, as defined in claim 1.

* * * * *